United States Patent [19]

McReynolds et al.

[11] 4,167,785

[45] Sep. 11, 1979

[54] TRAFFIC COORDINATOR FOR ARTERIAL TRAFFIC SYSTEM

[75] Inventors: Marshall B. McReynolds; Jack D. Van Tilbury, both of Arlington, Va.; Irving S. Oscar, Washington, D.C.

[73] Assignee: Trac Incorporated, Alexandria, Va.

[21] Appl. No.: 843,729

[22] Filed: Oct. 19, 1977

[51] Int. Cl.[2] ........................ G06F 15/48; G08G 1/08

[52] U.S. Cl. ...................................... 364/437; 340/40; 364/102

[58] Field of Search ............................... 364/436–437; 340/35, 36, 37, 40, 41

[56] References Cited

U.S. PATENT DOCUMENTS

| | | | |
|---|---|---|---|
| 3,241,107 | 3/1966 | Du Vivier | 364/436 |
| 3,302,170 | 1/1967 | Jensen et al. | 340/40 |
| 3,305,828 | 2/1967 | Auer, Jr. et al. | 364/436 |
| 3,374,340 | 3/1968 | Auer, Jr. et al. | 364/436 |
| 3,506,808 | 4/1970 | Riddle, Jr. et al. | 364/436 |
| 3,774,147 | 11/1973 | Hendricks | 364/437 |
| 4,061,902 | 12/1977 | Battle | 364/436 |

OTHER PUBLICATIONS

Crouse-Hinds: Technical Data Bulletin-Two Phase DM-200 Series Digital Controller Units, Nov. 1976.

Range: The Flo-Master Fixed Time Traffic Signal System, ATE Journal, vol. 19, No. 3/4, pp. 94–104.

*Primary Examiner*—Felix D. Gruber

*Attorney, Agent, or Firm*—Schwartz, Jeffery, Schwaab, Mack, Blumenthal & Koch

[57] ABSTRACT

A traffic coordinator is disclosed which utilizes a master unit and a plurality of secondary units wherein the secondary units are positioned at artery cross streets for controlling the main artery traffic in a coordinated fashion. Both the master unit and secondary units contain microprocessors for calculating parameters utilized in the coordination system. The coordination system may be installed in already existing timer-controlled intersections and serves to provide a highly efficient real time control of artery green bands, offsets and splits to achieve optimum traffic flow.

119 Claims, 20 Drawing Figures

DATA BUS
ADDRESS BUS
C.P.U (8080A)
CLOCK GEN. D8224
4013
4013
14585
Q1 2N3563
RESIN
WR
RD.
I/O
9Mhz
47pf
100K
4.7K
4.7K
1K
3K
.0015
.001
6.8
0.1

TRAFFIC COORDINATOR FOR ARTERIAL TRAFFIC SYSTEM

INDEX

BACKGROUND OF THE INVENTION
- Field of the Invention
- Description of the Prior Art SUMMARY OF THE INVENTION
BRIEF DESCRIPTION OF THE DRAWINGS
DETAILED DESCRIPTION OF THE PREFERRED EMBODIMENT
SYSTEM OVERVIEW
MODULE DESCRIPTION AND DEFINITIONS
- Master Unit 50
- Directional Module
- System Module
- Inbound and Outbound Modules
- Volume Module
- Occupancy and Speed Modules
- Average Module
- Display Module
- Secondary Unit 40
- Split 1 and Split 2 Modules
- Offset Module
- Display Module
- Selector Position
- Interface Module-Master and Secondary SYSTEM HARDWARE DESCRIPTION
FUNCTIONAL DESCRIPTION OF THE MASTER UNIT
- Overall Description
- Real Time Traffic Sampling
- Master Cycle Length Computation
- Volume Computations
- Occupancy Computation
- Average Cycle Length Selection
- Directional Commands
- Commands Based Upon Occupancy
- Output Decisions Update Intervals
- Manual Override
- System Percent Average
- Display FUNCTIONAL DESCRIPTION OF THE SECONDARY UNITS
- Average Offsets
- Transition Response
- Force Off Operation
- Free Operation
- Flash/Pre-Emption Operation
- Timer Monitoring
- Standby Operation
- Automatic Input Test SOFTWARE DESCRIPTION
MASTER UNIT
- Update
- PREXMIT
- COMPOSE
- GAPOUT
- GAPEND
- SYNCEND
- GRNUPDIR
- REDTIME
- GRNIN
- DIRSEL
- CONVRT (Calls OCCSEC)
- GRNUPAVG
- MANUAL CYCLE
- CTRMNTR (Counter Monitor)
- CYCTWS
- RANAVG
- QUEUE ROUTINES SECONDARY UNIT
- Overview of Secondary Operation
- Cycle Execution
- Transitions
- Queue Recovery
- Timing
- Dual Counter Concept
- Direction Change Processing
- Overall Block Diagram of Secondary Unit
- LATCHES
- LAMPFORM
- FORMATCP (Format, Complement, Pack)
- LDECLP (Load ECLP)
- DECISION
- TRANSMOD
- LIMITCKK
- NUMPHASE (Phase Number)

SECONDARY UNIT (Continued)
- SPLITIME
- PHDR (Phase Decrement)
- PHTMSET, TWS, SPLITSUM, PERSEC
- TRANSITION
- LENGTHEN
- MODO
- SECSYNC
- CKRANG
- QRECOV (Queue Recovery)
- STORE
- AV/DIR (Average to Directional)
- QUEUE
- SHORTEN
- OFFSEC, OFFMAS
- CTRMAS
- CTRSEC
- FREEOP
- MONITOR
- SCREEN
- STREETPH
- GETPHASE APPENDIX
- Master Unit
- Secondary Unit

BACKGROUND OF THE INVENTION

1. Field of the Invention

The invention is in the field of traffic coordinators, particularly those coordinators utilized for controlling arterial systems.

2. Description of the Prior Art

Many different types of traffic control systems have been devised in the prior art to meet particular traffic needs. Typically, traffic controllers are located at an intersection and may be either pretimed or traffic actuated devices. Many attempts have been made to coordinate the operation of the various controllers. Simple systems utilize time clocks or simple program units to coordinate a plurality of timers to thereby permit progressive traffic flow patterns. More sophisticated systems utilize a separate master coordinator (traffic computer) unit which may be programmed to control arterial systems or a complete grid network. Examples of such prior art systems are shown, for example, in U.S. Pat. Nos. 3,818,429, 3,660,812, 3,506,808, 3,258,745, 3,307,146 and 3,252,133. Typically, traffic control systems provide means for determining cycle lengths, offset and split information by utilizing either traffic actuated vehicle detectors to monitor traffic flow or stored parameter programs set to correspond to historical data for the intersection or artery under consideration. U.S. Pat. No. 3,258,745, for example, illustrates a traffic control system for an artery utilizing traffic actuating controllers and permitting adaptive control of split data in response to vehicle presence. U.S. Pat. No. 3,506,808, for example, discloses the utilization of both volume and occupancy detectors to determine appropriate cycle length in an analog computing and control system. Digital processing techniques for a traffic control system are shown, for example, in U.S. Pat. No. 3,818,429. Most of these prior art systems, however, lack the flexibility necessary to control a large number of traffic conditions, are complicated to install and control no provisions for coordinated operation during communication breakdown. Additionally, prior art coordinated traffic systems do not permit a means for achieving different cycle lengths simultaneously throughout the coordinated system to follow a platoon of vehicles through the system. As a consequence, cycle length is typically changed throughout the entire system at one time so that the coordinated system cannot truly operate to optimize the traffic flow pattern for the different platoons travelling therein.

SUMMARY OF THE INVENTION

It is therefore an object of the invention to provide a traffic coordination system which overcomes the disadvantages of the prior art and provides an economical and easily installed system for controlling arterial traffic.

Another object of the invention is to provide a traffic coordinator which operates in a real time to vary cycle length in a rippled fashion such that new cycle length information is sequentially applied at the controlled intersections to insure efficient movement of each of a plurality of platoons of cars through the system.

Another object of the invention is to provide a distributed processor coordination system such that system commands and calculations applicable to the entire artery are done in a single master unit whereas the interpretations of these commands particularized to the condition at the individual controlled intersections are carried out in secondary units by separate microprocessor means.

Yet another object of the invention is to provide a data communication system for use in a distributed processor traffic coordinator.

Yet another object of the invention is to provide a means for enabling coordinated traffic control during a breakdown in communication between a master unit and a plurality of secondary units in a coordinated system.

Another object of the invention is to provide a traffic coordinator sensitive to both volume and occupancy values within a controlled artery to achieve a real time calculation and selection of cycle lengths for each platoon of vehicles entering the artery.

In accordance with the invention, an arterial traffic coordinator is provided for use with a plurality of controllers and traffic detectors. Each controller is associated with a side street intersection for controlling traffic signals at the intersection. The detectors sense vehicle volume into the artery and vehicle occupancy within the artery for providing corresponding volume and occupancy signals. The coordinator comprises a means for receiving the volume and occupancy signals, a means for calculating an optimum cycle length in response to the received volume and occupancy signals and a means for storing the calculated cycle lengths corresponding to each platoon of vehicles. The coordinator further comprises means, connected to the storing means for retrieving the calculated cycle lengths, and for sequentially controlling the plurality of coordinators to effect the calculated cycle length at each associated intersection so that each platoon of vehicles moving through the intersection is controlled by its own optimum cycle length thereby achieving a coordinated traffic control.

The invention further provides for a means of changing the cycle length without the necessity of changing offset. To accomplish this end offset times are settable in seconds of travel time as opposed to percentages of cycle lengths. In this manner a constant speed through the system may be obtained while permitting variable cycle lengths.

The invention is further characterized as a distributed processing coordination system comprising a programmable master unit and a plurality of programmable secondary units. The master unit calculates system parameters such as cycle length and directional information in response to sensed volume and occupancy values. The secondary units response to the received master information, but act in accordance with separate program instructions and in accordance with individual input parameters corresponding to the associated intersection. The independent processing capability of the secondary units prevents undesirable rapid and/or blind response to information from the master unit.

Further subject matter disclosed herein is the subject of a copending application of Marshall B. McReynolds and Jack D. VanTilbury, Ser. No. 843,730, filed Oct. 19, 1977 and assigned to the same assignee as herein and entitled "Average/Mode Traffic Control System". For directional inbound and outbound modes, the coordinator operates to calculate a specific cycle length to each platoon entering the artery and the calculated cycle length is rippled through the artery as the platoon of vehicles moves through the intersections. In the average mode of operation an optimum cycle length is calculated to effect substantially equally favored traffic flow in each of two directions. More generally, an average mode apparatus is provided which comprises means for establishing a directional offset time for each of the intersections which is proportional to the distance of the intersection from a reference intersection, as for example the first or last intersection in the artery. The apparatus further comprises means for dividing a reference cycle length time into each of the directional offset times for determining a remainder fraction, means for selecting an average-mode offset time for each intersection from one of the group of approximately zero percent and approximately fifty percent of the reference cycle length time in accordance with the value of the remainder fraction, and means for controlling traffic signal lights at the intersections by utilizing the selected average-mode offset times as offset values with respect to the reference intersection.

BRIEF DESCRIPTION OF THE DRAWINGS

These and other objects of the invention will become clear in relation to the foregoing specification taken in conjunction with the drawings wherein:

FIG. 6B is a schematic diagram of a programmable read only memory utilized in the master and secondary units;

DETAILED DESCRIPTION OF THE PREFERRED EMBODIMENT

SYSTEM OVERVIEW

Figure 1:
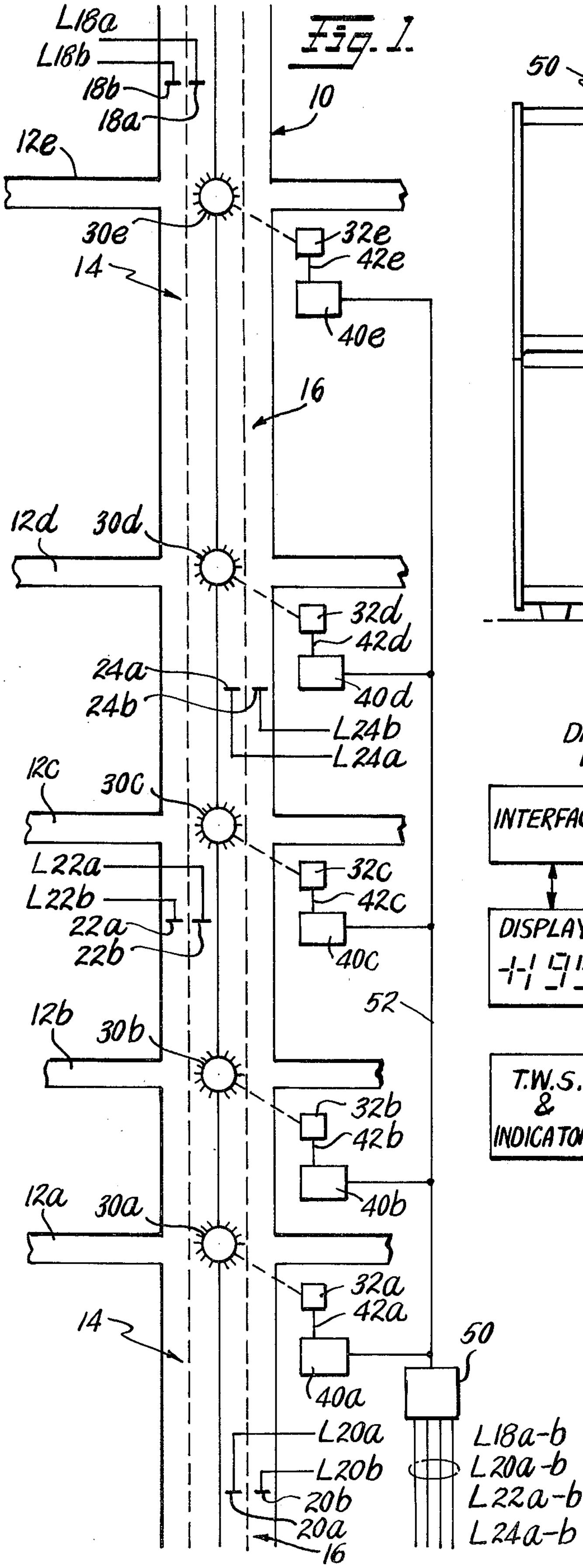
FIG. 1 is a diagrammatic illustration of a typical artery having side streets and showing the interconnection of the master and secondary units forming the coordination apparatus.

As illustrated in FIG. 1, the traffic control system of the instant invention may most advantageously be utilized to control artery traffic as shown in FIG. 1. A main artery 10 which may comprise a four lane highway, two inbound lanes and two outbound lanes, for example, is shown intersected by a plurality of side streets 12*a*–12*e*. Although only five side streets are shown it is readily understood that the number may be greater or less than five to control various lengths of artery traffic. Artery 10 comprises an inbound roadway 14 and an outbound roadway 16. At the beginning of inbound roadway 14 are positioned two inbound volume detectors 18*a* and 18*b* which may be conventional vehicle traffic detectors actuated by the vehicle. Naturally, if the inbound roadway consists of only one lane, then only a single detector 18*a* is employed. Similarly, at the beginning of the outbound road 16 two outbound volume detectors 20*a* and 20*b* are positioned to detect vehicle passage. Additional vehicle detectors are positioned between the inbound volume detectors and outbound volume detectors as for example the inbound occupancy detectors 22*a* and 22*b* and the outbound occupancy detectors 24*a* and 24*b*.

At the intersection of each sideway street 12 with the main artery 10 there is shown a traffic signal 30*a*–30*e* respectively. It is understood that the traffic signal at each intersection may comprise a plurality of lights, one governing each lane, and additional lights directing right and left turns, pedestrain crossing, leading greens and so forth as may be desired. The various traffic flow patterns governed by the signals are referred to as phases. Each traffic signal is controlled by means of associated controllers 32*a*–32*e* which may, for example, be of conventional type such as the Crouse-Hinds model DM-200. Controllers 32*a*–32*e* are effectively timers which serve to energize the various traffic signals 30*a*–30*e* and are capable of being forced off (force to red) after selectable time periods. The issuance of force-off commands to the controllers is, in fact, the mechanism by which coordination is obtained. For a detailed explanation of the operation of an exemplary controller, reference is made to the Crouse-Hinds Technical Data Bulletin, TDB-106T, November 1976, incorporated herein by reference. The coordination system described herein may coordinate any of a large number of types of controllers, and is designed in accordance with specifications of the National Electrical Manufacturers Association (NEMA) as set forth in the Standards Publication, NO. TSl-1976. Secondary units 40*a*–40*e* connected respectively to controllers 30*a*–30*e* serve to override the normal controller function by issuing force-offs as dictated by coordinated master/secondary system considerations. Each secondary 40*a*–40*e* is connected by a plurality of conductors 42*a*–42*e* to each associated controller 32*a*–32*e*, respectively. Each secondary unit 40*a*–40*e* is connected to a master unit 50 by means of a communication path 52. The communication path 52 may comprise either multi-conductor cables or conventional telephone interconnections so as to permit relatively easy installation into existing traffic control equipment.

The controllers 32*a*–32*e* may be of actuated type having associated traffic detectors for the side streets. The traffic control system in accordance with the invention effectively coordinates the operation of all of the conventional controllers 32 since the force-off information is now provided by the controllers associated secondary unit 40 as directed by the master unit 50. Additionally, each controller 32 is fed a large maximum artery green time (MAX II), and a continuous recall is made in the controller 32 to green artery phase. As a result the controllers 32 will always permit artery green unless forced-off by a secondary unit command.

The master/secondary communication scheme is a simplex-type communication. The master unit 50 operates in a broadcast mode to transmit data to all secondaries, each of which responds to the incoming data.

Lines L18*a*–L18*b* are associated with detectors 18*a* and 18*b* respectively and provide vehicle sense data to the master unit 50. Similarly, lines L20*a*–L20*b*, L22*a*–L22*b*, and L24*a*–L24*b* are connected to master unit 50 to provide corresponding vehicle detection information thereto. Although these input lines to the master unit 50 are shown connected to vehicle sensing detectors, it is clear that input signals to the master unit may originate from other sources such as weekly programmers or the like to set up desired platoons on the artery. The coordinator, in accordance with one aspect of the invention, may thus store externally generated cycle length values (whether or not generated from vehicle sensing means) and apply them in sequence to control the traffic light signals at each intersection.

Figure 2:
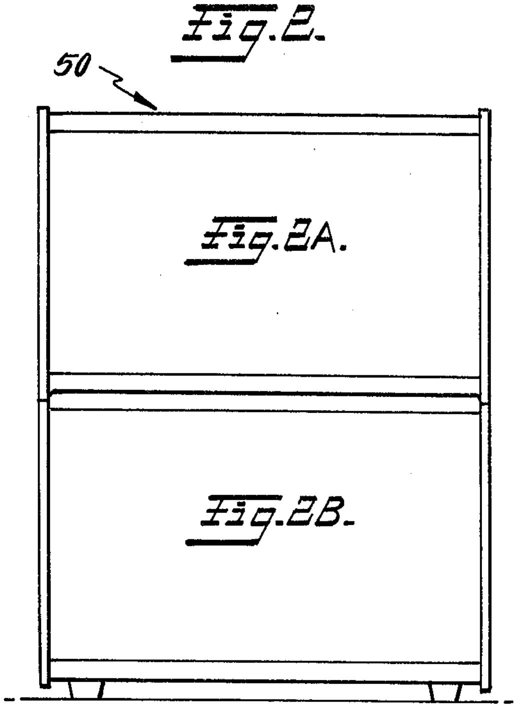
FIG. 2 illustrates the orientation of FIGS. 2A and 2B in a master unit.
Figure 3:
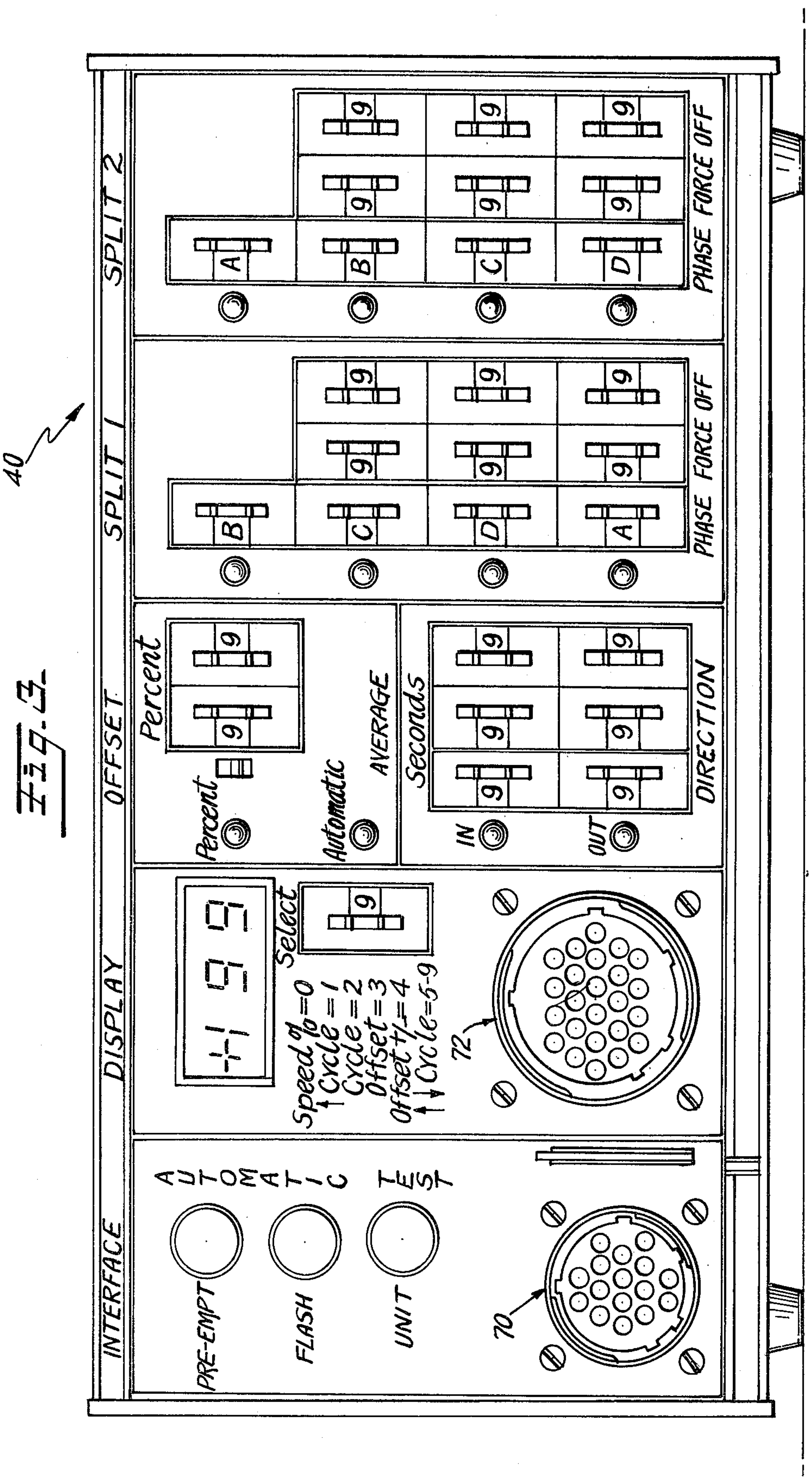
FIG. 3 is a front plan view of a secondary unit illustrating the various front panel controls of the modules utilized in accordance with the invention.

The front panel controls and interconnections of the master and secondary units are shown in FIGS. 2 and 3 respectively. The master unit 50 is seen to comprise a plurality of separate modules labeled inbound, volume, outbound, system, direction, interface, display, average, occupancy and speed. Secondary unit 40 comprises a plurality of modules labeled interface, display, offset, split 1 and split 2. Both the secondary unit 40 and the master unit 50 contain as interface module and a display module. The remaining modules in both the secondary and maaster units may be characterized as switch modules in that they primarily comprise a plurality of thumbwheel switches (TWS) which may be set by the operator. Additionally, these switch modules comprise individual indicators to provide various output data.

The various thumbwheel switch settings which provide input data and the various indicators which provide output data are explained more fully below wherein the various terms adjacent to the switches and indicators are described.

MODULE DESCRIPTION AND DEFINITIONS

Master Unit 50

Direction Module

Thumbwheel switches are provided on the direction module for setting the set points utilized in determining whether the coordinated system should operate in the INBOUND, OUTBOUND or AVERAGE mode. Actuations on the inbound (IN) and outbound (OUT) volume detectors are utilized in the formula IN/(IN+OUT)×100, and compared to the percentage values selected on the IN and OUT thumbwheel switches to select among the three possible modes.

The minimum green time is also settable on the direction module of the master unit. The minimum green is settable in seconds and is an overriding criteria for insuring that the arterial green period always exists for the settable minimum time.

The average sample time in minutes is settable on the direction module for two conditions. If a decision has been made to change from directional to average during a given cycle time the "INTO" thumbwheel switch selects a time period over which the decision must persist as dictated by persistent traffic conditions. The master unit will thus not enter into an average mode of operation from a directional mode unless the conditions dictating the change persists for the time period set on the "INTO" thumbwheel switch. Similarly, the master unit remains in the present average cycle length for a time period settable by the thumbwheel switch labeled "IN".

SYSTEM MODULE

The maximum side street green time is settable on two sets of thumbwheel switches, each set comprising three thumbwheel switches defining time periods set in seconds. The first set of switches is for the Split 1 condition (S-1) whereas the second set of switches corresponding to a larger side street time is for the Split 2 condition (S-2). An indicator is energized corresponding to the selected split. The master unit will automatically select the Split 2 condition if a predetermined green band is exceeded. The settable maximum side street time is essentially the Red phase (artery) time.

The system module also contains a set of thumbwheel switches utilized to set the maximum green period for the artery green as given in seconds. This maximum green period is an overriding criteria similar to the minimum green period.

The system module also contains three thumbwheel switches labeled $Y_{in}$, $Y_{out}$ and X. These thumbwheel switches are utilized to convert occupancy levels as measured by the occupancy detectors into cycle length in seconds. The Y values correspond to a percentage value having a cycle length equal to the maximum green time setting, and the X switch corresponds to a percentage of cycle length corresponding in time to the minimum green time in seconds.

INBOUND AND OUTBOUND MODULES

The inbound and outbound modules are essentially identical and apply to the inbound and outbound directions respectively. The upper pair of thumbwheel switches is utilized to set a time value in which an initial gap time between cars is linearly reduced to a minimum gap time between cars. Thumbwheel switches are separately provided to set both the initial gap in seconds and the mimimum gap in seconds as well as the time to reduce in a linear fashion from the initial gap to the minimum gap. If the gap between any two cars exceeds the time allowed for the gap then a "gap out condition" occurs which, under certain circumstances, terminates the green artery phase.

Separate thumbwheel switches are also provided to allow a time period settable in seconds for the last car passage. This time interval effectively enables a car just crossing a volume detector to pass through the intersection prior to its turning red. The last car passage time is thus added to a green band calculated on volume figures and/or occupancy figures. After a gap out condition is recognized, a time which is equal to the front panel setting of the last car passage is typically added to the green band after which the green period terminates. A last car passage time of at least two seconds is provided even if the front panel thumbwheel switches are set to less than two seconds.

VOLUME MODULE

The volume module is divided into an inbound portion and an outbound portion wherein each portion contains pairs of thumbwheel switches labeled red and green. These thumbwheel switches correspond to headway settings in seconds for the red artery time and the green artery time in both inbound and outbound directions. The red headway time essentially corresponds to the amount of time alloted a car which passes a volume detector during an artery red. The headway time given for a vehicle actuating a volume detector during the green period (green headway) is typically less than the red headway time inasumch as the vehicle is already moving and less time would be required for it to enter and pass through the intersection.

OCCUPANCY AND SPEED MODULES

The occupancy and speed modules contain corresponding sets of thumbwheel switches to permit the master unit to direct speed changes to the secondary units. In principal one wishes to increase the traffic flow speed to compensate for increased occupancy values. A change in the speed of the system will effectively increase or decrease the offset of the secondary units from the offset figure initially put in on the secondary unit thumbwheel switches. Each occupancy value, expressed in percent of occupancy, on the master Occupancy module corresponds to an adjacent percent speed change on the Speed module of the master unit. Four separate speed modifier settings are possible. 100% indicates no modification; 101% to 199% indicates an increase while 000 to 099% indicates a decrease in system speed. The effective speed modification percentage is indicated by an energized indicator (LED) adjacent to the selected thumbwheel switches.

AVERAGE MODULE

The average module is utilized to set four different average cycle lengths in seconds, one of which is selected by the master unit during the AVERAGE mode of operation. A maximum cycle length of 299 seconds may be selected. One of the four presettable cycle lengths is selected depending upon which one is closest to the calculated value of (IN+OUT)/2 where the IN and OUT values are the larger of either the volume cycle length value or occupancy cycle length value. The presettable values on the average module may be optimally determined using a nomograph supplied by TESCO of Alexandria, Virginia and described in U.S. Pat. No. 4,122,994 incorporated herein by reference.

DISPLAY MODULE

The numeric display located on the face of the display module indicates the following parameters as enabled by the adjacent select switch. For cycle lengths in excess of 199 seconds a + (plus) is activated indicating numbers of 200 to 299. For parameters expressed in percentage a − (minus) is activated. A flashing display denotes manual override operation.

Ten selectable parameters from throughout the unit are available and appear on the 2½ digit display of this unit.

The ten position selector shall be assigned as follows:

| | | |
|---|---|---|
| 3 - | An alternate display of Vol./Ocp. in seconds | INBOUND |
| 2 - | An alternate display of Occupancy expressed in Sec./% | INBOUND |
| 1 - | Green band in seconds derived from volume | INBOUND |
| 0 - | Present effective green band in seconds | |
| 9 - | Green band in seconds derived from volume | OUTBOUND |
| 8 - | An alternate display of Occupancy expressed in Sec./% | OUTBOUND |
| 7 - | An alternate display of Vol./Ocp. in seconds | OUTBOUND |
| 6 - | Gap value in seconds and tenths of seconds | |
| 5 - | Present effective cycle length in seconds | |
| 4 - | An alternate display of $T_r$ in Sec./ $\frac{IN}{IN + OUT}$ in %. | |

This computation is based on IN and OUT vehicle counts per each cycle.

SECONDARY UNIT

Split 1 and Split 2 Modules

The Split 1 module is utilized to allow setting of various force-off times in seconds for associated phases of the intersection. The top thumbwheel switch is reserved for the artery phase whereas the bottom three sets of thumbwheel switches are reserved for side street phases. The Split 2 modules is essentially identical to the Split 1 module although different force-off times may be utilized. Typically, the Split 2 module has a longer side street service time for the arterial traffic flow which may correspond also to a larger green time dictated by the master unit.

The phase thumbwheel switches permit association of the artery phase (as well as the side street phases) from the secondary unit 40 to the controller without the need for special logic circuits or wiring changes. Identical secondary units 40 may thus be employed for use at intersections wherein controllers have any assignment of artery and side street phases.

OFFSET MODULE

The offset module of the secondary unit has a plurality of thumbwheel switches for setting the offset time for inbound and outbound traffic with respect to a reference point. The reference point may, for example, by any point in the system not necessarily physically associated with the master unit location and is typically selected to be at the first intersection for inbound traffic flow or at the first intersection for outbound traffic flow. The offset is set in seconds by simply dividing the distance from the reference point by the velocity of traffic flow. Percent offset may also be selected during the average mode of operation utilizing the two thumbwheel switches provided in the offset module. Indicators are energized adjacent the inbound and outbound offset directions depending upon which is in effect at the time. Additionally, a percent and automatic indicator are provided to correspond to the percent offset and for the automatic computation of average offset when in the Average mode.

DISPLAY MODULE

A two and one-half (2½) digit numeric display is provided on the display module to indicate the following information when selected by an adjacent selector: A plus indication displayed along with the 1 in the most significant digit position implies the value 2=200.

SELECTOR POSITION

0—Effective speed wrap in % to 199%.

1—Incrementing secondary cycle in either seconds or %.

2—Effective cycle length in seconds.

3—Offset in seconds (Difference between Master and Secondary units in seconds.)

4—Offset transition, i.e., necessary correction expressed in seconds and updated each cycle. Will normally be 0 when no transition is underway.

Selector Position 5 thru 9:

Incrementing arterial phase followed by decrementing side street phase intervals in seconds or %.

Positions 5 thru 9 enable settable standby cycle lengths of 50 thru 90 seconds respectively. Positions 0 thru 4 enable a standby cycle length of 40 seconds.

The standby cycle length is in effect upon initial turn on of the unit and upon a communications failure that has exceeded time out. Operation in standby is indicated by the appearance of the "minus" sign preceding the numeric display.

INTERFACE MODULE—MASTER AND SECONDARY

The interface and display modules of the secondary unit 40 comprises two I/O pin connectors 70 and 72 respectively. Similarly, the interface and display modules of master unit 50 have I/O pin connectors 80 and 82 respectively. I/O pin connector 70 of each secondary unit is interconnected to the I/O pin connector 80 of the master unit via the communication path 52 (FIG. 1), and the I/O pin connector 72 of each secondary unit is interconnected to its associated controller 32 via conductors 42. I/O pin connector 82 of the master unit is interconnected to the various vehicle detector lines L18*a–b*, L20*a–b*, L22*a–b* and L≧*a–b*. Each display module is seen to further comprise a display and a thumbwheel selector switch. The interface module of both the secondary and master units are seen to comprise, in addition to the I/O pin connectors, a plurality of manual buttons. For the master interface module manual override buttons are provided in the form of slide switches, and in the secondary interface module spring loaded pushbutton switches are provided for automatic test purposes.

SYSTEM HARDWARE DESCRIPTION

Figure 4:
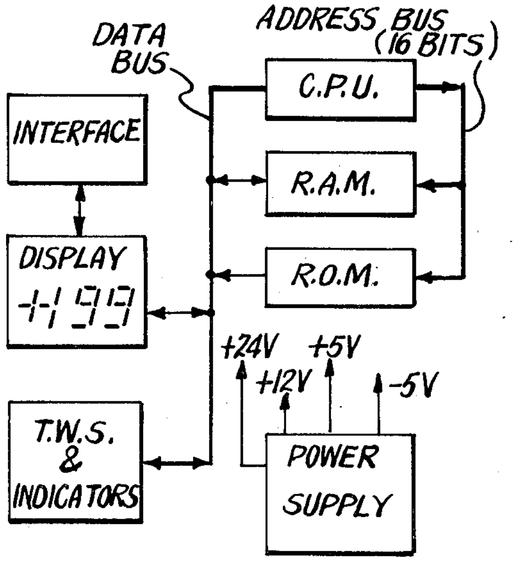
FIG. 4 is a block schematic diagram of the different types of modules utilized in the master and secondary units.
Figure 2A:
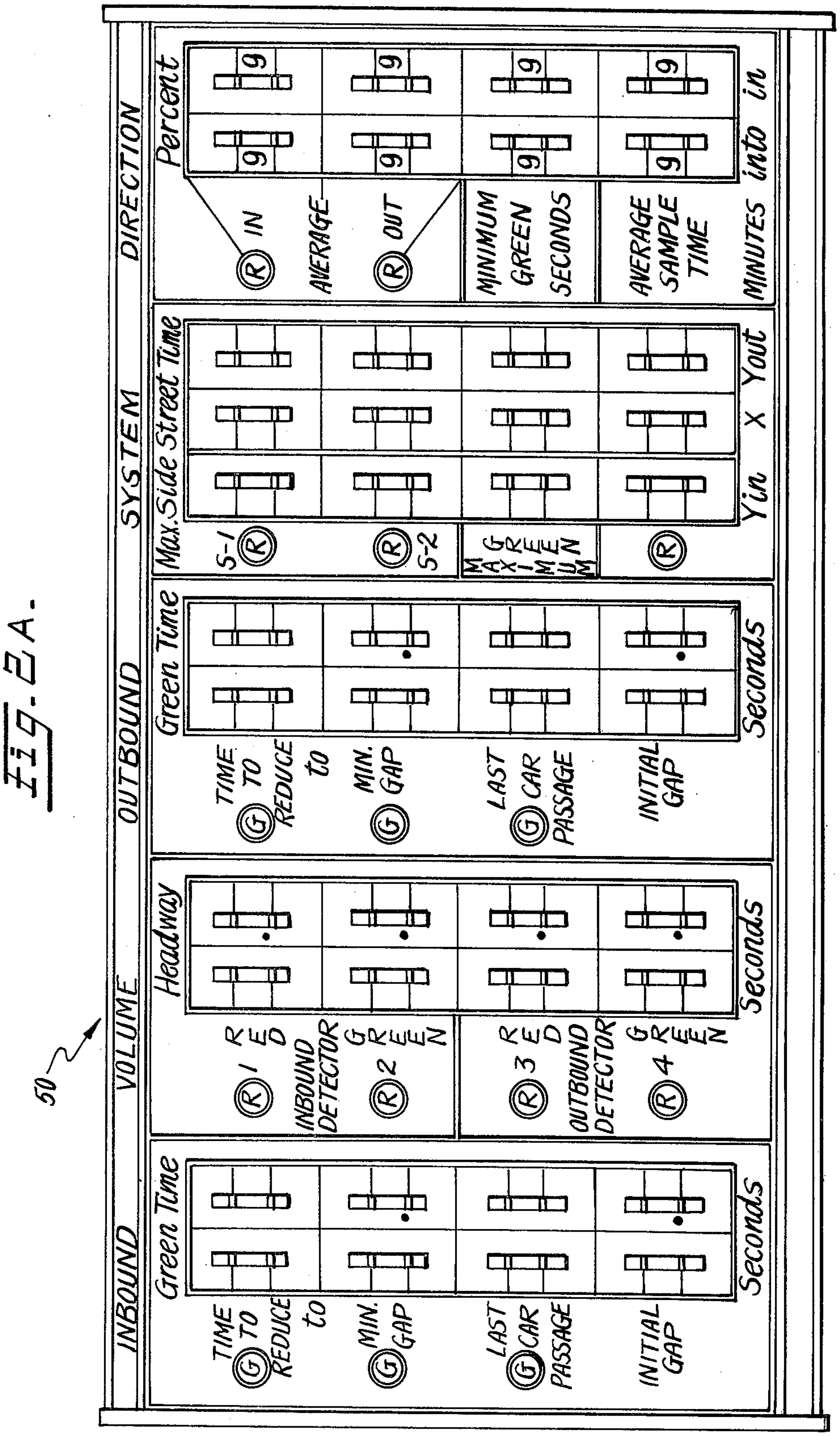
FIGS. 2A and 2B are front plan views of the modules employed in accordance with the invention.
Figure 2B:
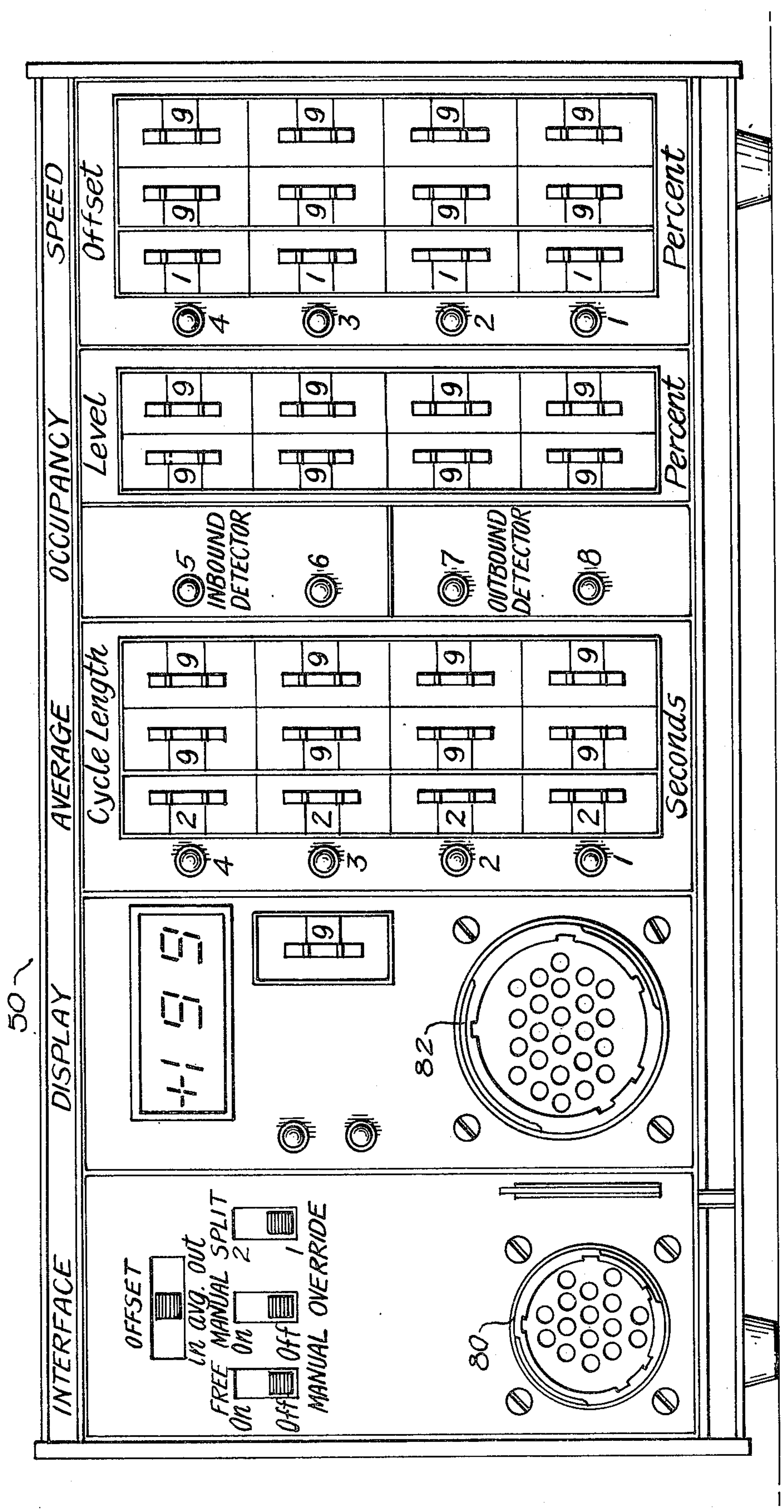

FIG. 4 shows a block schematic diagram of the various modules which are represented in both the master and secondary units. Both the master 50 and secondary 40 each have an interface and display module, the front panel of which is shown in FIGS. 2 and 3 respectively. The remaining modules shown in FIGS. 2 and 3 are switch modules and are of the same general type described in detail hereinbelow. The master unit 50 and secondary unit 40 also comprise modules which are internal to the units and have no front panel access. These internal units (which may have rear panel access, for example) include a CPU module, RAM module, PROM module and power supply modules. Consequently, FIG. 4 is representative of a block diagram for both the secondary unit 40 and the master unit 50. In this connection it is emphasized that the secondary unit and the master unit each contain computing means and memory storage means. Each secondary unit is, of course, programmed identically with the necessary input parameters for each secondary unit fed into its CPU via the front panel thumbwheel switches as available on the switch modules and via connections to the master unit from the interface module. The master unit 50 is programmed to control the secondary units 40 in such a fashion as to provide a system control consistent with the design objectives as explained more fully below.

Figure 5:
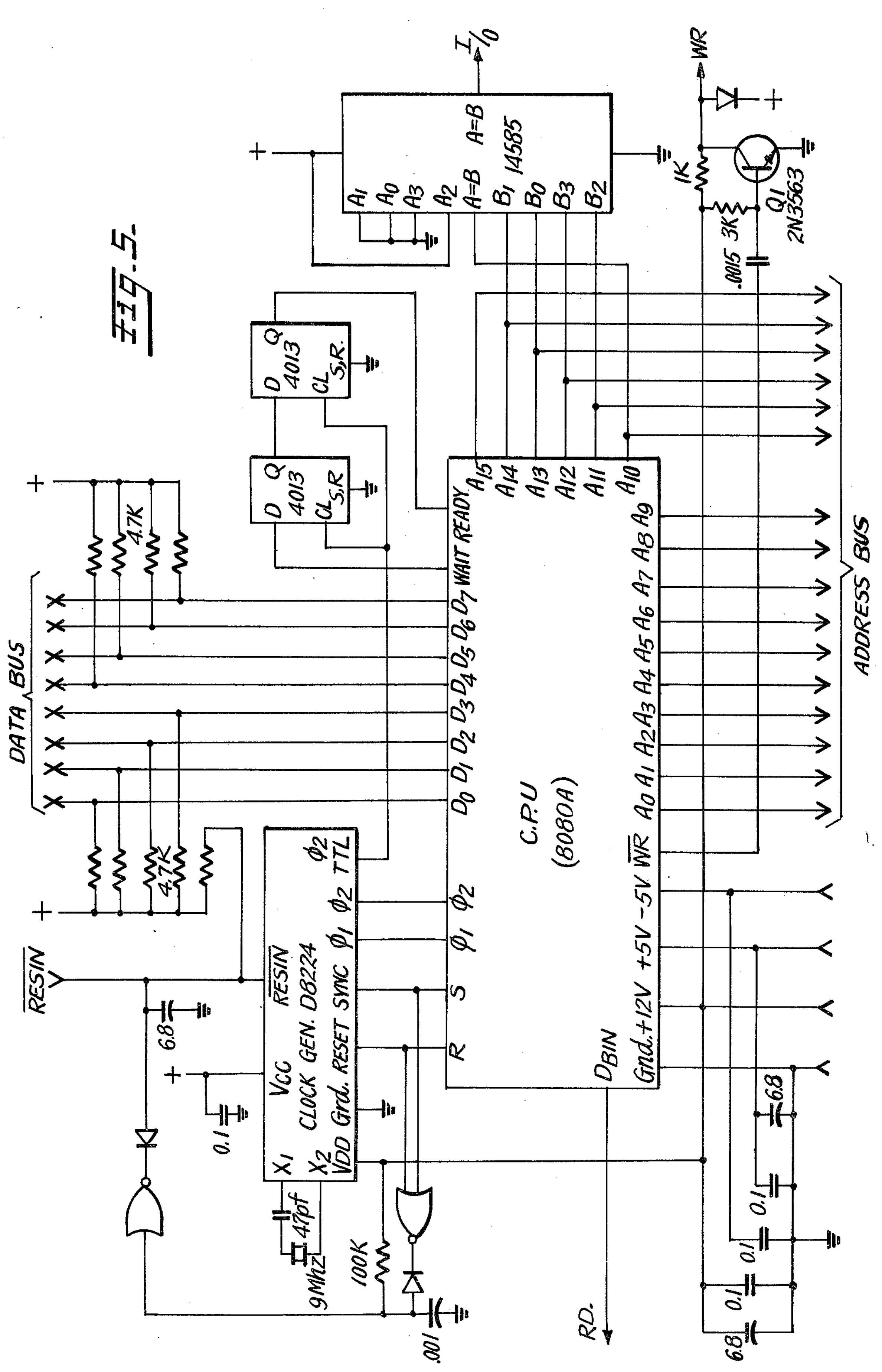
FIG. 5 is a schematic diagram of the central processor utilized in the master and secondary units in accordance with the invention.

FIG. 5 illustrates the CPU module which is utilized in both the master and secondary units. The CPU module may comprise for example, an Intel Model 8080A microprocessor together with its associated clock generator Model 8224. For a complete explanation of the operation and use of the microprocessor, reference is made to the Intel 8080 Systems User Manual published by Intel Corp., Santa Clara, California and incorporated herein by reference. The WAIT output of the microprocessor is fed to two "D" flip-flops Model 4013 which are clocked utilizing the TTL phase 2 output of the clock generator. The Q output of the second series flip-flops is utilized to provide the "ready" signal to the microprocessor. The effect of the two flip-flops is to extend the allowable response time for CPU associated RAM, PROM and I/O, in order to provide reliability of operation for the overall system and to permit the use of slower, commercially available components.

Address lines A0–A15 are utilized to address various other modules and memory locations in the master and secondary units. Communications between master and secondary units utilize data lines D0–D3 which are also used for all I/O. Data lines D0–D7 are used for data communication to PROM and RAM. Address lines A10–A14 are fed to comparator, Model 14585, and are utilized to provide an I/O command signal along line 90. The I/O command signal must be present during all I/O operations. Read and write strobes are also provided from the CPU along the RD and WR lines respectively.

Figure 6A:
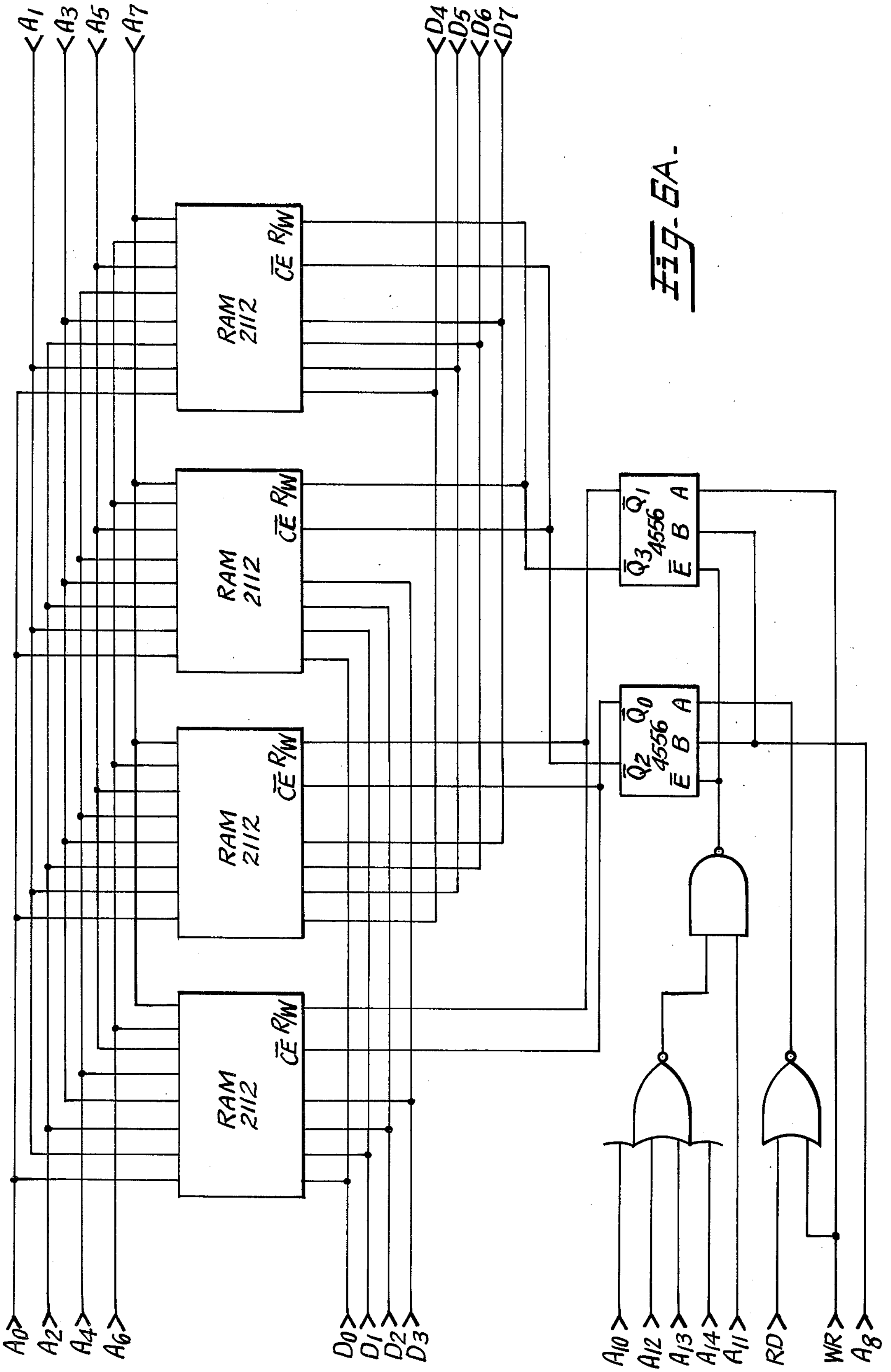
FIG. 6A is a schematic diagram of a random memory storage means utilized in the master and secondary units.
Figure 8B:
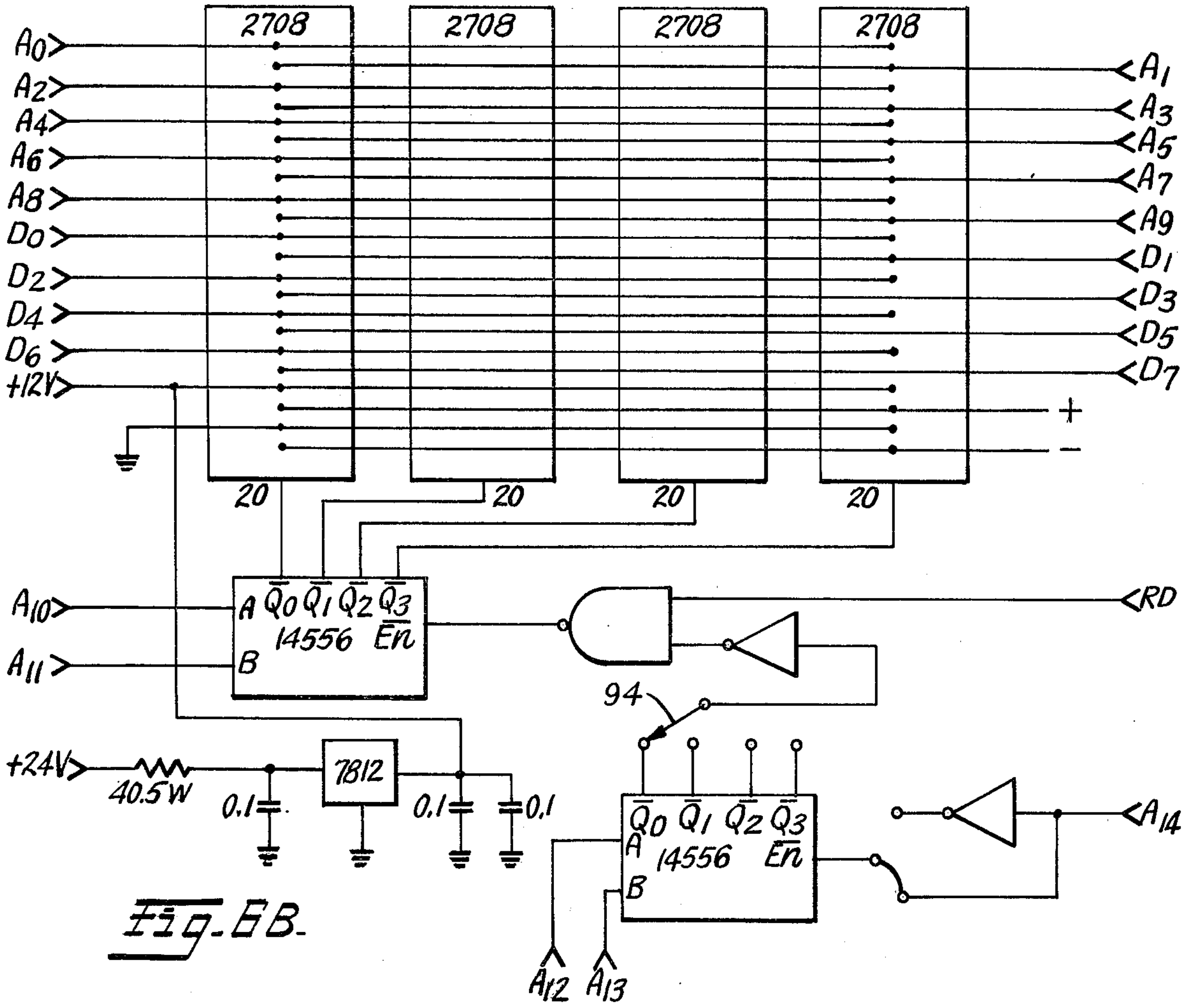
FIG. 8 is a schematic diagram of the LED display circuitry.

FIG. 6A is representative of a RAM memory module utilizing for example a plurality of 256×4 static MOS RAMs, Intel Model 2112. The chip enable and read/write inputs are provided via decoders, Model No. 14556, conditioned by address lines A8, A10–A14, the read strobe RD and write strobe WR. Data and address lines are interconnected to the memory chips in a conventional manner as shown.

An exemplary PROM module is illustrated in FIG. 6B. The module is seen to comprise a plurality of 1024×8 MOS erasable PROMs such as Model No. 2708 (Intel), and decode logic circuitry consisting of Model No. 14556 decoders and NAND gates as shown. A 12 volt regulator Model 7812 is also provided. Typically, three or four PROM circuit boards may be provided each as shown in FIG. 6B. A switch means 94 is provided to enable addressing of a desired circuit board.

Figure 7:
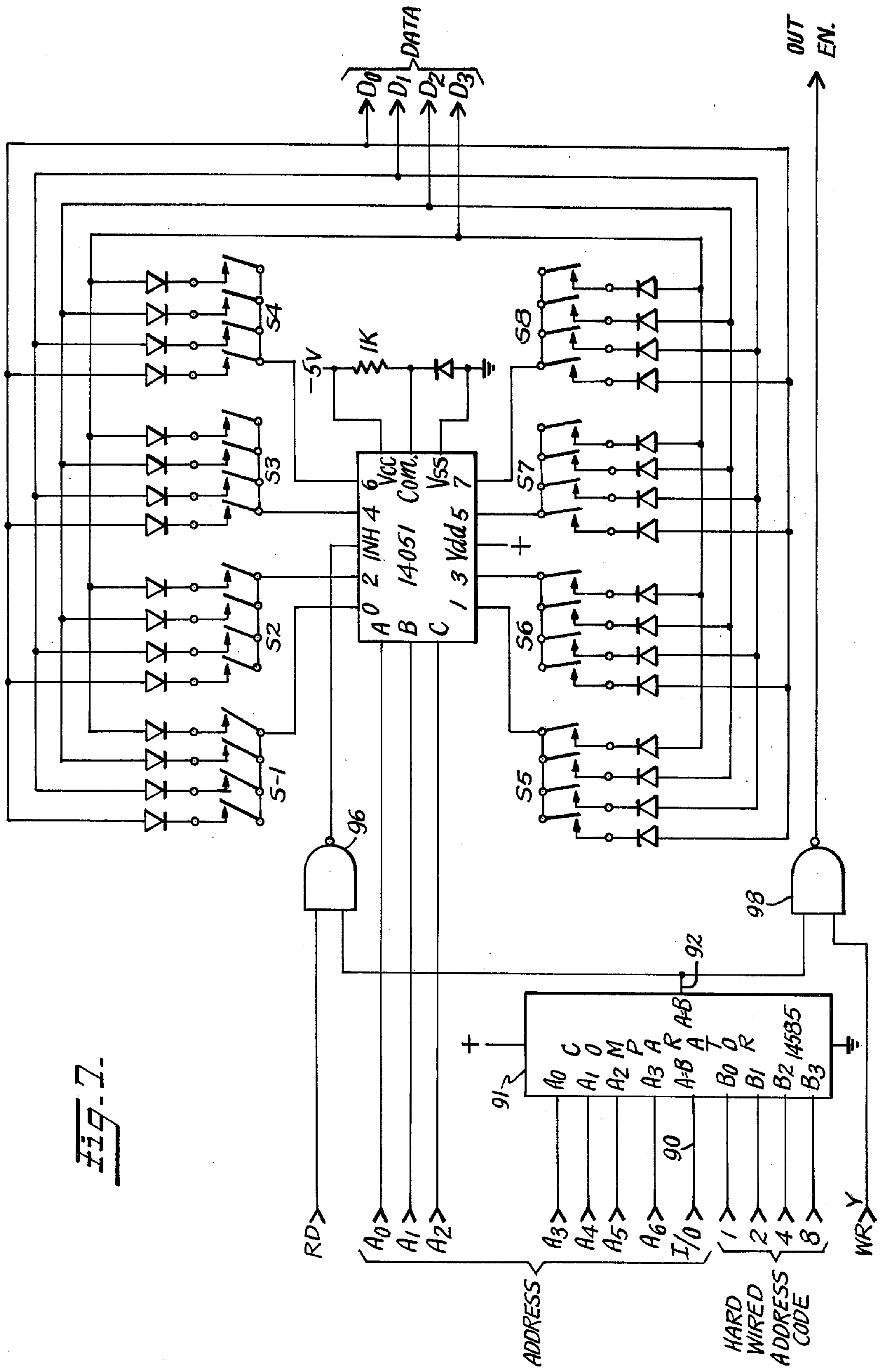
FIG. 7 is a schematic diagram of a switch module in accordance with the invention.

A detailed schematic diagram of a switch module (inbound, outbound, etc.) is illustrated in FIG. 7. The circuit shown in FIG. 7 is positioned on a single printed circuit board and is capable of reading eight different thumbwheel switches. Within certain modules, two printed circuit boards of the type shown in FIG. 7 are required wherein any excess switch reading capabilities are ignored. For example, the outbound module of master unit 50 (FIG. 2) contains a single printed circuit board as shown in FIG. 7. The system module of the master unit, however, requires two boards with the resulting capability of reading sixteen thumbwheel switches. In practice, only twelve switches need be read so that the circuitry for the remaining four switches is not utilized.

FIG. 7A shows the position of the switches which are labeled S1–S8 and are addressed respectively by the binary number 0–7. Each switch module contains a four bit comparator 91, Model No. 14585, for example, which compares the address code along the address lines A3–A6 with a hard wired address code unique to each particular switch module location. Consequently, the address bits A3–A6 are compared with the four bit hard wired code, and, if equal, an output strobe is provided along line 92. The I/O command along line 90 is also fed as a conditioning input to the comparator 91. The output of the comparator 91 goes high whenever the address matches the hard wired address code, so that a logical 1 is placed along a line 92 and fed to NAND gate 96. A second input to NAND gate 96 comes from the read strobe RD so that its output goes low whenever the particular switch module is addressed for reading. The low signal from the NAND gate 96 is fed to an analog mux/demux Model No. MC14051 used as a three-to-eight data selector. Depending on the particular code appearing on the address lines A0–A2, one of the switches S1–S8 is selected which subsequently provides an output along the data lines D0–D3. These data lines, of course, are part of the bidirectional data bus and are fed to the CPU shown in FIG. 5.

Figure 8:
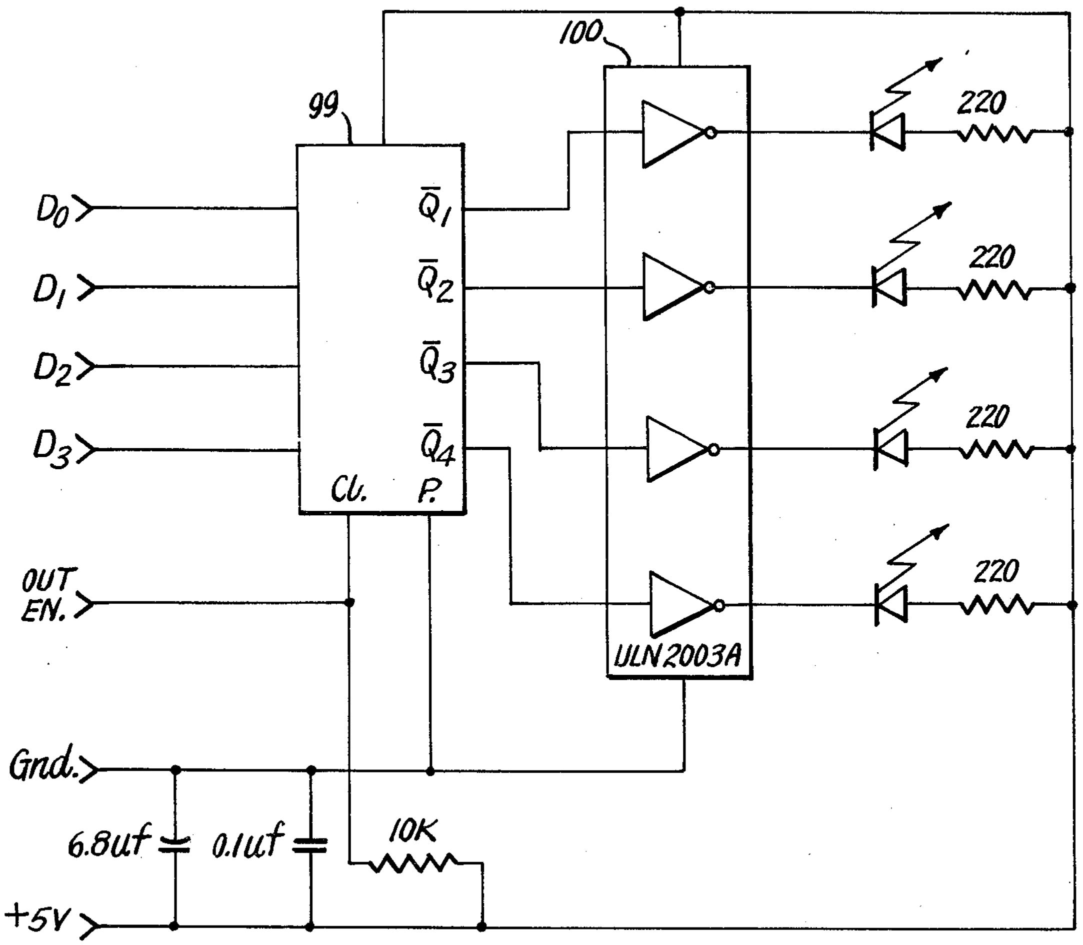

The output of the comparator 91, along line 92 is also shown connected to another NAND gate 98. The second input to this NAND gate is the write strobe WR. The output of NAND gate 98, the output enable signal, is fed to a quad display circuit during an output or write command. In reference, for example, to master unit 50 it is seen that the outbound module contains eight thumbwheel switches and three display indicators. The eight thumbwheel switches are simply the switches S1–S8, whereas the display indicators are shown in FIG. 8 and form part of the quad display circuitry. Thus, each switch module in both the master and secondary units contains at least one quad display and a maximum of four indicators may occur on any given module. The output enable signal is fed to a quad latch 99, for example, Model No. 14042 to latch the write data appearing on the data lines D0–D3. The latched data is fed to power inverter 100, for example Model No. ULN2003A (Sprague) which subsequently feeds indicating diodes D1–D4. In this manner, the hard wired address code provided as an input to the comparator 91 of FIG. 7 serves to direct the address decoder for both the switches S1–S8 and the indicators D1–D4.

Figure 9A:
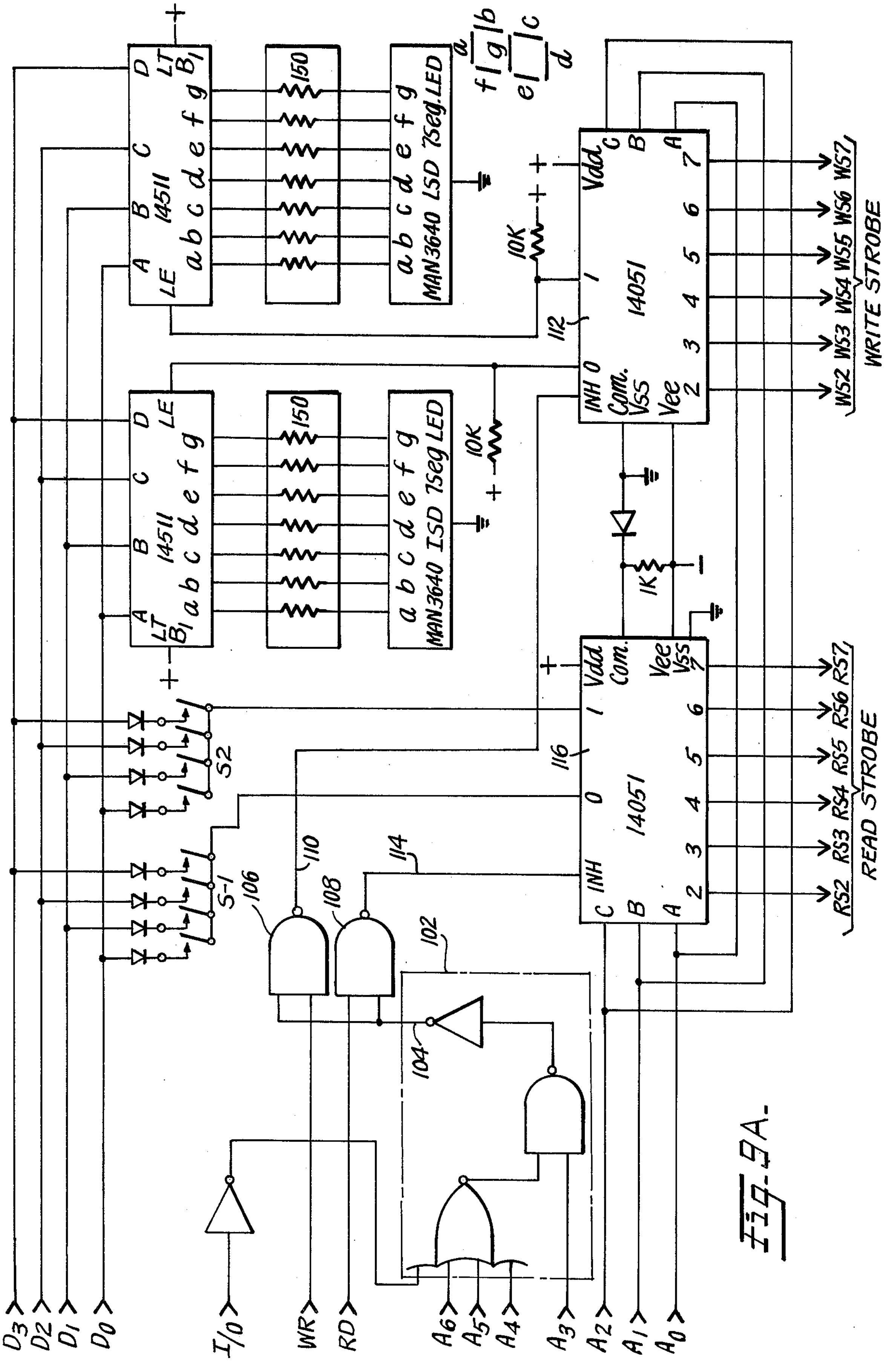
FIGS. 9A-9D are schematic drawings for the circuitry in the display module of the master and secondary units.

The display module is shown in detail in FIGS. 9A–9D. FIG. 9A illustrates the address decode for the display module which is implemented by logic circuit 102 utilizing address lines A3–A6. Additionally, the command I/O is provided as an input to the logic circuit 102. The output of the logic circuit 102 is fed along line 104 to NAND gates 106 and 108. NAND gate 106 is provided with an input from the write strobe WR and NAND gate 108 is provided with an input from the read strobe RD. The output of NAND gate 106 goes low whenever the display module is being addressed and a write command is to be implemented. The low or logically zero output is fed along line 110 to the inhibit input of an analog mux/demux 112 (Model 14051 for example used as a three-to-eight decoder). Decoder 112 provides a plurality of write strobes WS to be utilized with additional circuitry of the display module. These write strobes are identified by their binary decode so that decode 2 corresponds to write strobe WS-2 etc.

In a similar fashion the output of NAND gate 108 provides a logically zero output along line 114 to the inhibit input of decoder 116. Decoder 116 provides a plurality of read strobes RS, for use with additional circuitry in the display module. The particular line selected from the decoders 112 and 116 is dependent upon the address appearing on address lines A0–A12. The read strobe lines are also identified by their address decode. The circuitry shown in FIG. 9A is common to both the master and secondary display modules.

As may also be seen in FIG. 9A, two thumbwheel switches S1 and S2 are provided and are shown connected to the decoder 116. If a read command is given to the display module, these switches S1 and S2 may be addressed from address lines A0–A2 as address # zero and one respectively. Upon selection of either switch S1 or S2 the input lines to the decoder 116 are fed to the common pin 3 terminal of 116 so that the data bus D0–D3 may carry the BCD signal generated by each thumbwheel switch. It is noted that switch S1 is optional and is not utilized in the display modules for the secondary or master units as shown in FIGS. 2 and 3 respectively. Upon issuance of a write command the decoder 112 may be activated by address lines A0–A2. A decode of a binary zero or one is used to display one of two digits of the three digit seven-segment display shown for both the master and secondary display modules. The circuitry of FIG. 9A may be utilized to select either the intermediate significant digit (ISD) or the least significant digit (LSD) of the seven-segment display. The display circuitry for the ISD and LSD may comprise Model No. 14511 BCD to seven-segment decoder/driver, a resistor dropping network, and seven-segment LED display, Model No. MAN 3640A (Monsanto).

Figure 9B:
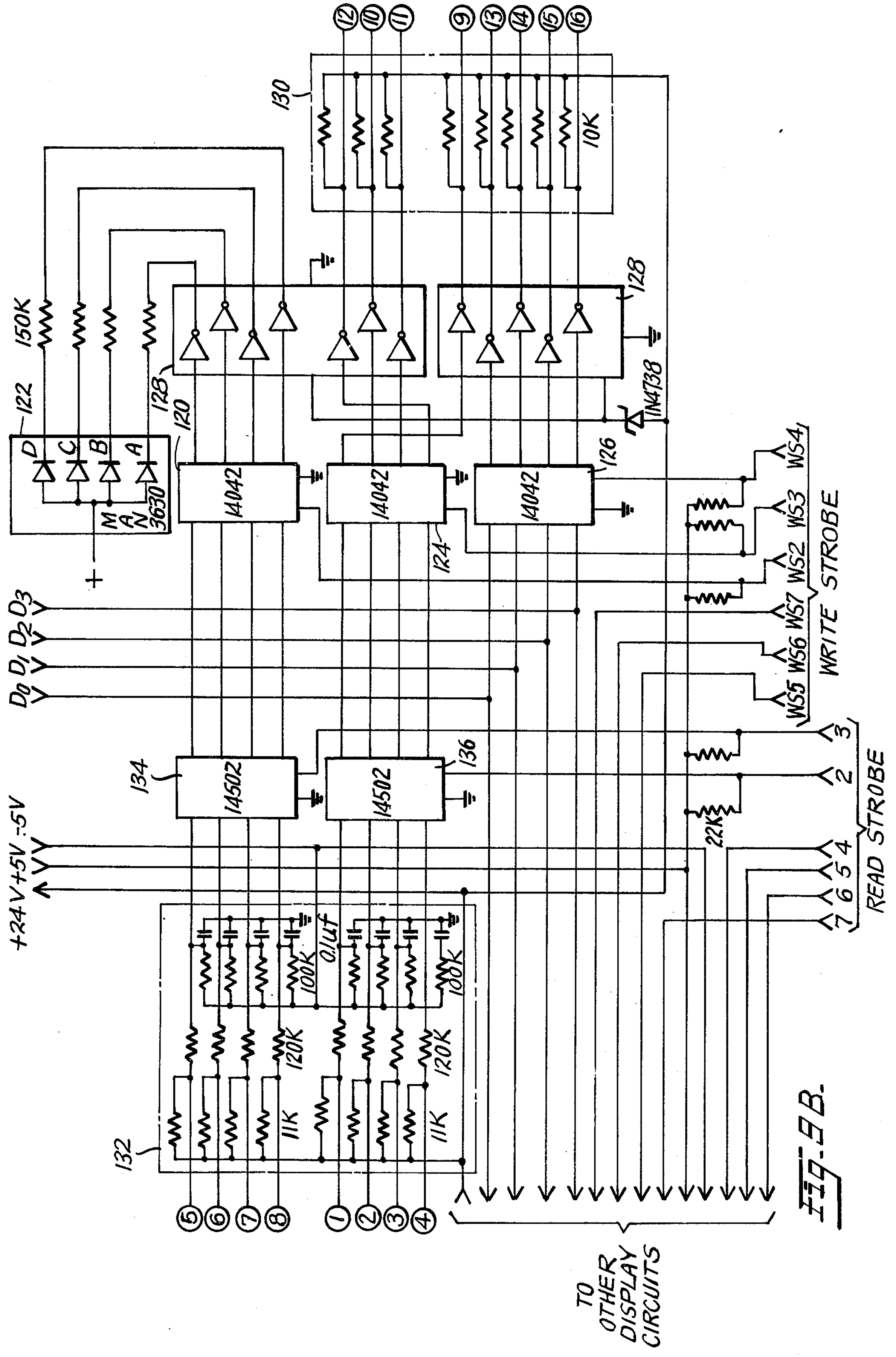

FIG. 9B illustrates additional circuitry for the display module which is common to both the master and secondary units. The circuitry of FIG. 9B controls the most significant digit in the seven-segment display as well as the "+" sign. The write strobe WS2 is utilized to activate a quad latch 120 (Model 14042) to drive LED display 122 (Model MAN3630A). Additional latches 124 and 126 are strobed by write strobes 3 and 4 to provide 24 volt level output of connectors labeled ⑨ - ⑯. For the master unit 50, these 24 volt level output lines are fed to the I/O pin connectors 82 whereas for the secondary unit 40 these 24 volt output level lines are fed to the I/O pin connectors 72. The current sinks operating from a 24 volt level are provided on these output pin connectors from the 5 volt logic signals provided from the latches 124 and 126 via power inverters 128 (Model ULN2003A) and resistor network 130. Thus, these write strobes are utilized to provide output data either to the display 122 or the 24 volt output level lines. The data originates from the data bus D0–D3. Various additional write strobes are fed to other circuitry within the display module as to be described hereinbelow.

FIG. 9B illustrates some of the read strobes which are utilized to latch input data into the data bus D0–D3. The input data is provided to the master or secondary via I/O pins 82 or 72 respectively which pins are connected to lines ①-⑧ as shown. The 24 volt level signal is passed through conditioning circuit 132 to translate the voltage level to 5 volts as utilized for inputs to the strobed inverter buffers 134 and 136. Input data from these buffers is fed to the CPU along the data lines D0–D3.

Additional read/write strobes are passed to still other circuitry of the display module to be described hereinbelow.

Figure 9C:
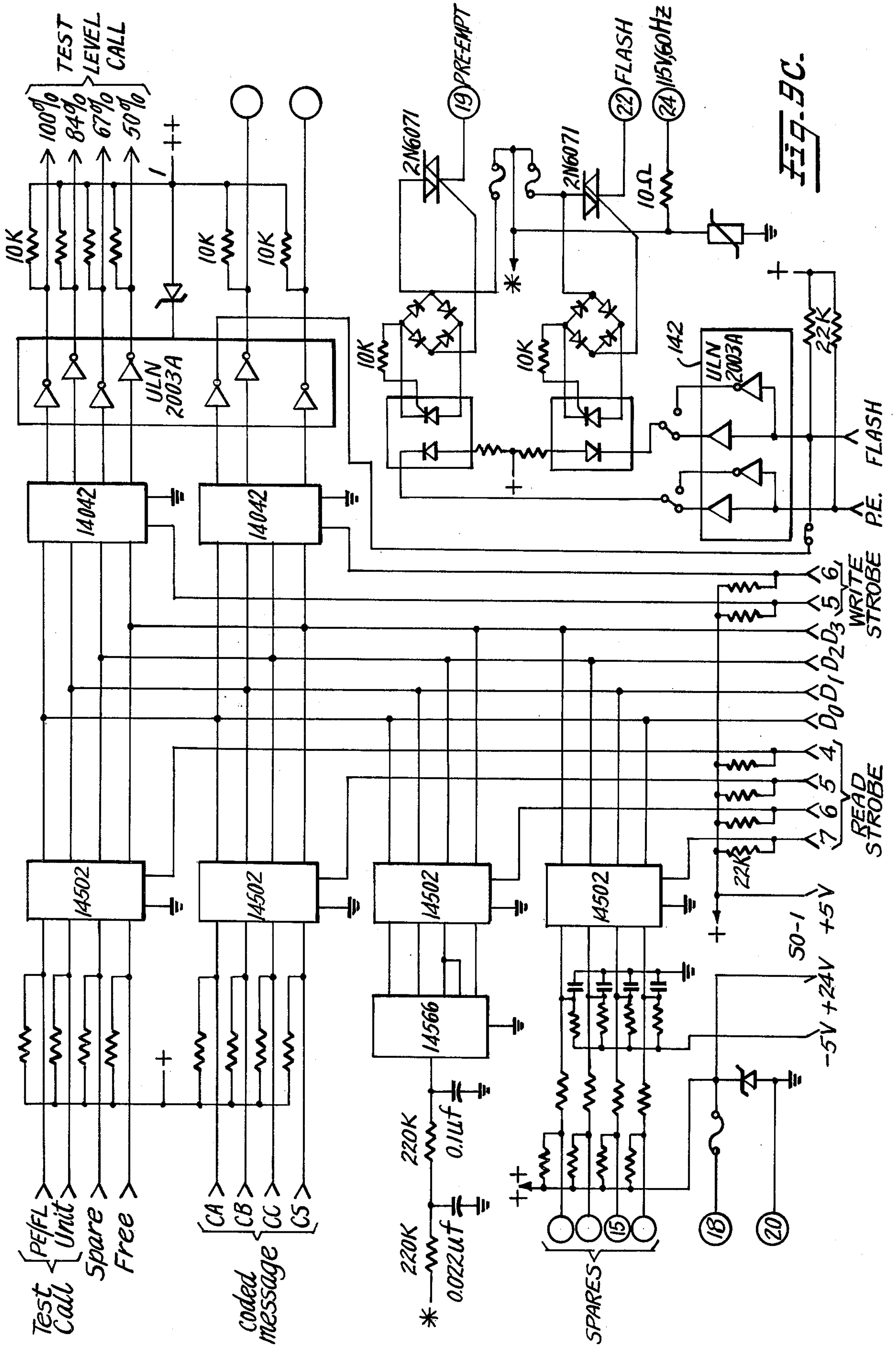

FIG. 9C illustrates additional circuitry for the display module which is applicable to the secondary units. Write strobes WS5 and WS6 are utilized to feed data from the data line D0–D3 to the interface module and I/O pins 72 respectively. The I/O pin outputs are spares and may be available for additional expansion of the system. The 24 volt level outputs to the interface module are provided by power inverters and resistor networks as in FIG. 9B. The four outputs conditioned by WS5 comprise the test level call signals which test operation of the secondary interface modules at 100%, 84%, 67% and 50% voltage levels. Write strobe WS6 is utilized to strobe a data code for activating a flash call generated by the secondary software. The flash call would be generated, for example, under system software control if the controller associated with the particular secondary did not respond to force-off commands and additionally failed to respond to the interval advance procedure. The D0 bit in the data bus line together with the write strobe WS6 would provide a signal along line 140 through power driver circuit 142 and solid state relay circuit 144. The output of solid state relay circuit 144 along pin (22) provides a 115 V 60 Hz source to the controller 32 for calling the flash condition.

Read strobes are also shown in FIG. 9C for strobing in the test call information and coded message data from the secondary interface module. The coded message data originates from the master data bus and is transmitted to the interface module of the secondary units via communication path 52. Read strobe RS4 is utilized to strobe in the test call information whereas read RS6 is used to strobe in the coded message information. Read strobe RS5 strobes 60 Hz sync data to enhance synchronization of operation of the master and secondary units. Read strobe RS7 is utilized to gate in additional input data from the I/O pin connector 72. Spare pins are also provided.

Figure 9D:
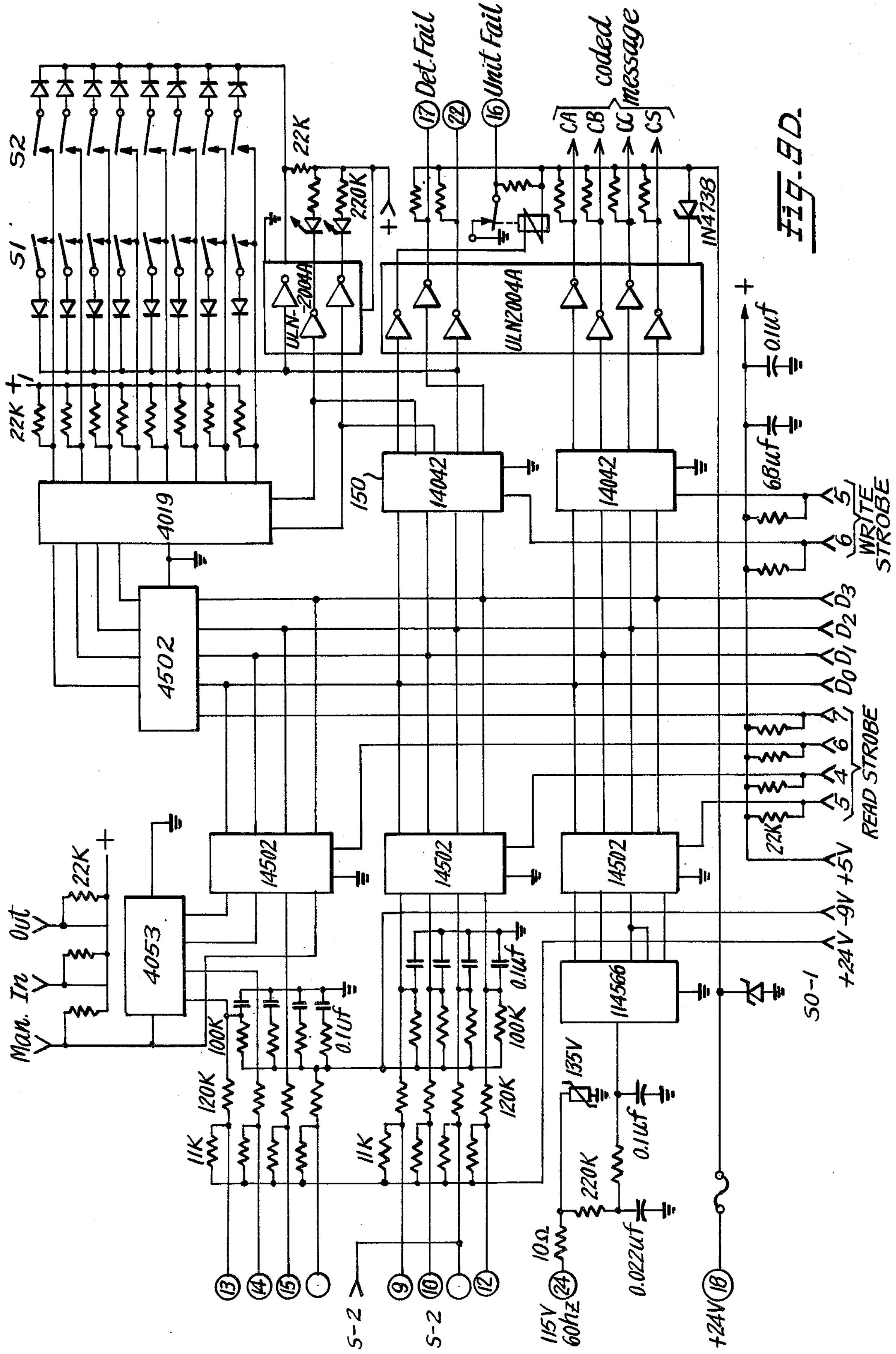

FIG. 9D illustrates additional display module circuitry which is applicable to the master unit only. Write strobe WS5 latches output data from the data bus D0–D3 to provide 24 volt level data which is the coded message transmitted to the secondary (via the master interface module and I/O pin connector 80). Write strobe WS6 is utilized to gate failure detection data to the master I/O pin connector 82 output via latch 150 and a power inverter and resistor network as shown. Additional output data may be provided by the write strobe WS6 and latch 150 to energize the indicators D17 and D18 which appear on the face of the master display module. Latch 150 also controls the selection of groups of behind front panel switches 152 to provide data to the master unit CPU permitting external programming for system data which typically will not change once the system is installed. For example, these switches may be used to store a BCD code for instructing a change from Split 1 to Split 2 operation. The data is selected utilizing a quad select gate, for example, Model No. CD4019.

Also illustrated in FIG. 9D are the read strobes which provide additional information to the master from the I/O pin connectors 82. Four lines of input data are provided via RS4. RS5 enables sensing of the 60 Hz sync information as was done in the display module of the secondary units. Read strobe RS6 is utilized to strobe data from input pin (15) to the data bus, and input pins (13) and (14) are connected to a data selector 154 (Model No. 14053) which is also connected to receive manual IN and manual OUT information from the interface module.

Figure 10:
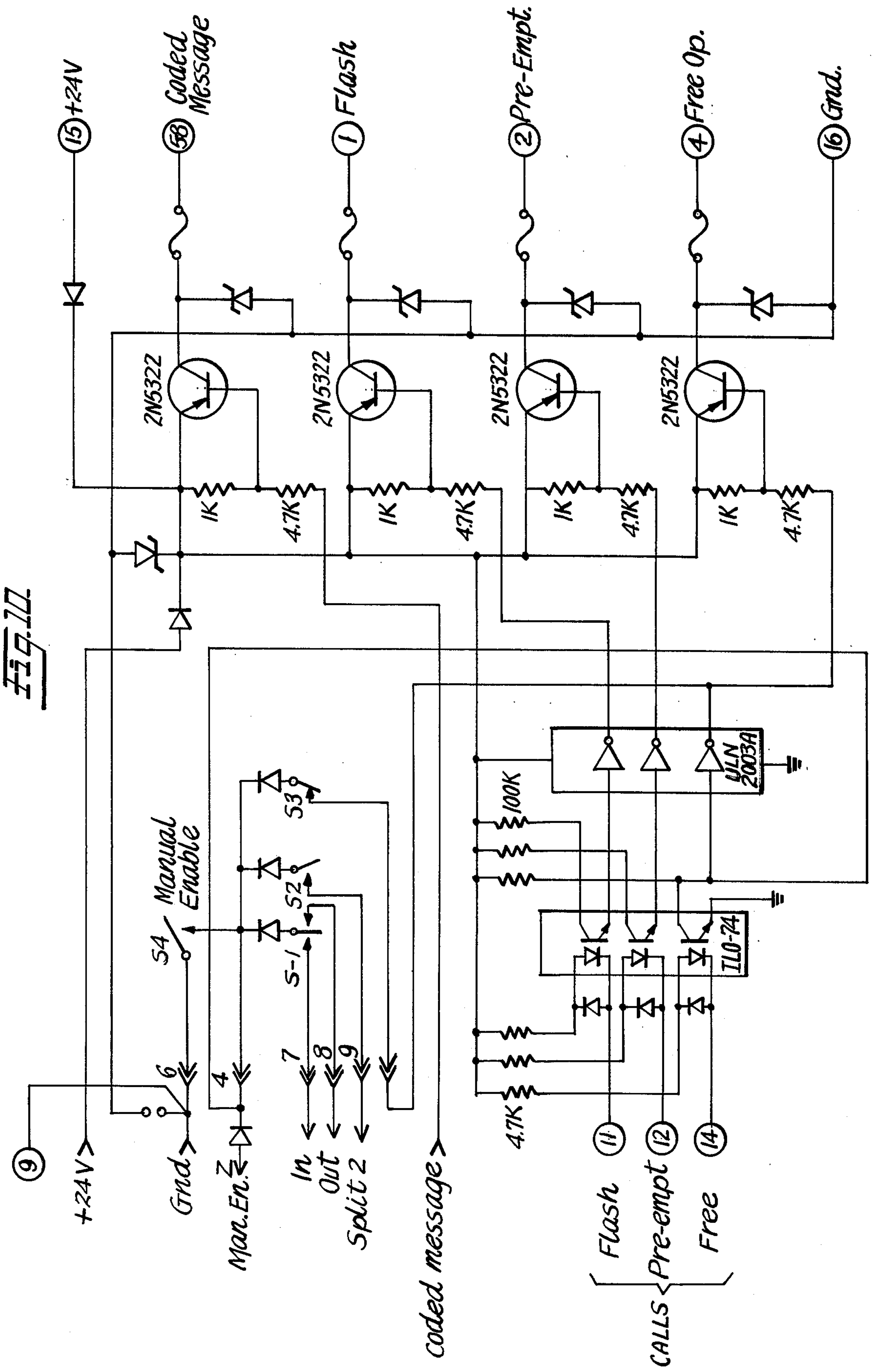
FIG. 10 is a schematic drawing of the master calling circuitry within the interface module of the master unit.

FIG. 10 is a schematic diagram of the interface module appropriate for the master unit 50 of FIG. 2. Information is transmitted between the master unit and secondary units via communication path 52 (see FIG. 1). A 24 V DC level communication line may be provided or, optionally, a 115 V AC level line and appropriate circuitry (not shown) may be used. The circuitry illustrated below provides a 24 volts DC level. The coded message signal is represented as a single line, but it is understood that in practice four lines are provided with four separate transistor circuits to provide the coded message to the secondary units along the pins (5)-(8) of I/O pin connectors 80 of the interface module for the master unit 50. The transistors shown are utilized to convert the 24 volt sink lines to 24 volt source lines for driving the data over the communication path 52 to the interface modules of the secondary units. All output data on the right hand side of FIG. 10 is fed along the communication path 52 to all secondary units simultaneously. Flash calls, pre-empt calls and free op calls shown on the left hand side of FIG. 10 may be provided as optional input calls along I/O pin connectors 80.

The manual switches located on the face of the interface module of the master unit 50 are represented by switches S1–S4 in FIG. 10. The manual enable switch S4 may be closed together with switch S1 to provide IN and OUT directional signals to the master CPU. The manual enable switch S4 activated in conjunction with switch S2 selects the Split 2 condition whereas activation of manual enable switch S4 in conjunction with switch S3 selects "free-op" operation via a line fed directly to output pin (4), on the I/O pin connector 80. For transient isolation optical isolators are provided between the flash, pre-empt and free-op interconnections from pins (11), (12) and (14) and their associated output conductors.

Figure 11:
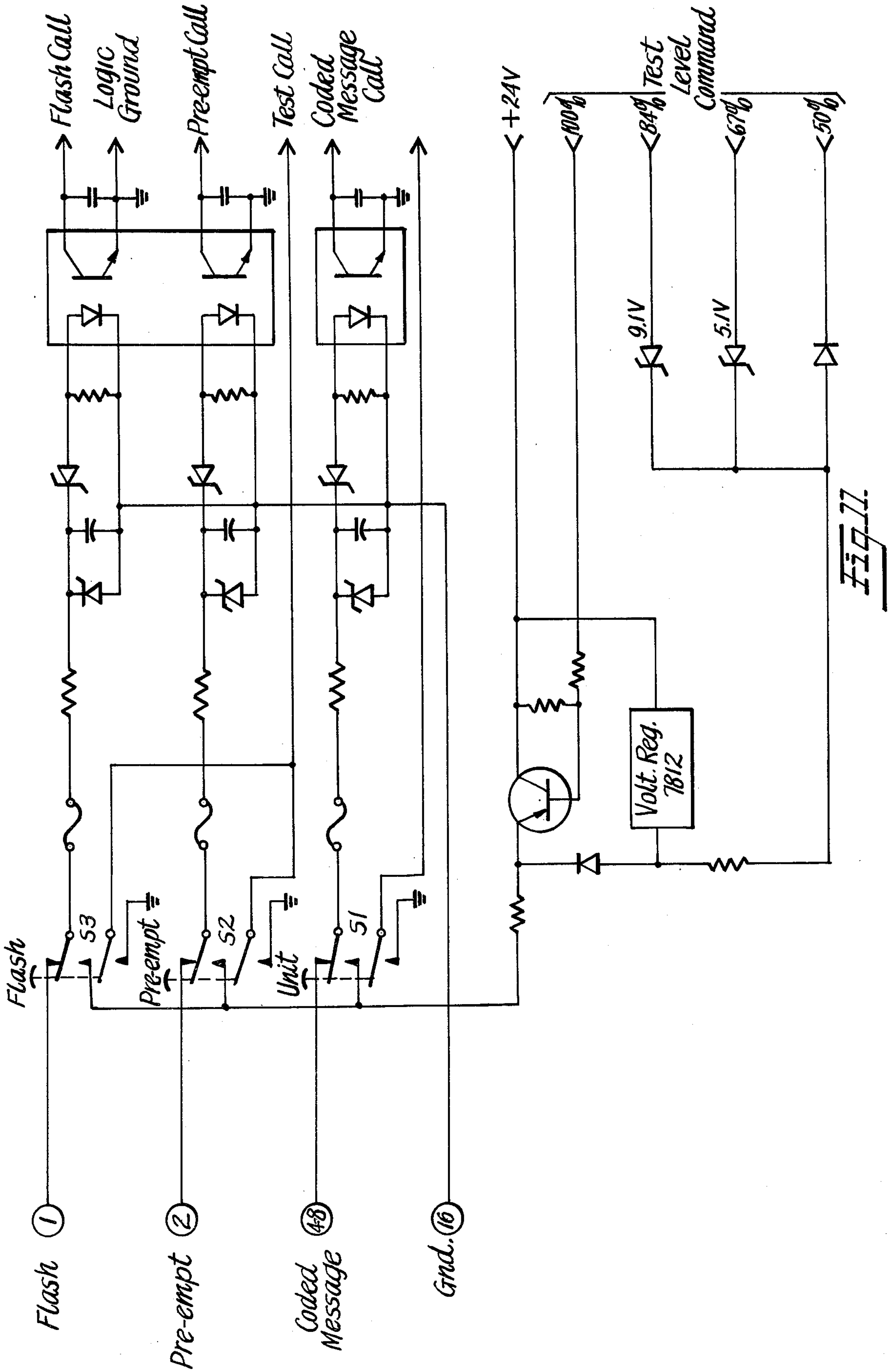
FIG. 11 is a schematic drawing of the circuitry within the interface module of a secondary unit.

FIG. 11 illustrates the 24 volt DC interface circuitry for the interface module of the secondary unit 40 shown in FIG. 3. The coded message and free op information are provided along pins (4)-(8) illustrated in the drawing as a single line for each of representation. Filter circuitry and optical isolators are utilized to convert the 24 volt signals from the master unit to logic level signals for feeding further circuitry in the secondary display module. Test level command information is generated in the secondary units for testing operation of the secondary interface module which may be subject to damage from transients and the like. The system's software steps the test level commands from the 100% to 84%, 64% and 50% levels sequentially to provide tests for the flash call, pre-empt call, free op call and coded message call.

Tables I and II show the pin assignments for the 24 pin I/O connectors 72 and 82 and 16 pin I/O connectors 70 and 80 respectively. The tables list the pin assignments for both the master and secondary units. The "phase green in" data listed in Table I for the secondary unit allows the master unit to monitor the green phase of the corresponding timer for two different timing rings each having as many as four green phases. Force-off outputs are provided for each ring on pins (9) and (13), and the MAX III, Call and call to artery green is provided on pins (10) and (12) respectively. The master pins (12) - (15) permit percent average calls to be made as selected by the operator by external means (not shown). Table II lists the pin assignments for the I/O pin connectors 70 and 80. Clock, data and sync information appear on pins (5)-(8). The data communication telemetry format is discussed in detail below.

TABLE I

| MASTER Function | Pin | SECONDARY Function | |
|---|---|---|---|
| Inbound Vol. Det. | 1 | | 1 |
| Inbound Vol. Det. | 2 | | 2 |
| Outbound Vol. Det. | 3 | | 3 |
| Outbound Vol. Det. | 4 | Phase | 4 |
| Inbound Ocp. Det. | 5 | Green | 5 |
| Inbound Ocp. Det. | 6 | | 6 |
| Outbound Ocp. Det. | 7 | | 7 |
| Outbound Ocp. Det. | 8 | | 8 |
| Indicator Inhibit Call | 9 | F.O. Ring 1 | |
| Spare Call | 10 | Max II | |
| Split 2 Call | 11 | Int. Adv. | |
| % Avg. Call,CL-1, No SC | 12 | Call Artery $\phi$ | |

TABLE I-continued

| | | | |
|---|---|---|---|
| % Avg. Call,CL-2, SC-2 | 13 | F.O. Ring 2 | |
| % Avg. Call,CL-3, SC-3 | 14 | φ Omit | |
| % Avg. Call,CL-4, SC-4 | 15 | Indicator Inhibit | |
| Unit Fail | 16 | Call Non. Art. φs. | |
| Det. Fail | 17 | Sum. Checks | |
| 24V | 18 | 24V | |
| Inbound | 19 | P.E. Out (115V) | |
| Logic. Gnd. | 20 | Logic Gnd. | |
| Chassis Gnd. | 21 | Chassis Gnd. | |
| Occupancy | 22 | Flash Out (115V) | |
| 115V Neut. | 23 | 115V Neut. | |
| 115V AC | 24 | 115V AC | |

TABLE II

| MASTER | PIN | SECONDARY |
|---|---|---|
| Flash | 1 | Flash Call |
| P.E. | 2 | P.E. Call |
| Spare | 3 | Spare Call |
| Free Op. | 4 | Free Op. Call |
| CMA CLOCK | 5 | CMA Call |
| CMB ($D_0$,$D_2$) | 6 | CMB Call |
| CMC ($D_1$,$D_3$) | 7 | CMC Call |
| CMS (SYNC) | 8 | CMS Call |
| Spare | 9 | Spare |
| 115V AC Input (AC only) | 10 | Spare |
| Flash Call | 11 | Spare |
| P.E. Call | 12 | Spare |
| Spare Key | 13 | Spare |
| Free Op. Call | 14 | Spare |
| 24V Input for Call | 15 | Spare |
| Ground | 16 | Ground |

FUNCTIONAL DESCRIPTION OF MASTER UNIT

Overall Description

The master unit 50 is designed to provide all of the system control functions for the coordinator system in accordance with the invention. The master unit basically samples traffic conditions, performs various traffic control decisions and communicates the results of these decisions to the plurality of secondary units 40. The prime function of the master unit is to calculate the most effective cycle length for the present sensed traffic pattern considering both the traffic detected by the volume detectors as well as by the occupancy detectors. The master unit may also be utilized to control the effective offset for each of the secondary units as well as to provide special "system" commands such as flash, free-op, pre-empt (P.E.), alternate split and percent average commands. The master unit also contains manual override switching means to effect manual operation of the system commands.

REAL TIME TRAFFIC SAMPLING

The master unit is responsible for sampling traffic conditions from both the volume and occupancy detectors. Volume detectors 18 and 20 provide a pulse signal upon actuation by a vehicle whereas the occupancy detectors, which serve to provide an internal traffic sampling, are of the pulse-duration type and thus stay in one state when a vehicle is present and in another state when a vehicle is not present. Indicators associated with the volume and occupancy detectors are energized to indicate vehicle activity. The master unit provides a failure indication by means of these indicators. These indicators are energized in a flashing mode whenever a fault condition is detected. The indicators for the volume detectors 18a, 18b and 20a, 20b are shown on the volume module of FIG. 2, and the indicators for occupancy detectors 22a, 22b and 24a, 24b are shown on the occupany module. The indicators associated with the detector flashes upon a failure condition as determined by the program in the master unit. The criteria established for indicating a failure condition for the volume detectors are a lack of any activity for sixteen minutes or a continuous actuation which exceeds two minutes. The criteria for a failure condition for the occupancy inputs are a lack of activity for sixteen minutes and a continuous activation which exceeds five minutes. Input signals which exceed the above criteria are ignored in the master unit.

MASTER CYCLE LENGTH COMPUTATION

The prime purpose of the master unit is to calculate the effective cycle length which is derived utilizing input information from both the volume and occupancy detectors. The coordinator system may operate in the INBOUND mode, OUTBOUND mode or AVERAGE mode. For each of these three conditions the master unit determines the most effective cycle length which is communicated to each of the secondary units. For example, if the system is operating in an INBOUND directional mode the larger of the two inbound volume detector signals is utilized in the volume computation, and the larger of the two inbound occupancy values are utilized in the occupancy computation. The specific manner in which the volume and occupancy values are utilized is set forth in detail below. The resultant cycle length is communicated to the secondary units. Two constraints are placed on the overall calculation. The first constraint is that the calculated cycle length cannot be less than the sum of the minimum arterial green time plus the maximum side street time. The second constraint is that the calculated cycle length cannot be more than the sum of the maximum arterial green time plus the maximum side street time. The minimum and maximum green times are presettable on thumbwheel switches in the directional and system module of the master unit 50 respectively. The maximum side street time is also settable for two separate values corresponding to the Split 1 and Split 2 system configurations. These thumbwheel switches for the Split 1 and Split 2 configurations appear on the system module of the master unit 50. An associated indicator is energized to indicate which value is in effect.

VOLUME COMPUTATIONS

The volume computations are utilized in determining cycle length for both directional mode and average mode of operation. Basically, the volume computation depends upon the extent of sensor activity and the periods within the cycle that the sensor activity occurs. The system cycle may thus be defined as comprising two time periods or bands:

$$\text{Total system cycle length} = S_R(\text{red period}) + S_G(\text{green period}).$$

The red period, $S_R$ is equal to the effective side street time which is the Split 1 or Split 2 side street times presettable on the system module of the master unit. This maximum side street time is equivalent to the red time for the artery. The green period, $S_G$, is calculated each cycle from activity detected during the red period, $S_R$, and the preceding last car passage (LCP) time, and continuing through the green period $S_G$ itself.

$S_G$ may be defined as comprising two time intervals, namely, $S_G=T_R+T_G$. $T_R$ is the time interval determined by activity occurring during the red period, $S_R$, and the preceding last car passage time. $T_G$ is the time interval determined by activity occurring during the green period before gapout is recognized. $S_G$ is, however, at all times constrained such that it may not exceed the front panel setting of the maximum green time as settable on the system module of the master unit 50.

The time intervals $T_R$ and $T_G$ are calculated as follows:

$$T_R=(E_R)\,(A_R)$$

OR the minimum artery green whichever is greater, where:

$E_R$=the extension time per actuation time (front panel setting of the red headway on the volume module), which actuations occur during the period $S_R$ and the preceding last car passage time; and $A_R$=the number of actuations detected while $E_R$ is in effect.

The calculation for the quantity $T_G$ is similarly given as:

$$T_G=(E_G)\,(A_G)$$

where:

$E_G$=the extension time per actuation (front panel setting for green headway on volume module of the master unit), which actuations occur during the $S_G$ period less the last car passage time; and $A_G$=the number of actuations detected during time $E_G$ is in effect.

The green period, $S_G$, is normally terminated by gapout, plus the time allowed for the last car passage, unless the quantity $T_R+T_G$, plus the last car passage time represents a longer green time than would be allowed by gapout termination. In this case, the longer period is used. In either case, $S_G$ is not allowed to exceed beyond the maximum green time.

Gapout termination is determined as follows: At the start of $S_G$, gap time equals the initial gap time (thumbwheel switch setting on inbound and outbound modules of the master unit 50) and retains the initial value until the gapout inhibit period is ended. At the end of the gapout inhibit period, the time to reduce period (thumbwheel switch settings on inbound and outbound modules) begins, and the gap time is reduced linearly over this period until the gap time equals the minimum gap setting (thumbwheel switches). If the minimum gap value is reached, it is retained for the remainder of the cycle.

Gapout recognition is inhibited and thus the appearance of a gap is ignored for an interval called the gapout inhibit period. This time period is simply the time $T_R$ minus the last car passage time (thumbwheel switches on inbound and outbound modules). When the gapout inhibit period is terminated, gapout timing begins. At the beginning of such gapout timing, the gapout time is equal to the initial gap setting, and the gap size is then linearly reduced. The gapout count continues unless a car is sensed by either of the volume detectors in which case the count is set to zero and beings again. When the gapout count equals the gap time, gapout occurs. When gapout occurs, the system operates to terminate $S_G$ after assuring sufficient time for the last detected car to clear, i.e. LCP time. An overall constraint, however, is that the total green time may not exceed the maximum green as set on the system module. Additionally, the gapout may not necessarily terminate $S_G$ if the accumulated volume or occupancy totals demand further extensions of the green time within the overall maximum green constraint. The basic reason for inhibiting the gapout count for a time period related to the value $T_R$ is to allow time for cars which have been backed up beyond the volume sensor during the red arterial phase, and therefore cannot immediately move as the light turns green, to pass across the volume sensor. If time were not provided an anomalous gap reading would appear shortly after the light turned green and the cycle could terminate too soon.

Figure 12:
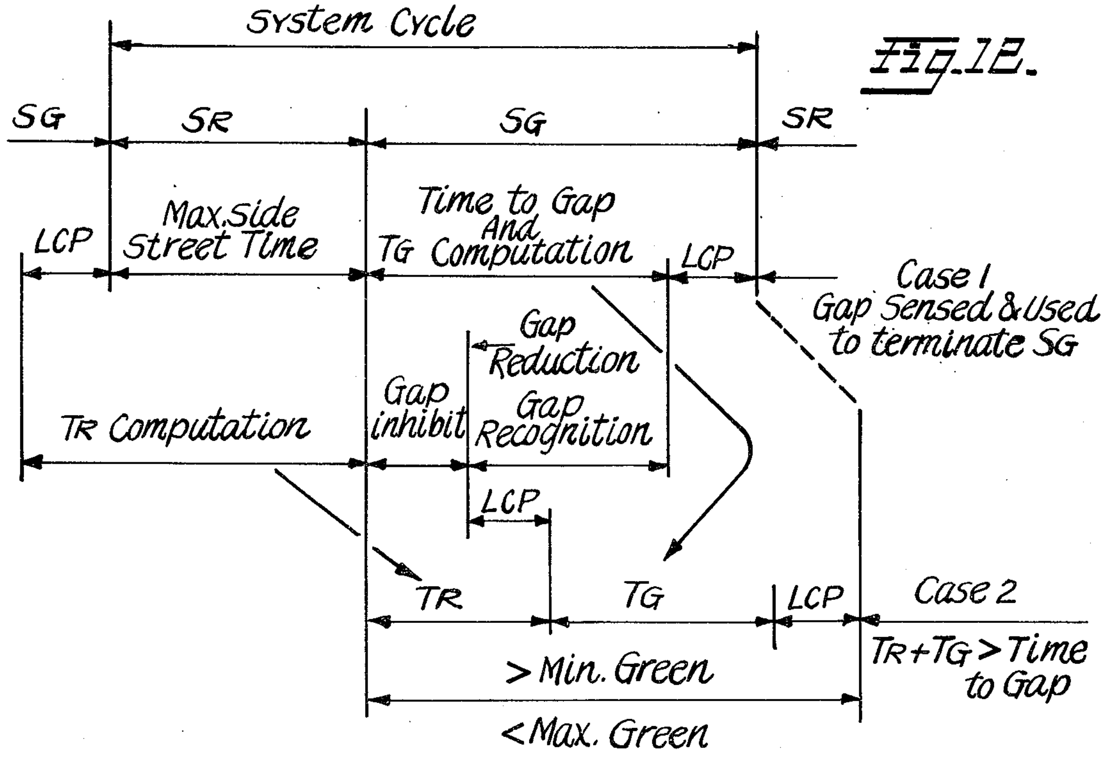
FIG. 12 shows a timing diagram depicting cycle length computation utilized by the master unit.

FIG. 12 illustrates a cycle length computation based on volume sensing utilizing the algorithm set forth above.

OCCUPANCY COMPUTATION

The occupancy values are based upon a running average obtained from thirty second increments averaged over a two minute period. The two minute averaging period may be varied over one minute increments to a maximum period of eight minutes via program memory modifications. Typically, a two minute window is set and the average is recomputed every thirty seconds for the most recent two minute window (most recent four readings). The occupancy values are derived from occupancy sensors which provide an input for the complete duration in which the vehicle is over the sensor position. Consequently, if during the thirty second sensing time a vehicle is stationary over the senor a 100% occupancy will be registered for this particular thirty second time period. The 100% occupancy value will be averaged into the preceding three 30 second occupancy values to give a total two minute window which is updated every thirty seconds in a sliding fashion. The occupancy values are thus expressed in percentage of time in which the occupancy signal is present indicating the presence of a vehicle. It is necessary, however, to convert these percentage occupancy values into a cycle length counterpart value so that a comparison may be made with the cycle length as computed from the volume detectors described above. For the purpose of converting the occupancy percentage figure into a cycle length, thumbwheel switches labeled "$Y_{in}$", "X" and "$Y_{out}$" are provided on the system module of the master unit 50. The conversion is derived from a straight line conversion of a portion of the occupancy values whose endpoints are defined by these preset values and whose endpoints match the two limits of the possible cycle length, namely, the minimum cycle defined by the minimum artery green time (direction module) and the maximum cycle defined by the maximum artery green time (system module). The minimum cycle match point is preset on the thumbwheel switch labeled "X" and is settable throughout a range of 0–9 corresponding to a 0–90% of occupancy. This set point is effective for both directions and is termed the "X" set point. The maximum cycle match point is determined by the setting of the thumbwheel switch labeled either $Y_{in}$ or $Y_{out}$ depending upon the directional mode in effect. The thumbwheel switch positions range from 1 to 9 corresponding to a 10 to 90% occupancy and the zero value of the thumbwheel switch corresponds to the 100% occupancy value. Consequently, any occupancy value may be converted utilizing the linear conversion defined by the two endpoints into a cycle length value.

The actual directional cycle length selected for transmission to the various secondary units is simply the larger of the cycle lengths as calculated from volume considerations and from occupancy considerations separately.

AVERAGE CYCLE LENGTH SELECTION

The master unit also provides a means for selecting the average cycle length which is communicated when a non-directional (average) traffic mode is in effect. Four values of the average cycle length are presettable on the average module of the master unit 50 (FIG. 2). A maximum of 299 seconds may be selected for a cycle length. When the average mode of traffic flow is in effect, the larger of the inbound and outbound cycle lengths, whether derived from either a volume input or an occupancy input, is applied to the formula (IN+OUT)/2, and the result of this computation is compared to the four preset values available for the average system configuration. The preset value which most closely approximates the absolute value of the computation is the effective cycle length communicated to the secondary units when the average mode or system configuration is being utilized. The system cycle for the above is taken to be the outbound system cycle. An adjacent indicator indicates which cycle length is presently being communicated to the secondaries.

DIRECTIONAL COMMANDS

An additional function of the master unit is to determine when a directional command need be given so as to change the mode of operation of the coordinator system between the three modes, INBOUND, OUTBOUND and AVERAGE.

In order to accomplish the directional commands the master unit totals the number of volume vehicle actuations which are achieved within the present effective length. The larger number of actuations selected from the two volume detectors at each end of the system (inbound detectors and outbound detectors) are applied to the following formula:

$$\frac{IN}{IN + OUT} \times 100$$

The derived value expressed in percent is compared to the two preset values (thumbwheel switches) which are expressed in percentages on the direction module of the master unit. Values derived exceeding the higher preset value cause an inbound directional command. Directional values lower than the lower preset value cause an outbound directional command. Derived values falling between or equal to the two preset values cause an average directional command. The program of the master unit is also provided with error detection subroutines such that if the inbound preset limit is lower than the outbound preset limit the associated IN/OUT indicators flash alternately and an average directional command is issued by the master unit until the fault condition is corrected. Proper operation is achieved for directional offset commands when the inbound percentage value is set higher than the outbound percentage value.

COMMANDS BASED UPON OCCUPANCY

The master unit issues "speed change" commands which act to change the effective offset at the secondary units depending upon the level of occupancy detected within the system. The offset changes are effectively speed modification commands which are based upon the occupancy level within the system as selected from the inbound and outbound modes of operation. The occupancy level expressed in percentage is determined using the running average obtained from thirty second increments averaged over a two minute window as explained above. These occupancy levels, expressed in percentage, are compared to four preset levels which correspond to the thumbwheel switch settings on the occupancy module of the master unit 50. Occupancy values exceeding the higher preset value (upper set of thumbwheel switches) cause a speed change #4 command to be issued. The speed change #4 command is a percent change in the offset and is settable using the upper set of thumbwheel switches of the Speed module of the master unit 50. Three additional speed change commands (labeled #3-#1 from top to bottom) are settable with thumbwheel switches on the Speed module. Occupancy values lower than the lowest preset value results in no speed change being issued. Occupancy values falling between these preset values cause preset speed change numbers #1-3 to be issued whenever the occupancy level exceeds the associated preset set point value. In the event that the preset value has been incorrectly set, i.e., not in increasing values, the four associated indicators flash and no speed change command is issued. A unit fault command is issued under these circumstances.

OUTPUT DECISION UPDATE INTERVALS

The master unit continuously provides updated information to the secondary units. The update intervals are controlled by the effective cycle lengths as derived from the system cycle. The transition from green to red ($S_G$ to $S_R$) is the synchronization point for update information. No output of the master unit changes more frequently than or out of synchronization with the green to red synchronization point. There are, however, two exceptions as to the interval of update. These two exceptions are, however, still synchronous with the system cycle.

The first exception is the offset decision which effects a directional to average change. The directional to average update change is governed by a preset update interval of 0-9 minutes as determined by the "INTO" thumbwheel switch on the Direction module of the master unit 50. The value of zero on this thumbwheel switch implies the effective cycle length.

The second exception to the update interval is that pertaining to cycle length selection decisions in the average configuration. These are governed by a preset update interval of 0-9 minutes. The update interval is selected by a thumbwheel switch labeled "IN" in the directional module of the master unit 50. The value of zero implies the effective cycle length.

MANUAL OVERRIDE

The master unit contains a plurality of slide switches utilized for manual control. When the manual override is enabled, the thumbwheel selector switch on the face of the display module of the master unit is utilized as a cycle length selector allowing individual call to any of four average cycle lengths as follows:

| Select Position | Effective Cycle Length |
|---|---|
| 1 | Average No. 1 |

-continued

| Select Position | Effective Cycle Length |
|---|---|
| 2 | Average No. 2 |
| 3 | Average No. 3 |
| 4 | Average No. 4 |
| 5-9-0 | Average No. 1 |

The associated indicator is energized and the numeric display flashes to indicate manual override operations. The numeric display indicates the cycle length selected in seconds.

SYSTEM PERCENT AVERAGE

When called, by external control, the system percent average operation is effective at the next system cycle $S_G$ to $S_R$ transition. Lacking any other input call the accompanying cycle length is taken to be the #1 TWS average setting on the average module with no speed change. When the above call is enabled along with another call (see Table I) the accompanying effective cycle length is:

Average No. 2 with Speed change No. 2
Average No. 3 with Speed change No. 3
Average No. 4 with Speed change No. 4

DISPLAY

The display module of the master unit 50 utilizes two seven-segment displays for the least significant digit (LSI) and the intermediate significant digit (ISD). The most significant digit (MSD) is a combination of the plus or minus sign and a "1". For cycle lengths in excess of 199 seconds the "+" sign is activated indicating numbers of 200 to 299. For parameters expressed in percentage, the "−" sign is activated. A flashing display is utilized to denote manual override operation.

Ten selectable parameters from throughout the unit are available and appear on the display unit as governed by the selector switch on the display module as described heretofore.

FUNCTIONAL DESCRIPTION OF THE SECONDARY UNITS

Each secondary unit, such as the one shown in FIG. 3, contains a microprocessor and memory unit for enabling control of the specific intersection associated therewith. The secondary unit issues force off commands to the timer (controller 32) governing the intersection. The secondary unit receives the cycle length information transmitted to it by the master unit, and has memory space available for storing twenty-four individual cycle length messages. The cycle length is stored until the appropriate time for its use (depending upon the offset of the secondary unit). Thus, the master unit may effectively change the cycle length for each successive cycle when in a directional operation, and the respective cycle length associated with each platoon of cars passing through the system will be called into play by the appropriate secondary unit at the appropriate time. Thus, the cycle length associated with each platoon within the coordinated arterial system will be "rippled" through the artery in a successive fashion such that ech platoon travels with its own cycle length.

The directional offset is settable using the thumbwheel switches on the offset module of the secondary unit 40. Offset relationships in each direction are determined in actual seconds of travel time from the start of the system utilizing a desired speed for vehicle traffic. Separate thumbwheel switches are provided on the offset module for both inbound and outbound directions. Thus, different speed limits may be set, if desired, for each direction.

Directional offset modifications may be made by the master unit. When such speed change offset modifications are commanded by the master unit the modified offset value utilized is the one dictated by the master unit.

AVERAGE OFFSETS

The secondary unit automatically calculates and implements average offsets which equally share the maximum possible green band between each direction for a given cycle length. The operation is based upon the offset setting used for the outbound direction, and thus the average speed is the same as that set into the outbound program. Alternately average offset may be set in percentage of cycle length as is more conventional in previous methods. A system calling command, communicated from the master unit, selects the preset percentage average offset operation.

In calculating the automatic average offset, each secondary unit compares its directional offset time with a reference cycle length which may be, for example, the presently effective cycle length. In effect, the reference cycle length is divided into the directional offset time to determine a remainder fraction, that is, the fraction by which the directional offset time falls within any multiple of a reference cycle length. Assuming the reference cycle length is 100 seconds and outbound offsets occur at 40, 80, 160 and 215 seconds for first through fourth intersections, the remainder fractions are simply (40/100), (80/100), (60/100), and (15/100) respectively. The average offset is taken to be either approximately zero or approximately fifty percent of the effective cycle length depending upon the value of the remainder fraction. A number of alternatives are possible. Using the example above, one may assign an average offset of zero (zero percent of reference cycle length) to all remainder fractions less than or equal to $\frac{1}{2}$, and an average offset of 50 seconds (fifty percent of reference cycle length) for all remainder fractions greater than $\frac{1}{2}$. Thus the first and forth intersections would have a zero average offset value, and the second and third intersection would have a 50 second average offset value. Alternately, the zero or fifty percent assignment may be made depending upon other criteria for the remainder fraction. One such alternative is to assign the zero percent value if the remainder fraction falls within a portion of the reference cycle length time defined by 0 to 24 or 75 to 100 percent thereof, and the fifty percent value if the remainder fraction falls within another portion of the reference cycle length time defined by 25 to 75 percent thereof. The software listings within the secondary utilize the above alternative in calculating the average-mode offset values for each of the secondary units in the system. The automatic average offset calculation is made within each secondary unit utilizing its particular outbound offset value as a reference input parameter.

TRANSITION RESPONSE

After a change in the offset value, the secondary unit resynchronizes itself with the new offset value by increasing or shortening the effective cycle length. For moderate offset changes, synchronization is accomplished within a single cycle. Larger offset changes are spaced over not more than three cycles of operation. Rapid synchronization is generally desirable, and the secondary unit will determine whether synchronization can best be reached by lengthening or shortening the cycle length. The effect of such lengthening or shortening to the traffic flow is also taken into account, and lengthening is generally favored when there is no choice preponderantly in favor of either mode. Before a shortening cycle length is attempted the secondary unit calculates the feasibility of such an approach by measuring early artery green return and the ratio of artery to side street service. The secondary unit may, for example, not be able to shorten a given cycle length since the side streets have a minimum green period which cannot be further reduced even in the presence of a force-off. Further, the side street will not react to a force-off during pedestrian crossing times.

FORCE OFF OPERATION

In the event that a controller and the associated secondary unit fall out of phase association, the secondary unit makes use of the force-off command to re-establish association. The secondary unit does not issue a force-off command before the associated controller has moved into phase association with the secondary unit. After association has been achieved the secondary unit issues a force-off command when it moves into the next phase unless the controller has also advanced to a new phase. The force-off command is held for approximately five seconds or until the controller advances, whichever event occurs first.

FREE OPERATION

The secondary unit causes the controller to be under coordination control at all times unless a free operation has been issued from the master unit. When in the free operation (free op) mode the secondary unit ceases to issue appropriate force-off commands to the controller and also drops the command for Max II extension limits and removes the constant arterial detector calls.

FLASH/PRE-EMPTION OPERATION

The secondary unit issues a 115 V, 60 Hz, command when directed by the master unit. This voltage is used to effect flash operation of the controller. Similarly, pre-empt operation may be effected upon command by the master unit in response, for example, to special intersection needs (fire station nearby, etc.).

TIMER MONITORING

Each controller has associated therewith a timing means which may comprise mechanical cams, electronic counters and the like. In the event that any given timer associated with an intersection controller fails to advance for one complete coordination cycle the secondary unit takes control of the interval advance circuit in the controller and steps it through each phase for the alloted split period as set on the secondary unit. (The interval advance (int. adv.) signal is connected to pin 11 as listed in Table 1). Under these conditions the display portion of the display module of the secondary unit is utilized to indicate a failure of the timer by flashing the vertical stroke of the "+" symbol. If the timer fails to advance, even in response to the interval advance circuit, the secondary coordination unit issues a flash call.

STANDBY OPERATION

In the event of a loss in communication between the master unit and the secondary unit, the secondary unit continues to operate on the already communicated cycle length, offset and split information in the order of storage within the secondary unit. After the cycle length and other data associated with each platoon has been utilized, the secondary unit then continues to operate on the last fully communicated combination of cycle lengths, offset and split information.

Selectable standby cycle lengths are provided for use in the event of a loss of communcation from the master unit after a thirty minute time interval. The secondary unit reverts to normal operation under command of the master unit upon re-establishment of communication.

AUTOMATIC INPUT TEST

The secondary unit performs an automatic self test with regard to the interface module input circuits when called to do so by actuation of appropriate pushbutton switches on the face of the interface module. Separate tests may be provided for pre-empt, flash and coordination unit inputs. The self test calls appropriate functions into service for that time that the test is enabled by the operator. The test consists of applying input levels of 100%, 84%, 67% and 50% of the designed input levels on the inputs in sequence. In the case of the pre-empt or flash functions the resultant output may be observed and an evaluation may be made of the result and the "display" will indicate the percent level presently being applied. In the case of the coordination functions the response will be automatic and the results will appear in the adjacent display at the completion of the test. At that time the display will sequentially indicate the failed test level and the pin number of the inputs that have failed at this level. A non-fail test will display 00.

It is clear that although the secondary unit as described herein is a separate physical unit from its associated controller, it may equivalently be incorporated into the controller unit without effecting the system operation.

SOFTWARE DESCRIPTION

MASTER UNIT

The computer program of the master unit calculates the traffic signal cycle length and related parameters from three data sources. The first souce is the thumbwheel switches on the front panel of the master unit; the second source is the real time inputs representing cars entering and occupying the section of artery controlled by the master/secondary units. Thirdly, certain general override functions can be initiated by remote inputs. Since the program has final say, it can interpret any of these inputs, and does do so if they seem incorrect as compared to the parameters which are part of the program and constitute the final definition of what is a proper and correct front panel setting or sensor input.

While it is instructive to consider that the program is in a Red phase or Green phase, or in some particular subphase of one of these, the method employed to represent the assorted states which the sytem can get into employs a combination of explicit flags and different paths of program logic to uniquely represent the different possible situations.

The first few layers of information processing of the clock and of the real time inputs is done by regular polling. The sensor inputs (occupancy and volume for example) are sampled every 33 ms, and counters are incremented to indicate the number of pulses for volume inputs, percent of time which an occupancy input is found to be on, or merely the state of a clock counter. The system outputs are updated at regular (100 ms) intervals. At longer time intervals, 30 seconds, the sensor data is examined to check for the possibility of a fault.

The continuous processing of inputs and outputs so far described may be considered as background processing whereas the foreground processing constitutes the second by second update of system state as represented by Directional mode (Inbound/Average/Outbound) and Phase (Red/Green). The system flags include DIRSTAT (Directional mode), SYSTAT (red/green; sync; red/green ect.), GAPPROC (current directional cycle length has/has not been calculated), and GAPFLG (a gap over the threshold has been observed). In conjunction with these flags, a set of timers control the minimum waiting time before changing state. These include SPEEDTM which keeps track of the time between changes in speedwarp, INAVGTM which keeps track of the time spent in AVERAGE directional mode, INTOAVGTM which keeps track of the time spent waiting to enter Average mode, and AVCYCTM which keeps track of the time to be spent in a particular average cycle length before changing. These timers are setup and interrogated at times specific to the logic of phase changes, but they are decremented by the background timing logic every 30 seconds. Thus, these timers are an interface between the regular background and the context sensitive foreground.

To handle the foreground logic, the state of the flags controls the selection of a specific routine among several which is to be called each second. During green time either GRNUPDIR, or GRNUPAVG, or MANUAL is called once a second. During red time either REDTIME or MANUAL is called once a second. These four routines share certain basic duties. They all increment a counter, (ACTGN) which is the accumulating time in the current phase, and check this time against various limit values in order to change flags. The differences among these four routines lies in the logic whereby assorted variables are calculated and the flags are set and reset. Numerous subroutines perform calculations which are shared among the main routines, and several subroutines exist for logical clarity rather than the convenience of multiple applications of the same logic. For instance, during a directional nonmanual (automatic) green phase GSPEND and SYNCEND are called precisely once to perform unique operations which would otherwise fall into the purvue of GRNUPDIR. Information output portakes of both clock regularity and variations with phase.

The telemetry is composed as a sequence of messages whose content changes with the current state of system variables when the message is generated. The messages are typically 4.8 seconds long, and thus, are somewhat dated by the time they are completely sent. To partially combat this, the state of sync is appended to every nibble of information sent. The sync delay is at most 300 ms. The front panel display is updated every 100 ms.

Thus the presence or absence of pulses on the inputs is quantized into 100 ms slots for visual presentation. Similarly, the presence or absence of a gap between cars is quantized into one second slots.

Basic timing information is developed from an input which is 60 Hz divided successively by (2), (3), (2) giving 4 inputs the slowest of which is 5 Hz. The program loops examine this input until a change is observed. It then updates the software clock and executes assorted routines depending on the current time slot. These routines finish and control returns to the waiting loop until the next clock transition.

The significant time slots, or intervals between major routine executions are 33 ms, 100 ms, 1 s and 30 s. The first of these is used primarily to sample the volume and occupancy inputs. 100 ms is used mostly to update display outputs, and to initiate lengthy routines which are allocated an N.1 slot. (N indicates that the routine is executed each second but on the 0.1 second mark - not exactly on the second.) The 30 second slot is used to maintain long term counters and to check up on validity of inputs. The major routines which determine system state run on the one second mark.

The system state is either Red phase or Green phase. The Directional mode of the system is either one of manual inbound, manual average, manual outbound, inbound, average, outbound or percentage average. The Green phase can be broken down into sections. In particular, a sync pulse is transmitted by the master unit and persists for all but the last 2 seconds of the Green phase in order to inform the secondaries of an impending phase change. During the first portion of the Green phase, the green headway is used with the volume sensors as part of the cycle length determination. During the last car passage time, or following a gapout in a non-manual directional mode, the red headway is used. In a non-manual directional mode, Green phase time is further subdivided into a gap inhibit period followed by a gap waiting period followed by a possible extension period after a gap has been acknowledged but before the last car passage period. Unlike the previously mentioned phases which are fixed by thumbwheel switch (TWS) settings, the second and third subphases of a non-manual Green phase can be skipped depending on traffic.

At one second intervals, the time keeping driver executes one of the major phase routines (which depend on system state). These routines share the responsibility of (1) incrementing a counter, ACTGN, reflecting time accumulated in the current phase, (2) advancing system state when this counter exceeds the previously established limit, and (3) performing calculations towards determining the current cycle length and/or future cycle durations.

The major states of the system are represented by different program routines, but the large quantity of continuous repetitive work is handled by frequently executed but short and simple background routines. This ranges from nearly continuously called routines such as RTCLK which monitors the real time clock waiting for the next transition to routines operative once every several traffic cycles such as AVCYC which calculates the average cycle length during average cycles, but only repeats after a timeout period measured in minutes.

The master unit calculates a system cycle length and parameters for Directional mode and speed change from volume and occupancy real-time input, and transmits this information to each of the secondary units. Basically, cycle length increases with increased traffic, and direction is governed by the relative balance of inbound and outbound traffic. Speed change is proportional to traffic as measured by occupancy.

Directional mode is selected by comparing panel settings (TWS) with the calculated value of inbound volume/(inbound volume+outbound volume) in percent as follows:

| Criteria | Directional Mode |
|---|---|
| $OUT\ \% \leq \frac{IN}{IN + OUT} \leq IN\ \%$ | AVERAGE |
| $OUT\ \% < IN\ \% < \frac{IN}{IN + OUT}$ | INBOUND |
| $\frac{IN}{IN + OUT} < OUT\ \% < IN\ \%$ | OUTBOUND |

To avoid undue variation, changes of Directional mode are constrained so that $IN \rightleftarrows AVG \rightleftarrows OUT$ and $IN \not\rightleftarrows OUT$. Furthermore, two time delays are enforced. "IN" is the minimum amount of time which the system can stay in any cycle length in AVERAGE mode. "INTO" is the minimum amount of time it will remain in a Directional mode even though it may wish, by calculation above, to go into AVERAGE. To execute a transition, the calculation must be consistent throughout the waiting period. Thus frequent variations due to random traffic is discouraged, but truly necessary transitions are delayed by no more than the waiting times. Both the IN and INTO time periods are settable on TWS located in the direction module of the master unit 50.

Assorted error checking and comparison results in the selection of a maximum valid inbound and outbound volume and occupancy values. These values enter into the cycle length calculation along with the panel settings and are defined as follows:

$$VOL_S = E_R A_R + E_G A_G$$

A - Actuations
E - Extensions
R - Red
G - Green $$OCC = \frac{OCC\ \% - X}{Y - X}\left[\begin{matrix}Max \\ Grn\end{matrix} - \begin{matrix}Min \\ Grn\end{matrix}\right] + MinGrn$$

$$IN_S = MAX\ (VOL_{SI}, OCC_{SI})$$

S - Seconds
I - Inbound
O - Outbound $$OUT_S = MAX\ (VOL_{SO}, OCC_{SO})$$

$$\text{Calculated Average Cycle } \frac{IN_S + OUT_S}{2} + \text{Side Street Time} \quad (1)$$

The calculated Average cycle length value is used to select the closest panel setting in the average module of the master unit for transmission to the secondaries. From the selected average cycle length, the Green Time is simply the average cycle length minus the side street time.

In a Directional Mode, the cycle length is calculated from the current data. At the beginning of the Green phase the value Max Grn (green) is used as a provisional Green Time. After the gap inhibit time, $MAX(E_R A_R, MINGRN) - LCP$, the gap value is considered. When the time between any two successive actuations, considering actuations in either or both lines in this direction exceeds a gap value, or the time in Green extends to MAX Green−LCP, further calculations are performed. $A_G'$ (up to this point in Green) is used so as to find $MAX\{E_G A_G' + E_R A_R$, MIN Green, OCC [IN or OUT]$\}$. This value is used for the Green time unless it exceeds MAX Green in which case the latter is substituted. We now have a value for green time. Note that this value equals or exceeds the currently elapsed green time+LCP. In the latter case the system waits out the remaining time before going into LCP time. Cars counted after $A_G$ are included in the $A_R$ of the next cycle.

Figure 13:
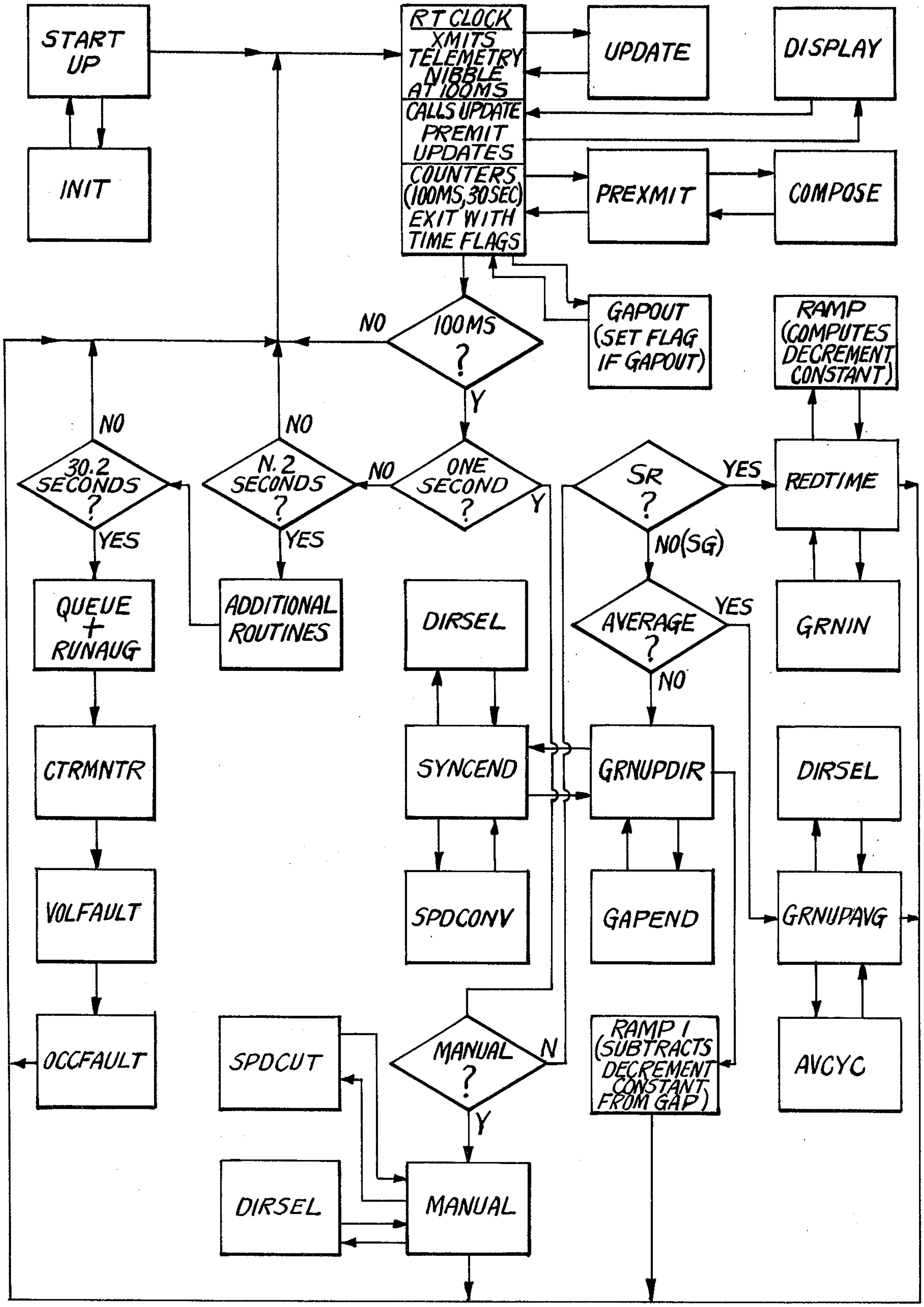
FIG. 13 is an overall flow diagram of the operation of the master unit in accordance with the invention.

An overall flow chart for the Master unit operation is given in FIG. 13. The major operating subroutines are discussed hereinbelow. Program listings are given in the appendix for the key operating programs in both the master and secondary units.

UPDATE

The UPDATE routine is called every 33 milliseconds (30 times per second). It keeps track of sensor inputs, both volume and occupancy. It also keeps a tally of "weighted" actuations to provide the required volume derived cycle lengths.

The actions taken for the volume and occupancy sensors are different:

Volume: The volume sensors are used to determine cycle length and/or direction as well as for display. A pulse on the order of one hundred milliseconds is normally generated when a vehicle passes over the volume detectors. UPDATE counts these pulses. It does so by using the exclusive OR function, successively comparing four bit samples representing the four volume sensors. A change results in a "1" and represents either the leading or trailing edge of the sensor pulse. Only the leading edge is counted. Each leading edge increments a binary one-byte counter. This counter is subsequently used for error detection and direction determination.

Each pulse also increases a weighted count, the value of the weight depending on whether the system is in the $S_R$ or the $S_G$ mode, and whether the sensor is inbound or outbound as determined for corresponding TWS headway settings. The weighing factors are simply the factors $E_R$ and $E_G$.

UPDATE also performs an operation preparatory to fault checking. It prepares a register for inspection by the routine called VOLFAULT. Then it inputs a new set of four volume bits, and it ANDs the contents with RAM register VOLHIGH. This is to determine whether the volume sensor is continuously high. If the sensor ever goes low, the result will be to clear the associated bit in RAM, notifying the fault checking routine VOLFAULT that the sensor has not remained high. VOLFAULT will test this register periodically and set it to all "1" (FF).

Occupancy: The occupancy sensors are used for determining cycle length as well as for display purposes and speed change. The occupancy calculation is a running average. Each detector is polled every 33 milliseconds and a count is accumulated for 30 seconds. The larger number from each pair of inbound or outbound detectors is used. At the end of 30 seconds, the accumulated totals are divided by four to insure a one byte result, and placed in a Queue as part of the running average. During UPDATE, a set of four double byte registers are incremented whenever the associated occupancy bit (each sensor is represented by one bit) is high. The accumulated totals are later processed by QUEUE. QUEUE will clear the counter after truncating it to eight bits (dropping the two LSB) and entering the new value into the appropriate circular stack location. This count may be considered an unnormalized percent of the time which the occupancy input was found to be high. Since QUEUE executes every 30 seconds, the maximum count is 900, which value fits in ten bits.

PREXMIT

The PREXMIT routine is called every 100 ms to handle the transmission of telemetry. Each message is composed of 8 four bit nibbles, but only 2 bits of data are sent for each of the 8 nibbles. This is done by transmitting the low order 2 bits of the data followed by the high order 2 bits. Four lines are utilized for telemetry between the master and secondary units. One of the 4 available lines for data transmission is used as a clock line that is high whenever the high order bits are sent, and low when low order bits are sent. Two of the remaining lines are used for data per se and one line reflects the status of sync. The sync line is high during a Green phase and goes low a fixed time, as, for example, 2 seconds prior to a transition to Red phase.

DATA TRANSMISSION EXAMPLE

Data nibble #1 = "1101"
Data nibble #2 = "0010" } assume SYNC = 0

| SYNC | DATA LINES $D_1$ | $D_0$ | |
|---|---|---|---|
| LINE | $D_3$ | $D_2$ | CLOCK LINE |
| "0" | "0" | "1" | "0" Nibble #1, low order bits |
| "0" | "1" | "1" | "1" Nibble #1, high order bits |
| "0" | "1" | "0" | "0" Nibble #2, low order bits |
| "0" | "0" | "0" | "1 " Nibble #2, high order bits |

Each ½ data nibble is transmitted for 300 ms. PREXMIT counts the number of nibbles transmitted (NIBCTR), and when this count equals 16, a routine called COMPOSE is called to format a new message. Since each ½ data nibble is transmitted for 300 ms, and it takes 16 nibbles (counting the SYNC and clock as part of the nibble) to transmit a message. Thus, 4.8 seconds elapse during the transmission of each message.

During a sequence of average cycles the length of each is calculated 2 seconds before the end of Green phase and transmitted as ECLT (effective cycle length time) during the operating time, namely the immediately following Red phase. During a sequence of Directional cycles, the cycle length is unknown until GAPEND time. The cycle length transmitted during the Red phase which precedes this is that of the preceding cycle. The length of the current cycle is only transmitted implicitly by the cessation of SYNC. The coded cycle length information thus serves as a check on the time information transmitted implicitly by the end of the SYNC pulse. In practice offsets between secondaries at the ends of the system and their corresponding adjacent secondaries are longer than 4.8 seconds and thus the secondaries have received both the end of SYNC pulse and the coded message prior to platoon arrival time. During transitions from Directional to Average mode, the cycle length transmitted during the first red is the new cycle. Thus the last directional cycle length is lost. For transitions from Average to Directional, the last Average value is repeated for the first Directional Red phase.

COMPOSE

The COMPOSE routine is called by PREXMIT every 4.8 seconds (after a 16 nibble message has been transmitted). The function of COMPOSE is to extract appropriate data from RAM and format it for telemetry. COMPOSE looks at the SYNC line, and depending on SYNC status, formats one of two possible messages.

Msg #1, transmitted if SYNC on.

| | D3 | D2 | D1 | D0 | |
|---|---|---|---|---|---|
| W0 | "1" | "1" | "0" | "0" | Message ID "C" |
| W1 | % Avg. | Out | In | "1" | $D_3$-$D_1$=Direction; $D_0$=Strobe |
| W2 | D | A | T | A | Base cycle, LSD |
| W3 | D | A | T | A | Base cycle, ISD |
| W4 | "0" | Split | D | A TA | $D_2$=Split; $D_1$-$D_0$=Base cycle, MSD |
| W5 | — | — | — | — | All zeroes |
| W6 | — | — | — | — | All zeroes |
| W7 | "0" | CHECKSUM | | | $D_2$-$D_0$=CHECKSUM |

Msg #2, transmitted if SYNC off.

| | $D_3$ | $D_2$ | $D_1$ | $D_0$ | |
|---|---|---|---|---|---|
| W0 | "1" | "1" | 0 | "1" | Message ID "D" |
| W1 | % Avg. | Out | In | "0" | $D_3$-$D_1$=Direction; $D_0$="0" |
| W2 | D | A | T | A | ECLT, LSD |
| W3 | D | A | T | A | ECLT, ISD |
| W4 | "0" | Spdchange | DATA | | $D_2$ Speed Change (MSD)$D_1$-$D_0$=ECLT |
| W5 | D | A | T | A | Speed Change |
| W6 | D | A | T | A | Speed Change |
| W7 | "0" | CHECKSUM | | | $D_2$-$D_0$=CHECKSUM |

CHECKSUM is generated by counting all the binary "1"s in the message and then storing only $D_2$ - $D_0$ of that count as the CHECKSUM.

GAPOUT

The GAPOUT routine determines whether a gapout condition has been reached. "Gapout" is related to time intervals between volume sensor actuations and consequently related to the distance between cars. The artery traffic signal is green as long as cars continue to stream over the sensor. When that stream is interrupted, that is, a "gap" appears, it is assumed that a "platoon" of cars has been serviced and the signal may go red. The length of the gap is not constant, but is made available to the routine for purposes of determining gapout.

The gapout condition is of interest only during the period designated $S_G$, that is, when the artery is assumed green. Thus, the GAPOUT routine is only used during $S_G$. When gapout is achieved, the routine sets a flag which is reset during Red phase and whenever a car is detected during green.

Although there are four volume sensors, only the two in the currently valid direction are of interest. (In Average mode, gapout is not used). The selected volume sensors are monitored and pauses in actuation of both detectors are determined by keeping a previous reading of CARWT in local registers called GPSVOLD, and comparing them with the newest reading. Unless a difference in reading is noted, the gap counter, GAPCTR, is incremented; if an actuation occurs, it is cleared. When the tally in GAPCTR reaches the actual gap value, the gapout flag GAPFLG is set. When the next car is detected, the flag is reset and the counter returned to zero. Should the time between cars exceed 9.9 seconds the gap counter is held at this value.

GAPEND

The GAPEND routine calculates the Green phase duration in Directional mode. A maximum of three quantities form this raw value. The first is the current accumulated time in this Green phase plus the last car passage time. The second is the weighted volume car count up to this time. The third is the directional occupancy value in seconds. The raw value is then bounded by minimum green and maximum green and posted as ECLGN. If the occupancy value dominates then a flag OCCDET is set, otherwise it is reset. ECLGN2, the time for SYNCEND, is also setup. Finally GAPPROC is set. Thus GAPEND will not be executed again this cycle. VOLSAV is executed now so later cars will be counted with red extensions.

SYNCEND

The SYNCEND routine is used only during a Directional mode. It is called only by GRNUPDIR, two seconds before the end of $S_G$. The purpose of the SYNCEND program is as follows:

1. Terminates the Sync pulse.
2. Calculates ECLT, total cycle length, which is known at this time since the commitment to end green has been made.
3. Determines whether to continue in a Directional mode or switch to Average (Calls DIRSEL for this information).
4. Calls SPDCVT to set up upcoming Speed Change.
5. Calls BASCYCNW in order to obtain new split and the new (if changed) Max Side Street setting of TWS.

The new maximum side street time is needed to allow calculations of the upcoming cycle length for average, and also to have it ready for telemetry at the start of $S_G$. However, the old value is still needed to finish the timeout of $S_R$, which will commence after the next two seconds. Hence, a dual register BASEOLD is set aside for the Max Side Street time still actually in effect.

GRNUPDIR

During a Green Directional non-manual phase the GRNUPDIR routine is called once a second on the second to time out the phase. In order to logically separate the functions, GAPEND and SYNCEND are separated out as subroutines, but are called by GRNUPDIR only. The logic of shifting between the subphases of green is handled by GRNUPDIR while the majority of the calculations for the subphase timings are handled in GAPEND and SYNCEND.

The first subphase of green is the gap inhibit period, the length of which, TRDLCP, is set by GRNIN just previous to this green time. The next subphase is spent waiting for a gap as signalled by GAPFLG set by GAPOUT. At this point GAPEND is executed, and the green phase duration, ECLGN, is established. There is now a waiting period until two seconds before the end of green. Then SYNCEND is executed which terminates sync and posts the total effective cycle length, ECLT. Then the final two seconds pass and GRNUPDIR sets SYSTAT=0 meaning red time has come. In order to assure that green time does not exceed maximum green, either the gap searching phase or both this and the gap inhibit phase may be cut short by an abrupt transition to gapend time. This limit is maximum green minus last car passage time, calculated by GRNUPDIR at the beginning of green as MAXGNLCP.

REDTIME

This routine operates during $S_R$, artery red, which corresponds to artery side street service. The period $S_R$ is defined by the setting of the Max Side Street Time thumbwheel switches. There are two sets of these switches, corresponding to Split 1 and Split 2. During REDTIME, the time for $S_R$ will not necessarily be the most recent split selected as a result of the previous GRNUP operation; it will be the split in effect at the start of GRNUP. The proper time will appear in BASEOLD, from which REDTIME gets its information.

The function of REDTIME is to time out $S_R$ and to develop certain information during that time as follows:

1. Calls RAMP, a routine which determines the increment of time to be subtracted from the gap time every second. RAMP is called three seconds after REDTIME begins, a period in which there is little processing activity. Since RAMP involves a division, it will perform the operation without interfering with other processes.
2. Calls in thumbwheel switch settings or other parameters of interest, two seconds after the start. This option is exercised only if other routines cannot efficiently service the fetch and translate operations on their own.
3. When $S_R$ is finished, as indicated by the equality between an incrementing counter ACTGN and BASEOLD, the routine GRNIN will be called. This prepares the system to enter the Green phase with certain data. In particular, the weighted values generated during REDTIME by the UPDATE routine are used in establishing an initial Green time, assuming a Directional mode.

GRNIN

The GRNIN routine is executed at the end of Red time by both REDTIME and MANUAL. It performs the housekeeping chore of setting SYSTAT to hexadecimal '83' corresponding to sync "on", green volume extensions, and Green phase.

GRNIN examines the weighted car count for the currently active direction (in average it uses outbound), and selects the maximum valid value. $T_R$ (TRED) is determined by bounding the value generated with respect to minimum and maximum green. This value is used for Display purposes and to calculate the gap inhibit period TRDLCP (=TRED−Last Car Passage), which is used in the following Green phase if it is directional.

DIRSEL

DIRSEL is a subroutine of SYNCEND, GRNUPAVE and MANUAL. It is used to determine the direction of traffic for the next cycle.

Direction decision is based on two criteria:

1. Calculated (or "desired") direction. The volume of traffic entering each end of the artery over the past cycle indicates the desired direction. Thus, if there is a heavy preponderance of inbound versus outbound actuations, the artery should favor inbound traffic. If the traffic volumes are nearly the same, the artery should be in an AVERAGE mode.

2. Previous direction of traffic. To prevent the street from swinging from one direction to another with each cycle, constraints are introduced. Switchover from inbound to outbound (or vice-versa) requires the street to go through a period of time in average. Thus, any change out of a Directional mode will initially be into average. The movement into average and the time spent in a selected average cycle length in average is subjected to time constraints set in by two single digit thumbwheel switches, representing "Minutes". These switches indicate how much time must pass before the street can change from a direction "Into" average. Once it enters average, it will dwell there until it receives a command to move into another direction. While it is in average the time "in" is measured, and there is a delay corresponding to the setting in moving between selected cycle lengths. If the calculated direction becomes inbound or outbound while the street is in average, the system will complete the current average cycle and then move into the new direction. Directional flow is given preference over average routing by this algorithm.

The first instructions calculate the "desired" direction. Based on this direction, it is seen whether a change in direction is indicated. If so, the constraints described in (2) above are checked to see if sufficient time has elapsed for the change to take place. If so, the routine sets the new direction in RAM; if not, it does not change the previous direction.

The timing is not accomplished by this routine; the routine sets flags which indicate to an external 30 second timing routine whether the "Into" or the "In" time counters should be decremented, or whether neither should be touched. DIRSEL does, however, set up the counters so that they may be decremented.

CONVRT (Calls OCCSEC)

The CONVRT program converts the two directional occupancy percentage values to seconds green time. The variables X, $Y_{in}$ and $Y_{out}$ enter into the calculation as set by single digit TWS values representing percentages where:

$0\% \leqq X \leqq 90\%$ $10\% \leqq Y \leqq 100\%$

OCCP=OCC%=occupancy percentage developed from street data, inbound and outbound

MinGrn, MaxGrn=Minimum and Maximum green time $$T = \left(\frac{OCCP - X}{Y - X}\right)(\text{MaxGrn} - \text{MinGrn}) + \text{MinGrn} = OOC$$

Furthermore, T is constrained so that $0 \leqq T \leqq 299$. This value is returned as occupancy seconds green time.

For ease of calculation, the case where $OCCP - X > 0$ is separated from the case where $OCCP - X < 0$. Furthermore, $1/(Y-X)$ is handled as a lookup (10 different values which $(1/Y-X)$ can take on) followed by a multiplication. If MinGrn>MaxGrn, no computation is performed, which results in undefined values for occupancy seconds. If $Y \leqq X$ the value $1/(Y-X)$ is set equal to (1/100).

GRNUPAVG

The GRNUPAVG routine includes AVCYC as a subroutine. The routines are used during $S_G$ and serve to time out $S_G$ when the system is in an average mode. During AVERAGE mode, sensor activity is not used to determine present green time, but may be used to determine the green time for the succeeding cycle. Hence, the length of green is known before $S_G$ is entered, and the timing out process simply involves counting until the preselected average cycle green has been completed. However, calculation of a new cycle length in AVERAGE mode is relatively lengthy.

Once a cycle length has been established in AVERAGE mode, it cannot be changed sooner than permitted by a thumbwheel switch setting designated Average "In". (The same setting is also used to govern the minimum time a setting of Speed change is used.)

The subroutine AVCYC first determines whether the preset time has elapsed. If it hasn't, the same setting for the green portion of the average cycle is used, and the total cycle length is recomputed on the basis. An exception arises if split is changed, in which case the entire cycle is recomputed.

If the preset time has elapsed, a new average cycle length is computed. Computation takes place in two steps:

1. The quantity $(IN_s + OUT_s/2$ is calculated as per equation (1) above.

2. The average cycle length TWS setting closest to this calculated value is used as the selected cycle length.

The factors inbound and outbound used in the calculation refer to the inbound and outbound sensors, both volume and occupancy. There are a total of four inbound and four outbound sensors. The largest inbound and the largest outbound are selected for the factors.

MANUAL CYCLE

In this mode of operation the operator controls direction from the front panel override switches, and selects cycle length by means of the TWS normally used for display selection. The average cycle length corresponding to the TWS setting is selected where select positions 1-4 correspond to settings #1-4 respectively, and positions 5-9 and 0 correspond to setting #1.

Volume and occupancy data is maintained during MANUAL mode although not used at this time. Internally the master unit is maintained ready to revert to automatic operation. Telemetry does not distinguish between AUTOMATIC and MANUAL modes. Auto split and speed change functions are transmitted as usual. ECGNAV is used as the length of green variable so that it will be reasonably defined if the first automatic cycle after a manual period is AVERAGE.

The procedure for entering and leaving MANUAL mode mimics that for changing between AVERAGE and DIRECTIONAL. DIRSEL sets up DIRNEW to manual at SYNCEND time. Two seconds later at the beginning of red, REDTIME or MANUAL, whichever has control sets DIRSTAT equal to DIRNEW. The next second, DRVMAS calls the now appropriate REDTIME or MANUAL. If the latter, the new cycle length is read in and green and red times calculated. A telemetry message composed during the first second of REDTIME could contain a value of ECLT corresponding to the cycle that was to have been, but has been overridden, if the manual enable is recognized before a cycle that was to have been average.

MANUAL mode operates as a one second routine during both Red and Green phases of a MANUAL cycle. While the operator selects the cycle length, housekeeping continues in order to facilitate change back to AUTOMATIC mode.

During Red phase at two seconds, the cycle length is read in and ECLT and related parameters are developed. At three seconds, SETUP and RAMP are executed, as usual. Finally when ACTGN reaches BASOLD, GRNIN is executed and ACTGN reset.

During Green phase VOLSAV is executed at the beginning of LCP time as determined by the previously calculated ECLGNLCP. At SYNCEND time DIRSEL, SPDCVT, and BASCYCNW are executed. If the next cycle is to be automatic AVERAGE, AVCYC is called to establish a proper average cycle length. If the next cycle is not to be manual, a value for ECLT is calculated.

CTRMNTR (Counter Monitor)

This routine is called every thirty seconds and is used to time out certain lengthy time intervals, intervals whose resolution is not critical. It is used to service counters associated with the AVERAGE mode plus Speed Change. It services the following four counters:

1. SPEEDTM—Counts the time dwelled in the same speed change.
2. AVCYCTM—Counts the time dwelled in the same average cycle length.
3. INAVTM—Counts the time the system has been in the AVERAGE mode. The AVCYC routine continually sets this counter back to its preselected full scale (from 0 to 9 minutes) as long as routine DIRSEL indicates that AVERAGE is the desired mode; the counter is allowed to time out only while the system is in AVERAGE but desires to move to a Directional mode.
4. INTOAVTM—Counts the time the system has desired to move into the AVERAGE mode, but is still in the Directional mode. This counter is continually reset back to its preselected full scale (0 to 9 minutes) as long as the DIRSEL routine indicates that the desired traffic flow is the same as the direction of flow presently in use by the system.

The CTRLMNTR routine ignores the above counters unless the D7 bit is set to "1". In that event, it is permitted to operate on the counter by decrementing it. When all the bits except D7 are zero, the routine clears the counter permitting the operating routine to inspect it for a zero condition.

The major portion of the routine is a called subroutine, and additional counters can be serviced by inserting the address and a call instruction.

CYCTWS

This routine compares four available switch settings with a calculated cycle time, and selects the switch setting closest to the calculated cycle time. The selected setting is then stored as the new cycle length, AVSEL.

The four switch settings are designated "average cycle length" on the average module of the master unit, and each setting comprises a three digit thumbwheel switch. Maximum cycle length is 299 seconds.

Prior to entering this routine, a decision will have been made that the desired direction is AVERAGE, and that the time during which this chosen direction is applicable has exceeded a preset value. Similarly, once this routine is entered, the chosen setting will not be changed until a preset time has expired.

This routine is responsible for setting up the adjacent indicator bank to reflect the choice for cycle length. The indicators are reset by CYCLESTAT when the Directional mode switches out of AVERAGE. These indicators are also used to reflect which manual cycle length is in effect, at which time they are set by the MANUAL routine.

RUNAVG

This routine is used to compute the average of all values of occupancy stored in queues.

There are four occupancy sensors and each sensor is continually monitored. The sensor is interrogated every 33 milliseconds and the amount of time it is On is determined by accumulating "1" responses from each sensor over a 30 second period. Thus, a 30 second period would yield a total number of 900 if the sensors were continuously on. Since this is a two byte quantity, at the end of 30 seconds the accumulated total is divided by four (shift out two LSB) to obtain a one byte quantity.

The result of the 30 second accumulation is then changed to a percentage and stored in a queue. The queue can store between 2 seconds and 8 seconds worth of data, that is, between 4 and 16 thirty second accumulations. As each 30 second "packet" is stored, the oldest 30 second packet is dropped. The number of minutes of storage is fixed in PROM.

Thus, to obtain the value of the running average of a sensor, the appropriate queue is addressed. The number of consecutive active addresses is determined by checking the governing value stored in PROM. Then, the entries in the queue are added, and the total is divided by (900/4)×No. of half minutes (that is, minutes×2).

The RUNAVG routine assumes the presence of all needed data in queues and the governing minute total in PROM. The routine accomplishes the totalling and then the division of each queue. Results are stored in RAM as a group of four one byte numbers, each byte representing a number up to 99 (which will be assumed to be 100% occupancy).

Division is avoided by setting up a table for the reciprocal of all the possible divisor quantities; there are eight possible values, assuming values from 1 to 8 are used.

QUEUE Routines

A queue is used to compose a running average for each of the four occupancy sensors. Each of the four queues occupies up to one "block" of RAM space, that is, up to 16 bytes of RAM per queue.

The queues are all updated at the same time, namely every 30 seconds. Updating consists of fetching a counter, whose recycle period is fixed by a number set into PROM which represents time in half minutes (30 seconds), using the counter to build an address, and successively putting new values into the addressed slot by overwriting the oldest value.

The 30 second accumulated counts are kept in RAM pairs, four such pairs, labeled OCCLK (1–4), being set aside. A pair of registers is needed since the count may reach 900. However, this degree of resolution is not needed for the queue, and in order to keep update values to a single byte, the original count is divided by four—the two least significant bits are dropped.

After each 30 second update, the running average for each queue is computed by taking the total count of all of the queue contents and dividing by the number of queue entries. This number is then converted to a percentage by determining the total number of counts possible and dividing. Since there are only a few possible values which the divisor can assume, the reciprocal can be stored in a table and the division changed to a multiplication. When the values of the running average are computed, and translated to percentages, they are stored as one byte quantities RUNAVG (1–4).

There are two Queue related routines:

1. QUEUE (2000).
2. OCCFAULT (1700)

The function of QUEUE has been explained above. OCCFAULT determines whether an occupancy sensor has been inactive for 15 minutes or fully active for 5 minutes; either condition represents a fault. OCCFAULT may either inspect the OCCLK double byte location for zero or full scale, or inspect the latest Queue location for the same values. Full scale or zero should cause a relevant clock to be incremented, the action continuing unless partial activity clears the counter. When the count exceeds preset limits the most significant bit of the counter is set and further counting inhibited. The MSB is then used as a fault indication.

SECONDARY UNIT

Overview of Secondary Operation

The secondary unit responds to commands originating at the master unit, reflecting these commands in overriding outputs to the controller. The outputs are phased so as to provide coordinated traffic flow through the artery.

In essence, the secondary unit mirrors cycle length messages from the master unit, but with a delay designated as the "offset". The offset is primarily determined by the distance of the secondary unit from the end of the artery nominally taken as the origin. The origin will be at one end for an Inbound directional mode, and at the other end for either Outbound directional or Average modes of operation.

During Directional modes of operation, the offset delay is maintained even in situations where the secondary unit is so far removed from the origin that several cycle lengths may intervene. Since each cycle length may differ from its predecessor, it is required that the secondary unit "memorize" each succeeding cycle length so that it reproduces that cycle at the proper delayed time (offset) with respect to the origin. With this facility a "platoon" of cars moving through the artery is accorded the same cycle time as when it moved through the origin, and successive platoons may receive differing cycle times in accordance with their requirements.

The various cycle lengths are stored in the secondary unit memory in a queue. The number of cycle lengths stacked up in the queue depends upon the distance of the particular secondary unit from the origin and the cycle length time. At a secondary unit distantly located, under conditions of short cycle lengths, a larger number of cycle entries will have to be stored; conversely, a secondary unit located within a single cycle length of the origin would require only a single queue entry. Provision is made to store up to 24 queue entries, a number which accomodates anticipated worst case combinations of cycle length and artery length. A flexible stack pointer arrangement in RAM memory allows ready modification for further queue entries, should they be required.

The queue has one entry for each platoon of interest to the secondary. (Platoons that have already passed a secondary are no longer of interest.) Each entry includes the time at which the platoon entered the artery, the direction of travel, the length of the cycle, and selection of one of two splits, which control the amount of time assigned to the cross street phases. This queue serves as the temporary storage for all information received from the master. The information is stored until it is used by the secondary unit to control the timer (controller) to service the corresponding platoon as it arrives at the intersection.

As information is removed from the queue it is checked for appropriateness. If the time associated with the entry does not match the time that the platoon entered the street (calculated as current time minus travel time) a search is made for a queue entry closer to the correct time. If no usable entry is found, the secondary unit reverts to standby mode and waits for a new telemetry message.

The queue is maintained as a circular list in a fixed buffer area. There are two pointers to the list; one is updated as entries are added to the list and the other as entries are deleted from the list.

Much of the secondary unit program is given over to strategies for accomodating perturbations in the traffic flow, such as momentary failures, changes in offset, changes in direction and changes in split selection. These disruptions may cause queue changes or rearrangement; an object of the program is to minimize traffic flow discontinuities until normal operation is resumed, and to minimize the time needed to resume normal operation.

All timing within the arterial system is ultimately referenced to the master unit, and to maintain system timing integrity each secondary unit maintains a clock which reproduces the action of the master unit clock, without regard to offset considerations. This clock, the "Master Clock" is kept in synchronism by a routine which monitors the sync line from the master unit. A second clock called the Running Time Clock, runs continuously, using the Master Clock as a source. The Running Time Clock has a resolution of one second and cycles at a count of 9999. This count represents a time very large in comparison with any practical offset and provides a means of keeping accurate track of events occurring within the queue. A third clock, the "Secondary Clock" governs the secondary as it times out each phase. In the absence of the types of perturbations mentioned above, this clock will mirror the Master Clock but with a phase delay equivalent to the effective offset. All three clocks are software counters utilizing the 60 Hz real time clock as the basic time source and the Master sync pulse for synchronization.

The functions of the three clocks are as follows:

1. The Master Clock serves as a local reproduction of the clock at the system master unit, allowing ready access at the secondary to the basic reference time source.

2. The Running Time Clock is used as a time tag for each new entry into the queue. When the Master Clock reads zero, corresponding to the start of a new cycle at the master unit, the Running Time Clock is read and its setting is written into the next queue location. Eventually, the contents of the queue location are retrieved for servicing by the secondary unit, and at that time the setting written into the queue entry is compared with the current Running Time Clock value. Under normal conditions, the difference between the queue value and the current value will be the offset, that is, the queue entry is retrieved for servicing exactly at the offset time in seconds after the cycle is initiated at the master unit. The Running Time Clock therefore serves as a check against changes in offset. Also, successive queue entries should, assuming no offset changes, contain Running Time Clock entries which differ from each other by the last cycle length. Failure of these conditions to obtain will bring corrective routines into play.

3. The Secondary Clock times out the actions which take place after a queue entry has been fetched. Under normal conditions this clock is simply a delayed version of the Master Clock. If corrective actions are taken, however, intermediary cycle lengths may have to be synthesized to bring the system back into synchronism, and the Secondary Clock will also serve to time out these special (transitional) cycles.

A special problem is posed when the system changes from an Average to a Directional mode. During Average mode, platoons do not move in a favored direction. Thus, at the instant of transfer to a Directional mode there is no queue built up at any secondary unit. Each secondary unit responds to this situation by immediately building a "phantom" queue, in which each entry is the cycle length of the first platoon to enter the artery in the directional mode. Each secondary unit then enters a "transitional" mode in which it moves from the last (Average) cycle length through intermediate cycle lengths until it is in step with the queue entries it has built up. After the first platoon has passed through the origin, each secondary unit will add successive platoons to its queue in the normal manner. Thus, by the time the first "directional" platoon reaches a remote secondary unit, directional flow will have been established and successive platoons will move through with their preassigned cycle lengths.

When the system changes from Directional to Average, the change is accomplished in a "ripple through" fashion rather than instantly switched over. Thus, a platoon which has been shaped while the master unit was dictating directional flow moves through the entire artery in the favored direction, and each secondary unit switches over to the Average mode only after the last "directional platoon" has passed through that secondary unit.

The actions described above are accomplished by storing in each queue entry the cycle length to be associated with it, and the direction assigned to it. Each secondary unit interprets this information as it retrieves successive queue entries, and acts through the Queue and Transition routines to respond to the information in an appropriate manner. A more detailed explanation of the key processes performed by the secondary units is given below.

CYCLE EXECUTION

As each cycle is completed, a new entry is removed from the queue and executed. This process involves examining the contents of the queue entry, the phase duration thumbwheel switches for the corresponding split module, and the appropriate offset thumbwheel switches. This information is used to calculate how long the secondary unit should remain in each of the requested phases.

In some cases, where the secondary is close to the master, the queue entry is not immediately available. The secondary will then begin to execute a very long cycle, and revise the associated phase durations when the master unit completes the transmission of the cycle length to the secondary unit.

The secondary maintains its internal cycle only as a reference for the phase of the controller. The controller must keep up with its associated secondary unit to maintain coordination along the roadway. The secondary unit maintains this synchronization by issuing a force-off command to the controller whenever it steps to the phase ahead of the controller. Thus the controller advances when the secondary unit does, and the roadway stays in coordination along its length.

There are also circumstances when the controller will skip a phase because there is no traffic on the associated side street. The secondary unit allows the controller to dwell in the resultant phase until the secondary unit overtakes the controller, wherein the force-off commands resume.

The coordination point for each cycle is the end of the arterial green phase. The length of the following cross street phases is determined by the corresponding thumbwheel switch settings. Any extra time in the cycle, not needed to service the cross streets, is added to the arterial green phase of the following cycle. Thus, the last cross street may be forced off, causing the controller to enter arterial green, when the secondary unit is still executing the previous cycle. This fact is noted by the secondary unit, and the extra time is used if any timing adjustments are required (transitions, described below).

TRANSITIONS

Transition is the state of a secondary unit changing from one offset to another. The offset of a secondary unit is its distance from the entrance of the coordinated roadway, measured as traveling time (in seconds) for a vehicle traveling along the roadway. Although the physical distance (in feet) from the entrance of the coordinated roadway to an intersection (secondary unit) is constant, the offset varies with the speed of traffic flow. Also the direction of the dominant traffic flow may change, which causes offset to be calculated from the other end of the roadway. Thus, the offset is a function of physical location, direction and traffic speed.

For a transition state to be induced, a change in offset must occur. Because the physical location of a secondary unit does not change dynamically, offset changes are due primarily to changes in traffic speed or direction. (A system start-up may also cause a transition.) Changes in speed may occur frequently and are the most common cause of transitions. When the speed changes, the offsets of the secondary units change. Each one second change in offset must be corrected by a one second cycle length change in transition (unless the net offset becomes greater than one cycle length or less than zero, when a greater transition may occur).

Direction changes also cause transitions by changing offsets, there being one offset setting for each direction. The AVERAGE mode uses the outbound offset thumbwheel switch setting, but is computed differently than OUTBOUND mode, so a change to or from AVERAGE mode is considered a direction change and may cause a transition.

Startup occurs at random time with respect to the coordinated cycles, so a transition is usually required to coordinate the secondary units with the rest of the system.

There are two transition states, shorten and lengthen. The secondary unit is said to be in a lengthen state when the secondary is ahead of where it should be (in time) and needs to lengthen the next cycle(s) to restore coordination. The shorten state requires a shortening of the next cycle(s).

A secondary unit that is in transition is also out of coordination and must shorten or lengthen one or more of its cycles to restore coordination. The secondary unit accomplishes these changes as gradually and smoothly as possible, without taking more than three cycles to restore coordination. All transitions are evaluated once each cycle and appropriate action is taken. The first two transition cycles are limited to relatively small changes in cycle length. The third transition cycle is allowed larger changes, so that transition always ends by the third cycle.

The transition logic is able to change from shortening to lengthening (or from lengthening to shortening) if required. If a larger amount of shortening is required, it is better for traffic flow to lengthen over several cycles than to omit a large portion of a cycle to catch up. This allows a greater percentage of the total time to be devoted to arterial green phase, while still bringing the secondary into coordination promptly. An effect of lengthening may be to eliminate a queue entry and, in effect, drop a platoon. The transition logic also takes into account the history of the timer at the intersection in order to minimize traffic perturbations. If the timer went into arterial green phase early, or if there is a long phase on the last cross street (which may be omitted using the phase omit command), then larger shortens are possible.

QUEUE RECOVERY

Even though no errors occur in the maintenance of the queue, the queue may occasionally get out of phase with the platoons on the roadway. This can occur with a large speed change, which may cause platoons to appear or disappear, as the speed of traffic is changed retroactively by the speed change commands. Transitions may also add or delete platoons, as seen in the example above, where a cycle (and the corresponding platoon) was omitted.

These anomolies of queue operation, queue errors, are manifested by an error in the calculated time of platoon entry into the roadway, as compared to the time shown in the queue entry. The queue errors are handled in the queue recovery process. The secondary unit begins with the most recent telemetry message, assumed to be valid, and works backwards in time until it finds an entry near the correct time. This entry is then used as the next entry. If no usable entry can be found, the secondary unit enters a startup mode, which gives it another clean start and removes the data anomaly that caused the error.

TIMING

There are four types of routines in the system.

a. The routines that handle the telemetry run very frequently and are, for all practical purposes, running continuously.

b. The display and telemetry message handling routines are run at 100 msec intervals.

c. The majority of the routines are run at one second intervals. All routines that count out cycle and phase durations are run once per second and thus operate on integral time intervals.

d. Queue and transition routines act only once per cycle. Once the associated values have been calculated, they remain constant for the duration of the cycle.

DUAL COUNTER CONCEPT

The reliability of the secondary unit operational characteristics results largely from the dual counter concept. This is the program structure that maintains the Master Clock and a Secondary Clock which is a reconstructed image of the Master Clock. The Master Clock is necessary to allow the secondary unit to maintain system coordination. The Secondary Clock is a counter which allows the secondary to operate properly despite a momentary telemetry disturbance. The secondary uses its internal Master Clock to keep track of what the master unit is probably doing. The Master Clock in the secondary unit acts like a flywheel that keeps the secondary unit running even if telemetry fails. Causes of telemetry failure include any failure that causes the master unit to stop transmitting messages, message checksum errors, sync line not changing state twice per cycle, clock line not changing state, or disconnected telemetry line.

When telemetry fails, the secondary uses its Master Clock to drive the modules that place messages in the queue. The speed, direction and cycle length used are identical to the last message received correctly, but the time of platoon entry is calculated for each successive cycle.

DIRECTION CHANGE PROCESSING

When the master unit transmits a message that calls for a direction change, the message is stored by the secondary unit, but probably not executed immediately. If the change is from a DIRECTIONAL mode (either inbound or outbound) to AVERAGE, the directional messages already in the queue represent directional platoons that will be protected as they travel down the roadway. Only the platoons that follow them will be associated with the average direction. After all directional platoons have been serviced, the execution of average cycles will begin. When an average cycle is to be executed, the most recent average cycle is taken from the queue. Immediately after an executed direction change to average there may be several average messages in the queue. The older ones are discarded and only the most recent one is used since its information content supercedes all others. Thus all secondary units execute the same average message at nearly the same time; these messages do not ripple down the artery as the directional ones do.

If the change is from average to a directional mode, there is only one message available (the directional one)

but the offset may be larger than one cycle length and therefore the queue contains messages for more than one platoon. The secondary unit handles this by creating entries in the queue for enough "phantom" platoons to cover the required offset. While the corresponding vehicles did not enter the roadway as a directional platoon, they will be serviced as if they did and their time of artery entrance is calculated and placed in the queue entry.

The secondary unit thus creates a backlog of directional quene entries to be executed when these are needed to cover a large offset change associated with the direction change. This procedure minimizes the need for large transition states associated with these direction changes.

The key programs utilized by the secondary units are discussed below and annotated program listings are given in the appendix.

OVERALL BLOCK DIAGRAM OF SECONDARY UNIT

Figure 14:
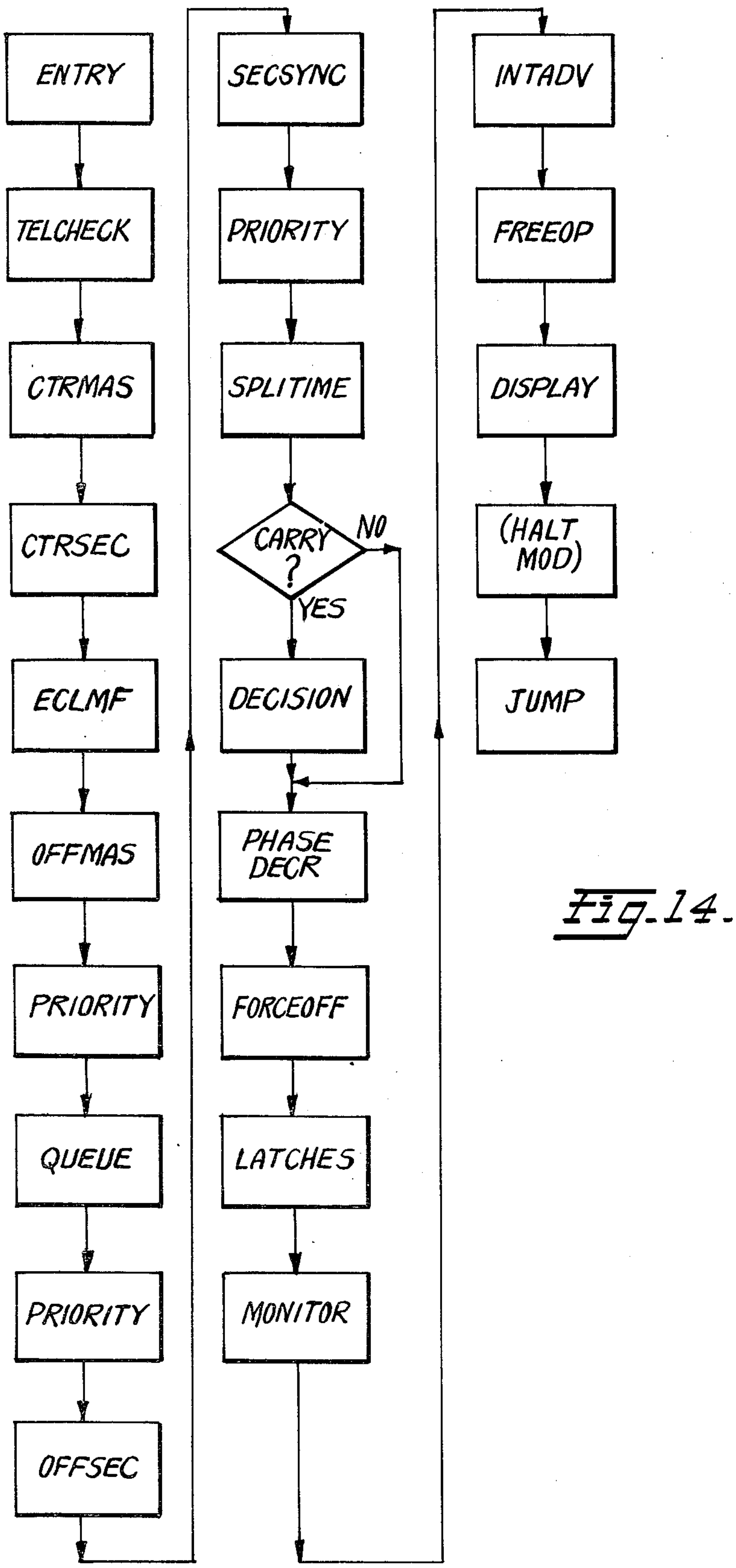
FIG. 14 is a flow chart of the main driver routine for the operation of the secondary unit in accordance with the invention.

An overall block diagram of the software controlling the operation of a secondary unit 40 is shown by the main driver routine TRFCTL illustrated in FIG. 14. A brief description of the main routines is set forth hereinbelow.

STARTUP—Calls PHTMSET to set the phase times for the standby cycle length. The routine jumps to the DRIVER routines starting at PRIORITY, and does not return to STARTUP unless RST 0 is executed (irrecoverable queue error or end of free-operation) or power on sequence occurs.

PHTMSET—Calls TWS for each of the three cross street phases. Calls SPLITSUM to calculate the length of main street green.

DRIVER—Loops on a call to PRIORITY until carry is set, indicating 100 millisecond mark, then jumps to TRFCTL if 1 second mark is set. If not, calls DISPLAY and returns to the loop above. TRFCTL jumps back to the DRIVER when it is finished.

PRIORITY—Handles telemetry. Calls SYNC to maintain exact synchronization between master and secondary. Reads telemetry lines and calls NIBVER to verify that the nibble is new and valid. NIBVER then calls MESSCOMP to compose the message. The message is stored by TRANSEFF and placed in final location by TRANSMOD.

TRFCTL (Traffic Controller)—The main line routine, executed once per second, that calls the primary system modules. Portions of this routine are executed only once per cycle, under control of SPLITIME.

TELCHECK—Watches for telemetry failure and sets TELFAIL if it occurs. Uses TELRESET to reset TALFAIL at the start of sync.

CTRMAS—Handles all master counters and synthesizes data during telemetry failure. After 30 minutes of telemetry failure, creates the standby mode, using PHTMSET.

CTRSEC—Handles all secondary counters. Sets ADVREQ when new cycle has started and new queue entry is available.

OFFMAS—Calculates offset on the basis of telemetered data just received from the master. Calls TWS (and FORMATCP) to read and format the offset thumbwheel switches. Calls LMITCHK to check and limit cycle length size.

QUEUE—Maintains the queue by adding and deleting entries. Calls AVDIR if synthetic platoons must be created. If an old message is removed from the queue, moves it to execution area by calling MOVEQ and sets offset error by calling SECSYNC.

OFFSEC—Calculates offset on the basis of data just removed from the queue for execution. Uses OFFMAS to do the arithmetic.

SECSYNC—If ADVREQ is set (at the start of message execution) calculates the offset error and green times. Calls LDECLP to copy ECLP from present queue entry and CKRANG to calculate the offset error.

SPLITIME—Detects the end of a cycle and initializes the new cycle.

DECISION—Calculates the exact remaining cycle length at the start of message execution. Calls PHTMSET to set the required phase times. Calls MODO to set PHDR and LDECLP to copy ECLP from the present queue entry. Calls TRANSITION if an offset error exists.

PHASE DECR—Decrements PHDR and goes to the next phase when it reaches zero.

FORCEOFF—Issues force-off command when secondary steps ahead of the street. Calls LAMPFORM to decode phase status.

LATCHES—Sets front panel indicators. Calls LAMPFORM to decode status and direction.

MONITOR—Calculates values from operator's monitor display.

INTADV—Performs the interval advance function if the associated timer sticks.

FREEOP—Puts the timer into free operation if that input goes true but not in a test mode. Does a RST 0 at the end of free operation to produce a clean restart.

DISPLAY—Displays the selected value. Performs tests if requested.

TRANSITION—Handles offset error by shortening or lengthening cycle length, or by adjusting queue. QRECOV is called to lower offset error to below cycle length. Calls SHORTEN or LENGTHEN as required. May call SNCHG to change the sign of the offset error. If QRECOV does not work, attempts to recover valid status using just the most recent queue entry. Calls AVIDR if directed, then calls MOVEQ, OFFSEC and SECSYNC.

QRECOV—Works backwards from most recent queue entry to find one with a low offset error. When it finds one, it updates the queue pointers.

SHORTEN—Calls MODO to calculate PM. If offset error is positive, calls SNCHG. Calls LENGTHEN if it is unable to handle the offset error by shortening.

LENGTHEN—If transition counter is equal to 2, calls CKRANG and STORE to set the offset error to the original sign for test of negative offset error on last transition cycle (special case—dwell in green full cycle). Calls MODO to calculate PM. If offset error is negative, call SNCHG.

A more detailed description of the subroutines governing the secondary unit operations are set forth hereinbelow.

LATCHES

This routine turns phase and direction indicators off. It obtains split information from PHSTAT and turns on the corresponding indicator (1 to 8 on the Split-1 and Split-2 modules). Direction is obtained from PRESQ+3 and a corresponding indicator is energized on the Direction module. LATCHES is a one second routine, and it calls LAMPFORM to decode an integer to a bit.

LAMPFORM

This routine decodes an integer to a single 0 bit and sets all other bits to 1.

Input: Accumulator
Output: Accumulator
Accumulator must not be 0 on entry.

| Examples: In | Out |
|---|---|
| 1 | 1 1 1 1 1 1 1 0 |
| 2 | 1 1 1 1 1 1 0 1 |
| 3 | 1 1 1 1 1 0 1 1 |
| 4 | 1 1 1 1 0 1 1 1 |

FORMATCP (Format, Complement, Pack)

The FORMATCP routine packs data read from three thumbwheel switches into two bytes.

Input: $\overline{LSD}$ in E Register
$\overline{ISD}$ in D Register
$\overline{MSD}$ in B Register
Output: $\phi$, MSD in D
ISD, LSD in E
Example: TWS setting=1 2 3; X=undefined nibble
In: E=XC
D=XD
B=XE
Out: E=23
D=01

LDECLP (Load ECLP)

This routine is called by DECISION and TRANSITION. It gets the cycle length from PRESENT queue entry and stores it in ECLP (Effective Cycle Length).

DECISION

This routine is called by TRFCTL (Traffic Controller) when ADVREQ (Advance Request) is set (once per cycle). It calls LDECLP to get cycle length from PRESENT queue entry, and stores it in ECLP (without flag nibble). It then calculates TRP (Time Remaining-Present)=ECLP−ACTP (Accumulating Cycle Time-Present) and calls PHTMSET (Phase Time Set). If DIFF is not zero and not in standby, it calls TRNSTN. If TRNSTN returns carry clear, the routine exits. If TRNSTN returns carry or if TRNSTN is not called, the routine calls MODO (PM=GRTR) and then moves PM (Phase M) to PHDR (Phase Decrement) with the result:

PHDR=GRTR=ECLP−ECLB(I)−ACTP, where ECLB is the Effective Cycle Length-Base, that is, the maximum side street time as set on the TWSs of the master unit. The index (I) is used to differentiate between Split 1 and 2.

TRANSMOD

This routine stores telemetry data as follows:

ECLB: Set by the first C message after start of sync and not changed for the duration of the cycle, D7=split, D6=status of strobe (origin of information), D5-D4=direction, ECLT: Set by the D message, D1-D3=direction Not used in any other routine, ECLB1: Last C message for split 1, ECLB2: Last C message for split 2. SPD WRP DIR Set by D message, takes effect next cycle. SPD WRP %AVG Set by D message, takes effect next cycle.

LIMITCHK

This routine checks a four digit value to ensure it is between 30 and 299. If it is outside this range, it is set to 30.

Input: Address of value in H, L Registers
Output: Value unchanged or set to 30

This routine is called from only one place in OFFSEC and may be placed on line or deleted.

NUMPHASE (Phase Number)

This routine is called by PHTMSET to count the number of phases and place the maximum phase number in MAXP.

SPLITIME

This routine is called by TRFCTL each second. It decides if the "10 second" routine should be called by testing ADVREQ. If so carry is set on return.

If ACTP>400 or TRP=0 then set parameters to start new cycle as follows:

ACTP=0
TRP=299
PHRD=299
Phase Omit=Reset
Phase Status=0

The "10 second" routine is called once each cycle (by DECISION) at a time period nominally 10 seconds into a cycle. Typically, the program waits 10 seconds before testing queue to see if valid information is contained therein.

PHDR (Phase Decrement)

This routine is called by TRFCTL and decrements the phase decrementing counter (PHDR). If the counter reaches zero, the phase status is incremented, and the new phase duration is placed in PHDR. A phase omit on the last phase or incrementing past the last phase will set phase status to zero.

PHTMSET, TWS, SPLITSUM, PERSEC

PHTMSET is the main routine and calls TWS for each of the three cross street phases. SPLITSUM calculates the length remaining for main street green, P0, as follows:

PO=ECLP−(P1+P2+P3)

and NUMPHASE sets MAXP to the maximum phase number.

TWS uses FORMATCP to do the conversion after the switches have been read.

TRANSITION

This routine is called by DECISION for a nonzero DIFF. DIFCOM (see CKRANG routine) is lowered to less than 2 (ECLP) using QRECOV, followed by AV/DIR if needed. Offsets, DIFF, DIFCOM and ECLP are updated if required. If DIFCO is large, a search is made of other queue entries to find a more appropriate platoon. If after the search, no queue entry can be found which reduces DIFCOM to less than 2 (ECLP), then a fault condition is assumed and the system restarts (sets RST 0, and executes next instruction from location 0).

LENGTHEN

This routine lengthens a cycle by up to 30 percent of ECLP and increments the transition counter (TRANCTR). The transition counter counts the number of cycles during a transition. The program limits this number to a maximum value of three. If the difference is negative on entry, it is changed to positive using SNCHG before proceeding. The lengthening is accomplished by adding the desired value to TRP and PM, then storing in PHDR.

If TRANCTR is already 2 on entry, and even though shortening would be preferable, the secondary must dwell in phase zero for the full cycle. This is accomplished by setting:

TRP−ECLP−DIFCOM−ACTP

PHDR is set to TRP+1; it will be decremented immediately after exit.

MOD0

This routine used by SHORTEN and LENGTHEN to calculate phi-sub-m (PM). PM is set to green time remaining (GRTR) plus 1 since PHDR has not yet been decremented for this cycle.

SECSYNC

The secondary resync (SECSYNC) routine is called by TRFCTL and others and acts ony if ADVREQ is set. It calls CKRANG to determine the difference (DIFF) for the PRESENT queue entry, after QUEUE has advanced the queue. The values

SG=ECLP−ECLB (I)

GRTR=SG−ACTP are calculated, where SG is System Green and GRTR is Green Time Remaining.

CKRANG

This routine is called by TRANSITION or SECSYNC and determines the difference (DIFF) between the PRESENT queue entry and the predicted running time counter. On input H,L is the queue running time counter address pointer. On output D,E is difference complete (DIFCOM), the 4-nibble BCD unsigned difference. DIFF is signed BCD (−79 to +79) and is in L. H is a flag, 0-6 as follows:

2. DIFF is the smallest positive value available, and if no positive value,

3. CQP2 is used. The routine uses MOVEQ to update the present queue image (PRESQ).

STORE

Routine sets:

DIFF=L

DIFCOM=D, E

Called by QRECOV.

AV/DIR (Average to Directional)

This routine builds a phantom queue. It is called once whenever the mode changes to either direction. The change is made at all secondary stations in the same cycle, and involves lengthening a cycle from zero to NEWCY seconds. The phantom queue is built by transforming the latest validated telemetry message to a set of queue entries, one entry for each synthetic (phantom) platoon required to fill the arterial from the master sync point (entrance) up to the location of the secondary unit. The entries are created starting with the most recent entry and working backwards in time for N entries, where N is calculated by OFFMAS. The running time count in each entry in one cycle length less than for the following entry.

NEWDIR: The new direction

NEWCY: The new cycle length, converted to seconds if %AVG

OFFSET: The distance from the master sync point in seconds, at a speed change of 1.00, read from TWS TIME: Working running time register used in calculations POINTER: Pointer to cycle queue entries N: Number of cycle queue entries to fill.

QUEUE

This routine is called by TRFCTL and maintains the queue. When ACTM (Master Counter)=0 the Running Time Counter is stored in the queue. At ENDSYNC=1, the cycle length and flags are stored in the queue, and the new queue entry is created. When ADVREQ=1 the next queue entry is made the PRESENT one, and the entry is moved to PRESQ. A change to directional causes AV/DIR to be called. A queue full of averages causes the queue to be truncated to one entry.

| R | 2 | 1 | 0 | 4 | 5 | 6 |
|---|---|---|---|---|---|---|
| Difference | −79 | −78 −11 | −10 −1 | 0 10 | 11 78 | 79 |

DIFF=(Queue time+Offset)−(Running Time Clock−ACTP) If DIFF is negative, secondary is late (need to shorten cycle to correct).

If DIFF is positive, secondary is early.

QRECOV (Queue Recovery)

Routine is called by TRANSITION if the queue pointers get out of step. This happens when the program is unable to shorten and lengthens instead, resulting in an extra entry in the queue. The routine starts with the most recent queue entry (CQP2—queue pointer #2) and works backwards until:

1. DIFF is between −10 and −1 (slightly late), and if not, until,

SHORTEN

This routine shortens cycle being executed if at least 75 percent of the time required to be shortened is available, and the transition counter is zero on entry. Otherwise all the time required to shorten must be available or the LENGTHEN routine is called.

In particular, the routine first attempts to accomplish the shortening using slack time, ST. If this cannot handle all of the shortening required, it tries using slack time, early green time, and excess green time (over 50 percent of cycle length). If this is not enough to reach the time required, the duration of the last phase (for three and four phase systems) is added. If this sum does not cover at least 75 percent of time required, the LENGTHEN routine is called.

The equation ST=PO-SG-CLEAR is derived as follows:

ST=ECLB-CROSS STREETS-CLEAR

SG=ECLP-ECLB so ECLB=ECLP-SG

PO=ECPL−CROSS STREETS so CROSS STREETS=ECLP−PO therefore:

ST−(ECLP-SG)−(ECLP-PO)−CLEAR

ST=PO−SG−CLEAR where, CROSS STREETS=time used by secondary for side street time, SG=System Green, CLEAR=yellow and red time, and ECLB=time allowed by master for cross street time (TWS setting on master). OFFSEC, OFFMAS The principal routine of OFFMAS and it is called directly or by OFFSEC. OFFMAS acts on incoming (master) telemetry data and OFFSEC acts on data reaching the secondary through the queue. The direction associated with average is outbound.

The following values are calculated.

| OFFMAS | OFFSEC | |
|---|---|---|
| OFFDIR | OFFDR | directional offset - read from the corresponding thumbwheel switch and/ corrected for speed change value. |
| OFFAVS | OFFAV | average offset - calculated based on net offset. If 25% ≦net offset≦75% cycle length then average offset = 50% cycle length. Else average offset = 0. Calculated only in average mode. |
| N | N | N - number of whole cycle lengths in directional offset |
| OFFN | OFFN | net offset = directional offset - N × cycle length. This is the remainder when N is calculated. |

CTRMAS

The Master Counter Update (CTRMAS) routine is a one second routine and is called by TRFCTL and handles all operations that relate to telemetry messages coming from the master. The Running Time Clock and ACTM are incremented and TRM (Time Remaining—Master) is decremented. The variables SYNCFLTR and TELFAIL are used as an input to maintain synchronization with the master and determine sync duration. When sync ends, SYNCDUR (Sync Duration), ECLM (Effective Cycle Length—Master), ECLMF (ECLM-Flag), and TRM are calculated and the flag ENDSYNC is set.

CTRSEC

This routine is called by TRFCTL. It clears ADVREQ and increments ACTP. If ACTP=1, CYCDONE is cleared. If CYCDONE=0, the queue is checked and if a NEXT entry is available, CYCDONE and ADVREQ are set. TRP is decremented.

FREEOP

This routine outputs the free-op bit to the controller from images in RAM. If the free operation bit is a logical true for two consecutive seconds and unit test is false, the secondary goes into free operation and all outputs to the controller are set false.

MONITOR

This routine sets up 0900 thru 09DB as required for operator displays. Cycle length is calculated as the sum of ACTP and TRP. If this value is 299, the previous cycle length is used. The minus sign is used to show standby mode in all positions except 4 (offset error), which is a signed value and keeps its inherent sign.

The values calculated are displayed by DISPLAY/TEST, depending on the setting of the single TWS.

SCREEN

This routine checks the input traffic light drivers and the phase TWS and sets a carry if a timer phase should be "on" but is not. The ring to be evaluated is stored in D (0=ring 1, 1=ring 2). First, controller inputs are examined and if any are "on", return is made with carry clear. The street phase is calculated by STREETPH, and then SCREEN looks for existence of a corresponding phase in the ring in question. If one exists return is made with carry clear.

INPUTS: D; ring to be screened

OUTPUTS: Carry set if in a clearance Carry clear if green or absent phase

STREETPH

This routine determines what phase the street is actually in by looking at the associated timer inputs for both rings. These are or'ed together and the resultant phase is found by table lookup. The table is as follows:

| HEX. EQUIV. TO STREETS | OR'ed LIGHT SIGNALS 4 | 3 | 2 | 1 | TABLE VALUE |
|---|---|---|---|---|---|
| 0 | | | | | 0 |
| 1 | 0 | 0 | 0 | 1 | 1 |
| 2 | 0 | 0 | 1 | 0 | 2 |
| 3 | 0 | 0 | 1 | 1 | 1 |
| 4 | 0 | 1 | 0 | 0 | 3 |
| 5 | | | | | 0 |
| 6 | 0 | 1 | 1 | 0 | 2 |
| 7 | | | | | 0 |
| 8 | 1 | 0 | 0 | 0 | 4 |
| 9 | 1 | 0 | 0 | 1 | 4 |
| A | | | | | 0 |
| B | | | | | 0 |
| C | 1 | 1 | 0 | 0 | 3 |
| D | | | | | 0 |
| E | | | | | 0 |
| F | | | | | 0 |

If the table value is 0, the phase cannot be determined (system is in clearance) and return is made with carry set. A nonzero table value (and corresponding ring 2 value which is 4 higher) is compared with the TWS settings to determine which secondary phase corresponds. If none (due to error in TWS settings), return is made with carry set. (If setting is A, Ring 1 is Phase 1, Ring 2 is Phase 5, etc.)

GETPHASE

Routine calculates street phases for both rings by reading and decoding the twelve position switches providing settings of 1-8 and A-D. The accumulator is preserved. A zero is returned for a phase not selected.

| | |
|---|---|
| INPUTS: | H, L TWS address<br>D ring, 0 = Ring 1, 1 = Ring 2 |
| OUTPUTS: | If D = 0 = B = Ring 1<br>C = Ring 2<br>If D = 1 - B = Ring 2<br>C = Ring 1 |

Example 1: TWS reads A, register D=1, On return B=5 and C=1. This is because the letter A corresponds to street phases 1 and 5 for Ring 1 and 2, respectively.

Example 2: TWS reads 7, register D=0. On return B=0 and C=7.

The foregoing description and disclosure of the invention including the following appendix is illustrative and explanatory thereof, and various modifications and improvements may be made by those skilled in the art within the scope of the appended claims without departing from the spirit of the invention.

```
              * INIT  INITIALIZATION FOR MASTER
              *
ØØØØ                  ORG   X'1ØØØ'
1ØØØ 21ØØØ8           LXI   H,RAMST     CLEAR RAM
1ØØ3 AF       CLRIT   XRA   A
1ØØ4 77               MOV   M,A         CLEAR A BYTE
1ØØ5 23               INX   H
1ØØ6 7C               MOV   A,H         FETCH MSD ADDR
1ØØ7 FEØA             CPI   RAMEND      SEE IF OVER TOP
1ØØ9 C2Ø31Ø           JNZ   CLRIT       LOOP UNTIL DONE
              *
1ØØC 315ØØ8           LXI   SP,SPSET    SET STACK
              *
              *  INITIALIZE TELEMETRY PARAMETERS
1ØØF 3EØ1     INIT    MVI   A,1
1Ø11 32C1Ø8           STA   BITIME      SET 3ØØMS TIMER=1
1Ø14 3EØF             MVI   A,15
1Ø16 32C2Ø8           STA   NIBCTR      NIBCTR=15(BINARY)
1Ø19 ØØ               DC    Ø,Ø,Ø
1Ø1A ØØ
1Ø1B ØØ
1Ø1C 32EDØ8           STA   OUTCOB
1Ø1F 32EBØ8           STA   OUTCOE
              *
              *  INITIALIZE ECLT AND SPEED WARP
1Ø22 3E41             MVI   A,X'41'
1Ø24 328EØ9           STA   ECLT        ECLT=41
1Ø27 21ØØØ1           LXI   H,X'Ø1ØØ'
1Ø2A 225EØ9           SHLD  SPDWARP     SPDWARP=1ØØ%
              *
              *SYSTAT GREENTIME,GAP INHIBIT,SYNC ON, PRE VOLSAV TIME
1Ø2D 3E37             MVI   A,X'87'     DØ,D1,D2,D7 ON
1Ø2F 329ØØ9           STA   SYSTAT      GREEN TIME & SYNC
1Ø32 3EØ2             MVI   A,2
1Ø34 329CØ9           STA   DIRSTAT     OUTBOUND DIRECTION
1Ø37 329DØ9           STA   DIRNEW       "          "
              *
1Ø3A 2126ØØ           LXI   H,X'ØØ26'
1Ø3D 22ACØ9           SHLD  ECGNAV
1Ø4Ø CDF123           CALL  TWSERR      FRONT PANEL INPUT
1Ø43 CDF417           CALL  RAMP
1Ø46 CDF423           CALL  BASCYCNW    SPLIT INFO
              *  FALL THROUGH TO DRIVER
              * COMPOSE TELEMETRY MESSAGE
              *
1DFA C5       COMPOSE PUSH B
1DFB D5               PUSH  D
1DFC E5               PUSH  H
1DFD ØØ               NOP
1DFE AF               XRA   A
1DFF 32C2Ø8           STA   NIBCTR      CLEAR IT
1EØ2 ØØ               DC    Ø,Ø
1EØ3 ØØ
1EØ4 21DØØ8           LXI   H,MSGOUT
1EØ7 ØØ               NOP
              *
1EØ8 3A9ØØ9           LDA   SYSTAT
1EØB 17               RAL
1EØC D2521E           JNC   SYNCOFF
              *
              *             "C" TYPE MESSAGE
              *
```

```
              *  MESSAGE PREFIX AND DIRECTION(W0,W1)
1E0F 360C          MVI  M,X'0C'    PREFIX "C"
1E11 23            INX  H
1E12 00            DC   0,0,0
1E13 00
1E14 00
1E15 3A9D09        LDA  DIRNEW
1E18 FE08          CPI  8
1E1A CA201E        JZ   W1WR
1E1D 87            ADD  A
1E1E E606          ANI  6
1E20 3C      W1WR  INR  A
1E21 77            MOV  M,A
1E22 00            DC   0,0,0
1E23 00
1E24 00
              *
1E25 23            INX  H
1E26 119809        LXI  D,BASECYC
1E29 1A            LDAX D
1E2A 77            MOV  M,A
1E2B 00            DC   0,0
1E2C 00
1E2D 23            INX  H
1E2E 07            RLC
1E2F 07            RLC
1E30 07            RLC
1E31 07            RLC
1E32 77            MOV  M,A
1E33 00            DC   0,0
1E34 00
              *
1E35 23            INX  H
1E36 13            INX  D
1E37 00            DC   0,0
1E38 00
1E39 EB            XCHG
1E3A 3A9E09        LDA  SPLIT
1E3D 87            ADD  A
1E3E 87            ADD  A
1E3F E604          ANI  4
1E41 B6            ORA  M
1E42 12            STAX D
              *
1E43 00            DC   0,0,0
1E44 00
1E45 00
1E46 210000        LXI  H,0
1E49 22D508        SHLD MSGOUT+5
1E4C C39B1E        JMP  W7PROC
              *
              *    "D" TYPE MESSAGES"
              *
1E4F 00            DC   0,0,0
1E50 00
1E51 00
1E52 360D    SYNCOFF MVI M,X'0D'
1E54 23            INX  H
1E55 00            DC   0,0,0
1E56 00
1E57 00
1E58 3A9D09        LDA  DIRNEW
1E5B FE08          CPI  8
1E5D CA651E        JZ   WRW1
1E60 87            ADD  A
1E61 E606          ANI  6
1E63 00            DC   0,0
1E64 00
1E65 77      WRW1  MOV  M,A
1E66 00            DC   0,0,0
1E67 00
1E68 00
              *
              *
```

```
1E69 23              INX  H
1E6A 118E09          LXI  D,ECLT
1E6D 1A              LDAX D
1E6E 77              MOV  M,A
1E6F 00              DC   0,0
1E70 00
1E71 23              INX  H
1E72 07              RLC
1E73 07              RLC
1E74 07              RLC
1E75 07              RLC
1E76 77              MOV  M,A
1E77 00              DC   0,0
1E78 00
             *
             *  CYCLE MSD & SPD WARP MSB(W4)
1E79 23              INX  H           MSD CYCLE
1E7A 13              INX  D           W4 ADDR
1E7B 00              DC   0,0
1E7C 00
1E7D EB              XCHG
1E7E 3A5F09          LDA  SPDWRP+1     FETCH SPD WP MSD
1E81 87              ADD  A
1E82 87              ADD  A
1E83 B6              ORA  M           OR IN ECL MSD
1E84 00              NOP
1E85 00              NOP
1E86 12              STAX D           WRITE W4
1E87 00              NOP
             *
             *  SPEED WARP LSD/ISD(W5,W6)
1E88 00              DC   0,0,0
1E89 00
1E8A 00
1E8B 13              INX  D           W5 ADDR
1E8C 3A5E09          LDA  SPDWRP       FETCH TENS/UNITS
1E8F 12              STAX D           WRITE W5
1E90 07              RLC
1E91 07              RLC              ROTATE TENS INTO
1E92 07              RLC                D3-D0.
1E93 07              RLC
1E94 13              INX  D
1E95 12              STAX D           WRITE W6
             *
             *  CHECKSUM (W7)
1E96 00              DC   0,0,0,0,0
1E97 00
1E98 00
1E99 00
1E9A 00
1E9B 21D008  W7PROC LXI  H,MSGOUT     ADDR OF MSG AREA
1E9E 0600            MVI  B,0         CLR CHECKSUM REG.
1EA0 110407          LXI  D,X'0704'   7 BYTES,4 BITS PER
1EA3 00              NOP
1EA4 00              NOP
1EA5 00              NOP
1EA6 CDB71E          CALL CHKSUM      CALL CHECKSUM RTN.
1EA9 00              NOP
1EAA 3E07            MVI  A,7         MASK
1EAC A0              ANA  B           ISOLATE D2-D0
1EAD 32D708          STA  MSGOUT+7
             *
1EB0 00              DC   0,0,0
1EB1 00
1EB2 00
1EB3 E1              POP  H
1EB4 D1              POP  D
1EB5 C1              POP  B
1EB6 C9              RET              RETURN
             *       PREXMIT
             *
1ECC         PREXMIT EQU *
1ECC E5              PUSH H
1ECD C5              PUSH B
```

```
1ECE 00          NOP
1ECF 00          NOP
        *  CHECK TO SEE IF PRESENT NIBBLE
        * HAS BEEN TRANSMITTED FOR 300MS.
        * IF NOT, ADD SYNC TO NIBBLE AND
        * RETURN.
1ED0 21C108      LXI  H,BITIME   TIMER ADDR
1ED3 35          DCR  M          DECREMENT ADDR
1ED4 C20A1F      JNZ  SYNCIT     JMP IF NOT 0
1ED7 00          NOP
1ED8 00          NOP
1ED9 3603        MVI  M,3        REINITIALIZE COUNT
1EDB 00          NOP
        *  COUNT # OF NIBBLES XMITTED.  IF COUNT
        * IS 16, THEN ALL 8 BYTES OF MESSAGE
        * HAVE BEEN SENT AND NEXT MESSAGE MUST
        * BE COMPOSED.
1EDC 2C          INR  L          ADR OF NIBBLE CNT
1EDD 34          INR  M          INCREMENT COUNT
1EDE 00          NOP
1EDF 00          NOP
1EE0 3E10        MVI  A,16       DECIMAL 16.
1EE2 BE          CMP  M          COMPARE TO 16
1EE3 CCFA1D      CZ   COMPOSE
        *
        *  DEVELOP ADDRESS OF BYTE TO TRANSMIT
        * BY ADDING NIBBLE COUNT(SHIFTED RIGHT
        * 1 BIT) TO ADDRESS OF FIRST BYTE OF
        * MESSAGE.  SINCE COUNT IS SHIFTED
        * RIGHT(DIVIDED BY 2), AND LOW ORDER
        * BIT IS LOST, THE CALCULATED ADDRESS
        * INCREMENTS BY 1 FOR EVERY 2 INCREMENTS
        * OF NIBBLE COUNT.  FIRST THE D1-D0
        * OF BYTE ARE TRANSMITTED AND THEN
        * D3-D2.
1EE6 00          NOP
1EE7 00          NOP
1EE8 7E          MOV  A,M        FETCH COUNT
1EE9 4F          MOV  C,A        SAVE IT IN C
1EEA 1F          RAR             SHIFT RIGHT
1EEB C6D0        ADI  X'D0'      ADD LOW ADDR
1EED 6F          MOV  L,A        LOAD ADDR
        *
        *  IF NIBBLE COUNT IS ODD(D0=1), SHIFT
        * D4-D3 OF BYTE INTO D2-D1, AND XMIT
        * WITH D0(CLOCK) HIGH.  IF COUNT IS EVEN
        * (D0=0), SHIFT D1-D0 INTO D2-D1, AND
        * TRANSMIT NIBBLE WITH D0 LOW.
        *  NOTE THAT 2 NIBBLES MUST BE XMITTED
        * TO SEND THE 4 BITS OF INFORMATION
        * IN EACH BYTE OF TELEMETRY.
1EEE 00          NOP
1EEF 00          NOP
1EF0 46          MOV  B,M        FETCH BYTE
1EF1 79          MOV  A,C        FETCH NIBBLE CNT
1EF2 1F          RAR             TEST D0
1EF3 DA011F      JC   ODD        JMP IF D0=1
1EF6 00          NOP
1EF7 00          NOP
        * EVEN COUNT,  TRANSMIT LSD 2 BITS.
1EF8 78          MOV  A,B        LOAD BYTE TO XMIT
1EF9 17          RAL             D1-D0 TO D2-D1
1EFA E606        ANI  6          ISOLATE D2-D1
1EFC C3051F      JMP  STORE
        * ODD COUNT,  TRANSMIT MSD 2 BITS.
1EFF 00          NOP
1F00 00          NOP
1F01 78     ODD  MOV  A,B        LOAD BYTE
1F02 1F          RAR             D3-D2 TO D2-D1
1F03 F601        ORI  1          OR IN CLOCK BIT
1F05 21C308 STORE LXI H,TELNIB
1F08 2F          CMA             INVERSE FORM
1F09 77          MOV  M,A
```

```
               *  ADD SYNC(IF PRESENT) TO TELEMETRY.
1FØA 3A9ØØ9 SYNCIT LDA  SYSTAT     FETCH STATUS BYTE
1FØD 21C3Ø8        LXI  H,TELNIB
1F1Ø ØF            RRC
1F11 ØF            RRC             SHIFT D7(SYNC BIT)
1F12 ØF            RRC               INTO D3
1F13 ØF            RRC
1F14 2F            CMA
1F15 E6Ø8          ANI  8          ISOLATE D3
1F17 47            MOV  B,A        SAVE SYNC BIT IN B
1F18 7E            MOV  A,M        FETCH "TELNIB"
1F19 E6Ø7          ANI  7          STRIP OFF D3
1F1B BØ            ORA  B          OR IN SYNC
1F1C 77            MOV  M,A        WRITE IT BACK
1F1D C1            POP  B
1F1E E1            POP  H
1F1F C9            RET             RETURN
1F2Ø               ORG  X'1FEE'
1FEE C3D31D        JMP  TØSFL
1FF1 C3AE1C        JMP  CYCSTAT
1FF4 C3CC1E        JMP  PREXMIT
1FF7 C3ØØØØ        JMP  Ø
1FFA C3ØØ1C        JMP  DISSEL
1FFD ØØ            DC   Ø,Ø,Ø
1FFE ØØ
1FFF ØØ
2ØØØ               END  Ø
               *   R T C L K   REAL TIME CLOCK
               *
ØCØD           RLCLK  EQU  X'CØD'    RT LINE CLOCK
               *
1ØAA           RTCLK  EQU  *
               *  FETCH REAL TIME CLOCK AND VALIDATE
               *BY READING TWICE.
1ØAA 21ØDØC           LXI  H,RLCLK
1ØAD 46        VERIFY MOV  B,M       1ST READ
1ØAE 7E               MOV  A,M       2ND READ
1ØAF B8               CMP  B
1ØBØ C2AD1Ø           JNZ  VERIFY    TRY AGAIN IF FAIL
               *
1ØB3 216ØØ8           LXI  H,RLHLD
1ØB6 77               MOV  M,A       STORE CLOCK
               *
               *  CHECK FOR 33MS LAPSE
1ØB7 E6Ø6             ANI  6         ISOLATE D1-D2
1ØB9 23               INX  H         LAST 33MS VALUE
1ØBA BE               CMP  M
1ØBB CA1611           JZ   NOFLGS    EXIT IF SAME
1ØBE 77               MOV  M,A       SAVE NEW VALUE
1ØBF CD5C11           CALL UPDATE
               *  CHECK FOR 1ØØMS LAPSED
1ØC2 3A6ØØ8           LDA  RLHLD     FETCH PRES. CLK
1ØC5 E6Ø8             ANI  8         ISOLATE D3
1ØC7 23               INX  H         LAST 1ØØMS VALUE
1ØC8 BE               CMP  M
1ØC9 C2D21Ø           JNZ  QW
1ØCC CD5112           CALL PRCHSM    CHECKSUM ON PROMS
1ØCF C31611           JMP  NOFLGS    EXIT IF SAME
1ØD2 77        QW     MOV  M,A       SAVE NEW VALUE
1ØD3 E5               PUSH H
               *
               *. CALL 1ØØ MS ROUTINES
1ØD4 CDF41F           CALL PREXMIT TELEMETRY SETUP
1ØD7 CDEE1F           CALL TWSFL   LED FLASHER LOGIC
1ØDA CDFA1F           CALL DISSEL  DISPLAY SELECT
1ØDD CDE817           CALL GAPOUT
1ØEØ CDDC11           CALL WROUT   LED IMAGES OUTPUT
1ØE3 E1               POP  H
               *
               *  INCREMENT 1ØØMS CTR AND TEST FOR
               *ONE SECOND MARK
1ØE4 23               INX  H         ADDR OF 1ØØMS CTR
1ØE5 34               INR  M         INCREMENT
1ØE6 3EØ9             MVI  A,9
```

```
10E8 BE             CMP  M          COMPARE TO 9
10E9 D2FF10         JNC  CHK200     NOT ON SECOND
              *
              *  FALL THROUGH ON 1 SECOND MARK
10EC AF             XRA  A
10ED 77             MOV  M,A        RESET 100MS CTR
10EE 00             NOP
10EF 00             NOP
              *
              *  INCREMENT 30 SEC CTR
10F0 23             INX  H          30 SECOND CTR
10F1 7E             MOV  A,M
10F2 3C             INR  A          INCREMENT IT
10F3 27             DAA             BCD ADJUST
10F4 FE30           CPI  X'30'      SEE IF OVER TOP
10F6 DAFA10         JC   WRCTR      JMP IF NOT
10F9 AF             XRA  A          RESET TO 0
10FA 77       WRCTR MOV  M,A        WRITE BACK
10FB AF             XRA  A          SET ZERO FLAG
10FC C31411         JMP  RETCY
              *
              *  CHECK IF 200MS PAST A 1 SECOND MARK
10FF 0600     CHK200 MVI B,0        INITIALIZE FLAG
1101 3A6303         LDA  MS100      FETCH 100MS CTR
1104 FE02           CPI  2
1106 C21211         JNZ  CLRSGN     NOT ON 200MS MARK
              *
              *  CHECK IF 30.2 SEC MARK (SAME AS 0.2)
1109 3A6408         LDA  SEC30      FETCH 30 SEC CTR
110C B7             ORA  A
110D C21111         JNZ  SETSGN     NOT ON MARK
1110 04             INR  B          SET D0 FLAG BIT
              *
              *  RETURN WITH SIGN ON N.2 SEC MARKS.
              *ALSO SET D0 OF A ON IF 30.2(0.2) SEC.
1111 2F       SETSGN CMA            FORCE D7 HIGH
1112 B7       CLRSGN ORA  A         SET/CLR SIGN FLAG
1113 78             MOV  A,B        SET FLAG BIT
              *
1114 37       RETCY  STC            SET CARRY
1115 C9              RET
1116 3C       NOFLGS INR  A         CLEAR ZERO & SIGN
1117 C9              RET
              *      CTRMNTR  ONCE EVERY 30 SECONDS
              *
              * THIS IS USED TO TIME OUT CERTAIN LONG
              * TIME INTERVALS (WHOSE RESOLUTION IS
              * NOT CRITICAL). IT INCREMENTS CNTRS
              * WITH FLAG (D7) SET UNLESS ERROR FLAG
              * (D6) IS SET. FINAL VALUE IS ZERO.
              * THE MAJOR PORTION OF THE ROUTINE IS A
              * CALLED SUBROUTINE, AND ADDITIONAL
              * COUNTERS CAN BE SERVICED BY INSERTING
              * THE BYTE IN A AND CALL CTMNSUB (22DB).
              *
              *
              *        ** COUNTERS SERVICED **
              *
09A8          SPEEDTM EQU X'09A8'   SPEED WARP DWELL
09A9          AVCYCTM EQU X'09A9'   AVG CYC LGTH DWELL
09AA          INAVTM  EQU X'09AA'   AVG MODE DWELL
09AB          INTOAVTM EQU X'09AB'  DIR MODE DWELL
              *
1118 E5       CTRMNTR PUSH H
1119 21A809          LXI  H,SPEEDTM
111C CD3311          CALL CTMNSUB
111F 21A909          LXI  H,AVCYCTM
1122 CD3311          CALL CTMNSUB
1125 21AA09          LXI  H,INAVTM
1128 CD3311          CALL CTMNSUB
112B 21AB09          LXI  H,INTOAVTM
112E CD3311          CALL CTMNSUB
1131 E1              POP  H
1132 C9              RET
```

```
                *
1133 7E         CTMNSUB MOV  A,M
1134 17                 RAL
1135 DØ                 RNC     DO NOTHING IF D7=Ø
1136 1F                 RAR            RESTORE BYTE
1137 FE8Ø               CPI  X'8Ø'     A = 8Ø?
1139 CA4111             JZ   CLRTN     IF YES, JMP.
113C 35         AT22    DCR  M
113D 3E8Ø               MVI  A,X'8Ø'
113F BE                 CMP  M         A = 8Ø NOW?
114Ø CØ                 RNZ            IF NOT = 8Ø, RTN.
1141 36ØØ       CLRTN   MVI  M,Ø       CLR BYTE.
1143 C9                 RET
                *       UPDATE         33 MS
                *
                *       COUNTS PULSES ON VOLUME INPUTS.
                *       OCCUPANCY PERCENTAGE HIGH (OCCLK)
                *       SETS UP VOLHI,VOLLO,OCCHI,OCCLO.
                *       MAINTAINS RAW CAR COUNT (SENVOL)
                *       AND WEIGHTED (CARWT) FOR VOLUME
                *       INPUTS. DOES NOT CLEAR THESE .
                *
ØCØA            INVOL   EQU  X'ØCØA'   VOLUME  INPUTS
ØCØB            INOCC   EQU  X'ØCØB'   OCCUPANCY INPUTS
                *
1144 47         BMANIP  MOV  B,A       INPUT
1145 1A                 LDAX D     HI AND HI
1146 AØ                 ANA  B
1147 12                 STAX D
1148 13                 INX  D
1149 1A                 LDAX D     LO OR LO
114A BØ                 ORA  B
114B 12                 STAX D
                *
114C 7E                 MOV  A,M       FLASH
114D ØF                 RRC
114E ØF                 RRC
114F ØF                 RRC
115Ø ØF                 RRC
1151 F6FØ               ORI  X'FØ'
1153 4F                 MOV  C,A
                *
1154 BØ                 ORA  B
1155 2F                 CMA
1156 47                 MOV  B,A  NOT INPUT AND NOT FLASH
1157 7E                 MOV  A,M  OR FLASH AND OLD VALUE
1158 A1                 ANA  C
1159 BØ                 ORA  B
115A 77                 MOV  M,A   INTO DISPLAY BYTE
115B C9                 RET
                *
115C C5         UPDATE  PUSH B
115D D5                 PUSH D
115E E5                 PUSH H
115F 3AØAØC             LDA  INVOL     INPUTS
1162 115ØØ9             LXI  D,VOLHI   SENERR DATA
1165 21E3Ø8             LXI  H,DSPVOL  DISPLAY DATA
1168 CD4411             CALL BMANIP
116B 2141Ø9             LXI  H,VOLNIB
116E 7E                 MOV  A,M
116F A8                 XRA  B
117Ø AØ                 ANA  B
1171 F5                 PUSH PSW   INVOL AND (INVOL EOR OLD INVOL)
1172 7Ø                 MOV  M,B
1173 13                 INX  D
1174 3AØBØC             LDA  INOCC
1177 21E9Ø8             LXI  H,DSPOCC
117A CD4411             CALL BMANIP
117D F1                 POP  PSW   PLUS GOING INPUTS
117E 47                 MOV  B,A
                *
                *       FOR VOLUME LOOP THREE ADDRESSES
                *       ARE KEPT; SENSVOL (TOP OF STACK),
                *       CARWT (D), AND VOLEX (H).
                *       B CONTAINS INPUT ACTUATION BITS.
```

```
                *       C CONTAINS LOOP INDEX 4-3-2-1
                *
117F 3A9009             LDA  SYSTAT    SET UP PROPER
1182 1F                 RAR            LOOK AT D1
1183 1F                 RAR            EXTENSION TIMES
1184 217009             LXI  H,VOLEX
1187 D28B11             JNC  UPE2A
118A 23                 INX  H
118B E5         UPE2A   PUSH H         AND SAVE IT
                *
118C 0E04               MVI  C,4       SET UP FOR LOOP
118E 21B809             LXI  H,SENVOL  OVER FOUR SENSORS
1191 E3                 XTHL
1192 11B009             LXI  D,CARWT
                *
1195 78         E2      MOV  A,B       TOP OF LOOP
1196 1F                 RAR            DOES VOLUME BIT
1197 47                 MOV  B,A       HAVE A + GOING
1198 D2AB11             JNC  UPG2D     TRANSITION?
                *
119B E3                 XTHL
119C 34                 INR  M         YES, SO INCREMENT
119D E3                 XTHL           SENVOL
                *
119E 7E                 MOV  A,M       FETCH EXTENSION
                *
119F EB                 XCHG           ADD TIME WEIGHT
11A0 86                 ADD  M         TO WEIGHTED SUM.
11A1 27                 DAA            NOTE THAT SUM IS
11A2 77                 MOV  M,A       TWO BYTES BCD,
11A3 23                 INX  H         WEIGHT IS ONE BYTE
11A4 7E                 MOV  A,M
11A5 CE00               ACI  0
11A7 27                 DAA
11A8 77                 MOV  M,A
11A9 2B                 DCX  H
11AA EB                 XCHG
                *
11AB 3E03       UPG2D   MVI  A,3     SWITCH TO OUTBOUND?
11AD B9                 CMP  C
11AE C2B311             JNZ  UPG2
11B1 23                 INX  H         VOLEX
11B2 23                 INX  H
                *
11B3 E3         UPG2    XTHL           BOTTOM OF LOOP
11B4 23                 INX  H         SENVOL
11B5 E3                 XTHL
11B6 13                 INX  D         CARWT
11B7 13                 INX  D
11B8 0D                 DCR  C
11B9 C29511             JNZ  E2
                *
11BC 33                 INX  SP        FIX STACK PTR
11BD 33                 INX  SP
                *
11BE 216009             LXI  H,OCCLK   SET UP FOR LOOP
11C1 3A0B0C             LDA  INOCC     OVER OCCUPANCY
11C4 47                 MOV  B,A       SENSORS
11C5 0E04               MVI  C,4
                *
11C7 78         B4      MOV  A,B       TOP OF LOOP
11C8 1F                 RAR
11C9 47                 MOV  B,A       IF BIT HIGH,
11CA 7E                 MOV  A,M       INCREMENT CNTR
11CB CE00               ACI  0
11CD 77                 MOV  M,A
11CE 23                 INX  H
11CF 7E                 MOV  A,M
11D0 CE00               ACI  0
11D2 77                 MOV  M,A
                *
11D3 23                 INX  H         BOTTOM OF LOOP
11D4 0D                 DCR  C
11D5 C2C711             JNZ  B4
```

```
          *
11D8 E1             POP  H          FINISH
11D9 D1             POP  D
11DA C1             POP  B
11DB C9             RET
          *         WROUT  OUTPUTS IMAGES OF ASSORTED
          *                LEDS AND TELEMETRY ETC
          *
11DC 00   WROUT     NOP
11DD E5             PUSH H
11DE 3A6C08         LDA  IMAGOC     CHECK FOR SQUELCH
11E1 1F             RAR
11E2 D2FE11         JNC  WR4
          *
11E5 210A0C         LXI  H,X'0C0A' LOOP TO CLEAR
11E8 110800         LXI  D,8        PANEL LEDS & 7 SEG
11EB 010F0F         LXI  B,X'0F0F' ALL OFF, 15 LEDS
11EE 70             MOV  M,B
11EF 2B             DCX  H      0A,09,08,10,18,,,78
11F0 70             MOV  M,B
11F1 2B             DCX  H
11F2 70   WR1       MOV  M,B
11F3 19             DAD  D
11F4 0D             DCR  C
11F5 C2F211         JNZ  WR1
11F8 C33A12         JMP  WR9        NECESSARY OUTPUT
11FB 00             DC   0,0,0
11FC 00
11FD 00
11FE 3AE008 WR4     LDA  SSDOV
1201 320A0C         STA  X'0C0A'    OVERFLOW
1204 2AE108         LHLD SSDISD
1207 22080C         SHLD X'0C08'    7 SEGMENT
120A 3AE308         LDA  DSPVOL
120D 32500C         STA  X'0C50'    VOLUME DISPLAY
1210 3AE408         LDA  DSPIG
1213 32480C         STA  X'0C48'    INBOUND GREEN
1216 3AE508         LDA  DSPOG
1219 32580C         STA  X'0C58'    OUTBOUND GREEN
121C 3AE608         LDA  DSPSYS
121F 32600C         STA  X'0C60'    SYSTEM SPLIT
1222 3AE708         LDA  DSPIO
1225 32780C         STA  X'0C78'    SYSTEM DIRECTION
1228 3AE808         LDA  DSPCYC
122B 32100C         STA  X'0C10'    AVG CYCLE LENGTH
122E 3AE908         LDA  DSPOCC
1231 32280C         STA  X'0C28'    OCCUPANCY
1234 3AEA08         LDA  DSPSP
1237 32300C         STA  X'0C30'    SPEEDWARP
          *
123A 3AC308 WR9     LDA  TELNIB
123D 320D0C         STA  X'0C0D'    TELEMETRY
1240 3AEB08         LDA  OUTCOE
1243 320E0C         STA  X'0C0E'    LINE OUTPUTS
1246 3AED08         LDA  OUTCOB
1249 320B0C         STA  X'0C0B'
124C 00             DC   0,0,0
124D 00
124E 00
124F E1             POP  H
1250 C9             RET
          *         FROM CHECKSUM ROUTINE
          *
          *         EXECUTES 96% OF THE TIME
          *
1251 C9   PRCHSM    RET             DON'T EXECUTE ON
1252 00             DC   0,0
1253 00
1254 3A6308         LDA  MS100      SECOND MARK
1257 FE09           CPI  9
1259 C8             RZ
125A E5             PUSH H
125B D5             PUSH D
125C C5             PUSH B
```

```
             *
125D FE02           CPI   2         DON'T USE RAM OR
125F DA6412         JC    PR2       INPUT OUTPUT AREA
1262 C602           ADI   2
             *
1264 4F      PR2    MOV   C,A       OTHERWISE USE
1265 07             RLC             MS100 TO CREATE
1266 07             RLC             ADDRESS OF 4 PROMS
1267 67             MOV   H,A      FOR THS .1 SEC SLOT
1268 2E00           MVI   L,0
126A 45             MOV   B,L
126B AF             XRA   A
             *
126C AE      TOPA   XRA   M         12 CLOCK CYCLES
126D 23             INX   H         + 2 FETCH DELAYS
126E AE             XRA   M         + 20% OVERHEAD
126F 23             INX   H         PER LOCATION .
1270 AE             XRA   M
1271 23             INX   H          ESTIMATE 20 MS/K
1272 AE             XRA   M
1273 23             INX   H
1274 05             DCR   B
1275 C26C12         JNZ   TOPA
             *
1278 FEFF           CPI   255       ODD PARITY
127A CA8912         JZ    CXRET
             *
127D 2B             DCX   H         FOR VISIBILITY
127E 77             MOV   M,A
             *
127F 47             MOV   B,A       STORE RESULT IN
1280 2609           MVI   H,9       X'09F?' WHERE ?
1282 79             MOV   A,C       IS BITS D5-D2 OF
1283 C6F0           ADI   X'F0'     THE HIGH ORDER
1285 6F             MOV   L,A      BYTE OF THE ADDRESS
1286 32EF03         STA   IMPROP    LEAVE FLAG
1289 C1      CXRET  POP   B
128A D1             POP   D
128B E1             POP   H
128C C9             RET
             *      MONITOR INTERFACE
             *
128D F5      WINDOW PUSH PSW        SEE DRIVER PGM
128E 3A0160         LDA   X'6001'   ADDRSS
1291 17             RAL
1292 D2A512         JNC   NYET
1295 17             RAL
1296 2A0060         LHLD X'6000'
1299 D2A112         JNC   INPUT
129C 5C             MOV   E,H       9C0+X
129D 1609           MVI   D,9
129F EB             XCHG
12A0 73             MOV   M,E
12A1 7E      INPUT  MOV   A,M       FETCH BYTE
12A2 320260         STA   X'6002'   YES,WRITE BYTE OUT
12A5 F1      NYET   POP   PSW
12A6 C9             RET
12A7                END   0
             *      REDTIME DURING DIR OR AVG CYCLES
             *
0000                ORG  X'2400'
2400         REDTIME EQU *
2400 E5             PUSH H
2401 D5             PUSH D
             *
2402 3A9D09         LDA   DIRNEW
2405 329C09         STA   DIRSTAT
2408 2AAC09         LHLD ECGNAV
240B 228609         SHLD ECLGN
             *
240E 110100         LXI   D,1
2411 218009         LXI   H,ACTGN
2414 CDEB07         CALL AIM
2417 2A8009         LHLD ACTGN
```

```
241A 7C                MOV  A,H        >=100 ?
241B A7                ANA  A
241C C22B24            JNZ  BASCHK
241F 00                NOP

2420 7D                MOV  A,L        NO;
2421 FE02              CPI  2
2423 CA4024            JZ   EXITU      AND EXIT

2426 FE03       CHK3   CPI  3
2428 CCF723            CZ   RAMP       IF ACTGN=3

242B 118009     BASCHK LXI  D,ACTGN
242E 21AE09            LXI  H,BASOLD
2431 CD0003            CALL COMPAR
2434 DA4024            JC   EXITU  EXIT IF ACTGN<BASOLD
                *
                *END OF RED, CLEAR  ACTGN
2437 210000            LXI  H,0
243A 228009            SHLD ACTGN
243D CD4324            CALL GRNIN
2440            EXITU  EQU  *
2440 D1                POP  D
2441 E1                POP  H
2442 C9                RET
                *      SUBROUTINE GRNIN
                *
                *      CALCULATE T[R], MAXGNLCP
                *      SET SYSTAT TO GREEN TIME
                *
2443            GRNIN  EQU  *
2443 E5                PUSH H
2444 D5                PUSH D
2445 C5                PUSH B

2446 3A9C09            LDA  DIRSTAT
2449 1F                RAR
244A 3A4209            LDA  BYPVOL
244D 11B009            LXI  D,CARWT
2450 214C09            LXI  H,LCPIN
2453 DA5D24            JC   GRA1
2456 11B409            LXI  D,CARWT+4
2459 23                INX  H   DEVELOP LCPOUT
245A 23                INX  H
245B 1F                RAR      DEVELOP OUTBOUND BYPASS
245C 1F                RAR
245D E5         GRA1   PUSH H   SAVE LCP[DIRECTION]
                *
245E 218209            LXI  H,TRED TEMP FOR CARWT
2461 CDF707            CALL MAXVAL2 FETCH CARWT
                *
2464 CDEE07            CALL GRBND  GREEN BOUND
2467 228209            SHLD TRED
                *
246A D1         GRA3   POP  D      FETCH LCP[DIRECTION]
                *
246B 218209            LXI  H,TRED    TRDLCP=TRED-LCP
246E CDC003            CALL SUBDEC
2471 2AB008            LHLD DIFF
                *
2474 3AB208            LDA  DIFF+2    ASSURE TRDLCP>=0
2477 B7                ORA  A
2478 C27E24            JNZ  GRA3A
247B 210000            LXI  H,0
247E 228409     GRA3A  SHLD TRDLCP
                *
2481 219009            LXI  H,SYSTAT  SYNC, GREEN EXT,
2484 3E87              MVI  A,X'87' GREEN TIME,GAP INHIB
2486 B6                ORA  M
2487 77                MOV  M,A
2488 C1                POP  B
```

```
2489 D1              POP  D
248A E1              POP  H
248B C9              RET
               *     GAPEND
               *
               *     CALCULATE ECLGN WHICH IS
               *     LENGTH OF GREEN TIME THIS CYCLE.
               *
               *     SET GAPPROC, OCCDET
               *
               *     CALL VOLSAV  WHICH TERMINATES
               *     ACCUMULATION OF A[G] THIS CYCLE
               *
248C E5        GAPEND PUSH H
248D D5              PUSH D
248E C5              PUSH B
248F 2A4C09          LHLD LCPIN      FETCH APPROPRIATE
2492 3A9C09          LDA  DIRSTAT    VALUE OF LCP
2495 1F              RAR
2496 DA9C24          JC   GEC3
2499 2A4E09          LHLD LCPOUT     GAPLCP=ACTGN+LCP-GAPSIZ (IF GAP)
249C 225408    GEC3  SHLD GAPLCP
249F 215408          LXI  H,GAPLCP
24A2 118009          LXI  D,ACTGN
24A5 CDFA07          CALL AIP
24A8 218108          LXI  H,TEMP1+1
24AB 3600            MVI  M,0
24AD 3A5B09          LDA GAPSIZ IN TENTHES OF A SECOND
24B0 2B              DCX  H
24B1 77              MOV  M,A
24B2 CDF407          CALL DSUSR      CHANGE TO SECONDS
24B5 228008          SHLD TEMP1
               *
24B8 3A9209          LDA  GAPFLG     IF NO FLAG,DON'T
24BB A7              ANA  A          SUBTRACT GAPSIZ
24BC CACE24          JZ   GE3A
24BF 215408          LXI  H,GAPLCP
24C2 118008          LXI  D,TEMP1
24C5 CDC003          CALL SUBDEC
24C8 2AB008          LHLD DIFF
24CB 225408          SHLD GAPLCP
               *
24CE 3A9C09    GE3A  LDA  DIRSTAT  FETCH MAXIMUM VALID
24D1 1F              RAR             CARWT IN THIS
24D2 3A4209          LDA  BYPVOL     DIRECTION
24D5 11B009          LXI  D,CARWT
24D8 DAE024          JC   GEA1
24DB 11B409          LXI  D,CARWT+4
24DE 1F              RAR
24DF 1F              RAR
24E0 219208    GEA1  LXI  H,TEMP2D
24E3 CDF707          CALL MAXVAL2
               *
24E6 115408          LXI  D,GAPLCP  GAPLCP>?<CARWT
24E9 CD0003          CALL COMPAR
24EC D2F024          JNC  GEC4
24EF EB              XCHG
24F0 D5        GEC4  PUSH D ADDR OF MAX(GAPLCP,CARWT)
               *
24F1 3A9C09          LDA  DIRSTAT  SELECT PAIR OF
24F4 1F              RAR           RUNAVG FOR CURRENT
24F5 118408          LXI  D,PROCIN DIRECTION AND INPUT
24F8 216809          LXI  H,RUNAVG FOR CONVRT.
24FB 3A4309          LDA  BYPOCC   ASSURE VALIDITY.
24FE DA0725          JC   GED5
2501 13              INX  D DEVELOP PROCOUT
2502 13              INX  D
2503 23              INX  H DEVELOP RUNAVG+2
2504 23              INX  H
2505 1F              RAR     DEVELOP BYPASS[OUTBOUND]
2506 1F              RAR
2507 CDF107    GED5  CALL MAXVAL1 FETCH MAXIMUM VALID
               *                  RUNAVG[DIRECTION]
250A CDF717          CALL CONVRT    PERCENT TO SECONDS
               *                    NOW (DE) IS IN SECONDS
```

```
250Ø E1               POP  H
             *SAVED VALUE OF MAXIMUM OF GAPLCP AND
             *CARWT[DIRECTION].
             *
250E CDØØ03           CALL COMPAR
2511 3E08             MVI  A,8
2513 D21925           JNC  GEG6      DOES VOLUME OR
2516 EB               XCHG         OCCUPANCY DOMINATE?
2517 3EØØ             MVI  A,Ø
2519 32EEØ8 GEG6      STA  OCCDET    LEAVE FLAG
             *
             * AT THIS POINT (DE) IS MAXIMUM OF
             * OCCUPANCY/VOLUME INPUT TO CYCLE LENGTH
             *
251C EB               XCHG
251D CDEEØ7           CALL GRBND     BOUND WRT GREEN
252Ø 2286Ø9           SHLD ECLGN     THIS CYCLE
2523 2288Ø9           SHLD ECLGN2
2526 22ACØ9           SHLD ECGNAV    SAVE FOR DISPLAY
             *
2529 119899           LXI  D,X'9998'
252C 2188Ø9           LXI  H,ECLGN2
252F CDEBØ7           CALL AIM     ECLGN2=ECLGN-2
             *
2532 2191Ø9           LXI  H,GAPPROC SET FLAG
2535 7E               MOV  A,M
2536 F68Ø             ORI  X'8Ø'
2538 77               MOV  M,A
             *
2539 CDEB17           CALL VOLSAV
253C C1               POP  B
253D D1               POP  D
253E E1               POP  H
253F C9               RET
             *        GRNDIR GREEN PHASE DIRECTIONAL
             *               ONE SECOND ROUTINE
             *
254Ø C5      GRNDIR   PUSH B
2541 D5               PUSH D
2542 E5               PUSH H
2543 2A8ØØ9           LHLD ACTGN     IF ACTGN = Ø THEN
2546 7C               MOV  A,H
2547 B5               ORA  L
2548 C26E25           JNZ  GDA1
             *
254B 3A9CØ9           LDA  DIRSTAT   SET UP LCP[DIR]
254E 114CØ9           LXI  D,LCPIN
2551 1F               RAR
2552 DA5825           JC   GDAØ
2555 114EØ9           LXI  D,LCPOUT
2558 218AØ9 GDAØ      LXI  H,MAXGN   MAXGNLCP=MAXGN-LCP
255B CDCØØ3           CALL SUBDEC    >=Ø
255E 2ABØØ8           LHLD DIFF
2561 3AB2Ø8           LDA  DIFF+2
2564 A7               ANA  A
2565 C26B25           JNZ  GDAØA
2568 21ØØØØ           LXI  H,Ø
256B 228CØ9 GDAØA     SHLD MAXGNLCP
             *
256E 218ØØ9 GDA1      LXI  H,ACTGN
2571 11Ø1ØØ GDA2      LXI  D,1     INCREMENT ACTGN
2574 CDEBØ7           CALL AIM
             *
2577 3A91Ø9           LDA  GAPPROC
257A 17               RAL
257B DAA325           JC   GDF1
             *
257E 118CØ9           LXI  D,MAXGNLCP ACTGN-MAXGNLCP>=Ø
2581 CDØØØ3           CALL COMPAR
2584 DAAØ25           JC   GDD3
             *
2587 1184Ø9           LXI  D,TRDLCP  NO;ACTGN>=TRDLCP?
258A EB               XCHG
258B CDØØØ3           CALL COMPAR
258E DACF25           JC   GDK4
```

```
              *
2591 3A9009          LDA  SYSTAT    YES; TURN OFF D2
2594 E6FB            ANI  X'FB'     STOP GAP INHIBIT
2596 329009          STA  SYSTAT
2599 3A9209 GDE3     LDA  GAPFLG    GAP FLAG SET?
259C 1F              RAR
259D D2CF25          JNC  GDK4      NOT YET SO RETURN
25A0 CD8C24 GDD3     CALL GAPEND    CREATE ECLGN ETC.
              *
25A3 118009 GDF1     LXI  D,ACTGN  SYNCEND TIME?
25A6 218809          LXI  H,ECLGN2 ACTGN-ECLGN2>=0?
25A9 CD0003          CALL COMPAR
25AC DACF25          JC   GDK4
              *
25AF 3A9009          LDA  SYSTAT   YES; SYNC ON?
25B2 17              RAL
25B3 DACC25          JC   GDB5
              *
25B6 218609          LXI  H,ECLGN  NO; ACTGN-ECLGN>0?
25B9 CD0003          CALL COMPAR
25BC DACF25          JC   GDK4
              *
25BF 210000          LXI  H,0    YES; CLEAR SYSTAT,
25C2 229009          SHLD SYSTAT       GAPPROC
25C5 228009          SHLD ACTGN      AND ACTGN
25C8 C3CF25          JMP  GDK4
              *
25CB 00              NOP
25CC CDD325 GDB5     CALL SYNCEND   CLEAR SYNC,SETUP
              *      DC   0,0,0     ECLT, DIRNEW
              *
25CF E1     GDK4     POP  H
25D0 D1              POP  D
25D1 C1              POP  B
25D2 C9              RET
              *      SYNCEND  GREEN PHASE
              *
25D3          SYNCEND EQU *
25D3 C5              PUSH B
25D4 D5              PUSH D
25D5 E5              PUSH H
              *
25D6 3A9C09          LDA  DIRSTAT
25D9 E61C            ANI  28  %AVG,MANUAL,AVG
25DB C2F325          JNZ  SY2
              *
25DE 2A8009          LHLD ACTGN  AUTO-DIRECT ONLY
25E1 228E09          SHLD ECLT
25E4 218E09          LXI  H,ECLT ECLT=ACTGN+2+BASECYC
25E7 110200          LXI  D,2
25EA CDEB07          CALL AIM
25ED 119809          LXI  D,BASECYC
25F0 CDFA07          CALL AIP
              *
25F3 CDEE1B SY2      CALL DIRSEL    NEW DIRECTION
25F6 CDFA1B          CALL SPDCVT    SPEEDWARP
25F9 CDF423          CALL BASCYCNW  SPLIT INFO
              *
25FC 3A9D09          LDA  DIRNEW    %AVG,MANUAL,AVG
25FF E61C            ANI  28       CALCULATE NEW CYCLE
2601 CA1126          JZ   SEH1
              *
2604 FE04            CPI  4         IF NORMAL AVG
2606 CA0D26          JZ   AVGQ      SAVE TIMER
              *
2609 AF              XRA  A
260A 32A909          STA  AVCYCTM   CLEAR TIMER
260D CD9C26 AVGQ     CALL AVCYC     AVERAGE CYCLE LENGTH CALCULATION
2610 00              NOP
              *
2611 21AC09 SEH1     LXI  H,ECGNAV  MINGN<=ECGNAV<=MAXGN
2614 CDEE07          CALL GRBND     ECLT:=ECGNAV+BASCYC
2617 22AC09          SHLD ECGNAV
261A 228E09          SHLD ECLT
261D 218E09          LXI  H,ECLT
```

```
2620 119809          LXI  D,BASECYC
2623 CDFA07          CALL AIP
               *
2626 219009          LXI  H,SYSTAT  SET SYNC FLAG =0
2629 7E              MOV  A,M
262A E67F            ANI  X'7F'
262C 77              MOV  M,A
262D E1              POP  H
262E D1              POP  D
262F C1              POP  B
2630 C9              RET
               *     GRNAVG
               *     ONE SECOND GREEN AVERAGE  DRIVER
               *     ALSO USED DURING %AVG AND MANUAL
               *
2631           GRNAVG EQU *
2631 E5              PUSH H
2632 D5              PUSH D
2633 C5              PUSH B
               *
2634 218109          LXI  H,ACTGN+1   ACTGN=0 ?
2637 7E              MOV  A,M
2638 2B              DCX  H
2639 B6              ORA  M
263A C26526          JNZ  GAC2
               *
263D 114E09          LXI  D,LCPOUT  ECLGNLCP=ECLGN-LCP
2640 218609          LXI  H,ECLGN
2643 CDC003          CALL SUBDEC
2646 2AB008          LHLD DIFF        >=0
2649 3AB208          LDA  DIFF+2
264C A7              ANA  A
264D C25326          JNZ  GAZ2
2650 210100          LXI  H,1
2653 228C09 GAZ2     SHLD ECLGNLCP
               *
2656 2A8609          LHLD ECLGN
2659 228809          SHLD ECLGN2
265C 218809          LXI  H,ECLGN2  ECLGN2=ECLGN-2
265F 119899          LXI  D,X'9998'
2662 CDEB07          CALL AIM
               *
2665 218009 GAC2     LXI  H,ACTGN   ACTGN=ACTGN+1
2668 110100          LXI  D,1
266B CDEB07          CALL AIM
               *
266E 118C09          LXI  D,ECLGNLCP ECLGNLCP=ACTGN?
2671 CD0003          CALL COMPAR
2674 C27A26          JNZ  GAB4
2677 CDEB17          CALL VOLSAV    YES;SAVE DET DATA
267A 118009 GAB4     LXI  D,ACTGN
267D 218809          LXI  H,ECLGN2
2680 CD0003          CALL COMPAR
2683 CCD325          CZ   SYNCEND
2686 218609          LXI  H,ECLGN
2689 CD0003          CALL COMPAR
268C DA9826          JC   EXIT      JUMP IF ACTGN<ECLGN
               *
268F 210000          LXI  H,0     CLEAR ACTGN
2692 228009          SHLD ACTGN   SYSTAT,GAPPROC
2695 229009          SHLD SYSTAT    END GREEN PHASE
               *
2698 C1     EXIT     POP  B
2699 D1              POP  D
269A E1              POP  H
269B C9              RET
               *     AVCYC ONCE PER AVERAGE CYCLE
               *     CALCULATES LENGTH OF NEXT AVERAGE
               *     CYCLE SUBJECT TO TIMEOUTS
               *
269C           AVCYC EQU  *
269C E5              PUSH H
269D D5              PUSH D
269E C5              PUSH B
```

```
269F 3A4209           LDA  BYPVOL     FETCH MAXIMUM INB
26A2 117409           LXI  D,CWTS     SAVED CAR WEIGHT
26A5 218008           LXI  H,TEMP1    WHICH IS VALID.
26A8 CDF707           CALL MAXVAL2
                *
26AB 3A4209           LDA  BYPVOL     FETCH MAXIMUM OUTB
26AE 1F               RAR             SAVED CAR WEIGHT
26AF 1F               RAR             WHICH IS VALID.
26B0 117809           LXI  D,CWTS+4
26B3 218208           LXI  H,TEMP2
26B6 CDF707           CALL MAXVAL2
                *
26B9 3A4309           LDA  BYPOCC     FETCH MAXIMUM INB
26BC 216809           LXI  H,RUNAVG   VALID RUNAVG
26BF 118408           LXI  D,TEMP3
26C2 CDF107           CALL MAXVAL1
                *
26C5 3A4309           LDA  BYPOCC     FETCH MAXIMUM OUTB
26C8 1F               RAR             VALID RUNAVG
26C9 1F               RAR
26CA 23               INX  H
26CB 23               INX  H
26CC 118608           LXI  D,TEMP4
26CF CDF107           CALL MAXVAL1
                *
26D2 CDF717           CALL CONVRT
                *CHANGES PERCENTAGES IN TEMP3&4 TO SEC.
                *
26D5 118608           LXI  D,TEMP4    FIND MAX OCCUP
26D8 218408           LXI  H,TEMP3
26DB CD0003           CALL COMPAR
26DE D2E226           JNC  DS01
26E1 EB               XCHG
26E2 4B         DS01  MOV  C,E
26E3 42               MOV  B,D
                *
26E4 118008           LXI  D,TEMP1    FIND MAX VOLUME
26E7 218208           LXI  H,TEMP2
26EA CD0003           CALL COMPAR
26ED D2F126           JNC  DS02
26F0 EB               XCHG
26F1 60         DS02  MOV  H,B
26F2 69               MOV  L,C
                *
26F3 CD0003           CALL COMPAR     OCCUPANCY GREATER?
26F6 3E00             MVI  A,0
26F8 D2FD26           JNC  DS03
26FB 3E08             MVI  A,8        IF SO, SET FLAG
26FD 32EE08 DS03      STA  OCCDET
2700 218008           LXI  H,TEMP1    FIND LARGER OF
2703 118408           LXI  D,TEMP3    INBOUND OCCUPANCY
2706 CD0003           CALL COMPAR     OR VOLUME
2709 DA0D27           JC   INBIG
270C EB               XCHG
270D 119608 INBIG     LXI  D,X'896'   STORE LARGER IN
2710 7E               MOV  A,M        MATH REG FOR ADD
2711 12               STAX D
2712 13               INX  D
2713 23               INX  H
2714 7E               MOV  A,M
2715 12               STAX D
2716 00               NOP


2717 218208           LXI  H,TEMP2    FIND LARGER OF
271A 118608           LXI  D,TEMP4    OUTBOUND VOLUME OR
271D CD0003           CALL COMPAR     OCCUPANCY
2720 DA2427           JC   OUTBIG
2723 EB               XCHG
2724 11B008 OUTBIG    LXI  D,DIFF     STORE LARGER IN
2727 7E               MOV  A,M        MATH REG FOR ADD
2728 12               STAX D
2729 23               INX  H
272A 13               INX  D
272B 7E               MOV  A,M
```

```
272C 12               STAX D
272D 00               NOP


272E CDA002           CALL DECADD0   FORM IN+OUT /2A0/
2731 2AB008           LHLD DIFF
2734 228408           SHLD TEMP3     STORE IN TEMP3
2737 210050           LXI  H,X'5000' 1/2 FOR MULTIPLY
273A 228208           SHLD TEMP2
273D 00               NOP


273E 1E84             MVI  E,TEMP3
2740 1682             MVI  D,TEMP2
2742 CD2003           CALL DECMLT    FORM IN+OUT/2
2745 2A9809           LHLD BASECYC   ADD BASECYC
2748 226E09           SHLD AVCALC
274B 2AB208           LHLD DIFF+2
274E EB               XCHG
274F 216E09           LXI  H,AVCALC
2752 CDE307           CALL AIM      STORE IN AVCALC
               *
2755 3AA909           LDA  AVCYCTM   IF STILL TIMING
2758 A7               ANA  A         IGNORE RESULTS
2759 C27B27           JNZ  ACEX
275C CDF11B           CALL CYCTWS  FIT CALCULATED VALUE
               *                    TO TWS INPUTS.
               *
275F 215C09           LXI  H,AVSEL
2762 119809           LXI  D,BASECYC ECGNAV:=AVSEL -
2765 CDC003           CALL SUBDEC           BASECYC
2768 2AB008           LHLD DIFF
276B 22AC09           SHLD ECGNAV    ECLT:=AVSEL
276E 2A5C09           LHLD AVSEL
2771 228E09           SHLD ECLT
               *
2774 3A7F0C           LDA  X'C7F'    FETCH 'IN' AVG TWS
2777 2F               CMA
2778 E60F             ANI  X'F'
277A 07               RLC   CHANGE TO HALF MINUTES
277B F680      ACEX   ORI  X'80'     SET D7=1
277D 32A909           STA  AVCYCTM
2780 00               NOP
2781 C1               POP  B
2782 D1               POP  D
2783 E1               POP  H
2784 C9               RET
2785                  ORG  X'27F1'
27F1 C30024           JMP  REDTIME
27F4 C33126           JMP  GRNAVG
27F7 C34025           JMP  GRNDIR
27FA C34324           JMP  GRNIN
27FD 00               DC   0,0,0
27FE 00
27FF 00
2800                  END  0
               *           TRANSFER                *
               *                                   *
               * TRANSFER MOVES DATA WITHIN RAM (0800).
               *
               * PREFACE:1.PRELOAD DE WITH SOURCE (E)
               *           AND DEST.(D) LSD ONLY.
               *           MSD = 08 IS ASSUMED.
               *         2.PRELOAD C WITH NUMBER OF
               *           BYTES TO BE TRANSFERRED.
               *
021D                  ORG X'0230'
0230 E5        TRANSFER PUSH H
0231 C5               PUSH B
0232 6A               MOV L,D       FORM COMPLETE DEST
0233 1608             MVI D,X'08'   ADDR IN HL & SOURCE
0235 62               MOV H,D       ADDR IN DE.
0236 1A        TST2   LDAX D        FETCH A BYTE.
0237 77               MOV M,A       STORE IT.
```

```
0238 2C            INR L        INCR DEST ADDR.
0239 1C            INR E        INCR SOURCE ADDR.
023A 0D            DCR C        DECR CTR.
023B C23602        JNZ TST2     IF COUNT NOT REACHED
023E C1            POP B        FETCH ANOTHER BYTE,
023F E1            POP H        ELSE EXIT.
0240 C9            RET
           *          CLEAR                    *
           * THIS ROUTINE CLEARS RAM (256 BYTES
           * MAX.). STARTING POINT IS LOADED IN
           * H&L REGS. C REGISTER HOLDS NUMBER
           * OF CONSECUTIVE LOCNS TO BE CLEARED.
           *
           * PREFACE:  21   LXI H,
           *           --
           *           --
           *           0E   MVI C,
           *           --
           *           CD   CALL CLEAR
           *           E0
           *           02
           *
           * RESULT: ALL ADDRESSED RAM IS CLEARED.
           *
02D4              ORG X'02E0'
02E0       CLEAR  EQU *
02E0 E5           PUSH H
02E1 C5           PUSH B
02E2 AF           XRA  A
02E3 77    CT02   MOV  M,A     CLR MEMORY LOCN.
02E4 23           INX  H       STEP TO NEXT ADDR.
02E5 0D           DCR  C       DECR COUNT.
02E6 C2E302       JNZ  CT02    GO TO NEXT LOCN IF
02E9 C1           POP  B       COUNT NOT ZERO.
02EA E1           POP  H
02EB C9           RET
           *             NIBBLE                *
           *
           * TAKES BYTE FROM A AND BREAKS IT INTO
           * TWO NIBBLES WHICH ARE THEN STORED IN
           * SUCCESSIVE MEMORY LOCATIONS.
           *
           * PREFACE: 1.LOAD A WITH BYTE.
           *          2.SET FIRST ADDR WITH LXI,H.
           *          3.CALL NIBBLE (02ED).
           *
02EC              ORG  X'02ED'
02ED C5    NIBBLE PUSH B
02EE 47           MOV  B,A     MOVE BYTE TO B.
02EF E60F         ANI  X'0F'   MASK 4 MS BITS.
02F1 77           MOV  M,A     STORE.
02F2 2C           INR  L       INCR HL.
02F3 78           MOV  A,B     MOVE BYTE TO A.
02F4 0F           RRC          SHIFT ACCUMULATOR 4
02F5 0F           RRC          BITS TO THE RIGHT.
02F6 0F           RRC
02F7 0F           RRC
02F8 E60F         ANI  X'0F'   MASK 4 MS BITS.
02FA 77           MOV  M,A     STORE IN NEXT LOCN.
02FB 2C           INR  L       INCR HL.
02FC C1           POP  B
02FD C9           RET
           *      DRIVMAS      SLOW DRIVER
           *
           *   NOTE THAT RTCLK DRIVES ROUTINES
           *   CALLED MORE FREQUENTLY THAN 1 SEC
           *
           *  KEEP CALLING "RTCLOCK" UNTIL IT RETURNS A CARRY FLAG
           *INDICATING A 100MS MARK.
1049       MARKER EQU *
1049 CDAA10       CALL RTCLK
104C D48D12       CNC  WINDOW     MONITOR INTERFACE
104F D24910       JNC  MARKER
1052 47           MOV  B,A        SAVE ACC IN B
```

```
1053 00             NOP
             *  TEST FOR A ZERO FLAG(1 SEC MARK)
1054 CA7E10         JZ    ONESEC     JMP TO 1 SEC DRIVER
             *  TEST FOR A SIGN FLAG(N.2 SEC MARK)
1057 F24910         JP    MARKER     JMP IF NOT N.2 SEC
             *
             *POSSIBLE N.2 SEC ROUTINES WOULD BE CALLED HERE.
105A CDF123         CALL TWSERR      TWS SETUP CHECK
105D CDF11F         CALL CYCSTAT     CYCLE STATUS LEDS
1060 CDFA17         CALL SENERR
             *
1063 213109         LXI   H,ACTGN+1
1066 7E             MOV   A,M        AT RED, T=0.2
1067 2B             DCX   H
1068 B6             ORA   M
1069 219009         LXI   H,SYSTAT
106C B6             ORA   M
106D CCFA23         CZ    DSU    DISPLAY SETUP
             *
             *  TEST FOR 30.2(0.2) SEC MARK.  THIS IS INDICATED BY
             *D0 OF ACCUMULATOR SET TO 1 UPON RETURN FROM "RTCLOCK".
1070 78             MOV   A,B        RESTORE OLD ACC. CONTENT
1071 1F             RAR
1072 D24910         JNC   MARKER     JMP IF NOT 30.2 MARK
             *
             *  FALL THROUGH ON 30.2(0.2) SEC MARK
1075 CDE517         CALL QUEUE
1078 CD1811         CALL CTRMNTR
107B C34910         JMP   MARKER
             *
             *      PHASE DEPENDENT ROUTINES ON
             *      ONE SECOND MARK
             *
107E 3A9009 ONESEC LDA   SYSTAT
1081 1F             RAR
1082 DA8B10         JC    GRNTIM
1085 CDF127         CALL REDTIME
1088 C34910         JMP   MARKER
             *
             *  GREEN TIME DRIVER
108B 3A9C09 GRNTIM LDA   DIRSTAT    FETCH DIRECTION STATUS
108E E618           ANI   X'18'      ;AVG OR MANUAL
1090 C2A410         JNZ   AVG    EXECUTE THROUGH AVG
1093 3A9C09         LDA   DIRSTAT
1096 E603           ANI   3          ISOLATE IN & OUT BITS
1098 CAA410         JZ    AVG        JUMP IF AVERAGE
             *  FALL THROUGH IF DIRECTIONAL MODE
109B CDF727         CALL GRNDIR
109E CDF117         CALL RAMP1
10A1 C34910         JMP   MARKER
             *
             *  COME HERE IF AVERAGE MODE
10A4 CDF427 AVG     CALL GRNAVG
10A7 C34910         JMP   MARKER
             *      SENERR SENSOR ERROR DETECTION N.2
             *
0000                ORG   X'1400'
1400 C5     SENERR PUSH B
1401 D5             PUSH D
1402 E5             PUSH H
             *
1403 0E04           MVI   C,4        LOOP OVER 4 INPUTS
1405 214409         LXI   H,OCCFLG
1408 E5             PUSH H
1409 210000         LXI   H,0
140C 228008         SHLD VOLT        CLEAR VOLT,OCCT
140F 21A009         LXI   H,VOLFLG
             *
1412 115009 DEC1    LXI   D,VOLHI
1415 3A8008         LDA   VOLT
1418 0F             RRC
1419 47             MOV   B,A
141A 1A             LDAX D           VOLHI
141B 1F             RAR
141C 12             STAX D
```

```
141D 13                INX  D
141E D22C14            JNC  DED1
              *
1421 3E88              MVI  A,136     2 MINUTE HIGH LIMIT
1423 CD8214            CALL INCRS
1426 1A                LDAX D         VOLLO
1427 1F                RAR
1428 12                STAX D
1429 C34014            JMP  DEE1
              *
142C 1A       DED1     LDAX D         VOLLO
142D 1F                RAR
142E 12                STAX D
142F D23B14            JNC  DED2
              *
1432 3600              MVI  M,0       CLEAR FLAG
1434 23                INX  H         SINCE THERE HAS
1435 3600              MVI  M,0       BEEN A TRANSITION
1437 2B                DCX  H
1438 C34014            JMP  DEE1
              *
143B 3E11     DED2     MVI  A,17      16 MINUTE LOW LIMIT
143D CD8214            CALL INCRS
              *
1440 13       DEE1     INX  D
1441 23                INX  H
1442 23                INX  H
1443 78                MOV  A,B
1444 328008            STA  VOLT
1447 3A8108            LDA  OCCT
144A 0F                RRC
144B 47                MOV  B,A
144C E3                XTHL           OCCFLG
              *
144D 1A                LDAX D         OCCHI
144E 1F                RAR
144F 12                STAX D
1450 13                INX  D
1451 D25F14            JNC  DEF1
              *
1454 3E36              MVI  A,54      5 MINUTE HIGH LIMIT
1456 CD8214            CALL INCRS
1459 1A                LDAX D         OCCLO
145A 1F                RAR
145B 12                STAX D
145C C37314            JMP  DEG1
              *
145F 1A       DEF1     LDAX D         OCCLO
1460 1F                RAR
1461 12                STAX D
1462 D26E14            JNC  DEF2
              *
1465 3600              MVI  M,0       CLEAR FLAG SINCE
1467 23                INX  H         THERE HAS BEEN A
1468 3600              MVI  M,0       TRANSITION.
146A 2B                DCX  H
146B C37314            JMP  DEG1
              *
146E 3E11     DEF2     MVI  A,17      16 MINUTE LOW LIMIT
1470 CD8214            CALL INCRS
              *
1473 23       DEG1     INX  H         BUMP OCCFLG PTR
1474 23                INX  H
1475 E3                XTHL           FETCH VOLFLG
1476 78                MOV  A,B
1477 328108            STA  OCCT
147A 0D                DCR  C
147B C21214            JNZ  DEC1      MORE TO DO.
147E E1                POP  H         FIX STACK
147F C39E14            JMP  DEG2      NO MORE DETECTORS
              *
1482 E5       INCRS    PUSH H         INCREMENT,CHECK &
1483 CD8D14            CALL INCREM    SET
1486 E1                POP  H
1487 D0                RNC
```

```
1488 78              MOV  A,B       SET ERROR BIT
1489 F608            ORI  8
148B 47              MOV  B,A
148C C9              RET
148D 86       INCREM ADD  M         ADD TO 2 BYTE CNTR
148E 77              MOV  M,A       RETURN WITH C IF
148F 23              INX  H         ERROR LIMIT REACHED
1490 7E              MOV  A,M
1491 17              RAL
1492 D8              RC             QUIT IF FLAG IS SET
1493 1F              RAR
1494 CE00            ACI  0
1496 77              MOV  M,A
1497 E640            ANI  64
1499 C8              RZ             QUIT IF NOT YET
149A 3680            MVI  M,128     SET FLAG
149C 37              STC
149D C9              RET
              *
149E 3E0F     DEG2   MVI  A,15      INITIALIZE FOR NEXT
14A0 325009          STA  VOLHI     SECOND FOR UPDATE
14A3 325209          STA  OCCHI
14A6 AF              XRA  A
14A7 325109          STA  VOLLO
14AA 325309          STA  OCCLO
              *
14AD 2A6A08          LHLD IMAGVOL   BYPASS SWITCHES
14B0 3A8008          LDA  VOLT
14B3 57              MOV  D,A       VOLUME FLASHER
14B4 7D              MOV  A,L       IF ERROR AND NOT
14B5 2F              CMA            DPS BYPASS
14B6 A2              ANA  D
14B7 0F              RRC
14B8 0F              RRC
14B9 0F              RRC
14BA 0F              RRC
14BB 47              MOV  B,A
14BC 3AE308          LDA  DSPVOL
14BF E60F            ANI  15
14C1 B0              ORA  B
14C2 32E308          STA  DSPVOL
              *
14C5 7A              MOV  A,D       BYPASS IF ERROR OR
14C6 B5              ORA  L         DSP BYPASS
14C7 324209          STA  BYPVOL
              *
14CA 3A8108          LDA  OCCT
14CD 5F              MOV  E,A       OCCUPANCY FLASHER
14CE 7C              MOV  A,H
14CF 2F              CMA            IF ERROR AND NOT
14D0 A3              ANA  E         DPS BYPASS
14D1 0F              RRC
14D2 0F              RRC
14D3 0F              RRC
14D4 0F              RRC
14D5 4F              MOV  C,A
14D6 3AE908          LDA  DSPOCC
14D9 57              MOV  D,A
14DA E60F            ANI  15
14DC B1              ORA  C
14DD 32E908          STA  DSPOCC
              *
14E0 7A              MOV  A,D        OCCUPANCY ERROR
14E1 A9              XRA  C          CHANGES.
14E2 0F              RRC
14E3 0F              RRC
14E4 0F              RRC
14E5 0F              RRC
14E6 57              MOV  D,A
              *
14E7 7B              MOV  A,E       BYPASS IF ERROR OR
14E8 B4              ORA  H         DPS BYPASS
14E9 324309          STA  BYPOCC
              *
14EC 79              MOV  A,C       DETECTOR FAULT
```

```
14ED B0              ORA  B
14EE E6F0            ANI  X'F0'
14F0 0E08            MVI  C,8
14F2 CAF714          JZ   DEG4A      LO TRUE OUTPUT
14F5 0E00            MVI  C,0
14F7 3AEB08 DEG4A    LDA  OUTCOE
14FA E6F7            ANI  X'F7'
14FC B1              ORA  C
14FD 32EB08          STA  OUTCOE
            *
1500 3A4209          LDA  BYPVOL     UNIT FAULT IF BOTH
1503 47              MOV  B,A      DETECTORS IN A GIVEN
1504 E603            ANI  3          DIRECTION ARE OUT
1506 FE03            CPI  3
1508 0E80            MVI  C,128
150A CA1715          JZ   SEZ1
150D 78              MOV  A,B
150E E60C            ANI  12
1510 FE0C            CPI  12
1512 CA1715          JZ   SEZ1
1515 0E00            MVI  C,0
1517 3A9509 SEZ1     LDA  UNERFL
151A E67F            ANI  X'7F'
151C B1              ORA  C
151D 329509          STA  UNERFL
            *
1520 4A              MOV  C,D
1521 215015          LXI  H,QUEUE
1524 E5              PUSH H
1525 219915          LXI  H,RUNAVG   IF OCCUPANCY ERROR
1528 0604            MVI  B,4           CHANGE,CLEAR
152A 79     DEH5     MOV  A,C        RUNAVG & QUEUE
152B 1F              RAR
152C 4F              MOV  C,A
152D D23F15          JNC  DEH4
1530 AF              XRA  A          CLEAR RUNAVG
1531 77              MOV  M,A
1532 23              INX  H
1533 E3              XTHL
1534 1610            MVI  D,16       CLEAR OUT QUEUE
1536 77     DEH6     MOV  M,A
1537 23              INX  H
1538 15              DCR  D
1539 C23615          JNZ  DEH6
153C C34515          JMP  DEH7
            *
153F 23     DEH4     INX  H          NEXT RUNAVG
1540 E3              XTHL
1541 7D              MOV  A,L        NEXT QUEUE ENTRY
1542 C610            ADI  16
1544 6F              MOV  L,A
1545 E3     DEH7     XTHL
1546 05              DCR  B
1547 C22A15          JNZ  DEH5
154A 33              INX  SP
154B 33              INX  SP
            *
154C E1              POP  H
154D D1              POP  D
154E C1              POP  B
154F C9              RET
            *        QUEUE        30 SECONDS
            *
            *        INCREMENT QPTR MODULO RUNDUR AND
            *        INSERT OCCLK[1:4] / 4  INTO
            *        QUEUES 1 - 4 AS ONE BYTE QUANTI-
            *        TIES. CALL RUNAVG. CLEAR OCCLK.
            *
1550 E5     QUEUE    PUSH H
1551 D5              PUSH D
1552 C5              PUSH B
1553 3A4009          LDA  QPTR       FETCH QPTR
1556 3C              INR  A          INCREMENT
1557 47              MOV  B,A
1558 3AE417          LDA  RUNDUR     FETCH RUNDUR
```

```
155B B8                 CMP  B            COMPARE
155C 78                 MOV  A,B
155D C26115             JNZ  QU2          IF =,REPLACE WITH
1560 AF                 XRA  A            ZERO.
1561 324009 QU2         STA  QPTR         STORE NEW VALUE.
            *
1564 215F09             LXI  H,OCCLK-1     SET UP OCCUPANCY
1567 11F008             LXI  D,QUETAB-16 AND QUEUE BASE
156A 83                 ADD  E                ADDRESSES.
156B 5F                 MOV  E,A
156C D27015             JNC  QU1
156F 14                 INR  D
            *
1570 0604   QU1         MVI  B,4          SET UP LOOP OF 4
            *
1572 23     QUEUE1      INX  H            TOP OF LOOP
1573 7B                 MOV  A,E          INCR ADDRESSES
1574 C610               ADI  16
1576 5F                 MOV  E,A
1577 3E00               MVI  A,0
1579 8A                 ADC  D
157A 57                 MOV  D,A
            *
157B 7E                 MOV  A,M          GET OCCUP VALUE
157C 0F                 RRC               AND DIVIDE BY 4
157D 0F                 RRC
157E E63F               ANI  X'3F'
1580 4F                 MOV  C,A
1581 23                 INX  H
1582 7E                 MOV  A,M
1583 0F                 RRC
1584 0F                 RRC
1585 E6C0               ANI  X'C0'
1587 B1                 ORA  C
1588 12                 STAX D            STORE IT IN QUEUE.
            *
1589 2D                 DCR  L CLEAR TO PERMIT NEW COUNT
158A AF                 XRA  A            BY UPDATE
158B 77                 MOV  M,A
158C 2C                 INR  L
158D 77                 MOV  M,A
            *
158E 05                 DCR  B            BOTTOM OF LOOP
158F C27215             JNZ  QUEUE1
            *
1592 C1                 POP  B
1593 D1                 POP  D
1594 E1                 POP  H
1595 CD9915             CALL RUNAVG
1598 C9                 RET
            *           RUNAVG       30 SECOND ROUTINE
            *
1599 C5     RUNAVG      PUSH B
159A D5                 PUSH D
159B E5                 PUSH H
            *
            *           LOAD ADDRESS FOR STORAGE OF
            *           RESULTS AND SAVE IN ADDR
            *
159C 216709             LXI  H,RUNAVG1-1
159F 228808             SHLD ADDR
            *
            *           CALCULATE TABLE ADDRESS
            *
15A2 211A16             LXI  H,TBLE-4 LOAD TABLE ADDRESS
15A5 118E08             LXI  D,TEMP8   MINUS 4 AND ADD
15A8 3AE417             LDA  RUNDUR    THE NUMBER OF
15AB 85                 ADD  L         QUEUE ENTRIES
15AC 6F                 MOV  L,A       BEING USED
15AD 7E                 MOV  A,M
15AE 12                 STAX D         MOVE THE TABLE
15AF 23                 INX  H         ENTRY TO TEMP8
15B0 13                 INX  D
15B1 7E                 MOV  A,M
15B2 12                 STAX D
```

```
            *
            *      SET UP FOR OUTER LOOP OVER THE
            *      FOUR QUEUES
            *
15B3 0E04          MVI  C,X'04'
15B5 21FF08        LXI  H,QUETAB-1
15B8 228C08        SHLD TEMP7
15BB D5            PUSH D
15BC C3CE15        JMP  RUN2
            *
            *      TOP OF OUTER LOOP
            *
15BF D5     RUN1   PUSH D         CALCULATE STARTING
15C0 2A8C08        LHLD TEMP7     QUEUE ADDRESS AND
15C3 3E10          MVI  A,X'10'   STORE IN TEMP7
15C5 85            ADD  L
15C6 6F            MOV  L,A
15C7 3E00          MVI  A,0
15C9 8C            ADC  H
15CA 67            MOV  H,A
15CB 228C08        SHLD TEMP7
15CE EB     RUN2   XCHG
15CF 3AE417        LDA  RUNDUR
15D2 47            MOV  B,A       LOAD LOOP COUNTER
15D3 218008        LXI  H,TEMP1
15D6 AF            XRA  A         CLEAR SUMMATION
15D7 77            MOV  M,A       AREA (TEMP1)
15D8 23            INX  H
15D9 77            MOV  M,A
            *
            *      TOP OF SUMMATION LOOP
            *
15DA 2B     RUN3   DCX  H
15DB 13            INX  D
15DC 1A            LDAX D         INCREMENT QUEUE
15DD 86            ADD  M         ENTRY POINTER AND
15DE 77            MOV  M,A       ADD QUANTITY TO
15DF 3E00          MVI  A,0       THE TOTAL
15E1 23            INX  H
15E2 8E            ADC  M
15E3 77            MOV  M,A
15E4 05            DCR  B         IF NOT FINISHED
15E5 C2DA15        JNZ  RUN3      GO TO RUN3
            *
            *      CONVERT TO %
            *
15E8 2A8008        LHLD TEMP1
15EB 229008        SHLD BDIN      CONVERT TO BCD AND
15EE CD8004        CALL BINDEC
15F1 2AB008        LHLD DIFF
15F4 228008        SHLD TEMP1
15F7 11808E        LXI  D,X'8E80'
15FA CD2003        CALL DECMLT    THEN TO % OCCUPNCY
15FD 2A8808        LHLD ADDR
1600 23            INX  H
1601 3AB308        LDA  CHECK     CHECK IF THE RESLT
1604 FE01          CPI  1         IS GREATER THAN
1606 DA0E16        JC   RUN4      99%.  IF SO, STORE
1609 3E99          MVI  A,X'99'   99% INSTEAD.
160B C31116        JMP  RUN5
160E 3AB208 RUN4   LDA  ANSWER
1611 77     RUN5   MOV  M,A
1612 228808        SHLD ADDR
1615 D1            POP  D
1616 0D            DCR  C         IF NOT FINISHED
1617 C2BF15        JNZ  RUN1      WITH ALL QUEUES,
            *                     GO TO RUN1.
161A E1            POP  H
161B D1            POP  D
161C C1            POP  B
161D C9            RET
            *
            *      TABLE OF CONSTANTS TO BE USED TO
            *      CONVERT FROM OCCUPANCY COUNTS TO
            *      % OCCUPANCY.
```

```
             *
161E 11      TBLE    DC    X'11'      2 MINUTES
161F 11              DC    X'11'
1620 41              DC    X'41'      3 MINUTES
1621 07              DC    X'07'
1622 56              DC    X'56'      4 MINUTES
1623 05              DC    X'05'
1624 44              DC    X'44'      5 MINUTES
1625 04              DC    X'04'
1626 70              DC    X'70'      6 MINUTES
1627 03              DC    X'03'
1628 17              DC    X'17'      7 MINUTES
1629 03              DC    X'03'
162A 78              DC    X'78'      8 MINUTES
162B 02              DC    X'02'
             *       SUBROUTINE CONVRT              *
             *
             *THIS PROGRAM CALCULATES SECONDS GREEN
             *TIME ON THE BASES OF OCCUPANCY.
             *THESE CALCULATIONS ARE IN LISTINGS AND
             *FLOWCHART.
             *CONVRT SETS UP VARIOUS INPUT VARIABLES
             *AND OCCSEC PERFORMS THE CALCULATIONS

             *THE INPUT VARIABLES ARE:
             *1)GNS=MAXGN-MINGN
             *IT IS ASSUMED THAT MAXGN IS A TWO BYTE
             *BCD NUMBER IN SECONDS AND MINGN IS A
             *ONE BYTE BCD NUMBER IN SECONDS.IT IS
             *FURTHER ASSUMED THAT THESE VALUES ARE
             *IN RAM BEFORE CONVRT IS CALLED.
             *2)OCCP=OCCUPANCY PERCENT.THIS IS
             *ASSUMED TO BE A ONE BYTE BCD NUMBER
             *REPRESENTING OCCUPANCY FROM 0 TO 99%
             *CONVRT ASSUMES THAT THESE HAVE BEEN
             *STORED IN RAM LOCATIONS 0884 FOR IN
             *AND 0886 FOR OUT.
             *3)Y THIS IS EITHER YIN OR YOUT FETCHED
             *FROM FRONT PANEL TWS AND IS A ONE BYTE
             *BCD NUMBER WHICH IS STORED IN THE LEAST
             *SIGNIFICANT NIBBLE.IT IS TO CORRESPOND
             *FROM 0 TO 90%.
             *4)OCCSECIN,OUT=SECONDS OCCUPANCY
             *TWO BYTES BCD IN SECONDS.OCCSEC RETURNS
             *WITH THIS VALUE IN REGISTERS H AND L
             *CONVRT STORES THESE VALUES IN 0884 FOR
             *IN AND 0886 FOR OUT.
             *
             *
             *
162C E5      CONVRT PUSH H
162D D5             PUSH D
162E C5             PUSH B
162F 218A09         LXI  H,MAXGN
1632 11BC09         LXI  D,MINGN
1635 CDC003         CALL SUBDEC    FORM MAXGN-MINGN
1638 2AB008         LHLD DIFF
163B 228A08         SHLD GNS
163E 018408         LXI  B,PROCIN  %OCCUP[IN]
1641 11660C         LXI  D,X'C66'  Y[IN] TWS
1644 CD5A16         CALL OCCSEC
1647 228408         SHLD OCSECIN
164A 018608         LXI  B,PROCOUT %OCCUP[OUT]
164D 116F0C         LXI  D,X'C6F'  Y[OUT] TWS
1650 CD5A16         CALL OCCSEC
1653 228608         SHLD OCSECOT
1656 C1             POP  B
1657 D1             POP  D
1658 E1             POP  H
1659 C9             RET
             *      SUBROUTINE OCCSEC OF CONVRT ONLY
             *
165A 3A9509 OCCSEC LDA  UNERFL     IF ERROR ON YXY,
165D E610          ANI  16         RETURN WITH ZERO
165F C2D616        JNZ  NEG
```

```
1662 0A              LDAX B
1663 328C08          STA  OCCP
          *
          *THIS PORTION OF PGM FORMS
          *V=(1/(Y-X))(MAXGN-MINGN)
1666 3A6E0C          LDA  X'C6E' FETCH X TWS
1669 2F              CMA
166A E60F            ANI  X'0F'  FORMAT X TWS
166C 325008          STA  X
166F 47              MOV  B,A
1670 1A              LDAX D      FORMAT Y TWS
1671 2F              CMA
1672 E60F            ANI  15
          *
1674 C27916          JNZ  OSC2       Y=0 MEANS Y=10
1677 3E0A            MVI  A,10
1679 90       OSC2   SUB  B          (Y-X)=[1,,,10]
          *
167A 210617          LXI  H,TABLEC-2
167D 07              RLC
167E 85              ADD  L      FIND ADR OF 1/(Y-X)
167F 6F              MOV  L,A    IN TABLE
1680 118808          LXI  D,TEMP5
1683 7E              MOV  A,M    FETCH W=1/(Y-X)
1684 12              STAX D      STORE IN TEMP5
1685 23              INX  H
1686 13              INX  D
1687 7E              MOV  A,M
1688 12              STAX D
1689 1B              DCX  D

168A 168A            MVI  D,GNS
168C CD2003          CALL DECMLT FORM (W)(GNS)=V
168F 00              NOP
1690 2AB108          LHLD DIFF+1
1693 228E08          SHLD V

          *THIS PORTION OF PGM COMPARES OCCP WITH
          *X AND COMPUTES OCCSEC ACCORDINGLY

1696 3A5008          LDA  X     FORM X AS A PERCENTAGE
1699 07              RLC
169A 07              RLC
169B 07              RLC
169C 07              RLC
169D 325008          STA  X
16A0 218C08          LXI  H,OCCP
16A3 BE              CMP  M      COMPARE OCCP>=X
16A4 DADA16          JC   HERE   JUMP IF OCCP>=X
          *THIS BRANCH COMPUTES OCCSEC BY:
          *OCCSEC=MINGN-W(X-OCCP)(GNS)

16A7 3E9A            MVI  A,X'9A'
16A9 96              SUB  M      SUBTRACT OCCP TO
16AA 215008          LXI  H,X    FORM 100'S COMP.
16AD 86              ADD  M      FORM X-OCCP=OCCMIN
16AE 27              DAA
16AF 118808          LXI  D,TEMP5
16B2 12              STAX D
16B3 AF              XRA  A
16B4 328908          STA  TEMP5+1   CLR MSB TEMP5
16B7 168E            MVI  D,V
16B9 CD2003          CALL DECMLT FORM (OCCMIN)(V)=OCCV
16BC 21B003          LXI  H,X'03B0' SHIFT OCCV LEFT
16BF CD8003          CALL NIBLFT
16C2 3E9A            MVI  A,X'9A'
16C4 21B208          LXI  H,DIFF+2 FORM 100'S COMP
16C7 96              SUB  M         OF OCCV
16C8 21BC09          LXI  H,MINGN
16CB 86              ADD  M     FORM MINGN-OCCV=0CCSEC
16CC 27              DAA
```

```
16CD 00            NOP
16CE D2D616        JNC   NEG   JUMP IF OCCSEC IS NEG

             *THIS BRANCH RETURNS WITH OCCSEC IN H+L

16D1 6F            MOV   L,A    MOVE OCCSEC TO L
16D2 2600          MVI   H,X'00' CLEAR H
16D4 00            NOP
16D5 C9            RET

             *THIS BRANCH RETURNS WITH ZERO IN H+L
             *IF OCCSEC IS NEGATIVE

16D6 210000 NEG    LXI   H,0
16D9 C9            RET

             *THIS BRANCH COMPUTES OCCSEC BY:
             *OCCSEC=MINGN+W(OCCP-X)(GNS)

16DA 3E9A   HERE   MVI   A,X'9A'    FORM 100'S COMP
16DC 215008        LXI   H,X        OF X
16DF 96            SUB   M
16E0 218C08        LXI   H,OCCP
16E3 86            ADD   M          FORM OCCP-X=OCCDIF
16E4 27            DAA
16E5 00            NOP
16E6 00            NOP
16E7 118808        LXI   D,TEMP5
16EA 12            STAX  D
16EB AF            XRA   A
16EC 328908        STA   TEMP5+1    CLR MSB TEMP5
16EF 168E          MVI   D,V
16F1 CD2003        CALL  DECMLT     FORM OCCV=
16F4 00            NOP              (OCCDIF)(V)
16F5 21B004        LXI   H,X'04B0'
16F8 CD8003        CALL  NIBLFT
16FB 21B208        LXI   H,DIFF+2
16FE 11BC09        LXI   D,MINGN
1701 CDFA07        CALL  AIP
1704 2AB208        LHLD  DIFF+2
1707 C9            RET
            *
1708 9999   TABLEC DC    B(X'9999')
170A 0050          DC    B(X'5000')
170C 3333          DC    B(X'3333'),B(X'2500')
170E 0025
1710 0020          DC    B(X'2000')
1712 6616          DC    B(X'1666'),B(X'1429')
1714 2914
1716 5012          DC    B(X'1250'),B(X'1111')
1718 1111
171A 0010          DC    B(X'1000')
            *      GAPOUT           100 MS
            *
            *      SETS GAPFLG IF GAP BETWEEN CARS
            *      GREATER THAN OR EQUAL TO GAPSIZ
            *      DURING GREEN DIR  NON GAP INHIBIT
            *
171C E5     GAPOUT PUSH  H
171D C5            PUSH  B
            *
171E 21B809        LXI   H,SENVOL  CHOOSE DIRECTION
1721 3A9C09        LDA   DIRSTAT
1724 1F            RAR
1725 DA2A17        JC    GPAR
1728 23            INX   H
1729 23            INX   H
```

```
               *
172A 7E        GPAR    MOV  A,M     COMBINE RAW DETECTORS
172B 23                INX  H
172C 86                ADD  M
172D 47                MOV  B,A
               *
172E 219409            LXI  H,GPSVOLD
1731 3A9009            LDA  SYSTAT       GREEN GAPSEARCH
1734 E604              ANI  4            TIME?
1736 C23E17            JNZ  GPB2
               *
1739 78                MOV  A,B          HAVE DETECTORS
173A BE                CMP  M            CHANGED?
173B CA4817            JZ   MORE         JUMP IF NOT.
               *
173E 70        GPB2    MOV  M,B
173F 210000            LXI  H,0          CLEAR GAPFLG AND
1742 229209            SHLD GAPFLG             GAPCNTR
               *
1745 C1        GPE5    POP  B
1746 E1                POP  H
1747 C9                RET
               *
1748 3A9309   MORE     LDA  GAPCTR       INCREMENT GAP TIME
174B FE99              CPI  X'99'        MAX=9.9 SECONDS
174D CA5617            JZ   CHK
1750 C601              ADI  1            BUT DON'T EXCEED
1752 27                DAA               MAX.
1753 329309            STA  GAPCTR
               *
1756 215B09   CHK      LXI  H,GAPSIZ     >= GAP FROM RAMP
1759 BE                CMP  M
175A DA4517            JC   GPE5         NO, RETURN;
               *
175D AF                XRA  A            YES, SET FLAG
175E 2F                CMA
175F 329209            STA  GAPFLG
1762 C34517            JMP  GPE5
               *    RAMP1
               *
1765 3A9009   RAMP1    LDA  SYSTAT       DON'T DECREMENT
1768 E604              ANI  4            DURING GAP INHIBIT
176A C0                RNZ
               *
176B C5                PUSH B
176C D5                PUSH D
176D E5                PUSH H
               *  DECREMENT GAPSIZ
176E 215A09            LXI  H,GAPSIZ-1  LSD ADDR
1771 115609            LXI  D,GAPDECR  PREFACE "SUBDEC"
1774 CDC003            CALL SUBDEC
1777 2AB008            LHLD DIFF
177A 225A09            SHLD GAPSIZ-1  WRITE BACK RESULT
177D 00                NOP
177E 3AB208            LDA  DIFF+2       FETCH SIGN
1781 A7                ANA  A
1782 CA9217            JZ   RESETG       IF MINUS;GAPMIN.
1785 00                NOP
               *
               * IF GAPSIZ < GAPMIN, SET GAPSIZ=GAPMIN.
1786 215A09            LXI  H,GAPSIZ-1  LSD ADDR
1789 115809            LXI  D,GAPMIN   PREFACE "COMPARE"
178C CD0003            CALL COMPAR
178F DA9817            JC   RETN         GAPSIZ > GAPMIN
               *
1792 2A5809   RESETG   LHLD GAPMIN
1795 225A09            SHLD GAPSIZ-1   GAPMIN TO GAPSIZ
               *
1798 E1       RETN     POP  H
1799 D1                POP  D
179A C1                POP  B
179B C9                RET
```

```
              *       "VOLSAV"
              *
179C C5       VOLSAV PUSH B
179D D5              PUSH D
179E E5              PUSH H
179F 117409          LXI  D,CWTS    SAVE AND CLEAR
17A2 21B009          LXI  H,CARWT   VOLUME SENSOR DATA
17A5 010C00          LXI  B,12
17A8 7E       VSM    MOV  A,M
17A9 70              MOV  M,B
17AA 12              STAX D
17AB 13              INX  D
17AC 23              INX  H
17AD 0D              DCR  C
17AE C2A817          JNZ  VSM
              *
17B1 219009          LXI  H,SYSTAT  SHIFT TO RED TIME
17B4 7E              MOV  A,M       VOL EXTENSIONS
17B5 E6FD            ANI  X'FD'
17B7 77              MOV  M,A
              *
17B8 AF              XRA  A         CLEAR IMAGE OF
17B9 329409          STA  GPSVOLD   SENVOL
17BC E1              POP  H
17BD D1              POP  D
17BE C1              POP  B
17BF C9              RET
17C0                 ORG  X'17E4'
17E4 04       RUNDUR DC   4
17E5 C35015          JMP  QUEUE
17E8 C31C17          JMP  GAPOUT
17EB C39C17          JMP  VOLSAV
17EE C30000          JMP  0
17F1 C36517          JMP  RAMP1
17F4 C30000          JMP  0
17F7 C32C16          JMP  CONVRT
17FA C30014          JMP  SENERR
17FD 00              DC   0,0,0
17FE 00
17FF 00
1800                 END  0
              *       DIRSEL  DIRECTION SELECTION
              *
              *       CALLED AT END OF GREEN TIME
              *       TO SELECT NEW DIRECTIONAL MODE
              *       UPON THE CRITERIA (1) IF THE
              *       INBOUND PERCENTAGE OF TOTAL
              *       TRAFFIC VOLUME EXCEEDS SET
              *       THRESHOLDS AND (2) REQUISITE TIME
              *       WAITING TO ENTER AVERAGE
              *                             HAVE BEEN MET.
              *       (3) MANUAL ENABLE SWITCH OVERRIDE
              *       (4) PERCENT AVERAGE CALL INPUT.
              *       (3) AND (4) HAVE NO WAITS.
              *
              *
0000                 ORG  X'1800'
              *
1800 00       DIRSEL DC   0
1801 C5              PUSH B
1802 D5              PUSH D
1803 E5              PUSH H
              *
1804 AF              XRA  A         CLEAR PRESET
1805 326D09          STA  CYCNUM    CYCLE NUMBER
              *
1808 CDD318          CALL DIRCALC   ACQUIRE DESIRED
180B 00              DC   0,0       DIRECTION & SAVE.
180C 00
              *
180D 216E08   DIG1   LXI  H,IMAGOE  CHECK FOR MANUAL
1810 7E              MOV  A,M
1811 E608            ANI  8         OVERRIDE.
1813 CA3618          JZ   DIH1
1816 7E              MOV  A,M       IF SO, SET UP
```

```
1817 E6Ø3                 ANI   3          REQUESTED DIRECTION
1819 F61Ø                 ORI   16           AND EXIT
181B 329DØ9               STA   DIRNEW
                *
181E 3AØ9ØC               LDA   X'ØCØ9'      FIND CYCLE IDENT
1821 2F                   CMA                SELECT INPUT
1822 E6Ø7                 ANI   7
1824 FEØ5                 CPI   5            ASSURE THAT IT
1826 D22E18               JNC   MD2A         IS WITHIN 1-4
1829 FEØØ                 CPI   Ø
182B C23Ø18               JNZ   MD2B
182E 3EØ1      MD2A       MVI   A,1
183Ø 326DØ9    MD2B       STA   CYCNUM       SAVE FOR CYCTWS
1833 C3CC18               JMP   DR4
                *
1836 3A6CØ8    DIH1       LDA   IMAGOC       IF LEGAL %AVG CALL
1839 1F                   RAR                THEN HONOR IT.
183A 1F                   RAR
183B 1F                   RAR
183C 1F                   RAR                PIN#12 TO DØ
183D 3A6EØ8               LDA   IMAGOE       PIN#13-15 TO D1-D3
184Ø 17                   RAL
1841 E6ØF                 ANI   15
1843 FEØ1                 CPI   1
1845 CA5B18               JZ    DRCYØ       CALL "1"
1848 FEØ3                 CPI   3
184A CA5A18               JZ    DRCY1       CALL "2"
184D FEØ5                 CPI   5
184F CA5918               JZ    DRCY2       CALL "3"
1852 FEØ9                 CPI   9
1854 3EØ6                 MVI   A,6         CALL "4"
1856 C26618               JNZ   DIH1A
1859 3D        DRCY2      DCR   A
185A 3D        DRCY1      DCR   A
185B 326DØ9    DRCYØ      STA   CYCNUM
185E 3EØ8                 MVI   A,8
186Ø 329DØ9               STA   DIRNEW
1863 C3CC18               JMP   DR4
                *
1866 3A95Ø9    DIH1A      LDA   UNERFL      % SWITCHES WRONG?
1869 E6Ø2                 ANI   2
186B C2BD18               JNZ   DRS3        YES; GO INTO AVG
                *
186E 3A9FØ9               LDA   DIRDES      DESIRED = AVERAGE?
1871 47                   MOV   B,A
1872 E6Ø3                 ANI   3
1874 CAA218               JZ    DR1
                *
1877 3A9CØ9               LDA   DIRSTAT     NO;
187A A8                   XRA   B           DESIRED = CURRENT?
187B CABØ18               JZ    DRS1
                *
187E A8                   XRA   B           NO;
187F E6Ø3                 ANI   3           CURRENT = AVERAGE?
1881 CA9318               JZ    DR2
                *
1884 3AABØ9    DR3        LDA   INTOAVTM    NO;  TIMER = Ø?
1887 A7                   ANA   A
1888 CABD18               JZ    DRS3
                *
188B F68Ø                 ORI   X'8Ø'       NO; BE SURE IT
                *                           DECREMENTS.
188D 32ABØ9               STA   INTOAVTM
189Ø C3CC18               JMP   DR4
                *
1893 3AAAØ9    DR2        LDA   INAVTM      TIMER = Ø?
1896 A7                   ANA   A
1897 CAAC18               JZ    DRS2
                *
189A F68Ø                 ORI   X'8Ø'       NO; BE SURE IT
                *                           DECREMENTS.
189C 32AAØ9               STA   INAVTM
189F C3CC18               JMP   DR4
                *
18A2 3A9CØ9    DR1        LDA   DIRSTAT     DESIRED = CURRENT?
18A5 A8                   XRA   B
```

```
18A6 CAC218          JZ   DRS4       YES; NO CHANGE.
18A9 C38418          JMP  DR3        NO; CONSIDER CHG.
                *
18AC 78      DRS2    MOV  A,B        SETUP NEW DIRECTION
18AD 329D09          STA  DIRNEW     (INBOUND/OUTBOUND)
                *
18B0 3A7E0C  DRS1    LDA  INTOTWS    REINITIALIZE MODE
18B3 2F              CMA             EXIT TIMER.
18B4 E60F            ANI  15
18B6 07              RLC
18B7 32AB09          STA  INTOAVTM
18BA C3CC18          JMP  DR4
                *
18BD 3E04    DRS3    MVI  A,4        SETUP AVG MODE.
18BF 329D09          STA  DIRNEW
                *
18C2 3A7F0C  DRS4    LDA  INTWS      REINITIALIZE MODE
18C5 AF              XRA  A          EXIT TIMER.
18C6 E60F            ANI  15         DEFEATED 7/20
18C8 07              RLC
18C9 32AA09          STA  INAVTM
                *
18CC 00      DR4     DC   0,0,0
18CD 00
18CE 00
18CF E1              POP  H
18D0 D1              POP  D
18D1 C1              POP  B
18D2 C9              RET
                *    DIRCALC   ONCE PER CYCLE
                *
                *CALLED BY DIRSEL, CALCULATES DIRECTION
                *ON BASIS OF INBOUND AND OUTBOUND VOLUME
                *UNLESEE VOLUME BYPASSED THEN OCCUPANCY.
                *IF BOTH BYPASSED, THEN AVERAGE.
                *IN/(IN+OUT) COMPARED WITH TWS IN%,OUT%
                *IF IN+OUT=0 THEN AVERAGE, IF OUT=0 THEN
                *INBOUND.
                *
18D3 3A4209  DIRCALC LDA  BYPVOL      BOTH INVALID?
18D6 E603            ANI  3
18D8 FE03            CPI  3
18DA CA1519          JZ   TRYOCC
                *
18DD 217C09          LXI  H,SENSAV   INBOUND
18E0 118808          LXI  D,INTEM
18E3 CDF107          CALL MAXVAL1
18E6 13              INX  D
18E7 AF              XRA  A
18E8 12              STAX D
                *
18E9 3A4209          LDA  BYPVOL     BOTH INVALID?
18EC 1F              RAR
18ED 1F              RAR
18EE E603            ANI  3
18F0 FE03            CPI  3
18F2 CA1519          JZ   TRYOCC
                *
18F5 23              INX  H          OUTBOUND
18F6 23              INX  H
18F7 13              INX  D
18F8 CDF107          CALL MAXVAL1
18FB 1A              LDAX D
18FC 47              MOV  B,A
18FD 13              INX  D
18FE AF              XRA  A
18FF 12              STAX D
                *
1900 3A8808          LDA  INTEM      IF IN+OUT=0 THEN
1903 4F              MOV  C,A        AVERAGE MODE
1904 80              ADD  B
1905 219008          LXI  H,BDIN
1908 77              MOV  M,A
1909 CAD919          JZ   AVGMODE
190C 23              INX  H
```

```
190D 3E00          MVI  A,0
190F CE00          ACI  0
1911 77            MOV  M,A
1912 C35219        JMP  BIN
            *
            * LACKING VOLUME, TRY OCCUPANCY DATA
            *
1915 3A4309 TRYOCC LDA  BYPOCC     BOTH INVALID?
1918 E603          ANI  3
191A FE03          CPI  3
191C CAD919        JZ   AVGMODE
            *
191F 216809        LXI  H,RUNAVG   INBOUND
1922 118208        LXI  D,TEMP2
1925 CDF107        CALL MAXVAL1
1928 13            INX  D
1929 AF            XRA  A
192A 12            STAX D
            *
192B 3A4309        LDA  BYPOCC     BOTH INVALID?
192E 1F            RAR
192F 1F            RAR
1930 E603          ANI  3
1932 FE03          CPI  3
1934 CAD919        JZ   AVGMODE
            *
1937 23            INX  H          OUTBOUND
1938 23            INX  H
1939 118008        LXI  D,TEMP1
193C CDF107        CALL MAXVAL1
            *
193F EB            XCHG            IF IN+OUT=0 THEN
1940 3A8208        LDA  TEMP2      AVERAGE MODE
1943 86            ADD  M
1944 27            DAA
1945 CAD919        JZ   AVGMODE    TEMP2 IS "IN"
1948 77            MOV  M,A        TEMP1 "IN+OUT"
1949 23            INX  H
194A 3E00          MVI  A,0
194C CE00          ACI  0
194E 77            MOV  M,A
194F C36B19        JMP  RATIO
            *
1952 CD8004 BIN    CALL BINDEC     CONVERT IN+OUT TO
1955 2AB008        LHLD DIFF       DECIMAL
1958 228008        SHLD TEMP1      STORE IN TEMP1
195B 219008        LXI  H,BDIN     RETRIEVE IN
195E 71            MOV  M,C
195F 23            INX  H
1960 3600          MVI  M,0
1962 CD8004        CALL BINDEC     CONVERT TO DECIMAL
1965 2AB008        LHLD DIFF
1968 228208        SHLD TEMP2      STORE IN TEMP2
            *
196B 218202 RATIO  LXI  H,TEMP2-X'800'+X'200'
196E CD8003        CALL NIBLFT     SHIFT ONCE
            *
1971 118108        LXI  D,TEMP1+1  IF(IN+OUT<10)THEN
1974 1A            LDAX D          MULTIPLY BOTH BY 10
1975 A7            ANA  A
1976 C28C19        JNZ  DC34
1979 1B            DCX  D
197A 1A            LDAX D
197B FE10          CPI  X'10'
197D D28C19        JNC  DC34
            *
1980 218002        LXI  H,TEMP1-X'800'+X'200'
1983 CD8003        CALL NIBLFT     IN+OUT *10
1986 218202        LXI  H,TEMP2-X'800'+X'200'
1989 CD8003        CALL NIBLFT     IN *10
            *
198C 1680   DC34   MVI  D,TEMP1
198E 1E82          MVI  E,TEMP2
1990 CD1006        CALL DECDIV     FORM IN/(IN+OUT)
1993 00            NOP             =DIRCAL
1994 3AA608        LDA  X'8A6'     DECIMAL POINT
```

```
1997 4F             MOV  C,A
1998 21A303 ZOAD    LXI  H,X'03A3'
199B CD8003         CALL NIBLFT    ADJUST DIRCAL
199E 0D             DCR  C
199F C29819         JNZ  ZOAD
            *
19A2 2AA408         LHLD X'8A4'    IF =100 THEN SET
19A5 22F408         SHLD DIRCAL    FOR DISPLAY
19A8 AF             XRA  A          IN INBOUND
19A9 BD             CMP  L
19AA C2B319         JNZ  DIRC1
19AD BC             CMP  H
19AE 3E01           MVI  A,1
19B0 C2DB19         JNZ  EXITDC
19B3 45     DIRC1   MOV  B,L
            *
19B4 218808         LXI  H,INTEM
19B7 1E78           MVI  E,X'78'   FETCH IN TWS(%)
19B9 CDC61A         CALL TWS2
19BC 218A08         LXI  H,OUT     FETCH OUT TWS(%)
19BF 1E7A           MVI  E,X'7A'
19C1 CDC61A         CALL TWS2
19C4 3A8A08         LDA  OUT
19C7 B8             CMP  B
19C8 3E02           MVI  A,2       OUTBOUND
19CA CAD919         JZ   AVGMODE   JUMP IF DIRCAL=OUT
19CD D2DB19         JNC  EXITDC    JUMP IF DIRCAL<OUT
19D0 3A8808         LDA  INTEM
19D3 B8             CMP  B
19D4 3E01           MVI  A,1       INBOUND
19D6 DADB19         JC   EXITDC    JUMP IF DIRCAL>IN
            *IF OUT=<DIRCAL=<IN AVERAGE IS SELECTED
19D9 3E04   AVGMODE MVI  A,4       AVERAGE
19DB 329F09 EXITDC  STA  DIRDES
19DE C9             RET
            *       SPDCVT         ONCE PER CYCLE
            *
            *       SELECT SPEED WARP BY FITTING
            *       MAXIMUM VALID OCCUPANCY % IN
            *       CURRENT DIRECTION TO TWS %
            *       VALUES, AND RETURNING "1.00" IF
            *       INPUT SWITCHES ARE OUT OF ORDER
            *       OR CALCULATED VALUE IS LESS THAN
            *       FIRST SWITCH OR MODE= AVERAGE.
            *
            *       IN %AVG MODE, CYCNUM SELECTS SPWP
            *
            *       SPEEDWARP DOES NOT CHANGE FROM
            *       ONE TWS SETTING TO ANOTHER
            *       WITHOUT WAITING FOR "INAVG" TIME.
            *       IT WILL CHANGE TO OR FROM 100%
            *       WITHOUT DELAY, HOWEVER.
            *
            *       SET UP LED TO REFLECT CHOICE.
            *       NO LED ON MEANS OUTPUT IS 100%
            *
19DF E5     SPDCVT  PUSH H
19E0 D5             PUSH D
19E1 C5             PUSH B
            *
19E2 3A9D09         LDA  DIRNEW    % AVG   MODE?
19E5 E608           ANI  8
19E7 CAFF19         JZ   SP3
            *
19EA 21A809         LXI  H,SPEEDTM YES,CLEAR TIMER
19ED 3600           MVI  M,0
19EF 3A6D09         LDA  CYCNUM    FETCH #
19F2 3D             DCR  A
19F3 CA3F1A         JZ   SPD2      IF CYCNUM=1,100%
19F6 07             RLC
19F7 2F             CMA
19F8 3C             INR  A
19F9 C636           ADI  SPDOFF
19FB 5F             MOV  E,A
19FC C3781A         JMP  SPJ2C
```

```
                 *
19FF 3A95Ø9 SP3      LDA  UNERFL     UNIT ERROR FLAG
1AØ2 E6Ø4            ANI  4
1AØ4 C23F1A          JNZ  SPD2       OCCUP % TWS WRONG
                 *
1AØ7 3A9DØ9          LDA  DIRNEW     AVERAGE ?
1AØA E6Ø3            ANI  3
1AØC CA3F1A          JZ   SPD2       IF SO, 1ØØ% RET
                 *
1AØF 1F              RAR             DIRECTIONAL
1A1Ø 3A43Ø9          LDA  BYPOCC
1A13 2168Ø9          LXI  H,RUNAVG
1A16 DA1D1A          JC   SPG        JUMP IF INBOUND
                 *
1A19 1F              RAR             OUTBOUND BYPASS
1A1A 1F              RAR
1A1B 23              INX  H          OUTBOUND RUNAVG
1A1C 23              INX  H
                 *
1A1D E6Ø3   SPG      ANI  3
1A1F 4F              MOV  C,A   RELEVANT BYPASS BITS
1A2Ø FEØ3            CPI  3
1A22 CA3F1A          JZ   SPD2       IF BOTH DEAD, 1ØØ%
                 *
1A25 116CØ9          LXI  D,OCCWRP   FETCH MAX VALID
1A28 CDF1Ø7          CALL MAXVAL1
                 *
1A2B 1A              LDAX D
1A2C 57              MOV  D,A
1A2D Ø181Ø8          LXI  B,STEMP2
                 *
1A3Ø 1E2E            MVI  E,OCCPCT   SET UP TWS PTR
1A32 6Ø              MOV  H,B
1A33 69              MOV  L,C
1A34 CDC61A          CALL TWS2       GET FIRST NUMBER
                 *
1A37 ØA              LDAX B          IS INPUT<TWS(1) ?
1A38 BA              CMP  D
1A39 CA4F1A          JZ   SPE1
1A3C DA4F1A          JC   SPE1
                 *
1A3F ØØ     SPD2     DC   Ø,Ø,Ø
1A4Ø ØØ
1A41 ØØ
1A42 AF              XRA  A          YES,SET OUTPUT TO
1A43 21ØØØ1          LXI  H,X'Ø1ØØ'  "1ØØ%"
1A46 32A8Ø9          STA  SPEEDTM    THIS IS ALSO ERROR
1A49 225EØ9          SHLD SPDWRP     DEFAULT RETURN.
1A4C C3B31A          JMP  SPK3
                 *
1A4F 2182Ø8 SPE1     LXI  H,STEMP3
                 *
1A52 ØØ     SPF1     DC   Ø,Ø,Ø
1A53 ØØ
1A54 ØØ
1A55 1D              DCR  E          BUMP TWS PTR
1A56 1D              DCR  E
1A57 CDC61A          CALL TWS2       GET NEXT VALUE
                 *
1A5A ØA              LDAX B         STEMP3>STEMP2 ?
1A5B BE              CMP  M
1A5C D23F1A          JNC  SPD2       THAT IS, IN ORDER?
                 *
1A5F 7A              MOV  A,D        INPUT< NEXT
1A6Ø BE              CMP  M
1A61 DA741A          JC   SPJ2
                 *
1A64 7B              MOV  A,E        NO, END OF LOOP?
1A65 FE28            CPI  OCCPCT-6
1A67 C26F1A          JNZ  SPJ2A
                 *
1A6A 1D              DCR  E          YES, GET LAST SPD
1A6B 1D              DCR  E
1A6C C3741A          JMP  SPJ2
```

```
              *
1A6F 7E       SPJ2A  MOV  A,M        NO; SHIFT NEW TO
1A70 02              STAX B          OLD.
1A71 C3521A          JMP  SPF1
              *
1A74 7B       SPJ2   MOV  A,E        SET TWS PTR FOR
1A75 C60A            ADI  SPDOFF-OCCPCT+2   PREVIOUS
1A77 5F              MOV  E,A        SWITCH FROM SPEED
              *                      OFFSET COLUMN.
              *
1A78 218408   SPJ2C  LXI  H,STEMP4   GET NEW VALUE
1A7B CDE11A          CALL TWS3
1A7E D5              PUSH D
              *
1A7F 115E09          LXI  D,SPDWRP   COMPARE WITH OLD
1A82 CD0003          CALL COMPARE
1A85 D1              POP  D
1A86 CAA71A          JZ   SPJ5       IS IT THE SAME?
              *
1A89 3AA809          LDA  SPEEDTM    NO; DELAY OVER?
1A8C A7              ANA  A
1A8D C2C21A          JNZ  SPK4
              *
1A90 2A8408          LHLD STEMP4   YES,CHECK FOR NO
1A93 7D              MOV  A,L        HARDWARE MODULE
1A94 B4              ORA  H
1A95 CA3F1A          JZ   SPD2       IF NOT, 100%
              *                      NORMAL, SET UP
1A98 225E09          SHLD SPDWRP     VALUE AND LIGHTS.
1A9B 3A7F0C          LDA  INAVGTWS   ALSO SET UP TIMER
1A9E 2F              CMA
1A9F E60F            ANI  15
1AA1 07              RLC
1AA2 F680            ORI  X'80'
1AA4 32A809          STA  SPEEDTM
              *
1AA7 7B       SPJ5   MOV  A,E        DEVELOP LED WORD
1AA8 D62E            SUI  SPDOFF-8
1AAA 1F              RAR
1AAB 47              MOV  B,A        BY SHIFTING A BIT
1AAC AF              XRA  A          INTO CORRECT
1AAD 37              STC             POSITION.
1AAE 17       SPJ6   RAL
1AAF 05              DCR  B
1AB0 C2AE1A          JNZ  SPJ6
              *
1AB3 2F       SPK3   CMA             NOTE THAT ERROR
1AB4 E60F            ANI  15         DEFAULT IS LED OFF
1AB6 21EA08          LXI  H,DISPSPD
1AB9 47              MOV  B,A
1ABA 7E              MOV  A,M
1ABB E6F0            ANI  X'F0'
1ABD B0              ORA  B
1ABE 70              MOV  M,B
1ABF 32EA08          STA  DISPSPD
              *
1AC2 C1       SPK4   POP  B
1AC3 D1              POP  D
1AC4 E1              POP  H
1AC5 C9              RET
              *      THUMB WHEEL SWITCH INPUT
              *
              *      LXI  H,DESTINATION (TWO BYTES)
              *      MVI  E,SOURCE (ONE BYTE)
              *
              *      CALL TWS2 (TWO BYTE SWITCHES)
              *                OR
              *      CALL TWS3  (THREE DIGIT SWITCHES)
              *
              *      SOURCES ARE IN COMPLEMENTED FORM
              *      DESTINATIONS IN NORMAL BCD
              *
              *      (SOURCE) = X MSD          TWS2
              *      (SOURCE+1) = X LSD
              *      (DESTINATION) = MSD LSD
```

```
              *
              *       (SOURCE) = X MSD            TWS3
              *       (SOURCE+8) = X ISD
              *       (SOURCE+9) = X LSD
              *       (DESTINATION) = ISD LSD
              *       (DESTINATION+1) = Ø MSD
              *
1AC6 C5       TWS2    PUSH B
1AC7 D5               PUSH D
              *
1AC8 16ØC             MVI  D,X'ØC'  SOURCE IS IN 'ØCXX'
1ACA CDFA1A           CALL WCHECK    FETCH BYTE
1ACD E6ØF             ANI  X'ØF'
1ACF Ø7               RLC
1ADØ Ø7               RLC
1AD1 Ø7               RLC
1AD2 Ø7               RLC
1AD3 47               MOV  B,A
1AD4 1C               INR  E
1AD5 CDFA1A           CALL WCHECK    FETCH BYTE
1AD8 E6ØF             ANI  X'ØF'
1ADA BØ               ORA  B
1ADB 2F               CMA            UNCOMPLEMENT
1ADC 77               MOV  M,A
1ADD D1               POP  D
1ADE C1               POP  B
1ADF C9               RET
              *
1AEØ ØØ               NOP
1AE1 D5       TWS3    PUSH D
1AE2 7B               MOV  A,E       SET UP TO GET LOW
1AE3 C6Ø8             ADI  X'Ø8'     BYTE WITH TWS2.
1AE5 5F               MOV  E,A
1AE6 CDC61A           CALL TWS2
1AE9 23               INX  H
1AEA 7B               MOV  A,E
1AEB D6Ø8             SUI  X'Ø8'
1AED 5F               MOV  E,A
              *
1AEE 16ØC             MVI  D,X'ØC'
1AFØ CDFA1A           CALL WCHECK    GET HIGH BYTE
1AF3 2F               CMA
1AF4 E6ØF             ANI  X'ØF'
1AF6 77               MOV  M,A
1AF7 2B               DCX  H
1AF8 D1               POP  D
1AF9 C9               RET
1AFA E5       WCHECK  PUSH H         GET BYTE POSSIBLY
1AFB 7B               MOV  A,E       OVERRIDDEN BY
1AFC 1F               RAR            INCOMING TELEMETRY
1AFD F6CØ             ORI  X'CØ'     ADDRESS/2+9CØ
1AFF 6F               MOV  L,A
1BØØ 26Ø9             MVI  H,9
1BØ2 7B               MOV  A,E
1BØ3 1F               RAR
1BØ4 7E               MOV  A,M
1BØ5 DAØC1B           JC   TWSW   IF DØ=Ø THEN HIGH NIB
1BØ8 ØF               RRC         ELSE LOW NIBBLE
1BØ9 ØF               RRC
1BØA ØF               RRC
1BØB ØF               RRC
1BØC E6ØF     TWSW    ANI  15   CHECK FOR DATA PRESENT
1BØE E1               POP  H
1BØF CØ               RNZ     VALID DATA CAN'T BE ZERO
1B1Ø 1A               LDAX D  GET RAW TWS DATA INSTEAD
1B11 C9               RET
              *       CYCTWS   ONCE PER AVG CYCLE CALC
              *
              *       CHOOSE TWS CYCLE TIME <= 299 SEC
              *       CLOSEST TO CALCULATED VALUE
              *       OR SET BY CYCNUM.
              *       TURN ON APPROPRIATE LED.
              *
              *       NOTE THAT CALCULATED CYCLE LENGTH
              *       ARRIVES IN AVCALC AND SELECTED
              *       VALUE DEPARTS IN AVSEL  .
```

```
                *
1B12 C5         CYCTWS PUSH B
1B13 D5                PUSH D
1B14 E5                PUSH H
                *
1B15 ØØ                DC   Ø,Ø,Ø
1B16 ØØ
1B17 ØØ
1B18 3A9DØ9            LDA  DIRNEW
1B1B E618              ANI  24          %AVG OR MANUAL
1B1D CA471B            JZ   CY1
                *
1B2Ø 3A6DØ9            LDA  CYCNUM
1B23 4F                MOV  C,A
1B24 Ø7                RLC              ACQUIRE THE TWS
1B25 47                MOV  B,A         CYCLE LENGTH.
1B26 3E18              MVI  A,ACLTWS4+2
1B28 ØØ                NOP
1B29 9Ø                SUB  B
1B2A 5F                MOV  E,A
1B2B 215CØ9            LXI  H,AVSEL
1B2E CDE11A            CALL TWS3
                *
1B31 3E1Ø              MVI  A,16        SETUP APPROPRIATE
1B33 ØF         MF2    RRC              LED.
1B34 ØD                DCR  C
1B35 C2331B            JNZ  MF2
1B38 2F         CY34   CMA
1B39 E6ØF              ANI  15
1B3B 47                MOV  B,A
1B3C 21E8Ø8            LXI  H,DISPACL
1B3F 7E                MOV  A,M
1B4Ø E6FØ              ANI  X'FØ'
1B42 BØ                ORA  B
1B43 77                MOV  M,A
1B44 C3961B            JMP  CYEXIT
                *
1B47 2A6EØ9     CY1    LHLD AVCALC      ACQUIRE AND DOUBLE
1B4A 225CØ9            SHLD AVSEL       CALCULATED CYCLE
1B4D EB                XCHG             LENGTH.
1B4E 215CØ9            LXI  H,AVSEL
1B51 CDEBØ7            CALL AIM
1B54 ØØ                DC   Ø,Ø
1B55 ØØ
                *
1B56 Ø616              MVI  B,AVGTWS    SET FIRST TWS
1B58 CD9A1B            CALL CON2        GET VALUE<=299
                *                       INTO YTEMP3
                *
1B5B 2A82Ø8     CON4   LHLD YTEMP3      MOVE CURRENT TO
1B5E 228ØØ8            SHLD YTEMP2      LAST
                *
1B61 Ø5                DCR  B
1B62 Ø5                DCR  B           NEXT TWS
                *
1B63 78                MOV  A,B         CHECK IF FIFTH
1B64 FEØE              CPI  AVGTWS-8
1B66 CA7E1B            JZ   CON3
                *
1B69 CD9A1B            CALL CON2        GET CURRENT TWS
1B6C 1182Ø8            LXI  D,YTEMP3
1B6F 218ØØ8            LXI  H,YTEMP2
1B72 CDFAØ7            CALL AIP  YTEMP2:=YTEMP2+CURRENT
                *
1B75 115CØ9            LXI  D,AVSEL     AVSEL >YTEMP2?
1B78 CDØØØ3            CALL COMPARE
                *
1B7B D25B1B            JNC  CON4        LOOP IF SO
                *
1B7E Ø4         CON3   INR  B           RETURN WITH LAST
1B7F Ø4                INR  B
1B8Ø 58                MOV  E,B
1B81 215CØ9            LXI  H,AVSEL
1B84 CDE11A            CALL TWS3
```

```
                *
1B87 78                MOV  A,B       DETERMINE WHICH
1B88 D60E              SUI  AVGTWS-8  LED AND TURN IT ON
1B8A 1F                RAR
1B8B 47                MOV  B,A       AND THE OTHERS OFF
1B8C AF                XRA  A
1B8D 37                STC
1B8E 17         CY2    RAL
1B8F 05                DCR  B
1B90 C28E1B            JNZ  CY2
1B93 C3381B            JMP  CY34      SETUP AND EXIT
                *
1B96 E1         CYEXIT POP  H
1B97 D1                POP  D
1B98 C1                POP  B
1B99 C9                RET
                *
1B9A 58         CON2   MOV  E,B       GET A VALUE INTO
1B9B 218208            LXI  H,YTEMP3  YTEMP3 AND CHECK
1B9E CDE11A            CALL TWS3      THAT IT IS <=299
1BA1 11B21B            LXI  D,CNV299
1BA4 CD0003            CALL COMPARE
1BA7 D0                RNC
                *                     IF NOT,
1BA8 2AB21B            LHLD CNV299    SET MAX CYCLE =299
1BAB 228208            SHLD YTEMP3    OVERRIDING TWS
1BAE 218208            LXI  H,YTEMP3
1BB1 C9                RET
1BB2 99         CNV299 DC   X'99'     ' INPUT HIGH LIMIT
1BB3 02                DC   X'02'     =299 BCD
1BB4                   ORG  X'1BEE'
1BEE C30018            JMP  DIRSEL
1BF1 C3121B            JMP  CYCTWS
1BF4 C3E11A            JMP  TWS3
1BF7 C3C61A            JMP  TWS2
1BFA C3DF19            JMP  SPDCVT
1BFD 00                DC   0,0,0     FOR CHKSM ETC
1BFE 00
1BFF 00
1C00                   END  0
                   ASSEMBLER

                *      RAMP   ONCE PER CYCLE
                *
22C5 C5         RAMP   PUSH B
22C6 D5                PUSH D
22C7 E5                PUSH H
22C8 11C808            LXI  D,TTRS    FETCH RAMP DATA
22CB 3A9C09            LDA  DIRSTAT   [DIRECTION]
22CE 1F                RAR
22CF DAD522            JC   RP1
22D2 11CB08            LXI  D,TTRS+3
22D5 1A         RP1    LDAX D
22D6 6F                MOV  L,A
22D7 2600              MVI  H,0
22D9 228008            SHLD TEMP1
22DC 13                INX  D
22DD 1A                LDAX D
22DE 6C                MOV  L,H
22DF 67                MOV  H,A
22E0 225809            SHLD GAPMIN
22E3 13                INX  D
22E4 1A                LDAX D
22E5 67                MOV  H,A
22E6 225A09            SHLD GAPSIZ-1
                *  CALCULATE GAPDIF=GAPINTL-GAPMIN
22E9 215A09            LXI  H,GAPINTL  LOAD SUBTRAHEND
22EC 115809            LXI  D,GAPMIN   LOAD MINUEND
22EF CDC003            CALL SUBDEC     SUBTRACT
                *  CALCULATE GAPDECR=GAPDIF/TTR
22F2 1EB0              MVI  E,DIFF     LOAD DIVIDEND ADR
22F4 1680              MVI  D,TEMP1    LOAD DIVISOR ADR
22F6 CD1006            CALL DIVIDE     DIVIDE
                *
```

```
              *  ADJUST QUOTIENT & STORE GAPDECR
22F9 21A303         LXI  H,X'3A3'  SET UP FOR SHIFT
22FC 3AA608         LDA  DECPOS    GET DECIMAL POS.
22FF 47             MOV  B,A
2300 05             DCR  B         DECR. BY 1
2301 E5      LEFT1  PUSH H         SAVE NIBLEFT PARAMETERS
2302 CD8003         CALL NIBLFT   MULTIPLY BY 10
2305 E1             POP  H         RESTORE HL
2306 05             DCR  B         DECR. POSITION
2307 C20123         JNZ  LEFT1     SHIFT AGAIN
230A 2AA408         LHLD QUOTIENT+1  FETCH ADJUSTED QUOTIENT
230D 225609         SHLD GAPDECR   STORE GAPDECR
2310 E1             POP  H
2311 D1             POP  D
2312 C1             POP  B
2313 C9             RET
                 ASSEMBLER

              *     BASCYCNW       ONCE PER CYCLE
              *     GIVEN S2 CALL,MANUAL, AUTO SPLIT
              *     SET UP SPLIT,BASECYC, BASEOLD
              *
2314          BASCYCNW EQU *
2314 E5             PUSH H
2315 D5             PUSH D
2316 C5             PUSH B
              *
2317 3A9D09         LDA  DIRNEW    IF MANUAL,IGNORE
231A E610           ANI  16        THRESHOLD
231C C22D23         JNZ  BSA1
              *
231F 215409         LXI  H,AUSPTH
2322 118609         LXI  D,ECLGN   AUSPTH>ECLGN?
2325 CD0003         CALL COMPAR
2328 3E01           MVI  A,1
232A D23423         JNC  BCE1      NO, GET SPLIT 2
              *
232D 3A6C08  BSA1   LDA  IMAGOC    FETCH S2 CALL INPT
2330 E604           ANI  4
2332 1F             RAR
2333 1F             RAR
              *
2334 47      BCE1   MOV  B,A       STORE SPLIT INFO
2335 219E09         LXI  H,SPLIT
2338 7E             MOV  A,M
2339 E6FE           ANI  X'FE'
233B B0             ORA  B
233C 77             MOV  M,A     SAVE IN D0 OF SPLIT
              *
233D 2A9809         LHLD BASECYC   SAVE LAST BASECYC
2340 22AE09         SHLD BASEOLD
              *
2343 AF             XRA  A         SELECT NEW MSST
2344 B8             CMP  B
2345 CA4E23         JZ   BCE2
2348 2A9A09         LHLD MSST2
234B C35123         JMP  BCE3
234E 2A9609  BCE2   LHLD MSST1
2351 229809  BCE3   SHLD BASECYC STORE IT IN NEW
              *
2354 C1             POP  B
2355 D1             POP  D
2356 E1             POP  H
2357 C9             RET
              *     MATHEMATICAL UTILITIES
              *
0000                ORG  X'0700'
              *
09BC          MINGN  EQU  X'09BC'
098A          MAXGN  EQU  X'098A'
0300          COMPAR EQU  X'0300'
              *
              *     SUBROUTINE ADD I: EDIATE  **AIM**
              *     (HL) := (HL) + D    TWO BYTE BCD
```

```
                *
0700 7E        AIM     MOV   A,M
0701 83                ADD   E
0702 27                DAA
0703 77                MOV   M,A
0704 23                INX   H
0705 7A                MOV   A,D
0706 8E                ADC   M
0707 27                DAA
0708 77                MOV   M,A
0709 2B                DCX   H
070A C9                RET
070B 00                DC    0,0,0
070C 00
070D 00
                *
                *       SUBROUTINE ADD IN PLACE    **AIP**
                *       (HL) := (HL) + (DE)  TWO BYTE BCD
                *
070E D5        AIP     PUSH D
070F E5                PUSH H
0710 EB                XCHG
0711 5E                MOV   E,M
0712 23                INX   H
0713 56                MOV   D,M
0714 E1                POP   H
0715 CD0007            CALL AIM
0718 D1                POP   D
0719 C9                RET
071A 00                DC    0,0,0
071B 00
071C 00
071D E5        MAXVAL2 PUSH H        GLOBAL SUBOUTINE
071E 1F                RAR            MAXIMUM VALID
                *                    D0,D1 =1 IF INVALID
071F DA3D07            JC    TRY2     WEIGHTED CAR COUNT
0722 1F                RAR            (DE),(DE+2) SOURCE
0723 DA3207            JC    USE1     (HL) DESTINATION
0726 62                MOV   H,D
0727 6B                MOV   L,E
0728 23                INX   H
0729 23                INX   H
072A CD0003            CALL COMPAR
072D D23207            JNC   USE1
0730 13        USE2    INX   D
0731 13                INX   D
0732 EB        USE1    XCHG
0733 CD4C07            CALL DSUSR
0736 EB                XCHG
0737 E1                POP   H
0738 73                MOV   M,E
0739 23                INX   H
073A 72                MOV   M,D
073B 2B                DCX   H
073C C9                RET
073D 1F        TRY2    RAR
073E D23007            JNC   USE2
0741 E1                POP   H
0742 3600              MVI   M,0
0744 23                INX   H
0745 3600              MVI   M,0
0747 2B                DCX   H
0748 C9                RET
0749 00                DC    0,0,0
074A 00
074B 00
                *       GLOBAL SUBROUTINE SHIFTS RIGHT
                *       ONE DIGIT WITHIN A TWO BYTE #
                *       IN (HL) . RESULT IS LEFT IN HL.
                *
074C D5        DSUSR   PUSH D
074D 5E                MOV   E,M
074E 23                INX   H
074F 56                MOV   D,M
0750 EB                XCHG
```

```
0751 AF            XRA  A
0752 29            DAD  H
0753 8F            ADC  A
0754 29            DAD  H
0755 8F            ADC  A
0756 29            DAD  H
0757 8F            ADC  A
0758 29            DAD  H
0759 8F            ADC  A
075A 6C            MOV  L,H
075B 67            MOV  H,A
075C D1            POP  D
075D C9            RET
075E 00            DC   0,0,0
075F 00
0760 00
          *        MAXVAL1 MAXIMUM VALID % OCCUP
          *
          *        (HL) % PAIR INPUT
          *        D0,D1 OF A =0 IF VALID
          *        (DE) IS DESTINATION
          *
0761 C5   MAXVAL1 PUSH B        GLOBAL SUBROUTINE
0762 E5            PUSH H
0763 E603          ANI  3
0765 4F            MOV  C,A
0766 D603          SUI  3         MAXIMUM VALID
0768 CA7E07        JZ   DSUZ      OCCUPANCY
076B 7E            MOV  A,M
076C 23            INX  H
076D BE            CMP  M
076E 79            MOV  A,C
076F D27707        JNC  DSUF
0772 FE02          CPI  2
0774 C27D07        JNZ  DSUSD
0777 FE01  DSUF    CPI  1
0779 CA7D07        JZ   DSUSD
077C 2B            DCX  H
077D 7E    DSUSD   MOV  A,M
077E 12    DSUZ    STAX D
077F E1            POP  H
0780 C1            POP  B
0781 C9            RET
0782 00            DC   0,0,0
0783 00
0784 00
          *        GRBND BOUNDS (HL) WITH MIN AND
          *              MAX GREEN AND RETURNS IN HL
          *
0785 D5    GRBND   PUSH D
0786 11BC09        LXI  D,MINGN
0789 CD0003        CALL COMPAR
078C D29907        JNC  REPL
078F 118A09        LXI  D,MAXGN
0792 CD0003        CALL COMPAR
0795 DA9907        JC   REPL
0798 EB            XCHG
0799 1A    REPL    LDAX D
079A 6F            MOV  L,A
079B 13            INX  D
079C 1A            LDAX D
079D 67            MOV  H,A
079E D1            POP  D
079F C9            RET
07A0               ORG  X'07EB'
07EB C30007        JMP  AIM
07EE C38507        JMP  GRBND
07F1 C36107        JMP  MAXVAL1
07F4 C34C07        JMP  DSUSR
07F7 C31D07        JMP  MAXVAL2
07FA C30E07        JMP  AIP
07FD 00            DC   0,0,0
07FE 00
07FF 00
0800               END  0
```

```
                 *      7670 SECONDARY PROM 0000-03FF
                 *STARTUP ROUTINE FOR SECONDARY
                 *
0800             RAMST  EQU  X'800'     START OF RAM ADDR
000A             RAMEND EQU  X'0A'
02A3             DECAD1 EQU  X'02A3'
03C0             SUBDEC EQU  X'03C0'
0840             SPSET  EQU  X'0840'    STACK POINTER
0865             TRM    EQU  X'0865'
0869             TRP    EQU  X'0869'
086F             SYNCEDGE EQU X'086F'
087C             PHDR   EQU  X'087C'
08C0             ECLB   EQU  X'08C0'
08C2             SPDWRP EQU  X'08C2'
08CB             CLEAR  EQU  X'08CB'
08F0             ECLP   EQU  X'08F0'
0900             QUEUE  EQU  X'0900'
0972             ECLT   EQU  X'0972'
0974             TELFAIL EQU X'0974'
097A             CYCSTAT EQU X'097A'
0980             PHASE0 EQU  X'0980'
09C0             ECLB1  EQU  X'09C0'
0C09             SWITCH EQU  X'0C09'
0736             PHTMSET EQU X'0736'
                 *
0000                    ORG  X'0040'
                 * CLEAR RAM
0040 210008             LXI  H,RAMST
0043 AF          CLRIT  XRA  A
0044 77                 MOV  M,A        CLEAR A BYTE
0045 23                 INX  H
0046 7C                 MOV  A,H        FETCH MSD ADDR
0047 FE0A               CPI  RAMEND     SEE IF OVER TOP
0049 C24300             JNZ  CLRIT      LOOP UNTIL DONE
                 *
                 * INITIALIZE STACK POINTER
004C 314008             LXI  SP,SPSET
                 *
                 * INITIALIZE OUTPUTS
004F 3EFF               MVI  A,X'FF'
0051 320B0D             STA  X'D0B'
0054 320C0D             STA  X'D0C'
0057 320E0D             STA  X'D0E'
005A 32100D             STA  X'D10'
005D 32200D             STA  X'D20'
0060 32300D             STA  X'D30'
                 *
                 * INITIALIZE RAM AREAS
0063 3E03               MVI  A,3
0065 32CB08             STA  CLEAR      CLEARANCE=3
                 *
                 * READ SWITCH ON DISPLAY
0068 3A090C             LDA  SWITCH
006B 2F                 CMA
006C E60F               ANI  X'0F'
                 *
                 * FIND CYCLE LENGTH
006E 21C400             LXI  H,TABLE
0071 85                 ADD  L
0072 6F                 MOV  L,A
0073 6E                 MOV  L,M        CYCLE LENGTH
0074 AF                 XRA  A
0075 67                 MOV  H,A
                 *
                 * STORE CYCLE LENGTH
0076 22F008             SHLD ECLP
0079 226908             SHLD TRP
007C 226508             SHLD TRM
007F 220209             SHLD QUEUE+2
0082 227209             SHLD ECLT
0085 227C08             SHLD PHDR
                 *
                 * CALCULATE ECLB
0088 CD3607             CALL PHTMSET
008B 21F008             LXI  H,ECLP
008E 118009             LXI  D,PHASE0
```

```
0091 CDC003         CALL SUBDEC     ECLP-PHASE0
0094 21CB08         LXI  H,CLEAR
0097 CDA302         CALL DECAD1     ECLP-PHASE0+CLEAR
009A 2AB008         LHLD X'08B0'
009D 22C009         SHLD ECLB1
00A0 22C008         SHLD ECLB
00A3 210001         LXI  H,X'0100'
00A6 22C208         SHLD SPDWRP
00A9 3E01           MVI  A,1
00AB 327A09         STA  CYCSTAT
00AE 327409         STA  TELFAIL
00B1 326F08         STA  SYNCEDGE
00B4 3EF5           MVI  A,X'F5'
00B6 327E09         STA  X'97E'     IMAGD0B=X'F5'
00B9 3EFF           MVI  A,X'FF'
00BB 325D08         STA  X'85D'     IMAGD0C=X'FF'
00BE 325B08         STA  X'85B'     IMAGD0E=X'FF'
00C1 C3CE00         JMP  DRIVER
               *
00C4 40        TABLE DC  64,64,64,64,64
00C5 40
00C6 40
00C7 40
00C8 40
00C9 50             DC   X'50',X'60',X'70'
00CA 60
00CB 70
00CC 80             DC   X'80',X'90'
00CD 90
               *DRIVER
               *   THIS ROUTINE CONTINUES CALLING "PRIORITY" UNTIL A
               *100MS MARK IS REACHED.  IT THEN CHECKS THE 100MS
               *COUNTER FOR ZERO.  IF IT IS ZERO THIS INDICATES A ONE
               *SECOND MARK AND A JUMP TO "TRFCTL" IS EXECUTED.  IF
               *NOT A ONE SECOND MARK,  "DISPLAY" IS CALLED AND THE
               *CALL "PRIORITY" LOOP CONTINUED.
               *
               *
0712           PRIORITY EQU X'0712'
0772           DISPLAY  EQU X'0772'
0784           IACTRL EQU  X'0784'
0862           ACT    EQU  X'0862'
13F1           TRFCTL EQU  X'13F1'
2BE5           KILLFD EQU  X'2BE5'
2BE8           PTRDSP EQU  X'2BE8'
               *
00CE           DRIVER EQU  *
00CE CD1207         CALL PRIORITY
00D1 D2CE00         JNC  DRIVER     WAIT FOR 100MS MARK FLAG
00D4 CD8407         CALL IACTRL     I.A. CTRL ROUTINE
00D7 CDE52B         CALL KILLFD
00DA 3A6208         LDA  ACT        FETCH 100MS CTR
00DD A7             ANA  A          SET FLAGS
00DE CAF113         JZ   TRFCTL     JUMP ON 1 SEC MARK
00E1 CD7207         CALL DISPLAY
00E4 CDE82B         CALL PTRDSP
00E7 C3CE00         JMP  DRIVER     CONTINUE LOOP
               *
00EA                ORG  X'01FA'
01FA C400           DC   B(TABLE),0
01FC 00
01FD C3CE00         JMP  DRIVER
               *         CLEAR
               * THIS ROUTINE CLEARS RAM (256 BYTES
               * MAX.). STARTING POINT IS LOADED IN
               * H&L REGS. C REGISTER HOLDS NUMBER
               * OF CONSECUTIVE LOCNS TO BE CLEARED.
               *
               * PREFACE:  21   LXI H,
               *           --
               *           --
               *           0E   MVI C,
               *           --
               *           CD   CALL CLEAR
               *           E0
               *           02
```

```
                *
                * RESULT: ALL ADDRESSED RAM IS CLEARED.
                *
02D4                  ORG X'02E0'
                *CLEAR  EQU *
02E0 E5               PUSH H
02E1 C5               PUSH B
02E2 AF               XRA  A
02E3 77         CT02  MOV  M,A     CLR MEMORY LOCN.
02E4 23               INX  H       STEP TO NEXT ADDR.
02E5 0D               DCR  C       DECR COUNT.
02E6 C2E302           JNZ  CT02    GO TO NEXT LOCN IF
02E9 C1               POP  B       COUNT NOT ZERO.
02EA E1               POP  H
02EB C9               RET
                *             NIBBLE                  *
                *
                * TAKES BYTE FROM A AND BREAKS IT INTO
                * TWO NIBBLES WHICH ARE THEN STORED IN
                * SUCCESSIVE MEMORY LOCATIONS.
                *
                * PREFACE: 1.LOAD A WITH BYTE.
                *          2.SET FIRST ADDR WITH LXI,H.
                *          3.CALL NIBBLE (02ED).
                *
02EC                  ORG  X'02ED'
02ED C5         NIBBLE PUSH B
02EE 47               MOV  B,A     MOVE BYTE TO B.
02EF E60F             ANI  X'0F'   MASK 4 MS BITS.
02F1 77               MOV  M,A     STORE.
02F2 2C               INR  L       INCR HL.
02F3 78               MOV  A,B     MOVE BYTE TO A.
02F4 0F               RRC          SHIFT ACCUMULATOR 4
02F5 0F               RRC          BITS TO THE RIGHT.
02F6 0F               RRC
02F7 0F               RRC
02F8 E60F             ANI  X'0F'   MASK 4 MS BITS.
02FA 77               MOV  M,A     STORE IN NEXT LOCN.
02FB 2C               INR  L       INCR HL.
02FC C1               POP  B
02FD C9               RET
                *     COMPARE (0300 - 031C)           *
                *
                * COMPARES ANY PAIR OF TWO BYTE MEMORY
                * LOCATIONS AND INDICATES RELATIVE
                * MAGNITUDES.
                * PREFACE:  LXI H (LSD OF 2 BYTE PAIR)
                *           LXI D (LSD OF 2 BYTE PAIR)
                *           CALL COMPARE (0300)
                * RESULT: IF CARRY SET, HL > DE.
                *         IF ZERO SET, HL = DE.
                *
02FE                  ORG X'0300'
0300            COMPARE EQU *
0300 E5               PUSH H
0301 D5               PUSH D
0302 00               NOP
0303 AF               XRA A
0304 2C               INR L          SET UP MSD FIRST.
0305 1C               INR E
0306 1A               LDAX D
0307 BE               CMP M
0308 DA1A03           JC AT03        H > D = CARRY
030B C21A03           JNZ AT03       H < D = NO ZERO,
                *                    NO CARRY.
030E 2D               DCR L          MOVE TO LSD.
030F 1D               DCR E
0310 00               NOP
0311 1A               LDAX D
0312 BE               CMP M
0313 DA1A03           JC AT03        H > D = CARRY.
0316 C21A03           JNZ AT03       H < D = NO ZERO,
                *                          NO CARRY.
0319 00               NOP            IF NO JUMPS H = D,
031A D1         AT03  POP D          ZERO FLAG SET.
```

```
031B E1              POP H
031C C9              RET
                +
                +    SUBROUTINE TO SEE IF TWO DEC.
                +    ARGS ARE EQUAL (CARRY SET IF TRUE)
                +    RP B=FIRST VALUE TO BE COMPARED
                +    RP H=SECOND VALUE "   "    "  "
                +    REG. D= # OF NIBBLES TO COMPARE
                +
0595            SUB01  EQU  +
0595 79                MOV  A,C
0596 BE                CMP  M
0597 C2B805            JNZ  SU01
059A 7A                MOV  A,D
059B FE03              CPI  3
059D FAB005            JM   SU02
05A0 C2B205            JNZ  SU03
05A3 2C                INR  L
05A4 78                MOV  A,B
05A5 E60F              ANI  X'F'
05A7 47                MOV  B,A
05A8 7E                MOV  A,M
05A9 E60F              ANI  X'F'
05AB B8         SU08   CMP  B
05AC C2B705            JNZ  SU04
05AF 2D                DCR  L
05B0 37         SU02   STC
05B1 C9                RET
05B2 2C         SU03   INR  L
05B3 7E                MOV  A,M
05B4 C3AB05            JMP  SU08
05B7 2D         SU04   DCR  L
05B8 AF         SU01   XRA  A
05B9 C9                RET
                ++++++++++++++++++++++++++++++++++++++++
                +                                      +
                +      DIVIDE  (0610 - 065F)           +
                +                                      +
                ++++++++++++++++++++++++++++++++++++++++
                + THIS ROUTINE DIVIDES 4 DIGITS BY
                + 4 DIGITS.
                + PREFACE:
                + 1.LOAD D WITH LSD OF ADDR OF DIVIDEND
                +    (MSD = 08).
                + 2.LOAD E WITH LSD OF ADDR OF DIVISOR
                +    (MSD = 08).
                + 3.CALL DIVIDE (0610).
                + RESULT:
                + 1.QUOTIENT IS STORED AT 08A3 - 08A5.
                + 2.DECIMAL POINT IS STORED AT 08A6
                + (INCREMENTS WITH EACH DIVISOR SHIFT).
                +
                +
                +         ++ EQUATES ++
0890            DIVISOR EQU X'0890'    LSD OF DIVISOR
08B0            DIVDEND EQU X'08B0'    LSD OF DIVIDEND
08A3            QUOT EQU X'08A3'       LSD OF QUOTIENT
                +
                +
                +        ++ ROUTINES CALLED ++
0230            TRANSFER EQU X'0230' PART OF TRANSAR
02A0            DECADD EQU X'02A0'  ADD 3 BYTES .
0380            NIBLEFT EQU X'0380'   4 BIT LEFT SHIFT
03A0            DECOMP EQU X'03A0'   10,000 COMPL'MT.
0670            DIVSETUP EQU X'0670'  MOVES DIVIDEND &
                +   DIVISOR TO 08B0 &0890 RESPECTIVELY.
06A0            DIVSHIFT EQU X'06A0'  SHIFTS OUT ZEROES.
                +      IN DIVISOR.
06D0            COMPDIV EQU X'06D0'  COMPLEMENT DIVISOR
                +
                +
05BA                   ORG X'0610'
0610            DIVIDE EQU +
0610 00                NOP
0611 E5                PUSH H
```

```
0612 C5                PUSH B
0613 00                NOP
               * CLEAR REGISTERS, MOVE DIVIDEND TO
               * 08B0. MOVE DIVISOR TO 0890.
0614 CD7006            CALL DIVSETUP
0617 00                NOP
0618 CDA006            CALL DIVSHIFT  MOVE OUT ZEROES.
061B CA5C06            JZ EXIT1
061E CDD006            CALL COMPDIV  COMPLEMENT DIVISOR
0621 0E04              MVI C,X'04'   COUNT 4 DIGITS
0623 00                NOP
0624 0600      AT06    MVI B,X'00'   CLR QUOT REG
0626 00                NOP
0627 CDA002    BT06    CALL DECADD   ADD 3 BYTES
062A 00                NOP
062B 3AB208            LDA DIVDEND+2   CHK STATUS DIVI-
               *                       DEND MSD.
062E A7                ANA A
062F 00                NOP
0630 FA3906            JM CT06      JMP IF "9" INDICATED
0633 00                NOP          OVER-SUBTRACTION.
0634 04                INR B        INCR QUOTIENT.
0635 C32706            JMP BT06     RETURN: Z=1 VALID
0638 00                NOP          Z=0 INVALID (/ BY 0)
0639 219008    CT06    LXI H,DIVISOR
063C AF                XRA A
063D CDA302            CALL DECADD+3
0640 00                NOP
               * WRITE BACK NEW QUOTIENT.
0641 21A308            LXI H,QUOT
0644 78                MOV A,B
0645 86                ADD M
0646 77                MOV M,A
0647 0D                DCR C
0648 CA5D06            JZ EXIT2
064B 00                NOP
064C 21A303            LXI H,X'03A3'  SET UP REGS.
064F CD8003            CALL NIBLEFT   SHIFT QUOT LEFT.
0652 00                NOP
0653 21B003            LXI H,X'03B0'  SET UP REGS.
0656 CD8003            CALL NIBLEFT   SHIFT DIV'ND.
0659 C32406            JMP AT06
065C 0C        EXIT1   INR C
065D C1        EXIT2   POP B
065E E1                POP H
065F C9                RET
               ****************************************
               *                                      *
               *       DIVSETUP   (0670 - 069F)       *
               *                                      *
               ****************************************
               *
               * DIVSETUP TAKES DIVIDEND & DIVISOR FROM
               * ANY PAIR OF BYTES IN RAM LOCNS 0800-
               * 08FF AND MOVES DIVIDEND TO 08B0 AND
               * THE DIVISOR TO 0890.
               *
               * PREFACE:   LXI D
               *              -   (E=DIV'ND) TO 08B0
               *              -   (D=DIV'OR) TO 0890
               *            CALL DIVSETUP (0670)
               *
               *
0660                   ORG X'0670'
0670 C5                PUSH B
0671 D5                PUSH D
0672 E5                PUSH H
0673 00                NOP
0674 00                NOP
0675 42                MOV B,D   MOVE DIV'ND TO 08B0
0676 16B0              MVI D,X'B0'
0678 0E02              MVI C,X'02'
067A CD3002            CALL TRANSFER
067D 00                NOP
067E 00                NOP
```

```
067F 00              NOP
0680 58              MOV E,B   MOVE DIVISOR TO 0890
0681 1690            MVI D,X'90'
0683 0E02            MVI C,X'02'
0685 CD3002          CALL TRANSFER
0688 00              NOP
0689 00              NOP
068A 00              NOP
068B AF              XRA A     CLR A
068C 21A308          LXI H,QUOT
068F 77              MOV M,A   CLR QUOT LOCNS
0690 2C              INR L
0691 77              MOV M,A
0692 2C              INR L
0693 77              MOV M,A
0694 2C              INR  L
0695 77              MOV  M,A
0696 329208          STA DIVISOR+2      CLR MSD DIVISOR
0699 32B208          STA DIVDEND+2      CLR MSD DIV'ND
069C E1              POP H
069D D1              POP D
069E C1              POP B
069F C9              RET
            ****************************************
            *                                      *
            *      DIVSHIFT    (06A0 - 06BF)       *
            *                                      *
            ****************************************
            *
            * ROUTINE SHIFTS OUT ZEROES IN MSD OF
            * DIVISOR. USED BY DIVIDE ROUTINE.
            *
            * PREFACE: CALL DIVSHIFT (06A0)
            *
            * RESULT: DECIMAL PT
            *              0           D.CBA
            *              1           DC.BA
            *              2           DCB.A
            *              3           DCBA.
            *
            *
06A0                 ORG X'06A0'
06A0 E5              PUSH H
06A1 C5              PUSH B
06A2 00              NOP
06A3 AF              XRA A         START COUNT AT "0"
06A4 4F              MOV C,A       FOR DECIMAL PT.
06A5 00              NOP
06A6 3A9108 DT06     LDA DIVISOR+1     LOOK FOR ZERO,
06A9 E6F0            ANI X'F0'         MSD,DIVISOR.
06AB 00              NOP
06AC C2BD06          JNZ ET06     MSD OCCUPIED, EXIT.
06AF 219002          LXI H,X'0290'  SET UP FOR CALL.
06B2 CD8003          CALL NIBLEFT   SHIFT DIVISOR.
06B5 0C              INR C        INCR DEC. PT. COUNT
06B6 79              MOV A,C      AND STORE.
06B7 32A608          STA QUOT+3
06BA C2A606          JNZ DT06     EXIT IF IN LOOP,
06BD C1     ET06     POP B        OTHERWISE LOAD FOR
06BE E1              POP H        NEXT MSD = 0 TEST.
06BF C9              RET
            ****************************************
            *                                      *
            *           COMPDIV                    *
            *                                      *
            ****************************************
            *
            * THIS ROUTINE COMPLEMENTS DIVISOR;
            * ROUTINE STARTS WITH:
            *    UNCOMPLEMENTED DIVISOR, SHIFTED
            *    LEFT IN 0890,0891. MSD OF DIVISOR
            *    IS CLEAR IN 0892.
            * ROUTINE ENDS WITH:
            *    COMPLEMENTED DIVISOR IN 0896,0897.
            *    ROUTINE SETS 0898 TO "99" TO
```

```
            *    EXTEND COMPLEMENTED WORD.
            * PREFACE: CALL COMPDIV (06D0)
            *
            *
06C0                ORG X'06D0'
06D0 D5             PUSH D
06D1 C5             PUSH B
06D2 00             NOP
            * TRANSFER 0890,0891 TO 0896,0897.
06D3 119096         LXI D,X'9690'
06D6 0E02           MVI C,X'02'
06D8 CD3002         CALL TRANSFER
06DB 00             NOP
06DC 00             NOP
            * COMPLEMENT 0896,0897
06DD 119608         LXI D,X'0896'
06E0 CDA003         CALL DECOMP  THE 10,000 COMPLM'T
06E3 00             NOP
06E4 C1             POP B
06E5 D1             POP D
06E6 C9             RET
06E7                END DIVIDE
            *    PRIORITY
            *
0000                ORG  X'1000'
            *
1000 E5     PRIORITY  PUSH H
1001 00             NOP
1002 00             NOP
            *
1003 3A0D0C         LDA  RTCLK      FETCH RT CLK
1006 E608           ANI  X'08'      ISOLATE D3
1008 21EE08         LXI  H,RTLAST
100B BE             CMP  M          COMP TO LAST VAL.
100C CA3610         JZ   IMMED      RETURN IF SAME
            *
            *  INCREMENT 100 MS. COUNTER.
100F 00             DC   0,0,0
1010 00
1011 00
1012 77             MOV  M,A        STORE NEW VAL.
1013 216208         LXI  H,ACT
1016 34             INR  M          INC 100MS CTR
1017 3E09           MVI  A,X'09'
1019 BE             CMP  M          SEE IF >9
101A D22210         JNC  CSYNC
101D AF             XRA  A
101E 77             MOV  M,A        RESET TO 0
101F 00             DC   0,0,0
1020 00
1021 00
            *
            *  CALL SYNC ROUTINE AND THEN MOVE
            * INCOMING TELEMETRY TO QUEUE.
1022 CD1807 CSYNC  CALL SYNC        DO SYNC PROCESS
1025 3A0E0C         LDA  INPUT      FETCH TELEMETRY
1028 32DA08         STA  TQUE       STORE IN QUEUE
102B CD5C11         CALL NIBVER     GO PROCESS TELEM.
102E 00             DC   0,0,0
102F 00
1030 00
1031 37             STC             SET CARRY
1032 E1             POP  H
1033 C9             RET             NORMAL RETURN
1034 00             NOP
1035 00             NOP
            *
1036 AF     IMMED   XRA  A          CLEAR CARRY
1037 E1             POP  H
1038 00             NOP
1039 C9             RET             IMMEDIATE RETURN
            *       "TRANSEFF"
            *
            *THIS ROUTINE TAKES INCOMING TELEMETRY
            *AND TRANSFERS IT TO APPPOPRIATE RAM.
```

```
            *IT IS CALLED BY "NIBVER".
            *
103A        TRANSEFF EQU *
103A C5           PUSH B
103B D5           PUSH D
103C E5           PUSH H
103D AF           XRA  A
103E 320908       STA  MSGST      CLR MSG STAT(CNT)
1041 325F08       STA  CKSUMST    RESET CHECKSUM ST.
1044 00           NOP
1045 00           NOP
            * SET UP FOR CHECKSUM
1046 21D008       LXI  H,MSG      MSG ADDR
1049 47           MOV  B,A        CLR CHKSUM
104A 110407       LXI  D,X'0704'  #BYTES,BITS/NYBBLE
            *
104D CDDA10       CALL CHKSM
1050 78           MOV  A,B        FETCH CHECKSUM
1051 E607         ANI  X'07'      ISOLATE D2-D0
1053 21D708       LXI  H,MSG+7    CHECKSUM NYBBLE
1056 BE           CMP  M
1057 0600         MVI  B,0        CLEAR FLAG REG.
1059 C2D210       JNZ  SETCKST
            *
            * IF CHECKSUM OK THEN CONTINUE....
            * MOVE IN MESSAGE PREFIX AND ECLZ
105C 21D008       LXI  H,MSG      PREFIX ADR
105F 7E           MOV  A,M        FETCH PREFIX
1060 FE0C         CPI  X'0C'
1062 CA6A10       JZ   TRN2
1065 FE0D         CPI  X'0D'
1067 C2D210       JNZ  SETCKST    JMP IF BAD PREFIX
            *
            *     PREFIX IS A "C" OR A "D"
            *
106A 118008 TRN2  LXI  D,ECLZ     ECLZ ADDR
106D 23           INX  H
106E 23           INX  H
106F 0E0F         MVI  C,X'0F'    LOAD MASK
1071 7E           MOV  A,M        FETCH MSG W2
1072 A1           ANA  C
1073 47           MOV  B,A        SAVE IT
1074 23           INX  H
1075 7E           MOV  A,M        FETCH W3
1076 A1           ANA  C
1077 07           RLC             LEFT
1078 07           RLC              JUSTIFY
1079 07           RLC               IT.
107A 07           RLC
107B B0           ORA  B          BRING IN LSD
107C 12           STAX D          STORE ISD/LSD,ECLZ
107D 13           INX  D
107E 23           INX  H
            *
            *  STORE DIRECTION,STROBE & ECLZ MSD.
107F 7E           MOV  A,M        FETCH W4
1080 E603         ANI  X'03'      ISOLATE D1-D0
1082 47           MOV  B,A        STORE IN B
1083 21D108       LXI  H,MSG+1
1086 7E           MOV  A,M
1087 0F           RRC             ROTATE STROBE
1088 0F           RRC              INTO D6.
1089 E640         ANI  X'40'      ISOLATE STROBE
108B B0           ORA  B          BRING IN D1-D0
108C 47           MOV  B,A        SAVE IN B
108D 7E           MOV  A,M        GET W1 AGAIN
108E A1           ANA  C
108F 1F           RAR             SHIFT OUT STROBE
1090 FE04         CPI  4          SEE IF %AVG
1092 C29610       JNZ  ROT
1095 3D           DCR  A          TURN ON IN&OUT BIT
1096 0F     ROT   RRC             ROTATE
1097 0F           RRC              INTO
1098 0F           RRC               D5-D4
1099 0F           RRC
```

```
109A B0             ORA   B          OR IN B
109B 12             STAX  D          STB,DIR,ECLZ/MSD
              *
              *  STORE SPEED WARP.
109C CDCA10         CALL  SWTYPE     DETERMINE IF %AVG.
109F 21D608         LXI   H,MSG+6
10A2 7E             MOV   A,M        FETCH W6
10A3 A1             ANA   C
10A4 07             RLC              SHIFT LEFT
10A5 07             RLC
10A6 07             RLC
10A7 07             RLC
10A8 47             MOV   B,A        SAVE IT
10A9 2B             DCX   H
10AA 7E             MOV   A,M        FETCH W5
10AB A1             ANA   C
10AC B0             ORA   B          OR IN B
10AD 13             INX   D
10AE 12             STAX  D          STR SW LSD/ISD
10AF 2B             DCX   H
10B0 7E             MOV   A,M        FETCH W4
10B1 E604           ANI   X'04'      ISOLATE D2
10B3 0F             RRC              SHIFT INTO D4.
10B4 0F             RRC
10B5 13             INX   D
10B6 12             STAX  D          STORE SW MSD
              *
              *  FLAG TELEMETRY AS BEING GOOD.
10B7 0680           MVI   B,X'80'    GOOD TELEM. FLAG
10B9 00             NOP
10BA 00             NOP
              *
              *  SET TELEMTRY FLAG AND RETURN.
10BB 218108 WRAPUPTE LXI  H,ECLZ+1
10BE 7E             MOV   A,M        FETCH FLAG BYTE
10BF E67F           ANI   X'7F'      TURN OFF D7
10C1 B0             ORA   B          BRING IN FLAG
10C2 77             MOV   M,A        WRITE BYTE
10C3 3E0C           MVI   A,X'0C'    LOAD A WITH PREFIX
10C5 00             NOP
10C6 E1             POP   H
10C7 D1             POP   D
10C8 C1             POP   B
10C9 C9             RET
              * %AVG? IF SO BUMP STORAGE LOC
10CA E630   SWTYPE  ANI   X'30'      ISOLATE DIRECTION
10CC EE30           XRI   X'30'      SEE IF %AVG
10CE C0             RNZ              RET IF NOT %AVG
10CF 13             INX   D          SET NEW ADDR
10D0 13             INX   D
10D1 C9             RET
              *
10D2 3E01   SETCKST MVI   A,1  FLAG CHKSM FAILURE
10D4 325F08         STA   CKSUMST
10D7 C3BB10         JMP   WRAPUPTE
              *
              *    CHKSM
              *
10DA 00     CHKSM   NOP
10DB 00             NOP
10DC 7E     NEXT    MOV   A,M        FETCH BYTE
10DD 4B             MOV   C,E        RESET BIT COUNT
10DE 1F     SHIFT   RAR              ROT. RT THRU CY
10DF D2E310         JNC   NOCY
10E2 04             INR   B          COUNT THE BIT
10E3 0D     NOCY    DCR   C          DCR BIT/BYTE CT.
10E4 C2DE10         JNZ   SHIFT      TEST IF END BYTE
10E7 23             INX   H          NEXT BYTE ADDR
10E8 15             DCR   D          DCR MSG SIZE
10E9 C2DC10         JNZ   NEXT       TEST IF DONE
10EC 00             NOP
10ED 00             NOP
10EE C9             RET
              *SYNC
              * ROUTINE CHECKS FOR THE PRESENCE OF
```

```
                * SYNC AND RESYNCS THE 100 MS CTR
                * IF NECESSARY.
                *
10EF C5         SYNC     PUSH B
10F0 E5                  PUSH H
10F1 00                  NOP
10F2 216108              LXI  H,TIMER    GET TIMER
10F5 7E                  MOV  A,M
10F6 A7                  ANA  A          SET FLAGS
10F7 F20411              JP   MAINSYNC   JUMP IF D7 OFF
10FA AF                  XRA  A
10FB 77                  MOV  M,A        CLEAR TIMER
10FC 3C                  INR  A          SET ACT = 1
10FD 23                  INX  H
10FE 77                  MOV  M,A
10FF C35911              JMP  EXITSY
1102 00                  NOP
1103 00                  NOP
                * LOOK AT THREE SUCCESSIVE LOCATIONS IN
                * TELEMETRY QUEUE BIT D3. IF ALL THREE
                * ARE IDENTICAL,UPDATE PREVIOUS READING.
                * IF THIS CAUSES A CHANGE, SET "START
                * SYNC" OR "END SYNC" FLAG.
                *
                *
1104 0E08       MAINSYNC MVI C,X'08'     SET MASK
1106 21DA08              LXI  H,QSYNC    TELEMETRY
1109 00                  NOP
110A 7E                  MOV  A,M        FETCH FIRST SYNC,
110B A1                  ANA  C          MASK, AND STORE
110C 47                  MOV  B,A
110D 00                  NOP
110E 2C                  INR  L          FETCH SECOND SYNC,
110F 7E                  MOV  A,M        MASK, AND COMPARE
1110 A1                  ANA  C          EXIT IF NO MATCH
1111 A8                  XRA  B
1112 C25911              JNZ  EXITSY
1115 00                  NOP
1116 00                  NOP
1117 2C                  INR  L          FETCH THIRD SYNC,
1118 7E                  MOV  A,M        MASK, AND COMPARE
1119 A1                  ANA  C          EXIT IF NO MATCH
111A A8                  XRA  B
111B C25911              JNZ  EXITSY
111E 00                  NOP
111F 00                  NOP
                * WE HAVE VALID SYNC. IF IT IS DIFFERENT
                * FROM OLD VALUE, UPDATE AND SET FLAGS.
1120 3A7109              LDA  SYNCFLTR   1 = SYNC PRESENT
1123 07                  RLC
1124 07                  RLC
1125 07                  RLC
1126 A8                  XRA  B
1127 CA5911              JZ   EXITSY
                * NEW SYNC LEVEL. SET FLAGS.
112A 00                  NOP
112B 00                  NOP
112C 78                  MOV  A,B
112D 0F                  RRC
112E 0F                  RRC
112F 0F                  RRC
1130 327109              STA  SYNCFLTR   UPDATE SYNCFLTR
1133 1F                  RAR
1134 DA3F11              JC   SYNSTART   CARRY=SYNC PRESENT
1137 3E80                MVI  A,X'80'
1139 326008              STA  SYNCSTAT   SET SYNC STATUS
113C C35911              JMP  EXITSY     TO "80"
                *
                * START OF SYNC DETECTED
113F 216208     SYNSTART LXI H,ACT       ADDR 100 MS CTR
1142 AF                  XRA  A
1143 BE                  CMP  M          IS CTR = 0 ?
1144 CA5911              JZ   EXITSY     RETURN IF 0
1147 3E05                MVI  A,5
1149 BE                  CMP  M          IS CTR > 5 ?
```

```
114A DA5511          JC   CLRIT      JUMP IF > 5
114D 2F              CMA             SET D7 HIGH
114E 2B              DCX  H
114F 77              MOV  M,A        STORE FLAG
1150 C35911          JMP  EXITSY
1153 00              NOP
1154 00              NOP
1155 AF       CLRIT  XRA  A
1156 77              MOV  M,A        CLR ACT
1157 00              NOP
1158 00              NOP
1159 E1       EXITSY POP  H
115A C1              POP  B
115B C9              RET
              *NIBVER
              *      CHECK THREE ELEMENTS OF QUEUE
              *      FOR CLOCK BITS 110 OR 001
              *      IF EQUAL CALL MESSCOMP
              *      THEN IN ANY CASE MOVE 5 ELEMENTS
              *      FORWARD ONE PLACE
              *
              * NIBVER EQU X'071B'
115C E5       NIBVER PUSH H
115D C5              PUSH B
115E 21DA08          LXI  H,TQUE     COMPARE CLOCK BITS
1161 0601            MVI  B,X'01'    OF FIRST TWO HALF
1163 7E              MOV  A,M        NIBBLES
1164 A0              ANA  B
1165 4F              MOV  C,A
1166 2C              INR  L
1167 7E              MOV  A,M
1168 A0              ANA  B
1169 B9              CMP  C
116A C27711          JNZ  NIB2       JUMP IF DIFFERENT
              *
116D 2C              INR  L          CHECK THIRD WORD
116E 7E              MOV  A,M
116F A0              ANA  B
1170 B9              CMP  C
1171 CA7711          JZ   NIB2       JUMP IF SAME
              *
1174 CD8811          CALL MESSCOMP
              *
1177 0E05     NIB2   MVI  C,X'05'    SHIFT 5 ELEMENTS
1179 21DA08          LXI  H,TQUE     UPSTORAGE BY ONE
117C 46              MOV  B,M
117D 78       NB3    MOV  A,B        TOP OF LOOP
117E 2C              INR  L
117F 46              MOV  B,M
1180 77              MOV  M,A
1181 0D              DCR  C
1182 C27D11          JNZ  NB3
1185 C1              POP  B
1186 E1              POP  H
1187 C9              RET
              *MESSCOMP
              *      CALL TRANSEFF IF HALF NIBBLE
              *      DURING HIGH CLOCK IS '3':
              *      CONSOLIDATE TWO VALID HALF
              *      NIBBLES INTO ONE NIBBLE.
              *      PLACE NIBBLE IN BUFFER AND
              *      INCREMENT BUFFER POINTER.
              *
              *MESSCOMP EQU X'071E'
1188 E5       MESSCOMP PUSH H
1189 C5              PUSH B
118A 00              NOP
118B 21F009          LXI  H,CLKCTR
118E 34              INR  M          INC. CLOCK COUNT
118F 3ADA08          LDA  TQUE       GET VALID NIBBLE
1192 1F              RAR
              *
1193 DA9E11          JC   MC2        JUMP IF CLOCK HI
              *
1196 E603            ANI  X'03'      ELSE STORE DATA
```

```
1198 32CA08          STA  NSCRATCH  AND RETURN
119B C1              POP  B
119C E1              POP  H
119D C9              RET
               *
119E 17       MC2    RAL            MOVE HALF NIBBLE
119F 17              RAL            TWO BITS LEFT
11A0 00              NOP
11A1 E60C            ANI  X'0C'
11A3 FE0C            CPI  X'0C'     CHECK BOTH BITS ON
11A5 4F              MOV  C,A       COMBINE WITH LAST
               *
               *IF MESSAGE HEADER "C" OR "D" DETECTED, PROCESS NEW MESSAGE
11A6 00              DC   0,0,0
11A7 00
11A8 00
11A9 C2B211          JNZ  MC3       JMP IF NOT NEW MSG
11AC CD3A10          CALL TRANSEFF
11AF CDB812          CALL TRANSMOD
               *
11B2 3ACA08 MC3      LDA  NSCRATCH  TWO BITS
11B5 B1              ORA  C         HIGH CLK IN D3D2
11B6 4F              MOV  C,A       LOW CLK IN D1D0
11B7 21D008          LXI  H,MSG     PLACE NIBBLE IN
11BA 3AC908          LDA  MSGST     (MSG+(MSGST))
11BD 85              ADD  L
11BE 6F              MOV  L,A
11BF 71              MOV  M,C
11C0 21C908          LXI  H,MSGST   INCR MSGST
11C3 34              INR  M
11C4 C1              POP  B
11C5 E1              POP  H
11C6 C9              RET
               *TRAFFIC CONTROL
               *CONTROLS THE EXECUTION OF THE MAIN
               *LINE ROUTINES IN THE SECONDARY
0754           QUEUE     EQU X'0754'
075D           OFFMAS    EQU X'075D'
0760           CTRMAS    EQU X'0760'
0763           CTRSEC    EQU X'0763'
0769           FREEOP    EQU X'0769'
0772           DISPLAY   EQU X'0772'
076F           MONITOR   EQU X'076F'
077B           PTR       EQU X'077B'
077E           INTADV    EQU X'077E'
0781           CPCRESET  EQU X'0781'
0784           IACTRL    EQU X'0784'
0852           ECLMF     EQU X'0852'
08C6           MOTELEM   EQU X'08C6'
0C38           SW2       EQU X'0C38'
               *
11C7 CD6512 TRFCTL CALL TELCHECK
11CA CD6007        CALL CTRMAS
11CD 00            DC   0,0,0
11CE 00
11CF 00
11D0 CD6307        CALL CTRSEC
11D3 00            DC   0,0,0
11D4 00
11D5 00
11D6 2A5208        LHLD ECLMF      SET UP FOR OFFMAS
11D9 22C608        SHLD MOTELEM
11DC CD5D07        CALL OFFMAS
11DF 00            DC   0,0,0
11E0 00
11E1 00
11E2 CD0010        CALL PRIORITY
11E5 CD5407        CALL QUEUE
11E8 00            DC   0,0,0
11E9 00
11EA 00
11EB CD0010        CALL PRIORITY
11EE 00            DC   0,0,0
11EF 00
11F0 00
```

```
11F1 CD2407           CALL OFFSEC
11F4 00               DC   0,0,0
11F5 00
11F6 00
11F7 CD4507           CALL SECSYNC
11FA 00               DC   0,0,0
11FB 00
11FC 00
11FD CD0010           CALL PRIORITY
1200 00               DC   0,0,0
1201 00
1202 00
1203 CD2A07           CALL SPLITIME
1206 D21512           JNC  NOT10       JUMP IF NOT "10 SECOND ROUTINES" TIME
1209 00               DC   0,0,0,0,0,0
120A 00
120B 00
120C 00
120D 00
120E 00
120F CD0C07           CALL DECISION
1212 00               DC   0,0,0
1213 00
1214 00
1215 CD2D07 NOT10     CALL PHASDECR
1218 00               DC   0,0,0
1219 00
121A 00
121B CD4E07           CALL EGTCALC
121E 00               DC   0,0,0
121F 00
1220 00
1221 CD0007           CALL FORCEOFF
1224 00               DC   0,0,0
1225 00
1226 00
1227 CD0307           CALL LATCHES
122A 00               DC   0,0,0
122B 00
122C 00
122D CD6F07           CALL MONITOR
1230 00               DC   0,0,0
1231 00
1232 00
1233 CD0010           CALL PRIORITY
1236 CD8107           CALL CPCRESET
1239 00               DC   0,0,0
123A 00
123B 00
123C CD7E07           CALL INTADV
123F 00               DC   0,0,0
1240 00
1241 00
1242 CD7B07           CALL PTR
1245 00               DC   0,0,0
1246 00
1247 00
1248 CD8407           CALL IACTRL
124B 00               DC   0,0,0
124C 00
124D 00
124E CD0010           CALL PRIORITY
1251 00               DC   0,0,0
1252 00
1253 00
1254 CD6907           CALL FREEOP
                 *
1257 CD7207 LOOP      CALL DISPLAY
125A 3A380C           LDA  SW2         HALT MOD, STOPS
125D AF               XRA  A  CLOCK,ENABLES BOX ONLY
125E 00               NOP
                 *    ANI  1           (AF00)
125F C25712           JNZ  LOOP
1262 C31001           JMP  DRIVER
```

```
             *TELCHECK
             *  THIS ROUTINE VERIFIES THE PRESENCE OF VALID TELEMETRY
             *AND SYNC.  IT IS CALLED ONCE A SECOND BY "TRFCTL".  LOSS
             *OF TELEMETRY IS ASSUMED IF NO TELEMETRY CLOCK TRANSITIONS
             *HAVE OCCURED IN THE SECOND SINCE THIS ROUTINE LAST CALLED.
             *SYNC FAILURE IS ASSUMED IF SYNC IS EIT*HER ON OR OFF
             *FOR A 300 SECOND PERIOD.
             *
             *A BYTE AT LOCATION X'974' (TELFAIL) CONTAINS THE STATUS
             *OF ANY TELEMETRY OR SYNC FAILURES:
             *
             *       D0=CHECKSUM FAILURE
             *       D1=LOSS OF TELEMETRY
             *       D2=SYNC FAILURE
             *
1265         TELCHECK EQU *
1265 C5             PUSH B
1266 D5             PUSH D
1267 E5             PUSH H
1268 217409         LXI  H,TELFAIL
126B AF             XRA  A
126C 47             MOV  B,A        ZERO OUT B
126D CD6607         CALL TELRESET   ATTEMPT TO RESET TELFAIL
             *
             *SET FLAG IF CLOCK TRANSITION COUNT=0
1270 00             NOP
1271 11F009         LXI  D,CLKCTR   ADDR OF COUNT
1274 1A             LDAX D          FETCH COUNT
1275 B7             ORA  A
1276 C27D12         JNZ  RESET
1279 7E             MOV  A,M        SET D1 OF TELFAIL
127A F602           ORI  2
127C 77             MOV  M,A
127D 78      RESET  MOV  A,B        GET ZEROS
127E 12             STAX D          RESET COUNT
             *
             *SET UP FOR SYNC VERIFICATION
127F 3A7109         LDA  SYNCFILT   FETCH SYNC STATUS
1282 B7             ORA  A
1283 C29212         JNZ  SYNCON
             *
             *IF SYNC IS OFF, RESET SYNC ON TIMER
1286 210000         LXI  H,0        RESET SYONCTR
1289 22F309         SHLD SYONCTR
128C 21F109         LXI  H,SYOFFCTR
128F C39B12         JMP  SYNCHK
             *
             *IF SYNC IS ON, RESET SYNC OFF TIMER
1292 210000  SYNCON LXI  H,0        RESET SYOFFCTR
1295 22F109         SHLD SYOFFCTR
1298 21F309         LXI  H,SYONCTR
             *
             *TEST FOR SYNC FAULT CONDITION
129B 110003  SYNCHK LXI  D,X'300'
129E CD0505         CALL INC3       INCR AND TEST=300
12A1 DAA712         JC   FAULT      JUMP IF =300
12A4 C3A912         JMP  WRAPUPTC
             *
             *TURN ON SYNC FAULT BIT(HOLD IT IN B)
12A7 0604    FAULT  MVI  B,4        TURN ON D2
             *
             *ADD CHECKSUM STATUS AND SYNC FAIL BIT TO TELFAIL & RET.
12A9 3A5F08  WRAPUPTC LDA  CKSUMST FETCH CHKSUM STAT.
12AC B0             ORA  B          OR IN SYNC FAIL
12AD 217409         LXI  H,TELFAIL
12B0 B6             ORA  M          COMBINE ALL BITS
12B1 77             MOV  M,A        WRITE TELFAIL
12B2 E1             POP  H
12B3 D1             POP  D
12B4 C1             POP  B
12B5 00             DC   0,0
12B6 00
12B7 C9             RET
```

```
         *       TRANSMOD
         *
         *   "TRANSEFF" TEMPORARILY STORES ALL TELEMETRY IN
         *0880-0887(SCRATCHPAD).  "TRANSMOD" DETERMINES THE
         *TYPE OF MESSAGE("C" OR "D") AND STORES TELEMETRY DATA
         *IN APPROPRIATE RAM LOCATIONS.
         *
12B8 3A5F08 TRANSMOD LDA  CKSUMST    FETCH CKSUM STAT
12BB 1F           RAR
12BC D8           RC                EXIT IF SET
12BD E5           PUSH H
12BE D5           PUSH D
12BF C5           PUSH B
         *
         *STORE STROBE AND DIRECTION(COMMON TO BOTH MSG TYPES)
12C0 21C108       LXI  H,ECLB+1  DESTINATION ADDR
12C3 118108       LXI  D,TEMP+1  SOURCE ADDR
12C6 1A           LDAX D
12C7 E670         ANI  X'70'     ISOLATE D6-D4
12C9 47           MOV  B,A       SAVE IN B
12CA 7E           MOV  A,M       FETCH 08C1
12CB E68F         ANI  X'8F'     CLEAR D6-D4
12CD B0           ORA  B         BRING IN NEW DATA
12CE 77           MOV  M,A       08C1,D6=STROBE;D5D4=DIRECTION
12CF 1A           LDAX D
12D0 E60F         ANI  X'0F'     STRIP D7-D4
12D2 12           STAX D          OF 0881.
         *
         *DETERMINE MESSAGE TYPE
12D3 3AD008       LDA MSG     MESSAGE "C" OR "D" ?
12D6 1F           RAR
12D7 D20213       JNC  CTYPE      JUMP IF "C"
         *
         *PROCESS "D" TYPE MESSAGE
12DA 7E           MOV  A,M       FETCH 08C1
12DB E6F0         ANI  X'F0'     ISOLATE D7-D4
12DD 2A8008       LHLD TEMP      FETCH ECLT
12E0 B4           ORA  H         ADD DIRECTION
12E1 67           MOV  H,A
12E2 227209       SHLD ECLT       & STORE IT
         *
12E5 3AD108       LDA  MSG+1     FETCH BYTE 2
12E8 E608         ANI  8         ISOLATE D3
12EA CAF912       JZ   AVDIR     JMP IF NOT %AVG
         *
12ED 2A8408       LHLD TEMP+4
12F0 22C408       SHLD PAVGSW    STORE %AVG SPDWARP
12F3 00           DC   0,0,0
12F4 00
12F5 00
12F6 C33613       JMP  EXITTM    RETURN
         *
12F9 2A8208 AVDIR  LHLD TEMP+2
12FC 22C208       SHLD SPDWRP    NON-%AVG SPDWARP
12FF C33613       JMP  EXITTM    RETURN
         *
         *PROCESS "C" TYPE MESSAGE
1302 00    CTYPE  DC   0,0,0
1303 00
1304 00
1305 1A           LDAX D         PICK UP 0881
1306 47           MOV  B,A       SAVE IN B
1307 7E           MOV  A,M       FETCH 08C1
1308 E670         ANI  X'70'      STRIP D7+ D3-D0
130A B0           ORA  B         BRING IN NEW DATA
130B 77           MOV  M,A       08C1,D3-D0=ECLB,MSD;D7=0
130C 1B           DCX  D         DE=0880
130D 1A           LDAX D
130E 2B           DCX  H         HL=08C0
130F 77           MOV  M,A       MOVE 0880 TO 08C0
1310 23           INX  H         HL=08C1
         *
1311 00           DC   0,0,0
1312 00
1313 00
```

```
1314 3AD408          LDA  MSG+4      GET SPLIT BIT
1317 E604            ANI  X'04'       ISOLATE IT
1319 CA3013          JZ   SPLIT1     TEST SPLIT
           *FALL THROUGH IF SPLIT2
131C 00              DC   0,0,0
131D 00
131E 00
131F 3E80            MVI  A,X'80'    TURN ON D7
1321 B6              ORA  M          OR WITH BYTE 2
1322 77              MOV  M,A        REWRITE WITH SPLIT
1323 00              NOP
1324 2A8008          LHLD TEMP
1327 22C209          SHLD ECLB2      STORE ECLB2
132A C33613          JMP  EXITTM
           *COME HERE IF SPLIT1
132D 00              DC   0,0,0
132E 00
132F 00
1330 2A8008 SPLIT1   LHLD TEMP
1333 22C009          SHLD ECLB1      STORE ELCB1
           *
1336 C1     EXITTM   POP  B
1337 D1              POP  D
1338 E1              POP  H
1339 00              DC   0,0,0
133A 00
133B 00
133C C9              RET
           *LIMITCHK
           *
           *         30<=(HL)<=299 ELSE (HL):=30
           *
           * LIMITCHK EQU X'0757'
133D E5     LIMITCHK PUSH H
133E D5              PUSH D
133F C5              PUSH B
1340 00              NOP
1341 00              NOP
1342 5E              MOV  E,M        FETCH LSD
1343 23              INX  H
1344 56              MOV  D,M        FETCH MSD
1345 EB              XCHG            DE=ADDR,HL=VALUE
           *
           * CHECK IF GREATER THAN 0299.
1346 7C              MOV  A,H
1347 FE03            CPI  X'03'
1349 D25A13          JNC  SET30      JMP IF MSD>2
134C 00              NOP
134D 00              NOP
           *
           * CHECK IF LESS THAN 0030.
134E 01CFFF          LXI  B,X'FFCF' COMPLEMENT OF 0030
1351 09              DAD  B          ADD TO VALUE
1352 D25A13          JNC  SET30      JMP IF <0030
           *
1355 C1     RETN     POP  B
1356 D1              POP  D
1357 E1              POP  H
1358 C9              RET             RETURN
1359 00              NOP
           *
           * SET VALUE TO 0030.
135A 1B     SET30    DCX  D
135B EB              XCHG            HL=ADDR OF VALUE
135C 3E30            MVI  A,X'30'
135E 77              MOV  M,A        LSD=30
135F 23              INX  H
1360 AF              XRA  A
1361 77              MOV  M,A        MSD=00
1362 C35513          JMP  RETN
           *
1365                 ORG  X'13DF'
13DF C30010          JMP  PRIORITY
13E2 C33A10          JMP  TRANSEFF
13E5 C3DA10          JMP  CHKSM
```

```
13E8 C3108? E610      JMP   SYNC
13EB C35C11           JMP   NIBVER
13EE C38811           JMP   MESSCOMP
13F1 C3C711           JMP   TRFCTL
13F4 C36512           JMP   TELCHECK
13F7 C3BA12           JMP   TRANSMOD
13FA C33D13           JMP   LIMITCHK
13FD 00               DC    0,0,0
13FE 00
13FF 00
               *        "NUMPHASE"
               *ROUTINE FINDS THE NUMBER OF THE LAST
               *PHASE BEING USED AND STORES THE VALUE
               *IN MAXP (1-7)
               *DOES THIS BY CHECKING PHASES 1 THRU
               *7 FOR ZERO DURATIONS.
               *
0000                  ORG   X'1400'
1400 0600     NUMPHASE MVI B,0      FIRST PHASE ALWAYS
1402 0E07             MVI   C,7         7 PHASES TO CHECK
1404 218209           LXI   H,PHASE0+2 FIRST PHASE TO CK
1407 7E       NPLOOP  MOV   A,M         GET PHASE DURATION
1408 B7               ORA   A
1409 CA1314           JZ    STOP     JUMP IF PHASE ABSENT
140C 04               INR   B           COUNT THIS PHASE
140D 23               INX   H           STEP TO NEXT PHASE
140E 23               INX   H
140F 0D               DCR   C
1410 C20714           JNZ   NPLOOP     LOOP IF MORE TO DO
               *
1413 78       STOP    MOV   A,B
1414 327F08           STA   MAXP        STORE (1-7)
1417 C9               RET
               *
               *        "SPLITIME"
               *
1418          SPLITIME EQU *
               *  SEE IF TRP = 0
1418 2A6908           LHLD TRP          FETCH TRP
141B 11FFFF           LXI   D,X'FFFF' HIGHEST 16 BIT VAL
141E 19               DAD   D
141F D23514           JNC   SETACT     NO CY IF TRP=0
               * SEE IF ADVREQ FLAG BIT IS SET
               * INDICATING DATA IS READY IN QUEUE FOR
               * PROCESSING.
1422 3A6409           LDA   ADVREQ
1425 1F               RAR
1426 D22A14           JNC   TST01     JUMP ADVREQ NOT SET
1429 C9               RET           RETURN WITH CY FLAG
142A 11FFFB   TST01   LXI   D,X'FBFF' PROTECT AGAINST
142D 2A6708           LHLD ACTP         ACTP>400.
1430 19               DAD   D
1431 DA3514           JC    SETACT
1434 C9               RET
               * COME HERE IF TRP=0.
1435 210000   SETACT  LXI   H,X'00'    SET ACTP =0.
1438 226708           SHLD ACTP
143B 219902           LXI   H,X'0299' SET PHDR = 299.
143E 226908           SHLD TRP
1441 227C08           SHLD PHDR
1444 3A5D08           LDA   IMAGDOC    IMAGE OF I/O DOC
1447 F602             ORI   2          SET BIT D1
1449 325D08           STA   IMAGDOC    RESET PHASE OMIT
144C AF               XRA   A
144D 327E08           STA   PHSTAT
1450 C9               RET
               *        "PHASE DECREMENT"
               *        ...CHUCK PERILLI
               *
               *
1451 E5       PHASDECR PUSH H
1452 D5               PUSH D
               *  DECREMENT PHASE TIMER AND RETURN
               *IF NOT TIMED OUT.
1453 217C08           LXI   H,PHDR
```

```
1456 CDA004          CALL DECR        CALL DECREMENT
1459 DA5F14          JC   TIMOUT      JUMP IF TIMED OUT
145C D1              POP  D
145D E1              POP  H
145E C9              RET              RETURN
            *
            * CHECK PHASE STATUS IF PHASE TIMED OUT.
145F 217E08 TIMOUT LXI  H,PHSTAT    PHASE STATUS
1462 56              MOV  D,M
1463 3A7F08          LDA  MAXP
1466 BA              CMP  D           LAST PHASE?
1467 CA8B14          JZ   LAST1       JUMP IF LAST DONE
146A 34              INR  M           INC PHASE STATUS
146B 3A7F08          LDA  MAXP        FETCH PHASE# LIMIT
146E BE              CMP  M
146F CA8314          JZ   LASTPH      JUMP IF LAST PHASE
            *
            *  IF NOT LAST PHASE, SET NEXT PHASE.
1472 7E     SETPH    MOV  A,M         PHASE STAT TO A
1473 07              RLC  A           MULT A*2
1474 218009          LXI  H,PHASE0    ADDR OF PHASE 0
1477 85              ADD  L           LSD ADDR+PH STATUS
1478 6F              MOV  L,A         PHASE-N LSD ADDR
1479 5E              MOV  E,M         E=1ST BYTE OF PH.
147A 2C              INR  L
147B 56              MOV  D,M         D=2ND BYTE OF PH.
147C EB              XCHG             SWAP DE/HL
147D 227C08          SHLD PHDR        STORE PHASE
1480 D1              POP  D
1481 E1              POP  H
1482 C9              RET              RETURN
            *
            *  IF LAST PHASE, CHECK OMIT FLAG.
            *IF FLAG IS OFF(-1), GO SET NEXT PHASE.
            *OF FLAG IS ON(=0), CLEAR PHASE STATUS
            *AND INITIALIZE PHASE 0.
1483 3A5D08 LASTPH LDA  IMAGDOC     FETCH OMIT FLAG
1486 1F              RAR
1487 1F              RAR              CARRY=D1
1488 DA7214          JC   SETPH       GO SET NEXT PHASE
148B AF     LAST1    XRA  A
148C 77              MOV  M,A         PHASE STAT=0
148D C37214          JMP  SETPH       GO SET PHASE 0.
            *TWS
            *SPLITSUM
            *PHTMSET
            *
            *TWS
            *ACQUIRE AND COMPACT THUMBWHEEL SWITCH
            *DATA USING FORMATCP
            *INPUT SS L LOW ORDER BYTE SOURCE
            *             HIGH ORDER ASSUMED '0C'
            *       DD H LOW ORDER BYTE DESTINATION
            *             HIGH ORDER ASSUMED '08'
            *SAMPLE CALL
            *       LXI  H,X'DDSS'
            *       CALL TWS
            *
            *       MSD SOURCE     MSB DEST+1
            *       ISD SOURCE+8   LSB DEST
            *       LSD SOURCE+9
            *
1490 C5     TWS      PUSH B
1491 D5              PUSH D
1492 4C              MOV  C,H         SAVE DESTINATION
1493 260C            MVI  H,X'0C'     ASSUMED SOURCE
1495 46              MOV  B,M         FETCH MSD
1496 7D              MOV  A,L         INCREMENT ADDR +8
1497 C608            ADI  8
1499 6F              MOV  L,A
149A 5E              MOV  E,M         FETCH ISD
149B 2C              INR  L           INCREMENT ADDR +1
149C 56              MOV  D,M         FETCH LSD
149D CD0907          CALL FORMATCP
14A0 69              MOV  L,C         RETRIEVE DEST
```

```
14A1 2608          MVI  H,X'08'    ASSUMED DEST
14A3 73            MOV  M,E        DEPOSIT LSB
14A4 2C            INR  L
14A5 72            MOV  M,D
14A6 D1            POP  D
14A7 C1            POP  B
14A8 C9            RET
            *SPLITSUM
            *PROGRAM ADDS PHASES 1 THRU 7 AND
            *SUBTRACTS SUM FROM ECLP.
            *THE RESULT IS STORED IN PHASE0.
            *IF ECLP-SUM IS NEGATIVE, ZERO IS USED
            *AS PHASE0.
            *
14A9 2AF008 SPLITSUM LHLD ECLP
14AC 228008         SHLD X'0880'
14AF 218008         LXI  H,X'0880'
14B2 118209         LXI  D,PHASE0+2
14B5 3A7F08         LDA  MAXP
14B8 4F             MOV  C,A
14B9 CDC003 LOOP    CALL SUBDEC  ECLP-(SUM OF PHASES)
14BC B7             ORA  A          SIGN
14BD CAD514         JZ   ERROR      JUMP IF NEGATIVE
14C0 13             INX  D          STEP TO NEXT PHASE
14C1 13             INX  D
14C2 E5             PUSH H
14C3 2AB008         LHLD X'08B0'    SAVE RESULT
14C6 228008         SHLD X'0880'
14C9 E1             POP  H
14CA 0D             DCR  C
14CB C2B914         JNZ  LOOP
            *
14CE 2AB008         LHLD X'08B0'
14D1 228009 SSSTORE  SHLD PHASE0
14D4 C9             RET
            *
14D5 210000 ERROR  LXI  H,0      ERROR, SET PHASE0=0
14D8 C3D114         JMP  SSSTORE
            *PHTMSET
            *PROGRAM FETCHES THUMBWHEEL SWITCH
            *SETTINGS AND STORES IN PHASE 1-3.
            *PHASES 4-7 ARE READ FROM THE DIP
            *SWITCH CARD, IF PRESENT.
            *THE PHASE TIMES ARE SUMMED AND
            *SUBTRACTED FROM ECLP TO YIELD MAIN
            *STREET GREEN.
            *MAXP IS SET TO THE MAXIMUM PHASE NUMBER
            *
14DB 110000 PHTMSET LXI  D,0
14DE 3A6B09         LDA  PRESD+3
14E1 B7             ORA  A
14E2 F2E814         JP   P2         SPLIT1
14E5 111000         LXI  D,X'0010'
14E8 212270 P2      LXI  H,X'7022'
14EB 19             DAD  D
14EC CD9014         CALL TWS
14EF 3A7008         LDA  X'0870'
14F2 328209         STA  PHASE0+2
14F5 212470         LXI  H,X'7024'
14F8 19             DAD  D
14F9 CD9014         CALL TWS
14FC 3A7008         LDA  X'0870'
14FF 328409         STA  PHASE0+4
1502 212670         LXI  H,X'7026'
1505 19             DAD  D
1506 CD9014         CALL TWS
1509 3A7008         LDA  X'0870'
150C 328609         STA  PHASE0+6
150F 3A003C         LDA  CARD
1512 F6F0           ORI  X'F0'      MASK IN 4 BITS
1514 FEFF           CPI  X'FF'
1516 CA2F15         JZ   OUT        JUMP IF NO CARD
            *CARD IS PRESENT, READ THE LAST FOUR
            *PHASE DURATIONS FROM IT.
1519 21003C         LXI  H,CARD
```

```
151C 7B              MOV  A,E        SPLIT OFFSET IS
151D 0F              RRC             ONLY 04 NOT 16(10)
151E 0F              RRC
151F 5F              MOV  E,A
1520 19              DAD  D          ADD SPLIT
1521 118809          LXI  D,PHASE0+8
1524 0604            MVI  B,4        4 PHASES
1526 7E      MOVE    MOV  A,M        GET VALUE
1527 12              STAX D          STORE PHASE(N)
1528 23              INX  H
1529 13              INX  D
152A 13              INX  D
152B 05              DCR  B
152C C22615          JNZ  MOVE       JUMP IF MORE
152F CD0014  OUT     CALL NUMPHASE
1532 CDA914          CALL SPLITSUM
1535 C9              RET
             *TRANSITION
             *
1536 21F008  TRNSTN  LXI  H,ECLP
1539 11FE08          LXI  D,DIFCOM
153C CD0003          CALL COMPARE
153F CA4515          JZ   RECO       ONE CYCLE LENGTH
1542 DAB515          JC   SMALDIF    ECLP>DIFCOM
1545 CD4B07  RECO    CALL QRECOV
1548 3AF308  R1      LDA  DIFF
154B B7              ORA  A
154C CADA15          JZ   SET        ALL IS OK
154F 21F008          LXI  H,ECLP
1552 11FE08          LXI  D,DIFCOM
1555 CD0003          CALL COMPARE
1558 DAB515          JC   SMALDIF
155B CD9915          CALL CMP2ECL    DIFCOM VS 2(ECLP)
155E D2AF15          JNC  LEN        DIFCOM SMALLER
1561 3A6309          LDA  COP2
1564 326109          STA  PRESENT
1567 326209          STA  NEXT
156A C603            ADI  3          DIRECTION BYTE
156C 6F              MOV  L,A        ADDRESS TO H,L
156D 2609            MVI  H,9
156F 7E              MOV  A,M        GET THE BYTE
1570 E630            ANI  X'30'      JUST DIRECT BITS
1572 EA8915          JPE  AVG        JUMP IF AVERAGE
1575 CD5107          CALL AVDIR      CREATE PHANTOM Q'S
1578 3A6209          LDA  NEXT
157B 326109          STA  PRESENT
157E C604            ADI  4
1580 FE60            CPI  X'60'
1582 FA8615          JM   R2
1585 AF              XRA  A          BEGINNING OF TABLE
1586 326209  R2      STA  NEXT
1589 CD7507  AVG     CALL MOVE0
158C CD2407          CALL OFFSEC
158F CD4507          CALL SECSYNC
1592 CD9915          CALL CMP2ECL    DIFCOM VS 2(ECLP)
1595 D24815          JNC  R1         DIFCOM SMALLER
1598 C7              RST  0          GIVE UP
             *CMP2ECL
             *SUBROUTINE TO COMPARE DIFCOM TO 2(ECLP)
1599 2AF008  CMP2ECL LHLD ECLP
159C 22B008          SHLD X'08B0'
159F 21F008          LXI  H,ECLP
15A2 CDA302          CALL DECAD1     FORM 2(ECLP)
15A5 21FE08          LXI  H,DIFCOM
15A8 11B008          LXI  D,X'08B0'  2(ECLP)
15AB CD0003          CALL COMPARE
15AE C9              RET
             *
15AF CD2C16  LEN     CALL LENGTHEN
15B2 C3D815          JMP  EXIT
             *DIFFERENCE IS LESS THAN CYCLE LENGTH
15B5 3AF308  SMALDIF LDA  DIFF
15B8 B7              ORA  A
15B9 FACA15          JM   TST60      POSITIVE SIGN
```

```
          *MULTIPLY ECLP BY .40 AND TEST DIFCOM
15BC 218008        LXI  H,X'0880' PUT 40 IN 0880
15BF 3640          MVI  M,X'40'
15C1 CDDC15        CALL MULCOM    DIFCOM-.40 ECLP
15C4 D2D515        JNC  SRT       DIFCOM SMALLER
15C7 CDF515        CALL SNCHG     MAKE DIFF POSITIVE
          *MULTIPLY ECLP BY .60 AND TEST DIFCOM
15CA 218008 TST60  LXI  H,X'0880' PUT 60 IN 0880
15CD 3660          MVI  M,X'60'
15CF CDDC15        CALL MULCOM    DIFCOM-.60 ECLP
15D2 D2AF15        JNC  LEN       DIFCOM SMALLER
15D5 CD5A07 SRT    CALL SHORTEN
          *
15D8 AF     EXIT   XRA  A         CLEAR CARRY
15D9 C9            RET
          *
15DA 37     SET    STC            SET CARRY
15DB C9            RET
          *MULTIPLY ECLP BY A PERCENTAGE AND
          *COMPARE TO DIFCOM
15DC 55     MULCOM MOV  D,L       SET MULTIPLY UP
15DD 2C            INR  L
15DE AF            XRA  A
15DF 77            MOV  M,A
15E0 1EF0          MVI  E,X'F0'   ECLP
15E2 CD2003        CALL DECMULT
          *COMPARE TO DIFCOM
15E5 2AB108        LHLD X'08B1'   ANS/100 (%)
15E8 228008        SHLD X'0880'
15EB 21FE08        LXI  H,DIFCOM
15EE 118008        LXI  D,X'0880' % ECLP
15F1 CD0003        CALL COMPARE
15F4 C9            RET
          *
          *SNCHG
          *SIGN CHANGE ROUTINE
          *DIFF=ECLP-DIFF
          *
15F5 21F008 SNCHG  LXI  H,ECLP
15F8 11FE08        LXI  D,DIFCOM
15FB CDC003        CALL SUBDEC    ECLP-DIFCOM
15FE B7            ORA  A         SIGN IS IN A
15FF F21E16        JP   S1        JUMP IF NEGATIVE
1602 2AB008        LHLD X'08B0'
1605 22FE08        SHLD DIFCOM
1608 11FFFF        LXI  D,X'FFFF'
160B 19            DAD  D
160C D21E16        JNC  S1        JUMP IF DIFCOM=0
160F 3AF308        LDA  DIFF
1612 B7            ORA  A
1613 3E85          MVI  A,X'85'   SET UP POSITIVE
1615 F21A16        JP   S0        JUMP IF WAS NEG
1618 3E05          MVI  A,X'05'   MAKE NEGATIVE
161A 32F308 S0     STA  DIFF
161D C9            RET
161E AF     S1     XRA  A
161F 32F308        STA  DIFF
1622 327909        STA  CYCDONE   TO ADVANCE QUEUE
1625 32FE08        STA  DIFCOM
1628 32FF08        STA  DIFCOM+1
162B C9            RET
          *LENGTHEN
          *EXTENDS F0 GREEN OF PRESENT CYCLE
          *TO ACCOMMODATE OFFSET SHIFT
          *
162C 3A5906 LENGTHEN LDA  TRANCTR
162F FE02          CPI  2
1631 CAA716        JZ   LAST      JUMP IF ALREADY 2
1634 3AF308        LDA DIFF
1637 B7            ORA  A
1638 FA3E16        JM   L0        JUMP IF POSITIVE
163B CDF515        CALL SNCHG     MAKE IT POSITIVE
163E 213000 L0     LXI  H,X'0030' SET UP MULT
1641 228008        SHLD X'0880'   PREFACE IS
1644 11F080        LXI  D,X'80F0' D=MULTIPLIER, 30
```

```
         *                     E=MULTIPLICAND,ECLP
         *TAKE RESULTS FROM 08B1,08B2 TO
         *TRANSLATE 30 INTO 0.3
1647 CD2003       CALL DECMULT    0.3 ECLP
164A 2AB108       LHLD X'08B1'
164D 228008       SHLD ADDON
1650 21FE08       LXI  H,DIFCOM
1653 118008       LXI  D,ADDON
1656 CD0003       CALL COMPARE
1659 DA6916       JC   L2
         *DIFFERENCE IS LESS THAN 30%. TRANSITION
         *CAN BE ACCOMPLISHED IN ONE TURN
165C 2AFE08 L1    LHLD DIFCOM
165F 228008       SHLD ADDON
1662 AF           XRA  A
1663 325908       STA  TRANCTR
1666 C36D16       JMP  STRETCH
1669 215908 L2    LXI  H,TRANCTR
166C 34           INR  M
         *
         *
         *STRETCH
166D CDDF16 STRETCH CALL MOD0
1670 218008       LXI  H,ADDON
1673 E5           PUSH H
1674 2A5E08       LHLD PM         PM+ADDON TO PHDR
1677 22B008       SHLD X'08B0'
167A E1           POP  H          ADDON
167B E5           PUSH H
167C CDA302       CALL DECAD1     PM+ADDON
167F 2AB008       LHLD X'08B0'
1682 227C08       SHLD PHDR
1685 2A6908       LHLD TRP        ADDON+TRP TO TRP
1688 22B008       SHLD X'08B0'
168B E1           POP  H          ADDON
168C E5           PUSH H
168D CDA302       CALL DECAD1     TRP+ADDON
1690 2AB008       LHLD X'08B0'
1693 226908       SHLD TRP
1696 2AF008       LHLD ECLP       ECLP+ADDON TO ECLI
1699 22B008       SHLD X'08B0'
169C E1           POP  H          ADDON
169D CDA302       CALL DECAD1     ECLP+ADDON
16A0 2AB008       LHLD X'08B0'
16A3 225608       SHLD ECLI
16A6 C9           RET
         *
         *LAST CHANCE, MAKE THE WHOLE CYCLE MAIN
         *STREET GREEN IF WE REALLY WANT TO
         *SHORTEN THE CYCLE.
16A7 216109 LAST  LXI  H,PRESENT RESTORE DIFF IN
16AA 6E           MOV  L,M          ORIGINAL SIGN
16AB CD4807       CALL CKRANG
16AE CD7807       CALL STORE
16B1 3AF308       LDA  DIFF
16B4 B7           ORA  A
16B5 FA3E16       JM   L0         JUMP IF DIFF POS
16B8 21F008       LXI  H,ECLP
16BB 11FE08       LXI  D,DIFCOM
16BE CDC003       CALL SUBDEC     ECLP-DIFF
16C1 2AB008       LHLD X'08B0'
16C4 228008       SHLD X'0880'
16C7 218008       LXI  H,X'0880'
16CA 116708       LXI  D,ACTP
16CD CDC003       CALL SUBDEC     ECLP-DIFF-ACTP
16D0 2AB008       LHLD X'08B0'    DWELL IN GREEN FOR
16D3 226908       SHLD TRP          REST OF CYCLE
16D6 23           INX  H          ADD 1 TO PHDR
16D7 227C08       SHLD PHDR
16DA AF           XRA  A          CLEAR TRANCTR
16DB 325908       STA  TRANCTR
16DE C9           RET
         *
         *SETS PM=GRTR+1=ECLP-ECLB(I)-ACTP+1
         * OR  PM=SG-ACTP+1
```

```
                 *
16DF 210100 MOD0    LXI  H,X'0001' ADD 1
16E2 22B008         SHLD X'08B0'
16E5 21C609         LXI  H,GRTR    TO GRTR
16E8 CDA302         CALL DECAD1
16EB 2AB008         LHLD X'08B0'
16EE 225E08         SHLD PM
16F1 C9             RET
                 *LATCHES    [FORCEOFF]
16F2 3EFF   LATCHES MVI  A,X'FF'   ALL LAMPS OFF
16F4 32E008         STA  PHASLED1
16F7 32E108         STA  PHASLED2
16FA 21E008         LXI  H,PHASLED1 FIRST SPLIT LEDS
16FD 3A6B09         LDA  PRESQ+3   CURRENT SPLIT
1700 B7             ORA  A
1701 F20717         JP   LAL0      SPLIT ONE
1704 21E108         LXI  H,PHASLED2
1707 3A7E08 LAL0    LDA  PHSTAT    SET UP TO PUT
170A 3C             INR  A             PHASE IN LAMPS
170B FE05           CPI  5
170D FA1917         JM   FIRST
1710 D604           SUI  4         SECOND 4 PHASES
1712 CD0607         CALL LAMPFORM
1715 77             MOV  M,A       WILL FLICKER
1716 C32217         JMP  LAL1
                 *
1719 CD0607 FIRST   CALL LAMPFORM  FIRST 4 PHASES
171C 47             MOV  B,A
171D 07             RLC
171E 07             RLC
171F 07             RLC
1720 07             RLC
1721 A0             ANA  B         BOTH NIBBLES SAME
1722 77     LAL1    MOV  M,A       WILL NOT FLICKER
1723 3A6B09         LDA  PRESQ+3   PUT DIR IN LAMPS
1726 1F             RAR
1727 1F             RAR
1728 1F             RAR
1729 1F             RAR
172A 3C             INR  A
172B E603           ANI  X'03'
172D 3C             INR  A
172E CD0607         CALL LAMPFORM
1731 32100D         STA  DIRLAMP
1734 C9             RET
                 *
1735                ORG  X'17DC'
17DC C3F216         JMP  LATCHES
17DF C30014         JMP  NUMPHASE
17E2 C31814         JMP  SPLITIME
17E5 C35114         JMP  PHASDECR
17E8 C39014         JMP  TWS
17EB C3A914         JMP  SPLITSUM
17EE C3DB14         JMP  PHTMSET
17F1 C33615         JMP  TRNSTN
17F4 C3F515         JMP  SNCHG
17F7 C32C16         JMP  LENGTHEN
17FA C3DF16         JMP  MOD0
17FD 00             DC   0,0,0
17FE 00
17FF 00
1800                END  0
                 *SECSYNC
                 *SECONDARY RESYNC
                 *IF SYNC ENDED SETS DIFF TO SIGNED TIME
                 *ERROR
                 *DIFF=(QUEUE TIME+OFFSET)-(RTC-ACTP)
                 *DIFCOM IS UNSIGNED DIFF WITH NO
                 *TRUNCATION (DIFFERENCE COMPLETE)
                 *  IF DIFF NEGATIVE, SECONDARY IS LATE
                 *  IF DIFF POSITIVE, SECONDARY IS EARLY
                 *  RANGE IS -79 TO +79
                 *  SEE CKRANG FOR FULL DESCRIPTION
                 *
0000                ORG  X'1800'
```

```
1800          SECSYNC EQU  *
1800 E5       ENTRY   PUSH H
1801 D5               PUSH D
1802 3A6409           LDA  ADVREQ     IS CYCLE READY?
1805 B7               ORA  A
1806 CA4318           JZ   EXITSS     JUMP NOT READY
1809 CDE807           CALL LDECLP
180C 216109           LXI  H,PRESENT
180F 6E               MOV  L,M        POINT TO PRESENT
              *                       QUEUE ENTRY
1810 CD4618           CALL CKRANG     CHECK RANGE
1813 7D               MOV  A,L
1814 32F308           STA  DIFF
1817 EB               XCHG
1818 22FE08           SHLD DIFCOM     STORE UNSIGNED DIF
              *
181B 11C209           LXI  D,ECLB2
181E 3A6B09           LDA  PRESQ+3    LAST QUEUE BYTE
1821 B7               ORA  A
1822 FA2818           JM   E1         JUMP IF SPLIT 2
1825 11C009           LXI  D,ECLB1
1828 21F008 E1        LXI  H,ECLP
182B CDC003           CALL SUBDEC     ECLP-ECLB(1,2)
182E 2AB008           LHLD X'08B0'
1831 22C409           SHLD SG
1834 21C409           LXI  H,SG
1837 116708           LXI  D,ACTP
183A CDC003           CALL SUBDEC     SG-ACTP
183D 2AB008           LHLD X'08B0'
1840 22C609           SHLD GRTR
              *
1843 D1       EXITSS  POP  D
1844 E1               POP  H
1845 C9               RET
              *CKRANG
              *CHECK RANGE OF SECONDARY SYNC ERROR
              * IN  H,L QUEUE RTC ADDRESS POINTER
              * OUT D,E DIFF COMPLETE(UNSIGNED)
              *     L   DIFF IN BCD
              *         HIGHEST BIT=80 IS +
              *                    =00 IS -
              *         RANGE -79 TO +79
              *     H   FLAG, 0-6 AS FOLLOWS
              *H      2      1      0     4     5     6
              *DIFF -79,-78 -11,-10 -1,0 10,11 78,79
              *  I.E., IF DIFF BETWEEN 11 AND 78, H=5
              *
1846 C5       CKRANG PUSH B
1847 E5               PUSH H          SAVE QUEUE ENTRY
              *                       ADDRESS
1848 CD0002           CALL TRANSAR1   MOVE QRTC TO 08B0
184B AF               XRA  A
184C 32B208           STA  X'08B2'
184F 216708           LXI  H,ACTP     ADD ACTP
1852 CDA302           CALL DECAD1     QRTC+ACTP
              *GET DIRECTION FROM PRESENT QUEUE ENTRY
1855 E1               POP  H
1856 2C               INR  L
1857 2C               INR  L
1858 2C               INR  L          TO DIRECTION BYTE
1859 7E               MOV  A,M
185A E630             ANI  X'30'      JUST DIRECTION
              *PUT OFFSET ADDRESS IN H,L
185C 21F609           LXI  H,OFFDR    DIRECTIONAL OFFSET
185F E26518           JPO  DIRCR
1862 21F809           LXI  H,OFFAV    AVERAGE OFFSET
1865          DIRCR   EQU  *
1865 CDA302           CALL DECAD1     QRTC+ACTP+OFFSET
              *IF = RTC, THEN IN SYNC
1868 21B008           LXI  H,X'08B0'
186B 116B08           LXI  D,RTC
186E 4E               MOV  C,M        CHECK LSB
186F 1A               LDAX D
1870 2C               INR  L
1871 1C               INR  E
```

```
1872 B9              CMP   C
1873 C28418          JNZ   OUTSYNC1
1876 4E              MOV   C,M         CHECK MSB
1877 1A              LDAX  D
1878 B9              CMP   C
1879 C28618          JNZ   OUTSYNC
187C AF              XRA   A
187D 57              MOV   D,A
187E 5F              MOV   E,A
187F 6F              MOV   L,A         SET DIFF=0
1880 2604            MVI   H,4         SET FLAG=4
1882 C1              POP   B           H ALREADY DONE
1883 C9              RET
1884 4E      OUTSYNC1 MOV  C,M         MSB OF QRTC+
1885 1A              LDAX  D           MSB OF RTC
             *OUT OF SYNC, CALCULATE DIFFERENCE
             *A AND C CONTAIN MSB OF RTC AND QRTC+
1886 E6F0    OUTSYNC ANI   X'F0'       TEST RTC MSB
1888 CA9B18          JZ    RTCHI
188B E680            ANI   X'80'
188D CAC118          JZ    NOWRAP      DOES NOT WRAP 9999
             *
1890 79              MOV   A,C         TEST QRTC+ MSB
1891 E6F0            ANI   X'F0'
1893 C2C118          JNZ   NOWRAP
             *QRTC+ IS ACTUALLY HIGHER
1896 0E04            MVI   C,4         FLAG QRTC+ HIGHER
1898 C3A318          JMP   SUB
189B 79      RTCHI   MOV   A,C         TEST QRTC+ MSB
189C E680            ANI   X'80'
189E CAC118          JZ    NOWRAP
             *RTC IS ACTUALLY HIGHER
18A1 0E00            MVI   C,0         FLAG RTC HIGHER
18A3 CDAF18  SUB     CALL  SUBTR
18A6 11B008          LXI   D,X'08B0'
18A9 CDA003          CALL  DECCMP      COMPLEMENT
18AC C3CF18          JMP   CALCL
18AF 2D      SUBTR   DCR   L
18B0 CD0802          CALL  TRANSAR2    MOVE QTRC+ TO 0896
18B3 AF              XRA   A
18B4 219808          LXI   H,X'0898'
18B7 77              MOV   M,A
18B8 2D              DCR   L
18B9 2D              DCR   L
18BA 116B08          LXI   D,RTC
18BD CDC003          CALL  SUBDEC      QRTC+10+OFFSET-RTC
18C0 C9              RET
18C1 CDAF18  NOWRAP  CALL  SUBTR
18C4 AF              XRA   A
18C5 4F              MOV   C,A         CLEAR FLAG
18C6 3AB208          LDA   X'08B2'     TEST SIGN
18C9 B7              ORA   A
18CA CACF18          JZ    CALCL       JUMP IF RESULT NEG
18CD 0E04            MVI   C,4         FLAG QRTC+ HIGHER
18CF 21B108  CALCL   LXI   H,X'08B1'   GET MSB
18D2 7E              MOV   A,M
18D3 56              MOV   D,M
18D4 B7              ORA   A
18D5 C20519          JNZ   HIGH        ANSWER > 99
18D8 21A108          LXI   H,X'08A1'   ANSWER < 100
18DB AF              XRA   A           STORE DIGITS IN
             *                                     08A0
18DC 77              MOV   M,A
18DD 2D              DCR   L
18DE 3AB008          LDA   X'08B0'
18E1 77              MOV   M,A
18E2 6F              MOV   L,A
18E3 5F              MOV   E,A
18E4 CD5002          CALL  DECBIN      DECIMAL TO BINARY
18E7 3A9008          LDA   X'0890'
18EA FE0B            CPI   11          IN FIRST RANGE?
18EC FAF818          JM    CL3
18EF 0C              INR   C
18F0 FE4F            CPI   79          IS IT SATURATED?
18F2 FAF818          JM    CL3
```

```
   18F5 2E79     CL2     MVI   L,X'79'
   18F7 0C               INR   C
   18F8 61       CL3     MOV   H,C         PUT FLAG IN H FOR
                 *                                    OUTPUT
   18F9 79               MOV   A,C
   18FA FE04             CPI   4
   18FC FA0319           JM    NEG         DIFF IS NEGATIVE
   18FF 7D               MOV   A,L
   1900 F680             ORI   X'80'       SET POSITIVE SIGN
   1902 6F               MOV   L,A         PUT DIFF IN L FOR
                 *                                    OUTPUT
   1903 C1       NEG     POP   B           H ALREADY DONE
   1904 C9               RET
   1905 0C       HIGH    INR   C
   1906 3AB008           LDA   X'08B0'
   1909 5F               MOV   E,A
   190A C3F518           JMP   CL2
              *QRECOV
              *QUEUE RECOVERY IF PRESENT QUEUE POINTER
              *  IS WRONG
              *CALLED IF OFFSET ERROR IS LARGE
              *MOVES PRESENT QUEUE POINTER (AND NEXT)
              *  TO ACHIEVE THE FOLLOWING GOALS,
              *  IN ORDER:
              *  1.  DIFF -10 TO -1 (SL. LATE)
              *  2.  DIFF SMALLEST POSITIVE AVAILABLE
              *  3.  CQP2 IS USED IF NO POSITIVE
              *
              *SUBROUTINE TO STORE INTO DIFF, DIFCOM
              *STORE   EQU   X'0778'
190D 7D       STORE  MOV   A,L
190E 32F308          STA   DIFF       STORE DIFF
1911 21FE08          LXI   H,DIFCOM   STORE DIFCOM
1914 73              MOV   M,E
1915 2C              INR   L
1916 72              MOV   M,D
1917 C9              RET
              *
              * QRECOV EQU   X'074B'
1918 E5       QRECOV PUSH H
1919 D5              PUSH D
191A C5              PUSH B
191B 219999          LXI   H,X'9999'  LARGEST 4 DIGIT
191E 228408          SHLD  X'0884'    NUMBER TO 0884
1921 216309          LXI   H,CQP2     POINTER
1924 6E              MOV   L,M        QUEUE ADDRESS
1925 44              MOV   B,H        SAVE ADDRESS IN BC
1926 4D              MOV   C,L
              *
1927 CD4618   LOOPQR CALL  CKRANG     GET TIME DIFFERENC
192A 7C              MOV   A,H
192B B7              ORA   A
192C CA5A19          JZ    THIS       THIS ENTRY OK
192F FE04            CPI   4
1931 CA5A19          JZ    THIS
1934 FA6919          JM    LATE       THIS ENTRY LATE
              *DIFCOM IS +, MUST BE CLOSER TO ZERO
              *THAN LAST TIME
1937 CD0D19          CALL  STORE
193A 218408          LXI   H,X'0884'
193D 11FE08          LXI   D,DIFCOM
1940 CD0003          CALL  COMPARE
1943 D26919          JNC   LATE       JUMP NOT LESS
1946 2AFE08          LHLD  DIFCOM
1949 228408          SHLD  X'0884'    FOR NEXT TIME
194C 60              MOV   H,B
194D 79              MOV   A,C
194E D604            SUI   4          PREVIOUS ENTRY
1950 F25519          JP    L1
1953 3E5C            MVI   A,X'5C'    WRAP TO END OF
              *                       QUEUE AREA
1955 6F       L1     MOV   L,A
1956 4F              MOV   C,A        SAVE AGAIN
1957 C32719          JMP   LOOPQR
```

```
195A CD0D19 THIS    CALL STORE      STORE DIFF, DIFCOM
195D 216109         LXI  H,PRESENT  THIS ENTRY,
             *                      SLIGHTLY LATE
1960 71             MOV  M,C        PRESENT
1961 79             MOV  A,C
1962 2C             INR  L          NEXT
1963 CD9719         CALL ADD4
1966 C38D19         JMP  EXITOR
             *
             *THIS MAKES US TOO LATE, USE NEXT ENTRY,
             *  UNLESS THIS IS COP2
1969 3A6309 LATE    LDA  COP2
196C B9             CMP  C
196D C27919         JNZ  NOT        JUMP NOT COP2
1970 326109         STA  PRESENT    COP2 REQUIRES
1973 326209         STA  NEXT       LENGTHEN, USE IT
1976 C38719         JMP  ST
1979 216109 NOT     LXI  H,PRESENT
197C 79             MOV  A,C
197D CD9719         CALL ADD4       STORES PRESENT
1980 CD9719         CALL ADD4       STORES NEXT
             *SET DIFF TO PRESENT VALUE
1983 216109         LXI  H,PRESENT
1986 6E             MOV  L,M
1987 CD4618 ST      CALL CKRANG
198A CD0D19         CALL STORE
             *
198D CD7D1A EXITOR  CALL MOVEQ      MOVE Q IMAGE
1990 CD0018         CALL SECSYNC
1993 C1             POP  B
1994 D1             POP  D
1995 E1             POP  H
1996 C9             RET
             *
             *SUBROUTINE TO ADD 4 TO POINTER IN A
             *WRAP AROUND AT THE END
             *ALSO STORES IN M, INCREMENTS L
1997 57     ADD4    MOV  D,A        SAVE
1998 3A6309         LDA  COP2
199B BA             CMP  D          AT COP2?
199C CAA819         JZ   A1A4       YES, NO ADD 4
199F 7A             MOV  A,D        NO, MAY ADD 4
19A0 C604           ADI  4          ADD 4
19A2 FE60           CPI  X'60'      AT END?
19A4 FAA819         JM   A1A4       NO WRAP
19A7 AF             XRA  A
19A8 77     A1A4    MOV  M,A        STORE IT
19A9 2C             INR  L          STEP TO NEXT ONE
19AA C9             RET
             *DWELCALC
             *CALCULATES ARTERIAL GREEN DWELL, THE
             *TIME IN PHASE0, AS DEFINED BY THE TOP
             *PHASE THUMBWHEEL SWITCH (TWS) OF THE
             *SPLIT MODULE CURRENTLY IN USE.  THE
             *LOCATION ARTGNDWL IS INCREMENTED ONCE
             *PER SECOND UNTIL THE STREET MOVES OUT
             *OF PHASE 0, AND THEN IT IS RESET.
             *
             * DWELCALC EQU X'074E'
19AB 3A6B09 DWELCALC LDA  PRES0+3
19AE B7             ORA  A
19AF FAB819         JM   SPLIT2     JUMP IF SPLIT TWO
19B2 3A200C         LDA  SPL1       TOP SWITCH SPLIT 1
19B5 C3BB19         JMP  X
19B8 3A300C SPLIT2  LDA  SPL2       TOP SWITCH SPLIT 2
19BB 2F     X       CMA
19BC E60F           ANI  X'0F'      SAVE JUST PHASE TWS
19BE 4F             MOV  C,A        PHASE TO B,C
19BF AF             XRA  A          (CLEAR B)
19C0 47             MOV  B,A
19C1 21E619         LXI  H,TABLE
19C4 09             DAD  B          ADD PHASE TO H,L
19C5 09             DAD  B
19C6 46             MOV  B,M
19C7 23             INX  H
```

```
19C8 7E              MOV   A,M
19C9 B7              ORA   A          NO TEST IF A=0
19CA C4FE19          CNZ   TESTLITE   TEST STREET LIGHT
19CD DADF19          JC    CLEAR      JUMP IF OFF
19D0 78              MOV   A,B
19D1 B7              ORA   A          NO TEST IF A=0
19D2 C4FE19          CNZ   TESTLITE   TEST STREET LIGHT
19D5 DADF19          JC    CLEAR      JUMP IF OFF
19D8 21F408          LXI   H,ARTGNDWL INC ARTGNDWL
19DB CD0A05          CALL  INC4
19DE C9              RET
19DF 210000 CLEAR    LXI   H,0        CLEAR ARTGNDWL
19E2 22F408          SHLD  ARTGNDWL
19E5 C9              RET
19E6 04     TABLE    DC    4,8        D
19E7 08
19E8 01              DC    1,0        1
19E9 00
19EA 02              DC    2,0        2
19EB 00
19EC 03              DC    3,0        3
19ED 00
19EE 04              DC    4,0        4
19EF 00
19F0 05              DC    5,0        5
19F1 00
19F2 06              DC    6,0        6
19F3 00
19F4 07              DC    7,0        7
19F5 00
19F6 08              DC    8,0        8
19F7 00
19F8 01              DC    1,5        A
19F9 05
19FA 02              DC    2,6        B
19FB 06
19FC 03              DC    3,7        C
19FD 07
            *INTERNAL SUBROUTINE TO DETERMINE IF THE
            *PHASE IN A ON ENTRY IS GREEN
            *CLEAR CARRY IF GREEN, ELSE SET CARRY
19FE 6F     TESTLITE MOV L,A
19FF FE05            CPI   5          PHASE 5-8
1A01 FA151A          JM    FSTSPLT    JUMP PHASE 1-4
1A04 3A0B0C          LDA   LIGHT2
1A07 E60F            ANI   X'0F'
1A09 67              MOV   H,A
1A0A 7D              MOV   A,L
1A0B D604            SUI   4          REDUCE TO 1-4
1A0D CD0607 TEST     CALL  LAMPFORM
1A10 2F              CMA              2=00000010
1A11 BC              CMP   H
1A12 C8              RZ         LIGHT ON, RET CARRY CLR
1A13 37              STC        LIGHT OFF, RET CARRY SET
1A14 C9              RET
1A15 3A0A0C FSTSPLT  LDA   LIGHT1
1A18 E60F            ANI   X'0F'
1A1A 67              MOV   H,A
1A1B 7D              MOV   A,L
1A1C C30D1A          JMP   TEST
            *AVDIR
            *BUILDS A SET OF PHANTOM QUEUE ENTRIES
            *
            * AVDIR  EQU  X'0751'
1A1F 216309 AVDIR    LXI   H,COP2
1A22 6E              MOV   L,M        MAKE INTO ADDRESS
1A23 E5              PUSH  H          ADDRESS OF NEWEST
            *                         QUEUE ENTRY
1A24 5E              MOV   E,M        RUNNING TIME TO DE
1A25 2C              INR   L
1A26 56              MOV   D,M
1A27 2C              INR   L
1A28 4E              MOV   C,M        CYCLE LENGTH AND
1A29 2C              INR   L          FLAGS TO B,C
1A2A 46              MOV   B,M
```

```
               *
1A2B EB                XCHG            RUNNING TIME
1A2C 228008            SHLD X'0880'    TO 0880
               *
1A2F 218408            LXI  H,X'0884'  3 CYCLE LENGTH
1A32 71                MOV  M,C        BYTES TO 0884
1A33 78                MOV  A,B
1A34 E60F              ANI  X'0F'      MASK OFF FLAGS
1A36 2C                INR  L
1A37 77                MOV  M,A
               *
1A38 E1                POP  H          ADDRESS OF NEWEST
               *                         ENTRY
1A39 3AFA08            LDA  N          # OF ENTRIES
1A3C 3C                INR  A          DO 1 EXTRA SO THAT
               *           DIRECTION LEDS WILL BE STABLE
1A3D 3D        LOOPAD  DCR  A          N-1
1A3E FA721A            JM   EXITAD
1A41 F5        CREATE PUSH PSW        SAVE A, N REMAINING
1A42 E5                PUSH H
1A43 218008            LXI  H,X'0880'  RTC
1A46 118408            LXI  D,X'0894'  CL
1A49 CDC003            CALL SUBDEC     RTC-CL
1A4C 3AB208            LDA  X'08B2'    SIGN
1A4F A7                ANA  A
1A50 FA591A            JM   02       JUMP ANSWER POSITIVE
1A53 11B008            LXI  D,X'08B0'  ANSWER IS NEGATIVE
1A56 CDA003            CALL DECCMP     COMPLEMENT IT
1A59 2AB008 02         LHLD X'08B0'
1A5C 228008            SHLD X'0880'    ANSWER TO 0880
1A5F EB                XCHG            ANSWER TO D,E
               *STORE THE PHANTOM PLATOON IN QUEUE
1A60 E1                POP  H          FIRST WORD OF THIS
               *                                   ENTRY
1A61 2D                DCR  L          BACK TO PREVIOUS
1A62 F2671A            JP   03        JUMP STILL IN TABLE
1A65 2E5F              MVI  L,X'5F'    WRAPAROUND
1A67 70        03      MOV  M,B        STORE CYCLE LENGTH
               *                       AND FLAGS
1A68 2D                DCR  L
1A69 71                MOV  M,C
1A6A 2D                DCR  L
1A6B 72                MOV  M,D        STORE RUNNING TIME
1A6C 2D                DCR  L
1A6D 73                MOV  M,E
1A6E F1                POP  PSW        RESTORE A
1A6F C33D1A            JMP  LOOPAD
1A72 7D        EXITAD  MOV  A,L        FIRST PLATOON
1A73 326109            STA  PRESENT
1A76 CD4C1B            CALL BUMP       SECOND PLATOON
1A79 326209            STA  NEXT       WILL BE USED NEXT
1A7C C9                RET
               *
               *MOVEQ
               *MOVES IMAGE OF PRESENT QUEUE ENTRY
               *TO PRESQ
               *DESTROYS A,D,E,H,L
               * MOVEQ  EQU  X'0775'
1A7D 216109 MOVEQ  LXI  H,PRESENT
1A80 6E            MOV  L,M        MAKE ADDRESS
1A81 116809        LXI  D,PRESQ
1A84 7E     P1     MOV  A,M        GET DATA
1A85 12            STAX D          TO PRESQ
1A86 2C            INR  L
1A87 1C            INR  E
1A88 7B            MOV  A,E
1A89 FE6C          CPI  X'6C'      PAST END?
1A8B C2841A        JNZ  P1         JUMP IF NOT
1A8E C9            RET
            *QUEUE
            *PERFORMS QUEUE MAINTENANCE
            *GETS NEW INPUTS FROM TELEMETRY
            *UPDATES POINTERS ON REQUEST
            * QUEUE  EQU  X'0754'
1A8F E5     QUEUE  PUSH H
```

```
1A90 D5              PUSH D
1A91 C5              PUSH B
1A92 AF              XRA  A
1A93 326509          STA  ADRUN      AV/DIR RUN FLAG
1A96 3A6309          LDA  COP2
1A99 CD4C1B          CALL BUMP       ADD 4 WITH WRAP
1A9C 4F              MOV  C,A        COP2+4 TO C
1A9D 2A6308          LHLD ACTM
1AA0 7C              MOV  A,H        MSB OF ACTM
1AA1 B7              ORA  A
1AA2 C2B41A          JNZ  CHECK
1AA5 7D              MOV  A,L        LSB OF ACTM
1AA6 B7              ORA  A
1AA7 C2B41A          JNZ  CHECK
             *YES, ACTM=0
1AAA 2A6B08          LHLD RTC
1AAD EB              XCHG            RTC TO D,E
1AAE 2609            MVI  H,X'09'    TO 0900 RAM
1AB0 69              MOV  L,C        COP2+4
1AB1 73              MOV  M,E        STORE RTC
1AB2 2C              INR  L
1AB3 72              MOV  M,D
             *DID SYNC END?
1AB4 3A7009 CHECK    LDA  ENDSYNC
1AB7 B7              ORA  A
1AB8 CA151B          JZ   ADVANCE
             *YES, SYNC ENDED
1ABB 2A5208          LHLD ECLMF
1ABE EB              XCHG            CL TO D,E
1ABF 2609            MVI  H,X'09'
1AC1 69              MOV  L,C
1AC2 2C              INR  L
1AC3 2C              INR  L          COP2+6
1AC4 73              MOV  M,E        STORE LSB CL
1AC5 2C              INR  L
1AC6 72              MOV  M,D        STORE CL AND FLAGS
1AC7 42              MOV  B,D        SAVE FLAGS IN B
             *
1AC8 216109          LXI  H,PRESENT
1ACB 56              MOV  D,M        PRESENT TO D
1ACC 2C              INR  L
1ACD 7E              MOV  A,M        NEXT TO A
1ACE BA              CMP  D          NEXT-PRESENT
1ACF C2D31A          JNZ  06
             *NEED TO UPDATE NEXT
             *
             *TEST FOR FAULT AND PROCESS THE FAULT
             *(TO BE ADDED LATER)
             *       INR  L
             *       MOV  D,M        COP2 TO D
             *       CMP  D          NEXT-COP2
             *       JNZ  05
             *FAULT PROCESSING
             *05     DCR  L          POINT TO NEXT
1AD2 71              MOV  M,C        COP2+4 TO NEXT
1AD3 2C     06       INR  L          POINT TO COP2
1AD4 71              MOV  M,C        COP2+4 TO COP2
             *
1AD5 78              MOV  A,B        CL+FLAGS (COP2)
1AD6 E630            ANI  X'30'      JUST DIRECTION
1AD8 E2DC1A          JPO  07        JUMP IF DIRECTIONAL
1ADB AF              XRA  A          IS AVERAGE OR %AVG
1ADC 47     07       MOV  B,A       COP2 DIRECTION IN B
1ADD 216109          LXI  H,PRESENT
1AE0 CD551B          CALL DIR        CHECK DIRECTION
1AE3 E2E71A          JPO  08
1AE6 AF              XRA  A         IS AVERAGE OR %AVG
1AE7 07     08       RLC
1AE8 07              RLC
1AE9 80              ADD  B
1AEA CA021B          JZ   TRUNC       00=AVG TO AVG
1AED FE20            CPI  X'20'
1AEF DA0B1B          JC   AVDIRC      10=AVG TO IN
1AF2 CA0B1B          JZ   AVDIRC      20=AVG TO OUT
1AF5 FE60            CPI  X'60'
```

```
1AF7 CA0B1B         JZ   FAULT      60=IN  TO OUT
1AFA FE90           CPI  X'90'
1AFC CA0B1B         JZ   FAULT      90=OUT TO IN
1AFF C3151B         JMP  ADVANCE    ALL OTHERS
            *
            *TRUNCATE
            *CYCLE QUEUE IS FULL OF AVG, USE JUST
            *THE LATEST ONE
1B02 3A6309 TRUNC   LDA  CQP2
1B05 326209         STA  NEXT       CQP2 TO NEXT
1B08 C3151B         JMP  ADVANCE
            *
            *FAULT PROCESSING, IF DESIRED
1B0B        FAULT   EQU  *
            *
            *AV/DIR CALL
1B0B CD1F1A AVDIRC CALL AVDIR
1B0E 216509         LXI  H,ADRUN    AV/DIR RUN FLAG
1B11 34             INR  M
1B12 00             DC   0,0,0
1B13 00
1B14 00
            *ADVANCE QUEUE ON REQUEST
1B15 3A6409 ADVANCE LDA ADVREQ     ADVANCE QUEUE
            *                       REQUEST FLAG
1B18 A7             ANA  A
1B19 CA421B         JZ   DONE
1B1C 3A6309         LDA  CQP2       SAVE CQP2 IN C
1B1F 4F             MOV  C,A
1B20 3A6109         LDA  PRESENT
1B23 326009         STA  LAST
1B26 216209         LXI  H,NEXT     NEXT QUEUE ENTRY
1B29 CD551B         CALL DIR        CHECK DIRECTION
1B2C E2351B         JPO  A1A0       JUMP IF DIRECTION
1B2F 3A6309         LDA  CQP2       AVG, MOST RECENT
1B32 326209         STA  NEXT         IS NEXT
1B35 3A6209 A1A0    LDA  NEXT
1B38 326109         STA  PRESENT
1B3B B9             CMP  C
1B3C C44C1B         CNZ  BUMP
1B3F 326209         STA  NEXT
1B42 CD7D1A DONE    CALL MOVEQ      MOVE Q IMAGE
1B45 CD0018         CALL SECSYNC
1B48 C1             POP  B
1B49 D1             POP  D
1B4A E1             POP  H
1B4B C9             RET
            *
            *BUMP, INTERNAL SUBROUTINE
            *IN:  QUEUE POINTER IN A
            *ADDS 4 WITH WRAPAROUND, RETURN
1B4C C604   BUMP    ADI  4          ADD 4
1B4E FE60           CPI  X'60'      END OF TABLE?
1B50 FA541B         JM   B1         JUMP IF NOT
1B53 AF             XRA  A          BEGINNING
1B54 C9     B1      RET
            *
            *DIR,INTERNAL SUBROUTINE FINDS DIRECTION
            *IN:  QUEUE POINTER ADDRESS IN H,L
            *OUT: PARITY FLAGS SET ON DIRECTION BITS
1B55 7E     DIR     MOV  A,M        GET LOW BYTE
1B56 C603           ADI  3          TO DIRECT BYTE
1B58 6F             MOV  L,A          TO L
1B59 7E             MOV  A,M        CL+FLAGS
1B5A E630           ANI  X'30'      JUST DIRECTION
1B5C C9             RET
            *
1B5D                ORG  X'1BE5'
1BE5 C30018         JMP  SECSYNC
1BE8 C34618         JMP  CKRANG
1BEB C31819         JMP  QRECOV
1BEE C30D19         JMP  STORE
1BF1 C3AB19         JMP  DWELCALC
1BF4 C31F1A         JMP  AVDIR
1BF7 C37D1A         JMP  MOVEQ
```

```
1BFA C38F1A          JMP   QUEUE
1BFD 00              DC    0,0,0
1BFE 00
1BFF 00
1C00                 END   0
           *FORCE OFF
           *
           *GET DESIRED PHASES FROM PROPER TWS
           *     RING 1 IN B (1-8, 0 IF NOT DEFINED)
           *     RING 2 IN C (1-4, 0 IF NOT DEFINED9
1DFD 21200C FORCEOFF  LXI   H,SPLIT1
1E00 3A6B09          LDA   PRES0+3
1E03 B7              ORA   A
1E04 F20A1E          JP    X           JUMP IF SPLIT 1
1E07 21300C          LXI   H,SPLIT2
1E0A 3A0A0C X        LDA   LIGHT1      SET UP FIRST RING
1E0D E60F            ANI   X'0F'
1E0F 327908          STA   LT1
1E12 3A7F08          LDA   MAXP
1E15 FE04            CPI   4           EXTENDED RING?
1E17 3A7E08          LDA   PHSTAT
1E1A FA371E          JM    NOT         JUMP NOT EXT RING
1E1D 3C              INR   A
1E1E 47              MOV   B,A         PHASE TO B
1E1F 3A0B0C          LDA   LIGHT2      JOIN THE TWO RINGS
1E22 07              RLC               INTO A SINGLE BYTE
1E23 07              RLC
1E24 07              RLC
1E25 07              RLC
1E26 E6F0            ANI   X'F0'
1E28 4F              MOV   C,A
1E29 3A0A0C          LDA   LIGHT1
1E2C E60F            ANI   X'0F'
1E2E B1              ORA   C
1E2F 0E00            MVI   C,0         OTHER RING PHASE
1E31 327908          STA   LT1
1E34 C34A1E          JMP   PROC
1E37 47     NOT      MOV   B,A         ADD PHASE TO TWS
1E38 85              ADD   L             ADDRESS
1E39 80              ADD   B
1E3A 6F              MOV   L,A
1E3B 7E              MOV   A,M         READ TWS
1E3C 2F              CMA
1E3D E60F            ANI   X'0F'
1E3F 4F              MOV   C,A         PHASE TO B,C
1E40 AF              XRA   A           (CLEAR B)
1E41 47              MOV   B,A
1E42 21F01E          LXI   H,TABLE
1E45 09              DAD   B           ADD PHASE TO H,L
1E46 09              DAD   B
1E47 46              MOV   B,M
1E48 23              INX   H
1E49 4E              MOV   C,M
           *NOW PROCESS THE RINGS
1E4A 3A7E09 PROC     LDA   IMAGDOB
1E4D 57              MOV   D,A
1E4E 3AED09          LDA   OLDFO1
1E51 328008          STA   X'0880'
1E54 3A7908          LDA   LT1         LIGHTS TO CHECK
1E57 217208          LXI   H,CPCTR1
1E5A 228408          SHLD  CPCADR      STORE ADDR OF CTR
1E5D CD901E          CALL  SET
1E60 32ED09          STA   OLDFO1
1E63 216D08          LXI   H,MEMPY1
1E66 CDD81E          CALL  CLEAR
1E69 7A              MOV   A,D
1E6A 327E09          STA   IMAGDOB
1E6D 3A5D09          LDA   IMAGDOC
1E70 57              MOV   D,A
1E71 3AEE09          LDA   OLDFO2
1E74 328008          STA   X'0880'
1E77 41              MOV   B,C         RING 2 PHASE
1E78 3A0B0C          LDA   LIGHT2      RING 2
1E7B E60F            ANI   X'0F'
1E7D 327A08          STA   LT2
```

```
1E80 217308          LXI   H,CPCTR2
1E83 228408          SHLD  CPCADR       STORE CTR ADDR
1E86 CD9D1E          CALL  SET
1E89 32EE09          STA   OLDFO2
1E8C 216E08          LXI   H,MEMRY2
1E8F CDD81E          CALL  CLEAR
1E92 7A              MOV   A,D
1E93 325D08          STA   IMAGDOC
1E96 3A7E08          LDA   PHSTAT
1E99 32EF09          STA   OLDPH
1E9C C9              RET
               *SET
               *SETS F.O. BIT IF STREET LIGHT DOES NOT
               *MATCH DESIRED PHASE, BUT DID ONE SECOND
               *EARLIER, AND COORDINATOR PHASE HAS JUST
               *CHANGED.
               *HANDLES F.O. BIT IN AN IMAGE OF THE
               *OUTPUT WORD.
               *INPUT:   IMAGE IN D
               *         DESIRED PHASE IN B
               *         MASKED LIGHTS IN A
               *         OLDFO(I) IN 0880
               *OUTPUT:  IMAGE IN D
               *         OLDFO(I) REVISION IN A
               *             =0 IN PHASE
               *             =1 OUT OF PHASE
               *             =2 NOT DEFINED OR CLEARANCE
1E9D 5F        SET   MOV   E,A          SAVE LIGHTS
1E9E 78              MOV   A,B          DESIRED PHASE
1E9F B7              ORA   A
1EA0 CAAB1E          JZ    ZERO         JUMP IF ZERO
1EA3 CD4B1F          CALL  LAMPFORM
1EA6 2F              CMA                2=0000 0010
1EA7 BB              CMP   E
1EA8 CAD61E          JZ    INPHAS       JUMP IF IN PHASE
1EAB 3AEF09    ZERO  LDA   OLDPH
1EAE 217E08          LXI   H,PHSTAT
1EB1 BE              CMP   M
1EB2 C2C41E          JNZ   TRY          JUMP COORD PHASE
1EB5 7B              MOV   A,E     LIGHTS          CHANGE
1EB6 B7              ORA   A
1EB7 C2D31E          JNZ   NOTYET       JUMP IF NOT CLEAR
1EBA 7A              MOV   A,D          IMAGE
1EBB F601            ORI   1            CLEAR F.O.
1EBD 00              DC    0,0,0
1EBE 00
1EBF 00
1EC0 57              MOV   D,A
1EC1 3E02            MVI   A,2          CLEARANCE OR NOT
1EC3 C9              RET                              DEFINED
               *
               *FIRST SECOND OUT OF PHASE
1EC4 2A8408    TRY   LHLD  CPCADR
1EC7 34              INR   M            BUMP PHASE CHG CTR
1EC8 3A8008          LDA   X'0880'      TRY TO F.O.
1ECB B7              ORA   A
1ECC C2D31E          JNZ   NOTYET       JUMP RING NOT IN
1ECF 7A              MOV   A,D    IMAGE                 PHASE
1ED0 E6FE            ANI   X'FE'        SET F.O.
1ED2 57              MOV   D,A
1ED3 3E01      NOTYET MVI  A,1          SET OLDFO(I)
1ED5 C9              RET
1ED6 AF        INPHAS XRA  A            CLEAR OLDFO(I)
1ED7 C9              RET
               *CLEARS F.O. AFTER SET FOR 5 SECONDS
               *
1ED8 7A        CLEAR MOV   A,D          IMAGE
1ED9 E601            ANI   1            TEST F.O. BIT
1EDB C2EB1E          JNZ   OUTDT        JUMP IF NOT SET
1EDE 3E05            MVI   A,5
1EE0 BE              CMP   M            TEST MEMRY(I)=5
1EE1 C2EE1E          JNZ   INC          JUMP IF NOT 5 YET
1EE4 7A              MOV   A,D
1EE5 F601            ORI   1            CLEAR F.O.
```

```
1EE7 00               DC    0,0,0
1EE8 00
1EE9 00
1EEA 57               MOV   D,A
1EEB 3600     OUTDT   MVI   M,0         CLEAR MEMRY(I)
1EED C9               RET
              *
1EEE 34       INC     INR   M           INRECMENT MEMRY(I)
1EEF C9               RET
              *              D   1   2   3   4
1EF0 04       TABLE   DC    4,4,1,0,2,0,3,0,4,0
1EF1 04
1EF2 01
1EF3 00
1EF4 02
1EF5 00
1EF6 03
1EF7 00
1EF8 04
1EF9 00
              *              5   6   7   8
1EFA 00               DC    0,1,0,2,0,3,0,4
1EFB 01
1EFC 00
1EFD 02
1EFE 00
1EFF 03
1F00 00
1F01 04
              *              A   B   C
1F02 01               DC    1,1,2,2,3,3
1F03 01
1F04 02
1F05 02
1F06 03
1F07 03
              *LATCHES
1F08          LATCHES EQU   *
1F08 3EFF             MVI   A,X'FF'     ALL LAMPS OFF
1F0A 32E008           STA   PHASLED1
1F0D 32E108           STA   PHASLED2
1F10 21E008           LXI   H,PHASLED1 FIRST SPLIT LEDS
1F13 3A6B09           LDA   PRESO+3     CURRENT SPLIT
1F16 B7               ORA   A
1F17 F21D1F           JP    L0          SPLIT ONE
1F1A 21E108           LXI   H,PHASLED2
1F1D 3A7E08   L0      LDA   PHSTAT      SET UP TO PUT
1F20 3C               INR   A                 PHASE IN LAMPS
1F21 FE05             CPI   5
1F23 FA2F1F           JM    FIRST
1F26 D604             SUI   4           SECOND 4 PHASES
1F28 CD4B1F           CALL  LAMPFORM
1F2B 77               MOV   M,A         WILL FLICKER
1F2C C3381F           JMP   L1
              *
1F2F CD4B1F   FIRST   CALL  LAMPFORM    FIRST 4 PHASES
1F32 47               MOV   B,A
1F33 07               RLC
1F34 07               RLC
1F35 07               RLC
1F36 07               RLC
1F37 A0               ANA   B           BOTH NIBBLES SAME
1F38 77       L1      MOV   M,A         WILL NOT FLICKER
1F39 3A6B09           LDA   PRESO+2     PUT DIR IN LAMPS
1F3C 1F               RAR
1F3D 1F               RAR
1F3E 1F               RAR
1F3F 1F               RAR
1F40 3C               INR   A
1F41 E603             ANI   X'03'
1F43 3C               INR   A
1F44 CD4B1F           CALL  LAMPFORM
1F47 32100D           STA   DIRLAMP
1F4A C9               RET
```

```
              *LAMPFORM
              *CHANGE BINARY NUMBER TO A SINGLE 0 BIT
              *AND ALL OTHER BITS 1
1F4B          LAMPFORM EQU *
1F4B C5               PUSH B
1F4C 4F               MOV  C,A
1F4D AF               XRA  A           CLEAR CARRY
1F4E 3EFF             MVI  A,X'FF'
1F50 17       LP      RAL              ROTATE THRU CARRY
1F51 0D               DCR  C
1F52 C2501F           JNZ  LP
1F55 C1               POP  B
1F56 C9               RET
              *FORMATCP
              *PRINCIPAL USE IS IN TWS REFORMATTING
              *ROUTINE PREFACED WITH:
              *       NOT LSD IN E
              *       NOT ISD IN D
              *       NOT MSD IN B
              *REFORMATS AND EXITS WITH 0,MSD IN D,
              *                          ISD,LSD IN E.
1F57          FORMATCP EQU *
1F57 7A               MOV  A,D         ISD
1F58 2F               CMA
1F59 E60F             ANI  X'0F'       ISOLATE D3-D0
1F5B 57               MOV  D,A
1F5C 7B               MOV  A,E         LSD
1F5D 2F               CMA
1F5E E60F             ANI  X'0F'
1F60 07               RLC
1F61 07               RLC
1F62 07               RLC
1F63 07               RLC
1F64 B2               ORA  D           ISD,LSD
1F65 5F               MOV  E,A         IN E FOR RETURN
1F66 78               MOV  A,B
1F67 2F               CMA
1F68 E60F             ANI  X'0F'
1F6A 57               MOV  D,A
1F6B C9               RET
              *
1F6C                  ORG  X'1FEB'
1FEB C3001C           JMP  DISPLAY
1FEE C3FD1D           JMP  FORCEOFF
1FF1 C3D81E           JMP  CLEAR
1FF4 C3081F           JMP  LATCHES
1FF7 C34B1F           JMP  LAMPFORM
1FFA C3571F           JMP  FORMATCP
1FFD 00               DC   0,0,0
1FFE 00
1FFF 00
2000                  END  0
              *SHORTEN
0380          NIBLEFT EQU X'0380'
0757          LIMITCHK EQU X'0757'
0730          TWS      EQU X'0730'
02A3          DECAD1    EQU X'02A3'
0300          COMPARE   EQU X'0300'
0320          DECMULT   EQU X'0320'
03C0          SUBDEC    EQU X'03C0'
0610          DIVIDE    EQU X'0610'
073C          SNCHG     EQU X'073C'
073F          LENGTHEN EQU X'073F'
0742          MODO      EQU X'0742'
08CB          CLEAR     EQU X'08CB'
0859          TRANCTR   EQU X'0859'
085D          IMAGDOC   EQU X'085D'
085E          PM        EQU X'085E'
0867          ACTP      EQU X'0867'
0869          TRP       EQU X'0869'
087C          PHDR      EQU X'087C'
087E          PHSTAT    EQU X'087E'
087F          MAXP      EQU X'087F'
0880          SCRATA    EQU X'0880'
0884          LPT       EQU X'0884'  LAST PHASE TIME
```

```
0888            GTF      EQU X'0888'  GREEN TIME FREE
08B1            PROD2    EQU X'08B1'
08E2            TRQD     EQU X'08E2'
08E4            TQM      EQU X'08E4'
08E6            CYC      EQU X'08E6'
08E8            EGT      EQU X'08E8'
08EA            TTSVD    EQU X'08EA'
08EC            ST       EQU X'08EC'
08F0            ECLP     EQU X'08F0'
08F3            DIFF     EQU X'08F3'
08F4            ARTGNDWL EQU X'08F4'
08FE            DIFCOM   EQU X'08FE'
0980            PHASE0   EQU X'0980'
09C4            SG       EQU X'09C4'
09C6            GRTR     EQU X'09C6'
0800            DIVBASE EQU X'0800'
0880            C4      EQU X'0880'
088A            ECLF    EQU X'088A'
088C            DIRECT  EQU X'088C'
08A3            QUOT    EQU X'08A3'
08B0            SUBLSD  EQU X'08B0'
08C2            SPDWRP  EQU X'08C2'
08C4            PAVGSW  EQU X'08C4'
08C6            MQTELEM EQU X'08C6'
08EF            OFFAVP  EQU X'08EF'   AVG OFFSET IN %
08F6            OFFDIR  EQU X'08F6'   DIR OFFSET
08F8            OFFAVS  EQU X'08F8'   AVG OFFSET IN SEC
08FA            N       EQU X'08FA'
08FB            OFFN    EQU X'08FB'   NET OFFSET
0968            PRESQ   EQU X'0968'
                *
0000                   ORG  X'2000'
2000 CD4207 SHORTEN CALL MOD0
2003 2A5E08            LHLD PM
                *
2098 21E808            LXI  H,EGT
209B CDA302            CALL DECAD1     EGT+GTF
209E 2AB008            LHLD X'08B0'
20A1 22E808            SHLD EGT        =EGT
                *
20A4 21E808            LXI  H,EGT      LIMIT EGT TO GRTR
20A7 11C609            LXI  D,GRTR
20AA CD0003            CALL COMPARE
20AD D2B620            JNC  M3         JUMP GRTR>=EGT
20B0 2AC609            LHLD GRTR
20B3 22E808            SHLD EGT
                *
20B6 21E208 M3         LXI  H,TRQD
20B9 11EC08            LXI  D,ST
20BC CD0003            CALL COMPARE
20BF D2AA21            JNC  DS         JUMP ST>=TRQD
                *
20C2 2AE808            LHLD EGT
20C5 22B008            SHLD X'08B0'
20C8 21EC08            LXI  H,ST
20CB CDA302            CALL DECAD1     ST+EGT
20CE 2AB008            LHLD X'08B0'
20D1 22EA08            SHLD TTSVD      =TTSVD
                *
20D4 21E208            LXI  H,TRQD
20D7 11EA08            LXI  D,TTSVD
20DA CD0003            CALL COMPARE
20DD D29821            JNC  CS         JUMP TTSVD>=TRQD
                *
20E0 3A7F08            LDA  MAXP
20E3 FE01              CPI  1
20E5 C2FF20            JNZ  PHOMIT     JUMP NOT 2 PHASE
20E8 3A5908            LDA  TRANCTR
20EB FE02              CPI  2
20ED D2D321            JNC  LEN        JUMP TRANCTR>1
                *
20F0 21E408            LXI  H,TQM
20F3 11EA08            LXI  D,TTSVD
20F6 CD0003            CALL COMPARE
20F9 D2B421            JNC  ES         JUMP TQM>-TTSVD
```

```
20FC C3D321          JMP  LEN
               ◆
20FF 3A7F08 PHOMIT LDA  MAXP       GET LAST PHASE TIME
2102 87              ADD  A
2103 218009          LXI  H,PHASE0
2106 85              ADD  L
2107 6F              MOV  L,A      POINT TO LAST PHASE
2108 7E              MOV  A,M
2109 328408          STA  LPT       STORE IN LPT
210C 2C              INR  L         (LAST PHASE TIME)
210D 7E              MOV  A,M
210E 328508          STA  LPT+1
               ◆
2111 2AEA08          LHLD TTSVD
2114 22B008          SHLD X'08B0'
2117 218408          LXI  H,LPT
211A CDA302          CALL DECAD1     TTSVD+LPT
211D 2AB008          LHLD X'08B0'
2120 22EA08          SHLD TTSVD      =TTSVD
               ◆
2123 21E208          LXI  H,TROD
2126 11EA08          LXI  D,TTSVD
2129 CD0003          CALL COMPARE
212C D26521          JNC  BS        JUMP TTSVD>=TROD
               ◆
212F 3A5908          LDA  TRANCTR
2132 FE02            CPI  2
2134 D2D321          JNC  LEN        JUMP TRANCTR>1
2137 21E408          LXI  H,TQM
213A 11EA08          LXI  D,TTSVD
213D CD0003          CALL COMPARE
2140 DAD321          JC   LEN        JUMP TQM>TTSVD
2143 CDCA21 AS       CALL DROPLAST
2146 2A8408          LHLD LPT
2149 22B008          SHLD X'08B0'
214C 21E808          LXI  H,EGT
214F CDA302          CALL DECAD1     LPT+EGT
2152 21EC08          LXI  H,ST
2155 CDA302          CALL DECAD1     LPT+EGT+ST
2158 11B008          LXI  D,X'08B0'
215B CDEB21          CALL TRPSUB
215E 11E808          LXI  D,EGT
2161 CDD721          CALL PHDRSUB
2164 C9              RET
               ◆
2165 CDCA21 BS       CALL DROPLAST
2168 11E208          LXI  D,TROD
216B CDEB21          CALL TRPSUB
216E 2A8408          LHLD LPT
2171 22B008          SHLD X'08B0'
2174 21EC08          LXI  H,ST
2177 CDA302          CALL DECAD1     LPT+ST
217A 2AB008          LHLD X'08B0'
217D 22EC08          SHLD ST         =ST
               ◆
2180 21E208          LXI  H,TROD
2183 11EC08          LXI  D,ST
2186 CDC003          CALL SUBDEC     TROD-ST
2189 B7              ORA  A          SIGN IS IN A
218A CA9321          JZ   BS2        JUMP IF NEGATIVE
218D 11B008 BS1      LXI  D,X'08B0'
2190 CDD721          CALL PHDRSUB
2193 AF     BS2      XRA  A
2194 325908          STA  TRANCTR
2197 C9              RET
               ◆
2198 11E208 CS       LXI  D,TROD
219B CDEB21          CALL TRPSUB
219E 21E208          LXI  H,TROD
21A1 11EC08          LXI  D,ST
21A4 CDC003          CALL SUBDEC     TROD-ST
21A7 C38D21          JMP  BS1
               ◆
21AA 11E208 DS       LXI  D,TROD
21AD CDEB21          CALL TRPSUB
```

```
21B0 C39321          JMP   BS2
21B3 C9              RET
               *
21B4 11EA08 ES       LXI   D,TTSVD
21B7 CDEB21          CALL  TRPSUB
21BA 21EA08          LXI   H,TTSVD
21BD 11EC08          LXI   D,ST
21C0 CDC003          CALL  SUBDEC     TTSVD-ST
21C3 11B008          LXI   D,X'08B0'
21C6 CDD721          CALL  PHDRSUB
21C9 C9              RET
21CA 3A5D08 DROPLAST LDA IMAGDOC
21CD E6FD            ANI   X'FD'      ISSUE PHASE OMIT
21CF 325D08          STA   IMAGDOC    D1=0
21D2 C9              RET
               *
21D3 CD3F07 LEN      CALL LENGTHEN
21D6 C9              RET
               *
21D7 217C08 PHDRSUB LXI H,PHDR
21DA CDC003          CALL  SUBDEC     PHDR-(D,E)
21DD 2AB008          LHLD  X'08B0'
21E0 227C08          SHLD  PHDR       =PHDR
21E3 11FFFF          LXI   D,X'FFFF'  IS PHDR=0?
21E6 19              DAD   D
21E7 D4F821          CNC   PHSINC     CALL IF PHDR=0
21EA C9              RET
               *
21EB 216908 TRPSUB LXI   H,TRP
21EE CDC003          CALL  SUBDEC     TRP-(D,E)
21F1 2AB008          LHLD  X'08B0'
21F4 226908          SHLD  TRP        =TRP
21F7 C9              RET
               *
               *PHASE INCREMENT--INCREMENT THE PHASE
               *AND PUT IN NEW PHDR SINCE THE PRESENT
               *PHDR IS ZERO.
21F8 E5        PHSINC PUSH H
21F9 217E08          LXI   H,PHSTAT   INCREMENT PHSTAT
21FC 34              INR   M
21FD 7E              MOV   A,M
21FE 87              ADD   A
21FF 218009          LXI   H,PHASE0
2202 85              ADD   L
2203 6F              MOV   L,A        NEXT PHASE ADDRESS
2204 7E              MOV   A,M        NEXT PHASE
2205 327C08          STA   PHDR
2208 E1              POP   H
2209 C9              RET
               *OFFMAS
               *OFFSEC
               *
               *DIRECTION EQUATES
0000           AV    EQU   X'00'
0010           INB   EQU   X'10'
0020           OUTB  EQU   X'20'
0030           PERAV EQU   X'30'
               *
220A E5        OFFMAS PUSH H
220B D5              PUSH  D
220C C5              PUSH  B
220D 3AC608          LDA   MOTELEM
2210 328A08          STA   ECLF
2213 3AC708          LDA   MOTELEM+1
2216 47              MOV   B,A
2217 E60F            ANI   X'0F'
2219 328B08          STA   ECLF+1
221C 78              MOV   A,B
221D E630            ANI   X'30'
221F 328C08          STA   DIRECT
2222 FE30            CPI   PERAV
2224 CA6E22          JZ    AVGPCT
2227 FE00            CPI   AV
2229 CA6522          JZ    OBD
222C FE20            CPI   OUTB       LOOK FOR OUTBOUND
```

```
222E 2116FB          LXI  H,X'FB16' PREFACE FOR TWS
2231 CA3622          JZ   OFF1
2234 2E14            MVI  L,X'14'
2236 CD3007 OFF1     CALL TWS
2239 21FB02          LXI  H,X'02FB' SHIFT FB LEFT 2
223C CD8003          CALL NIBLEFT   BYTES TO IMPROVE
223F 11FBC2          LXI  D,X'C2FB' RES.  FB/C2
2242 CD1006          CALL DIVIDE    TWS/SPEED WARP
2245 3AA608          LDA  X'08A6'   LOAD # OF SHIFTS
2248 FE01            CPI  1
224A CA5322          JZ   OFF2      JUMP IF 1 SHIFT
224D 2AA308          LHLD X'08A3'   NO, LOAD BYTES AND
2250 C35C22          JMP  OFF3      JUMP TO STORE
2253 21A303 OFF2     LXI  H,X'03A3' MOVE 1 NIBBLE LEFT
2256 CD8003          CALL NIBLEFT   MOVE MSD TO 08A5
2259 2AA408          LHLD X'08A4'
225C 22F608 OFF3     SHLD OFFDIR
225F 22FB08          SHLD OFFN
2262 C3B722          JMP  CMPOFF
2265 2116FB OBD      LXI  H,X'FB16'
2268 CD3007          CALL TWS
226B C3B722          JMP  CMPOFF
226E 211084 AVGPCT   LXI  H,X'8410'
2271 CD3007          CALL TWS
2274 AF              XRA  A         CLEAR FIRST BYTE
2275 328308          STA  X'0883'   FOR DIVISOR
2278 2AC408          LHLD PAVGSW    % AVG SPEED WARP
227B 228608          SHLD X'0886'
227E 218602          LXI  H,X'0286'
2281 CD8003          CALL NIBLEFT   SHIFT SPEED WARP
2284 118366          LXI  D,X'6683' SETUP FOR DIVIDE
2287 CD1006          CALL DIVIDE    OFFAVP=TWS/SPD WRP
228A 3AA608          LDA  X'08A6'   FETCH DIVISOR SHIF
228D FE01            CPI  1         IS IT 1?
228F CA9822          JZ   TSR
2292 2AA308          LHLD X'08A4'   FETCH OFFAVP
2295 C3A122          JMP  MULT
2298 21A302 TSR      LXI  H,X'02A3' SHIFT RESULT
229B CD8003          CALL NIBLEFT
229E 2AA408          LHLD X'08A4'
22A1 228008 MULT     SHLD X'0880'
22A4 7D              MOV  A,L
22A5 32EF08          STA  OFFAVP    AVG OFFSET IN %
22A8 1180F0          LXI  D,X'F080' ECLP X OFFAVP
22AB CD2003          CALL DECMULT
22AE 2AB108          LHLD X'08B1'
22B1 22F808          SHLD OFFAVS
22B4 C34D23          JMP  EXIT
            *
            *THIS SECTION COMPUTES THE NET OFFSET
            *
            *IS ECL<OFFN(NET OFFSET)
22B7 21FB08 CMPOFF LXI  H,OFFN
22BA 118A08          LXI  D,ECLF
22BD AF              XRA  A         INIT CYCLE COUNTER
22BE 32FA08          STA  N
22C1 CD0003 CMP01    CALL COMPARE
22C4 CACA22          JZ   CMPEQ     BR IF =
22C7 D2E622          JNC  CMP02     BR IF ECL>OFFN
            *HERE IF ECL<=OFFN
            *COMPUTE OFFN=OFFN-ECLF
            * 30<=ECLF<=299
22CA EB     CMPEQ    XCHG           ECLF TO H,L
22CB CD5707          CALL LIMITCHK
22CE EB              XCHG
22CF CDC003          CALL SUBDEC
22D2 3AB008          LDA  SUBLSD    STORE RESULT IN
22D5 77              MOV  M,A       OFFSET AVERAGE/
22D6 3AB108          LDA  SUBLSD+1  IN SECONDS
22D9 32FC08          STA  OFFN+1
22DC 3AFA08          LDA  N         BUMP CYCLE COUNT
22DF 3C              INR  A
22E0 32FA08          STA  N
22E3 C3C122          JMP  CMP01     KEEP LOOPING
            *
```

```
             *HERE WHEN OFFN AND N HAVE BEEN COMPUTED
             *NOW CHECK IF AVERAGES SHOULD BE COMPUTD
22E6 3A8C08 CMP02  LDA  DIRECT
22E9 FE00          CPI  AV
22EB C24D23        JNZ  EXIT       BR IF NO AV.
             *
             *COMPUTE AVERAGES IN SECONDS AND %
22EE 1E8A          MVI  E,ECLF-DIVBASE  LSD OF ECL A
22F0 3E04          MVI  A,4        STORE DIVISOR
22F2 328008        STA  C4
22F5 AF            XRA  A
22F6 328108        STA  C4+1
22F9 1680          MVI  D,C4-DIVBASE  LSD OF C4 ADR
22FB CD1006        CALL DIVIDE
             *
             *QUOTIENT IS IN LOC. 'QUOT'
             *CHECK IF > THAN NET OFFSET
22FE 21A308        LXI  H,QUOT
2301 11FB08        LXI  D,OFFN
2304 CD0003        CALL COMPARE
2307 CA1A23        JZ   CMP04      BR IF =
230A D21A23        JNC  CMP04      BR <
             *
             *HERE IF ECL/4 >= OFFN
230D AF     CMP03  XRA  A          AET AV OFFSET=0
230E 32F808        STA  OFFAVS
2311 32F908        STA  OFFAVS+1
2314 32EF08        STA  OFFAVP     SET AV. IN %=0
2317 C34D23        JMP  EXIT       BYE
             *
             *HERE IF ECL/4 < OFFN
231A 218A08 CMP04  LXI  H,ECLF
231D 11A308        LXI  D,QUOT
2320 CDC003        CALL SUBDEC
             *
             *SEE IF RESULT > OFFN
2323 21B008        LXI  H,SUBLSD   ADR OF PREV SUBT.
2326 11FB08        LXI  D,OFFN
2329 CD0003        CALL COMPARE
232C CA0D23        JZ   CMP03      BR. IF =
232F D20D23        JNC  CMP03      BR. IF RES.< OFFN
             *
             *HERE IF RESULT WAS > OFFN
2332 1E8A          MVI  E,ECLF-DIVBASE
2334 3E02          MVI  A,2
2336 328008        STA  C4
2339 AF            XRA  A
233A 328108        STA  C4+1
233D 1680          MVI  D,C4-DIVBASE
233F CD1006        CALL DIVIDE     CMP. 50% AVERAGE
             *QUOTIENT IS IN LOC. 'QUOT'
2342 2AA308        LHLD QUOT       STORE AVERAGE IN
2345 22F808        SHLD OFFAVS     SECONDS
2348 3E50          MVI  A,X'50'    STORE 50%
234A 32EF08        STA  OFFAVP     IN AVERAGE IN %
234D C1     EXIT   POP  B
234E D1            POP  D
234F E1            POP  H
2350 C9            RET
2351 2A6A09 OFFSEC LHLD PRESQ+2    FETCH TELEM
2354 22C608        SHLD X'08C6'    DATA
             *
             *SAVE OLD DATA
2357 21F608        LXI  H,X'08F6'
235A 11E609        LXI  D,X'09E6'
235D CD7823        CALL TRANSOFF
2360 21F609        LXI  H,X'09F6'
2363 11F608        LXI  D,X'08F6'
2366 CD7823        CALL TRANSOFF
2369 CD0A22        CALL OFFMAS     COMPUTE OFFSETS
236C EB            XCHG            SAVE OFFSEC DATA
236D CD7823        CALL TRANSOFF
2370 EB            XCHG
2371 21E609        LXI  H,X'09E6'
```

```
2374 CD7823          CALL TRANSOFF
2377 C9              RET
              *
              *SUBR. TO MOVE 7 BYTES OF DATA AT A SHOT
              *
2378          TRANSOFF EQU *
2378 E5              PUSH H
2379 D5              PUSH D
237A C5              PUSH B
237B 0E07            MVI  C,7         MOVE 7 BYTES
237D 7E       LOOP   MOV  A,M         MOVE A BYTE
237E 12              STAX D
237F 23              INX  H
2380 13              INX  D
2381 0D              DCR  C
2382 C27D23          JNZ  LOOP
2385 C1              POP  B
2386 D1              POP  D
2387 E1              POP  H
2388 C9              RET
2389                 ORG  X'23F4'
23F4 C30020          JMP  SHORTEN
23F7 C30A22          JMP  OFFMAS
23FA C35123          JMP  OFFSEC
23FD 00              DC   0,0,0
23FE 00
23FF 00
2400                 END  0
              *MASTER COUNTER UPDATE
0000                 ORG  X'2400'                                PAGE 2
2400 E5       CTRMAS PUSH H
2401 D5              PUSH D
              *                 INCREMENT RTC AND ACTM
2402 216B08          LXI  H,RTC       RUNNING TIME
2405 CD0A05          CALL INC4        2 BYTE INCREMENT
2408 216308          LXI  H,ACTM
240B CD0505          CALL INC3        3 DIGIT INCREMENT
240E AF              XRA  A           CLEAR ENDSYNC
240F 327009          STA  ENDSYNC
2412 3A7409          LDA  TELFAIL     GET TELEMETRY STAT
2415 B7              ORA  A
2416 C2FE24          JNZ  FAIL        JUMP IF FAILURE
2419 3A7C09          LDA  OLDTLFL     OLD TELFAIL STATUS
241C B7              ORA  A
241D C28F24          JNZ  RESTART     JUMP IF FIRST GOOD
2420 210000          LXI  H,0         CLEAR TFCTR
2423 227509          SHLD TFCTR
2426 AF              XRA  A           SET STANDBY=1
2427 3C              INR  A
2428 32FD08          STA  STANDBY
242B 216508          LXI  H,TRM       DECREMENT TRM
242E CDA004          CALL DEC3
2431 DA9624          JC   TIMOUT      JUMP TO START NEW
2434 3A7109          LDA  SYNCFLTR    GET SYNC BIT
2437 B7              ORA  A
2438 C2CA24          JNZ  SYNC        JUMP SYNC PRESENT
243B 3A7A09          LDA  CYCSTAT     1=END OF SYNC
243E FE02            CPI  2           2=END + 1 SECOND
2440 C2A724          JNZ  WAIT        JUMP IF 0 OR 1
2443 AF              XRA  A           CLEAR CYCSTAT
2444 327A09          STA  CYCSTAT
2447 3C              INR  A           SET ENDSYNC
2448 327009          STA  ENDSYNC
244B 2A6308          LHLD ACTM
244E 227709          SHLD SYNCDUR     SYNCDUR=ACTM
2451 210100          LXI  H,1
2454 22B008          SHLD X'08B0'     1 SECONDS
2457 217709          LXI  H,SYNCDUR
245A CDA302          CALL DECAD1      SYNCDUR+1
245D 2AC008          LHLD ECLB
2460 7C              MOV  A,H         MASK OFF FLAGS
2461 E60F            ANI  X'0F'
2463 67              MOV  H,A
2464 228008          SHLD X'0880'
```

```
2467 218008          LXI  H,X'0880'
246A CDA302          CALL DECAD1       SYNCDUR+1+ECLB
246D 2AB008          LHLD X'08B0'
2470 225408          SHLD ECLM         TO ECLM
2473 3AC108          LDA  ECLB+1       FLAGS
2476 E6F0            ANI  X'F0'        JUST FLAGS
2478 84              ADD  H
2479 67              MOV  H,A
247A 225208          SHLD ECLMF        ECLM + FLAGS
247D 215408          LXI  H,ECLM
2480 116308          LXI  D,ACTM
2483 CDC003          CALL SUBDEC       ECLM-ACTM
2486 2AB008          LHLD X'08B0'
2489 226508          SHLD TRM          M=ECLM-ACTM

248C C3AB25          JMP  CMEXIT
                *
                *TELEMETRY IS RESTARTING
248F AF         RESTART XRA A          CLEAR OLDTLFL
2490 327C09          STA  OLDTLFL
2493 C3E324          JMP  S1
                *
                *MASTER CYCLE HAS TIMED OUT
2496 3A7A09     TIMOUT LDA  CYCSTAT
2499 B7              ORA  A
249A C2D124          JNZ  S0           JUMP IF STILL =1
249D 3A7109          LDA  SYNCFLTR
24A0 B7              ORA  A
24A1 CAD124          JZ   S0           JUMP NO SYNC
24A4 C3B324          JMP  NEWCY        START NEW CYCLE
                *
                *WAIT 1 SECOND TO ALLOW FOR A CHECK FOR
                *TELEMETRY FAILURE
24A7 B7         WAIT  ORA  A
24A8 CAAB25          JZ   CMEXIT       JUMP IF AFTER END
24AB 3E02            MVI  A,2            OF SYNC
24AD 327A09          STA  CYCSTAT      SET FLAG SYNC OFF
24B0 C3AB25          JMP  CMEXIT
                *
                *START A NEW CYCLE
24B3 AF         NEWCY XRA  A           CLEAR LOOKSYNC
24B4 327B09          STA  LOOKSYNC
24B7 3C              INR  A            SET CYCSTAT
24B8 327A09          STA  CYCSTAT
24BB 210000 N1       LXI  H,0          CLEAR ACTM
24BE 226308          SHLD ACTM
24C1 219902          LXI  H,X'299'     TRM=299
24C4 226508          SHLD TRM
24C7 C3AB25          JMP  CMEXIT
                *SYNC IS PRESENT
24CA 3A7B09 SYNC     LDA  LOOKSYNC
24CD B7              ORA  A
24CE CAF424          JZ   GREEN
24D1 2A7209 S0       LHLD ECLT
24D4 225208          SHLD ECLMF
24D7 7C              MOV  A,H
24D8 E607            ANI  A,X'0F'      DROP FLAGS
24DA 67              MOV  H,A
24DB 225408          SHLD ECLM
24DE AF              XRA  A            SET ENDSYNC
24DF 3C              INR  A
24E0 327009          STA  ENDSYNC
24E3 3A7109 S1       LDA  SYNCFLTR
24E6 B7              ORA  A
24E7 C2B324          JNZ  NEWCY
24EA 327A09          STA  CYCSTAT      CLEAR CYCSTAT
24ED 3C              INR  A
24EE 327B09          STA  LOOKSYNC
24F1 C3BB24          JMP  N1
                *
                *SYNC PERSISTS IN GREEN OR IS EARLY
24F4 3A7A09 GREEN    LDA  CYCSTAT
24F7 B7              ORA  A
24F8 C2AB25          JNZ  CMEXIT       JUMP IF IN GREEN
24FB C3B324          JMP  NEWCY        SYNC IS EARLY
```

```
                *
                *TELEMETRY HAS FAILED
24FE AF         FAIL    XRA   A           SET OLDTLFL
24FF 3C                 INR   A
2500 327C09             STA   OLDTLFL
2503 3A7A09             LDA   CYCSTAT
2506 B7                 ORA   A
2507 CA3225             JZ    F1          JUMP THIS CY 0'ED
250A 2A7209             LHLD  ECLT
250D 7C                 MOV   A,H
250E E60F               ANI   X'0F'       DROP FLAGS
2510 67                 MOV   H,A
2511 228008             SHLD  X'0880'
2514 218008             LXI   H,X'0880'
2517 116308             LXI   D,ACTM
251A CDC003             CALL  SUBDEC      ECLT-ACTM
251D 2AB008             LHLD  X'08B0'
2520 226508             SHLD  TRM        TRM=ECLT-ACTM
2523 7D                 MOV   A,L
2524 84                 ADD   H
2525 CA8525             JZ    F2          JUMP IF TRM=0
2528 3AB208             LDA   X'08B2'     SIGN
252B B7                 ORA   A
252C F28525             JP    F2          JUMP IF MINUS
252F C39525             JMP   F3
                *
2532 217509 F1          LXI   H,TFCTR     INCREMENT TFCTR
2535 110018             LXI   D,X'1800'
2538 CD0A05             CALL  INC4
253B D27C25             JNC   F1A         JUMP NOT 1800
                *RETURN TO STANDBY
253E 3E03               MVI   A,3         CLEARANCE=3
2540 32CB08             STA   CLEAR
2543 3A090C             LDA   SWITCH      READ STANDBY CL
2546 2F                 CMA
2547 E60F               ANI   X'0F'       JUST TWS
2549 21F000 LHLD        LXI   H,TABLE
254C 85                 ADD   L
254D 6F                 MOV   L,A
254E 6E                 MOV   L,M         CYCLE LENGTH
254F AF                 XRA   A
2550 67                 MOV   H,A
2551 22F008             SHLD  ECLP
2554 227209             SHLD  ECLT
2557 CD3607             CALL  PHTMSET
255A 21F008             LXI   H,ECLP
255D 118009             LXI   D,PHASE0
2560 CDC003             CALL  SUBDEC      ECLP-PHASE0
2563 21CB08             LXI   H,CLEAR
2566 CDA302             CALL  DECAD1      ECLP-PHASE0+CLEAR
2569 2AB008             LHLD  X'08B0'
256C 22C009             SHLD  ECLB1
256F 22C008             SHLD  ECLB
2572 210001             LXI   H,X'0100'   SET SPEED WARP 100
2575 22C208             SHLD  SPDWRP
2578 AF                 XRA   A           CLEAR STANDBY
2579 32FD08             STA   STANDBY
257C 216508 F1A         LXI   H,TRM       DECREMENT TRM
257F CDA004             CALL  DEC3
2582 D2A725             JNC   F4          JUMP NOT ZERO
2585 210000 F2          LXI   H,0         CLEAR ACTM
2588 226308             SHLD  ACTM
258B 2A7209             LHLD  ECLT
258E 7C                 MOV   A,H         MASK OFF FLAGS
258F E60F               ANI   X'0F'
2591 67                 MOV   H,A
2592 226508             SHLD  TRM         TRM=ECLT
2595 2A7209 F3          LHLD  ECLT
2598 225208             SHLD  ECLMF
259B 7C                 MOV   A,H
259C E60F               ANI   X'0F'       DROP FLAGS
259E 67                 MOV   H,A
259F 225408             SHLD  ECLM        ECLM=ECLT
25A2 AF                 XRA   A           SET ENDSYNC
25A3 3C                 INR   A
```

```
25A4 327009          STA   ENDSYNC
25A7 AF       F4     XRA   A           CLEAR CYCSTAT
25A8 327A09          STA   CYCSTAT
              *
25AB D1       CMEXIT POP   D
25AC E1              POP   H
25AD C9              RET
              *CTRSEC
              *SECONDARY COUNTER UPDATE
              *
25AE E5       CTRSEC PUSH H
25AF D5              PUSH D
25B0 AF              XRA   A
25B1 326409          STA   ADVREQ      CLEAR FLAG
25B4 216708          LXI   H,ACTP
25B7 110100          LXI   D,X'0001'
25BA CD0505          CALL  INC3
25BD D2C425          JNC   SAMECY      JUMP NOT =1
25C0 AF              XRA   A           CLEAR CYCDONE
25C1 327909          STA   CYCDONE
25C4 3A7909 SAMECY   LDA   CYCDONE
25C7 B7              ORA   A
25C8 C2DE25          JNZ   OUT
25CB 3A6109          LDA   PRESENT
25CE 57              MOV   D,A
25CF 3A6209          LDA   NEXT
25D2 92              SUB   D           NEXT-PRESENT
25D3 CADE25          JZ    OUT         JUMP IF STILL =
25D6 AF              XRA   A           SET CYCDONE
25D7 3C              INR   A
25D8 327909          STA   CYCDONE
25DB 326409          STA   ADVREQ      SET ADVREQ
25DE 216908 OUT      LXI   H,TRP
25E1 CDA004          CALL  DEC3
25E4 D1              POP   D
25E5 E1              POP   H
25E6 C9              RET
              *TELRESET
              *RESETS TELFAIL BYTE TO 0 ON EACH
              *LEADING EDGE OF SYNC.
              *
25E7 E5       TELRESET PUSH H
25E8 00              DC    0,0,0
25E9 00
25EA 00
25EB 216F08          LXI   H,SYNCEDGE  FETCH FLAG ADDR
25EE 3A7109          LDA   SYNCFLTR
25F1 1F              RAR               TEST FOR SYNC ON
25F2 D2FF25          JNC   NOSYNC      JUMP IF OFF
25F5 7E              MOV   A,M         FETCH EDGE FLAG
25F6 1F              RAR               TEST D0
25F7 D20426          JNC   RESET       JUMP IF FLAG OFF
25FA 00              DC    0,0,0
25FB 00
25FC 00
25FD E1              POP   H           EXIT
25FE C9              RET
25FF 77       NOSYNC MOV   M,A         RESET FLAG
2600 E1              POP   H
2601 C9              RET
2602 00              DC    0,0
2603 00
2604 AF       RESET  XRA   A
2605 327409          STA   TELFAIL     RESET TELFAIL
2608 3C              INR   A           TURN ON D0
2609 77              MOV   M,A         SET EDGE FLAG
260A E1              POP   H
260B 00              DC    0,0,0
260C 00
260D 00
260E C9              RET
```

What is claimed is:

1. A coordinator for use with a plurality of controllers for coordinating traffic at least along an artery, each controller associated with a side street intersection for controlling traffic signals at said intersection, said coordinator comprising:

(a) means for storing a plurality of values corresponding to cycle lengths, said cycle length values associated with platoons of traffic moving along said artery, and (b) means connected to said storing means for retrieving said cycle length values and for sequentially controlling each of said plurality of controllers in an individual manner to effect said retrieved cycle length values at each associated intersection as said platoons of vehicles move along associated intersections of said artery to thereby coordinate said controllers and traffic along said artery.

2. A coordinator as recited in claim 1 further comprising:

means for receiving input signals, and means cooperating with said storing means for calculating said plurality of cycle length values in response to said input signals, whereby said stored cycle length values correspond to said calculated cycle length values.

3. A coordinator as recited in claim 2 wherein said calculating means and said means for receiving input signals form a master unit which further comprises means for transmitting said calculated cycle length values, and said means for storing and retrieving said plurality of cycle length values form a plurality of secondary units, each secondary unit associated with one of said plurality of controllers and each secondary unit further comprises means for receiving said transmitted calculated cycle length values from said master unit.

4. A coordinator as recited in claim 3 wherein said input signals are generated in response to vehicles.

5. A coordinator as recited in claim 4 wherein said input signals are generated in real time, and said calculating means of said master unit comprises means for calculating said cycle length values in real time for each of said platoons of vehicles.

6. A coordinator as recited in claim 5 wherein said calculating means of said master unit is programmable.

7. A coordinator as recited in claim 6 wherein each of said secondary units comprise programmable calculating means.

8. A coordinator as recited in claim 7 wherein said input signals comprise volume signals generated from volume detectors positioned to sense vehicle volume entering said artery, said calculating means of said master unit calculating said cycle length values in response to said vehicle volume signals.

9. A coordinator as recited in claim 8 wherein said cycle length value consists of a red band time and a green band time and said programmable calculating means of said master unit calculates said cycle length value during a green band time and operates:

(a) to monitor a gap time between successive volume signals, (b) to compare the gap time to a reference time to determine when the gap time exceeds the reference time to establish a gapout condition, (c) to count the number of volume signals corresponding to traffic actuations, $A_R$, by vehicles during at least the artery red band time immediately preceding the artery green band time, (d) to multiply the number $A_R$ by a red headway time $E_R$ to form a product $T_R$, (e) to determine if a gapout condition occurs prior to a maximum green band time, and, (i) to determine the quantity $T_G=(A_G)(E_G)$ where, $A_G$ is the number of actuations during the green band time prior to the occurrence of the gapout condition, and $E_G$ is a green headway time, and (ii) to compare the quantity $S_G=T_R+T_G$ to the time at which the gapout condition occurs from the start of the green band time, and (iii) to select the larger of the two compared times as the calculated green band time to establish said cycle length for transmission to said secondary units, and (f) to restrict the cycle length value transmitted to said secondary units to correspond to a green band time less than or equal to said maximum green band time.

10. A coordinator as recited in claim 9 wherein said reference time is a linear decreasing function time.

11. A coordinator as recited in claim 10 wherein said master unit comprises manually operable switches for selecting the slope of said linear decreasing function of time.

12. A coordinator as recited in claim 9 wherein said master unit further comprises manually operable switches for selecting said maximum green band time.

13. A coordinator as recited in claim 9 wherein said programmable calculating means of said master unit further operates to restrict the cycle length value transmitted to said secondary units to correspond to a green band time greater than or equal to a minimum green band time.

14. A coordinator as recited in claim 13 wherein said master unit further comprises manually operable switches for selecting said minimum green band time.

15. A coordinator as recited in claim 9 wherein said master unit further comprises manually operable switches for selecting said red headway time $A_R$.

16. A coordinator as recited in claim 9 wherein said master unit further comprises manually operable switches for selecting said green headway time $A_G$.

17. A coordinator as recited in claim 9 wherein said input signals further comprise occupancy signals, said occupancy signals generated from occupancy vehicle detectors positioned to sense vehicle occupancy within said artery.

18. A coordinator as recited in claim 17 wherein said occupancy signals have a variable pulse width corresponding to vehicle occupancy and said master unit further comprises means for converting said variable pulse width signals into a corresponding cycle length value.

19. A coordinator as recited in claim 18 wherein said converting means comprises means for selecting a linear function of cycle length values to pulse width signals.

20. A coordinator as recited in claim 19 wherein said selecting means comprises manually operable switches on said master unit.

21. A coordinator as recited in claim 20 wherein said manually operable switches select end points of said linear function to correspond to green band time values having said minimum green band time and said maximum green band time.

22. A coordinator as recited in claim 18 wherein said calculating means of said master unit further operates to select the larger of the cycle length values as calculated in response to said volume and occupancy input signals for transmission to said secondary units.

23. A coordinator as recited in claim 8 wherein said input signals further comprise occupancy signals, said occupancy signals generated from occupancy vehicle detectors positioned to sense vehicle occupancy within said artery.

24. A coordinator as recited in claim 23 wherein said occupancy signals have a variable pulse width corresponding to vehicle occupancy and said calculating means of said master unit further comprises means for converting said variable pulse width signals into a corresponding cycle length value.

25. A coordinator as recited in claim 24 wherein said converting means comprises means for selecting a linear function of cycle length values to pulse width signals.

26. A coordinator as recited in claim 24 wherein said calculating means of said master unit further comprises means for selecting the larger of the cycle length values as calculated in response to said volume and occupancy input signals for transmission to said secondary units.

27. A coordinator as recited in claim 25 wherein said selecting means comprises manually operable switches on said master unit.

28. A coordinator as recited in claim 27 wherein said calculated cycle length consists of a red band time and a green band time and said manually operable switches select end points of said linear function to correspond to green band values having a minimum green band time and a maximum green band time, said master unit further comprising means for setting said minimum and maximum green band times.

29. A coordinator as recited in claim 28 wherein said master unit further comprises manually operable switches for selecting said red band time.

30. A coordinator as recited in claim 28 wherein said master unit further comprises manually operable switches for selecting a plurality of red band times, said master unit comprising means for selecting said red band times in response to the value of said calculated green band time.

31. A coordinator as recited in claim 9 wherein each of said plurality of secondary units comprises means for selecting an offset value in time units, said offset value selectable independently of said calculated cycle length values.

32. A coordinator as recited in claim 31 wherein each of said plurality of secondary units comprises means for manually selecting said offset value, and wherein said secondary units are positioned adjacent said associated controllers.

33. A coordinator as recited in claim 9 wherein said coordinator is operable in an inbound and outbound mode, said inbound mode operative for coordinating said plurality of controllers to produce a favored inbound direction of traffic flow and said outbound mode operative for coordinating said plurality of controllers to produce a favored outbound direction of traffic flow.

34. A coordinator as recited in claim 33 wherein said master unit further comprises means for selecting separate values for $E_R$ and $E_G$ corresponding to each of said inbound and outbound modes and said calculating means of said master unit operates to utilize same in calculating the quantity $S_G$ for the corresponding modes.

35. A coordinator as recited in claim 34 wherein said means for selecting said separate values for $E_R$ and $E_G$ of said master unit comprises manually operable switches.

36. A coordinator as recited in claim 8 wherein each of said plurality of secondary units comprises means for selecting an offset value in time units, said offset value selectable independently of said calculated cycle length values.

37. A coordinator as recited in claim 36 wherein said time units is seconds of vehicle travel time.

38. A coordinator as recited in claim 37 wherein each of said plurality of secondary units comprises means for manually setting said offset value.

39. A coordinator as recited in claim 38 wherein said secondary units are positioned adjacent said associated controllers.

40. A coordinator as recited in claim 36 wherein said input signals further comprise occupancy signals generated from occupancy vehicle detectors positioned to sense vehicle occupancy within said artery.

41. A coordinator as recited in claim 40 wherein said master unit further comprises means for changing the offset value of said secondary units in response to said occupancy signals.

42. A coordinator as recited in claim 41 wherein said master unit comprises manually operable switches for enabling selection of the change in offset value.

43. A coordinator as recited in claim 42 wherein said master unit further comprises manually operable switches associated with said switches for enabling selection of the change in offset value, said associated switches corresponding to setpoint occupancy values, whereby different changes in offset values are selected in response to different values of occupancy.

44. A coordinator as recited in claim 3 wherein each of said plurality of secondary units comprises means for selecting an offset value in time units, said offset value selectable independently of said calculated cycle length values.

45. A coordinator as recited in claim 44 wherein said time units is seconds of vehicle travel time.

46. A coordinator as recited in claim 45 wherein each of said plurality of secondary units comprises means for manually selecting said offset value.

47. A coordinator as recited in claim 46 wherein said secondary units are positioned adjacent said associated controllers.

48. A coordinator as recited in claim 9 wherein said calculating means of said master unit additionally operates to count the number of actuations during a last car passage time (LCP) immediately preceding said red band time, and said quantity $T_R$ is formed by:

$$T_R=(A_R+LCP)E_R$$

49. A coordinator as recited in claim 48 wherein said coordinator is operable in an inbound and outbound mode, said inbound mode operative for coordinating said plurality of controllers to produce a favored inbound direction of traffic flow and said outbound mode operative for coordinating said plurality of controllers to produce a favored outbound direction of traffic flow.

50. A coordinator as recited in claim 49 wherein said master unit further comprises means for selecting separate values for LCP corresponding to each of said inbound and outbound modes.

51. A coordinator as recited in claim 3 wherein said coordinator is operable in an inbound and outbound mode, said inbound mode operative for coordinating said plurality of controllers to produce a favored inbound direction of traffic flow and said outbound mode operative for coordinating said plurality of controllers to produce a favored outbound direction of traffic flow.

52. A coordinator as recited in claim 51 wherein said input signals comprise volume and occupancy signals and said calculating means of said master unit calculates a cycle length value in response to said volume and occupancy signals and further comprises means for selecting the larger of said calculated cycle length values for transmission of same to said secondary units.

53. A coordinator as recited in claim 52 wherein said coordinator is operative in an average mode and said master unit further comprises means for generating average cycle length values.

54. A coordinator as recited in claim 53 wherein said master unit comprises a plurality of manually operable switches for setting a plurality of average cycle length values and means for selecting one of said values for transmission to said secondary units in said average mode.

55. A coordinator as recited in claim 54 wherein said selecting means comprises means for averaging said larger value of cycle length in said inbound mode with said larger value of cycle length in said outbound mode and means for comparing said average value with said set plurality of cycle length values.

56. A coordinator as recited in claim 3 wherein said secondary units comprise means for retrieving said last received cycle length value for controlling said controllers in the event of communication breakdown between said master and secondary units.

57. A coordinator as recited in claim 3 wherein said secondary units comprise means for sending force-off commands to said associated controllers for controlling same.

58. A coordinator as recited in claim 57 wherein said secondary units comprise manually operable switches for selecting times for issuing said force-off commands for different phases of traffic flow.

59. A coordinator as recited in claim 58 wherein said selected times are in seconds.

60. A coordinator as recited in claim 59 wherein said force-off commands are selectable independently of cycle length values.

61. A coordinator as recited in claim 2 further comprising means for sending force-off commands to said associated controllers for controlling same.

62. A coordinator as recited in claim 61 further comprising manually operable switches for selecting times for issuing said force-off commands for different phases of traffic flow.

63. A coordinator as recited in claim 62 wherein said force-off commands are selectable independently of cycle length values.

64. A coordinator as recited in claim 2 wherein said coordinator is operable in an inbound and outbound mode, said inbound mode operative for coordinating said plurality of controllers to produce a favored inbound direction of traffic flow and said outbound mode operative for coordinating said plurality of controllers to produce a favored outbound direction of traffic flow.

65. A coordinator as recited in claim 64 wherein said input signals comprise volume and occupancy signals and said calculating means calculates a cycle length value in response to said volume and occupancy signals and further comprises means for selecting the larger of said calculated cycle length values for controlling said plurality of controllers.

66. A coordinator as recited in claim 65 wherein said coordinator is operative in an average mode and comprises means for generating average cycle length values.

67. A coordinator as recited in claim 66 further comprising a plurality of manually operable switches for setting a plurality of average cycle length values and means for selecting one of said average cycle length values for controlling said plurality of controllers in said average mode.

68. A coordinator as recited in claim 67 wherein said means for selecting one of said average cycle length values comprises means for averaging said larger value of calculated cycle length from an inbound mode with said larger value of calculated cycle length from an outbound mode.

69. A coordinator as recited in claim 1 wherein said coordinator is operable in an inbound and outbound mode, said inbound mode operative for coordinating said plurality of controllers to produce a favored inbound direction of traffic flow and said outbound mode operative for coordinating said plurality of controllers to produce a favored outbound direction of traffic flow.

70. A coordinator as recited in claim 69 wherein said coordinator is operative in an average mode and comprises means for generating average cycle length values, said coordinator further comprising:

means for sensing vehicles entering said artery in both inbound and outbound directions to provide inbound and outbound direction signals, and means for selecting an inbound, outbound or average mode in response to said inbound and outbound direction signals.

71. A coordinator as recited in claim 1 further comprising means for selecting offset values for said controllers in time units, said offset values selectable independently of said cycle length values.

72. A coordinator as recited in claim 71 wherein said time units are in seconds of vehicle travel time.

73. A traffic coordination system controlling vehicle traffic flow along a main traffic artery and a plurality of side street intersections comprising:

(a) a master unit having programmable computing means, (b) at least one inbound and one outbound volume vehicle detector each measuring vehicles entering said artery and for providing inbound and outbound vehicle volume signals to said master unit in response to inbound and outbound vehicle volume respectively, said inbound and outbound vehicle detectors positioned proximate opposite extremities of the artery under control by said coordination system, (c) at least one inbound and one outbound occupancy vehicle detector for providing inbound and outbound occupancy signals to said master unit in response to inbound and outbound vehicle occupancy respectively, said inbound and outbound occupancy detectors positioned within said artery and removed from said corresponding inbound and outbound volume detectors, (d) a plurality of secondary units each unit interconnected to said master unit and having means for receiving and storing data therefrom, (e) said master unit computing means comprising means for calculating a cycle length value for artery traffic in response to received vehicle volume and occupancy signals, (f) a plurality of controllers, one controller connected for operating traffic signals at each side street intersection of said artery, and (g) a secondary unit connected to each controller for providing traffic signal control commands thereto in response, at least in part, to data received and stored from said master unit, whereby traffic is coordinated along said artery in response to sensed vehicle flow.

74. A traffic coordination system as recited in claim 73 wherein each secondary unit issues force-off commands to associated controllers for terminating a green time interval in response to data from said master unit.

75. A traffic coordination system as recited in claim 73 wherein said system is operable in inbound, outbound and average modes of operation as determined by said master unit in response to said vehicle volume signals, said inbound mode effective to favor inbound traffic flow, said outbound mode effective to favor outbound traffic flow and said average mode effective to favor average traffic flow.

76. A traffic coordination system as recited in claim 75 wherein said computing means of said master unit calculates a cycle length value appropriate for a platoon of vehicles sensed in real-time and transmits data corresponding to said calculated cycle length value to each of said secondary units.

77. A traffic coordination system as recited in claim 76 wherein said means for storing data of each secondary unit comprises memory storage means for storing cycle length values received from said master unit and each secondary unit further comprises means for retrieving said cycle length values for providing said traffic signal control commands to said connected controller after a period of time determined by an offset value, whereby each platoon of vehicles may be optimally passed through each intersection by application of the associated stored cycle length value upon arrival of said platoon at each intersection.

78. A traffic coordination system as recited in claim 76 wherein said means for receiving and storing said cycle length values comprises programmable computing means.

79. A traffic coordination system as recited in claim 78 wherein each secondary unit comprises means for selecting said offset value in time units, said offset value selectable independently of said cycle length values.

80. A traffic coordination system as recited in claim 79 wherein said offset value is selectable in seconds.

81. A traffic coordination system as recited in claim 78 wherein said secondary unit comprises means for presetting said offset value in percent of cycle length value.

82. A traffic coordination system as recited in claim 78 wherein each secondary unit is positioned adjacent said connected controller at the corresponding side street intersection.

83. A traffic coordination system as recited in claim 73 wherein each secondary unit is positioned adjacent said connected controller.

84. A traffic coordination system as recited in claim 83 wherein each secondary unit comprises means for selecting the offset value independently of said cycle length values.

85. A method of coordinating a plurality of traffic signal lights associated with side street intersections for controlling traffic at said intersections and along a common roadway comprising steps of:

(a) storing a plurality of cycle length values, said cycle length values associated with groups of vehicles moving along said roadway, (b) automatically retrieving said stored cycle length values, and (c) automatically, sequentially and individually controlling said traffic signal lights in response to said retrieved cycle length values at offset times corresponding to the position along said roadway of the side street intersections, thereby producing cycle lengths at said intersections corresponding to said retrieved cycle length values.

86. A method as recited in claim 85 further comprising the steps of:

(a) receiving input signals, and (b) automatically calculating from said received input signals said cycle lengths values.

87. A method as recited in claim 86 further comprising the steps of sensing vehicles entering said roadway and generating said input signals in response to said sensed vehicles to provide a directional coordination of said traffic signal lights for said groups of vehicles entering said coordinated roadway.

88. A method as recited in claim 87 wherein said sensing step comprises sensing vehicles entering said roadway in both an inbound and outbound direction and generating input signals in response thereto to provide a directional coordination of said traffic light signals in response to sensed inbound vehicles and sensed outbound vehicles.

89. A method as recited in claim 88 further comprising the steps of:

(a) sensing vehicles within said coordinated roadway, (b) generating additional input signals in response to said vehicles sensed within said coordinated roadway, and (c) calculating said cycle length values from said input signals and said additional input signals.

90. A method as recited in claim 89 further comprising the steps of:

(a) calculating a modification of said offset times in response to said additional input signals, and (b) controlling said traffic light signals at said modified offset times.

91. A method as recited in claim 88 further comprising the steps of:

(a) sensing vehicles within said coordinated roadway, (b) generating additional input signals in response to said vehicles sensed within said coordinated roadway, (c) calculating a modification of said offset times in response to said additional input signals, and (d) controlling said traffic light signals in response at said modified offset times.

92. A method as recited in claim 89 wherein said calculating step comprises:

calculating one cycle length value in response to said input signals, calculating another cycle length value in response to said additional input signals, and said method further comprising the steps of selecting the larger cycle length value from said one and another cycle length values and storing said selected larger value for coordinating said traffic signal lights.

93. A method as recited in claim 92 wherein the step of sensing the vehicles entering said roadway comprises sensing vehicle volume and the step of sensing vehicles within said roadway comprises sensing vehicle occupancy.

94. A method as recited in claim 93 wherein the step of sensing the vehicles entering said roadway comprises sensing vehicle volume and the step of sensing vehicles within said roadway comprises sensing vehicle occupancy.

95. A method as recited in claim 85 further comprising the step of sensing vehicles on said roadway to provide inbound, outbound and average modes of coordinating said traffic signal lights.

96. A method as recited in claim 85 wherein the step of controlling said traffic signal lights comprises the step of generating force-off command signals to controllers associated with said traffic signal lights.

97. A method as recited in claim 85 further comprising the steps of:

(a) sensing vehicle volume entering said coordinated roadway for providing input vehicle volume signals, and (b) calculating the cycle length value in real time from said input vehicle volume signals for the group of vehicles being sensed, whereby said stored cycle length values correspond to groups of sensed vehicles entering said coordinated roadway.

98. A method as recited in claim 97 wherein said cycle length values comprise red band times and green band times and said calculating step comprises calculating a gap time between successive sensed vehicles and terminating said green band time in response, at least in part, to said gap time.

99. A method as recited in claim 98 wherein the step of controlling said traffic signal lights comprises the step of generating force-off command signals to controllers associated with said traffic signal lights.

100. A method as recited in claim 99 wherein said step of terminating said green band time further comprises calculating the number of input vehicle volume signals and delaying the termination of said green band time for numbers exceeding a reference value.

101. A method of coordinating a plurality of traffic signal lights positioned along a common roadway for controlling said roadway and a plurality of side street intersections comprising the steps of:

(a) sensing vehicles along said roadway to provide input signals to a master unit, (b) calculating in said master unit cycle length values in real time corresponding to said sensed vehicles, (c) transmitting said cycle length values to a plurality of secondary units, each secondary unit associated with a side street intersection, (d) storing said cycle length values in said secondary units, (e) individually retrieving said cycle length values in said secondary units for sequential application as force-off commands to associated controllers controlling said traffic signal lights at said side street intersections, and (f) generating said force-off commands at said secondary units at offset times corresponding to the position of the secondary units along said roadway.

102. A method as recited in claim 101 wherein said sensing step comprises sensing vehicle volume entering said roadway for providing said input signals.

103. A method as recited in claim 102 wherein said sensing step further comprises sensing vehicle occupancy within said roadway for providing additional input signals, and said calculating step comprises calculating said cycle length values in response to said input signals and said additional input signals.

104. A method as recited in claim 101 wherein said sensing step comprises sensing vehicles entering said coordinated roadway in both inbound and outbound directions and said method further comprises the step of coordinating said traffic signal lights for favoring traffic flow in one of said inbound and outbound directions in response to the number of sensed inbound and outbound vehicles.

105. Apparatus for coordinating a plurality of traffic signal lights along an artery having a plurality of side street intersections comprising:

(a) means for storing in sequence a plurality of cycle length values, said cycle length values associated with platoons of traffic moving along said artery, and (b) means connected to said storing means for retrieving said cycle length values in sequence and for individually and sequentially controlling said plurality of traffic signal lights to effect said retrieved cycle length values at each associated intersection as said platoons of vehicles move along associated intersections of said artery to thereby coordinate said traffic along said artery.

106. Apparatus as recited in claim 105 further comprising:

means for receiving input signals, and means cooperating with said storing means for calculating said plurality of cycle length values in response to said input signals, whereby said stored cycle length values correspond to said calculated cycle length values.

107. Apparatus as recited in claim 106 wherein:

said calculating means and said means for receiving input signals form a master unit which further comprises means for transmitting said calculated cycle length values, and said means for storing and retrieving said plurality of cycle length values form a plurality of secondary units, each secondary unit associated with one of said plurality of side street intersections and further comprises means for receiving said transmitted calculated cycle length values from said master unit.

108. A coordinator as recited in claim 107 wherein said input signals are generated in response to vehicles.

109. A coordinator as recited in claim 108 wherein said input signals are generated in real time, and said calculating means of said master unit comprises means for calculating said cycle length values in real time for each of said platoons of vehicles.

110. Apparatus as recited in claim 109 wherein said input signals comprise volume signals generated from volume detectors positioned to sense vehicle volume entering said artery, said calculating means of said master unit calculating said cycle length values in response to said vehicle volume signals.

111. Apparatus as recited in claim 110 wherein said cycle length value consists of a green band time and a red band time and said transmitting means of said master unit comprises means for transmitting a sync signal during said green band time at a time related to the calculated cycle length value, and each of said plurality of secondary units comprises means for determining from said sync signal the calculated cycle length value.

112. Apparatus as recited in claim 111 wherein said sync signal corresponds to a change in state of a binary signal.

113. Apparatus as recited in claim 112 wherein said sync signal precedes the end of said green band time by a fixed time interval.

114. Apparatus as recited in claim 113 wherein said transmitting means of said master unit further comprises means for transmitting a coded message corresponding to said cycle length value, and each of said secondary units comprises means for decoding said coded message, whereby said coded message serves as a redundancy check of said received calculated cycle length values as determined from said received sync signal.

115. Apparatus as recited in claim 114 wherein said coded message is transmitted after said sync signal and during the red band time of the next cycle.

116. Apparatus as recited in claim 109 wherein each of said secondary units comprises first counter means for providing a unique running time count of each platoon within said coordinated artery, said running time count stored in said storing means with corresponding cycle length values of said platoons and means for retrieving said running time count and said corresponding cycle length values, whereby said running time count provides an offset value check for platoons passing through said intersections.

117. Apparatus as recited in claim 116 wherein each of said plurality of secondary units comprises a second counter means resettable at the end of each cycle length value for clocking operations within said secondary unit, said second counter means in synchronization with said platoons of vehicles passing through said corresponding intersections.

118. Apparatus as recited in claim 117 wherein each of said plurality of secondary units comprises a third counter means in synchronization with platoons of vehicles associated with said master unit and resettable at the end of cycle length values at said master unit, said first, second and third counter means operable to ensure coordinated vehicle flow through said artery.

119. A traffic coordinator for use on a roadway having a plurality of intersections and traffic lights and means for sensing vehicle traffic along said roadway, said sensing means including means for generating signals indicative of said sensed traffic, said coordinator comprising:

(a) a master unit comprising:
  (i) input interface means for receiving said signals,
  (ii) data processing means connected to said input interface means, said data processing means including a microprocessor, data memory storage means and program memory storage means for programming said microprocessor, said data processing means operable for calculating a cycle length value in response to said received signals and for generating cycle length signals corresponding thereto,
  (iii) output interface means connected to said data processing means for transmitting said cycle length signals, (b) a plurality of secondary units, one secondary unit associated with each of said intersections along said roadway and associated with an offset time from a preselected reference, each secondary unit comprising:
  (i) input interface means operable for receiving said transmitted cycle length signals from said master unit,
  (ii) data processing means connected to said input interface means of said secondary unit and including a microprocessor, data memory storage means and program memory storage means for programming said microprocessor, said data processing means of said secondary unit operable for storing representations of said cycle length signals and for retrieving same in the order of storage for generating force-off command signals corresponding to said cycle length signals at time determined by said associated offset times, and
  (iii) output interface means connected to said data processing means of said secondary unit for receiving said force-off command signals and for applying same to actuate traffic lights at said associated intersections.

* * * * *